United States Patent
Rudow

(10) Patent No.: US 12,407,444 B1
(45) Date of Patent: Sep. 2, 2025

(54) ENHANCED RELIABLE COMMUNICATIONS INCLUDING STREAMING CODES FOR PARTIAL BURSTS AND GUARDSPACES AND SYNERGIZED COMPRESSION

(71) Applicant: Michael H. Rudow, Cleveland, OH (US)

(72) Inventor: Michael H. Rudow, Cleveland, OH (US)

( * ) Notice: Subject to any disclaimer, the term of this patent is extended or adjusted under 35 U.S.C. 154(b) by 0 days.

(21) Appl. No.: 19/021,669

(22) Filed: Jan. 15, 2025

Related U.S. Application Data

(63) Continuation of application No. PCT/US2024/043054, filed on Aug. 20, 2024.

(60) Provisional application No. 63/655,861, filed on Jun. 4, 2024.

(51) Int. Cl.
H04L 1/00 (2006.01)

(52) U.S. Cl.
CPC .......... *H04L 1/0063* (2013.01); *H04L 1/0041* (2013.01); *H04L 1/0059* (2013.01)

(58) Field of Classification Search
CPC ..... H04L 1/004; H04L 1/0041; H04L 1/0057; H04L 1/0059; H04L 1/0063
See application file for complete search history.

(56) References Cited

U.S. PATENT DOCUMENTS

| | | | |
|---|---|---|---|
| 5,699,365 A | 12/1997 | Klayman et al. | |
| 6,421,387 B1 * | 7/2002 | Rhee | H04N 21/6437 375/E7.279 |
| 6,694,478 B1 | 2/2004 | Martinian et al. | |
| 7,257,664 B2 | 8/2007 | Zhang | |
| 8,352,832 B2 | 1/2013 | Khisti et al. | |
| 8,375,266 B2 | 2/2013 | Zhang | |
| 8,775,889 B2 | 7/2014 | Zhang | |
| 9,209,897 B2 | 12/2015 | Amitai et al. | |
| 9,641,803 B1 | 5/2017 | Badr et al. | |
| 9,843,413 B2 | 12/2017 | Badr et al. | |

(Continued)

FOREIGN PATENT DOCUMENTS

WO 2019213556 A1 11/2019

OTHER PUBLICATIONS

Rudow et al., Streaming codes for variable-size messages, IEEE Trans. on Information Theory, vol. 68, No. 9, pp. 5823-5849. (Year: 2022).*

(Continued)

*Primary Examiner* — Shelly A Chase
(74) *Attorney, Agent, or Firm* — Nutter McClennen & Fish LLP

(57) ABSTRACT

Enhanced reliable communications systems, methods, computer program products, and integrated circuits include streaming codes for partial burst and guardspaces and synergized compression. An FEC encoder can generate two or more types of parity symbols to address partial burst and guardspace losses. An FEC encoder can utilize information from a data compressor to make frame splitting, parity symbol generation, and/or packetizing decisions. A data compressor can use information from an FEC encoder to make data compression decisions. Aspects of an FEC encoder and/or data compressor can be trained using machine learning, including reinforcement learning. Multimodal operation provides flexibility for dynamically reacting to changing communication conditions.

124 Claims, 172 Drawing Sheets

(56) References Cited

U.S. PATENT DOCUMENTS

| | | | |
|---|---|---|---|
| 10,833,710 | B2 | 11/2020 | Caramma |
| 10,979,175 | B2 | 4/2021 | Low et al. |
| 11,036,525 | B2 | 6/2021 | Momchilov |
| 11,303,690 | B1* | 4/2022 | Bhattacharyya ... H04N 21/2187 |
| 2013/0039410 | A1* | 2/2013 | Tan ...................... H04N 19/895 |
| | | | 375/240 |
| 2013/0070844 | A1 | 3/2013 | Malladi et al. |
| 2013/0097470 | A1 | 4/2013 | Hwang et al. |
| 2013/0156420 | A1 | 6/2013 | Amitai et al. |
| 2017/0279558 | A1 | 9/2017 | Badr et al. |
| 2018/0034583 | A1* | 2/2018 | Low ...................... H04L 1/0057 |
| 2019/0007069 | A1 | 1/2019 | Caramma |
| 2019/0339997 | A1 | 11/2019 | Momchilov |
| 2020/0044772 | A1 | 2/2020 | Low et al. |
| 2022/0124543 | A1 | 4/2022 | Orhan et al. |
| 2023/0106959 | A1 | 4/2023 | Ananthanarayanan et al. |

OTHER PUBLICATIONS

Ellis et al., Performance analysis of AL-FEC for RTP-based streaming video traffic to residential users, IEEE, pp. 1 to 6. (Year: 2012).*
International Search Report and Written Opinion for International Application No. PCT/US2024/043054, mailed Dec. 31, 2024 (19 pages).
Lin, C., "A RED-FEC Mechanism for Video TransmissionOver WLANs," IEEE Transactions on Broadcasting, vol. 54, No. 3, Sep. 2008 (8 pages).
Lykouris, T., et al., "Competitive Caching with Machine Learned Advice," 2021. J. ACM 68, 4, Article 24 (Jul. 2021), (pp. 24:1-24:25 (25 pages).
Ma, S., et al., "Image and V+B63:B75ideo Compression with Neural Networks: A Review," IEEE Transactions On Circuits And Systems For Video Technology, arXiv:1904.03567v2 [cs.CV] Apr. 10, 2019 (16 pages).
Martinian, E., et al., "Burst Erasure Correction Codes With Low Decoding Delay," IEEE Transactions On Information Theory, vol. 50, No. 10, Oct. 2004 pp. 2494-2502 (9 pages).
Maturana, F., et al., "Access-optimal Linear MDS Convertible Codes for All Parameters," available on arXiv, 2020 (6 pages).
Mazyavkina, N., et al., "Reinforcement learning for combinatorial optimization: A survey," Computers & Operations Research 134 (2021) 105400 (15 pages).
McCanne, S. et al., "Joint Source/Channel Coding for Multicast Packet Video," Proceedings., International Conference on Image Processing, Washington, DC, USA, 1995, pp. 25-28 vol. 1, doi: 10.1109/ICIP.1995.529030 (4 pages).
Mitzenmacher, M., "A Model for Learned Bloom Filters, and Optimizing by Sandwiching," 32nd Conference on Neural Information Processing Systems (NeurIPS 2018), Montréal, Canada (10 Pages).
Moerland, T., et al., "Model-based Reinforcement Learning: A Survey," Foundations and Trends® in Machine Learning, vol. 16, No. 1, pp. 1-118, 2023 (43 pages).
Nagy, M., et al., "Congestion Control using FEC for Conversational Multimedia Communication," MMSys '14 Mar. 19-21, 2014, Singapore, Singapore (12pages).
Narra, H., et al., "Collage Inference: Using Coded Redundancy for Lowering Latency Variation in Distributed Image Classification Systems," 2020 IEEE 40th International Conference on Distributed Computing Systems (ICDCS), Singapore, Singapore, 2020, pp. 453-463, doi: 10.1109/ICDCS47774.2020.00024, pp. 453-463 (11 pages).
Nichols, K., et al., "Controlled Delay Active Queue Management," Internet Engineering Task Force (IETF), Jan. 2018 (25 pages).
Nowroozi, E., et al., "A survey of machine learning techniques in adversarial image forensics," Computers & Security 100 (2021) 102092 (25 pages).
Orosz, P., et al., "A Case Study on Correlating Video QoS and QoE," 2014 IEEE Network Operations and Management Symposium (NOMS) (5 pages).

O'Shea, T. et al., "An Introduction to Deep Learning for the Physical Layer," IEEE Transactions On Cognitive Communications And Networking, vol. 3, No. 4, Dec. 2017.
Pan, R., et al., "Proportional Integral Controller Enhanced (PIE): A Lightweight Control Scheme to Address the Bufferbloat Problem," Internet Engineering Task Force (IETF), Feb. 2017 (30 pages).
Park, K., "AFEC: An Adaptive Forward Error-Correction Protocol and Its Analysis," Department of Computer Science Technical Reports, Report No. 97-038, 1997 (25 pages).
Perkins, C., et al., "A Survey of Packet Loss Recovery Techniques for Streaming Audio," IEEE Network Sep./Oct. 1998 pp. 40-48 (9 pages).
Ponlatha, S., et al., "Comparison of Video Compression Standards," International Journal of Computer and Electrical Engineering, vol. 5, No. 6, Dec. 2013 (7 pages).
Powell, W., "A unified framework for stochastic optimization," European Journal of Operational Research (2018) pp. 1-27 (27 pages).
Raghavendra, R., et al., "Characterizing High-bandwidth Real-time Video Traffic in Residential Broadband Networks," WiOpt'10: Modeling and Optimization in Mobile, Ad Hoc, and Wireless Networks, May 2010, Avignon, France. pp.539-544 (6 pages).
Rao, N., et al., "Analysis of the Effect of QoS on Video Conferencing QoE," https://ieeexplore.ieee.org/abstract/document/8766591, 2019 (6 pages).
Rippel, O., et al., "Learned Video Compression," Computer Vision Foundation, arXiv:1811.06981, Nov. 16, 2018 (10 pages).
Rosenberg, J., et al., "An RTP Payload Format for Generic Forward Error Correction," Network Working Group, Columbia University, Dec. 1999 (26 pages).
Rudow, M. et al., "A locality-based approach for coded computation," arXiv:2002.02440v1 [cs.IT], Feb. 6, 2020 (18 pages).
Rudow, M. et al., "A locality-based lens for Coded computation," retrieved from the internet at: //2021 IEEE International Symposium on Information Theory (ISIT) © 2021 IEEE | DOI: 10.1109/ISIT45174.2021.9518056// (6 pages).
Rudow, M., et al., "Compression-informed coded computing," In 2023 IEEE International Symposium on Information Theory (ISIT), pp. 2177-2182, 2023 (6 pages).
Rudow, M., "Discrete Logarithm and Minimum Circuit Size," Inf. Process. Lett. (2017) http://dx.doi.org/10.1016/j.ipl.2017.07.005 (10 pages).
Rudow, M. et a., "Learning-Augmented Streaming Codes are Approximately Optimal for Variable-Size Messages," arXiv:2205.08521v1 [cs.IT] Extended Version, May 17, 2022 (13 pages).
Rudow, M., et al., "Learning-augmented streaming codes for variable-size messages under partial burst losses," in 2023 IEEE International Symposium on Information Theory (ISIT), 2023, (20 pages).
Rudow, M., et al., "On expanding the toolkit of locality-based coded computation to the coordinates of inputs," 2023 IEEE International Symposium on Information Theory (ISIT) (10 pages).
Rudow, M., et al., "Learning-augmented streaming codes are approximately optimal for variable-size messages," 2022 IEEE International Symposium on Information Theory (ISIT). IEEE, pp. 474-479, 2022 (6 pages).
Rudow, M., et al., "Learning-Augmented Streaming Codes For Variable-Size Messages Under Partial Burst Losses," In 2023 IEEE International Symposium on Information Theory (ISIT), pp. 1101-1106, 2023 (6 pages).
Rudow, M., et al., "On expanding the toolkit of locality-based coded computation to the coordinates of inputs," 2023 IEEE International Symposium on Information Theory (ISIT) (6 pages).
Rudow, M., et al., "Online Versus Offline Rate in Streaming Codes for Variable-Size Messages," arXiv:2006.03045v2 [cs.IT] Feb. 27, 2023 (21 pages).
Rudow, M., et al., "Online Versus Offline Rate In Streaming Codes For Variable-Size Messages," 2020 IEEE International Symposium on Information Theory (ISIT), 2020 (6 pages).
Rudow, M., et al., "Online versus offline rate in streaming codes for variable-size messages," IEEE Transactions on Information Theory, vol. 69, No. 6, pp. 3674-3690, 2023 (17 pages).

(56) References Cited

OTHER PUBLICATIONS

Rudow, M., et al., "Streaming codes for variable-size arrivals," 2018 56th Annual Allerton Conference on Communication, Control, and Computing, (Allerton). IEEE, 2018 (8 pages).

Rudow, M., et al., "Streaming Codes for Variable-Size Messages," IEEE Transactions on Information Theory, vol. 68, No. 9, pp. 5823-5849, Sep. 2022 (27 pages).

Rudow, M., et al., "Tambur: Efficient loss recovery for videoconferencing via streaming codes," In Proceedings of the 20th USENIX Symposium on Networked Systems Design and Implementation, Apr. 17-19, 2023 (20 pages).

Rudow, M., "Efficient loss recovery for videoconferencing via streaming codes and machine learning," Carnegie Mellon University, Thesis, retrieved from the internet at //https://doi.org/10.1184/R1/24992973.v1//, May 2023 (186 pages).

Sharma, S., "Active Queue Management for Forward Error Correction," International Journal of Computing and Business Research (IJCBR) ISSN (Online) : 2229-6166, vol. 3, Issue 2, May 2012 (7 pages).

Sztrik, J., "Basic Queueing Theory," https://irh.inf.unideb.hu/~jsztrik/education/16/SOR_Main_Angol.pdf, 2016 (246 pages).

Sullivan, G., et al., "Video Compression-From Concepts to the H.264/AVC Standard," Proceedings of the IEEE, vol. 93, No. 1, Jan. 2005 (14 pages).

Tan, W., et al., "Video Multicast using Layered FEC and Scalable Compression," in IEEE Transactions on Circuits and Systems for Video Technology, vol. 11, No. 3, pp. 373-386, Mar. 2001, doi: 10.1109/76.911162 (30 pages).

Uehara, M. et al., "A Review of Off-Policy Evaluation in Reinforcement Learning," arXiv:2212.06355v1 [stat.ML] Dec. 13, 2022 (27 pages).

Usman, M., et al., "Survey of Error Concealment Techniques: Research Directions and Open Issues," 2015 Picture Coding Symposium (PCS), Cairns, QLD, Australia, 2015, pp. 233-238, doi: 10.1109/PCS.2015.7170081 (7 pages).

Wah, B., et al. "Survey of Error-Concealment Schemes for Real-Time Audio and Video Transmissions over the Internet," Proceedings International Symposium on Multimedia Software Engineering 2000 (8 pages).

Wang, Y., et al., "Error Control and Concealment for Video Communication: A Review," Proceedings of the IEEE, vol. 86, No. 5, May 1998 (24 pages).

Watson, M. et al., "Forward Error Correction (FEC) Framework," Internet Engineering Task Force (IETF), Oct. 2011 (42 pages).

Adams, R., "Active Queue Management: A Survey," IEEE Communications Surveys & Tutorials, vol. 15, No. 3, Third Quarter 2013 (52 pages).

Adan, I., et al., "Queueing Theory," retrieved from the internet at https://citeseerx.ist.psu.edu/document?repid=rep1&type=pdf&doi=097d866985fc04b986d1f28885de7a0c1e89fce9, Feb. 14, 2001 (180 pages).

Adler, N., et al., "Burst-Erasure Correcting Codes With Optimal Average Delay," IEEE Transactions On Information Theory, vol. 63, No. 5, May 2017, pp. 2848-2865 (18 pages).

Agrawal, A., et al., "A Rewriting System for Convex Optimization Problems," arXiv:1709.04494v2 [math.OC] Jan. 22, 2019, (18 pages).

Alemu,T., "The Interaction of Forward Error Correction and Active Queue Management," JDIR'04 : 6èmes Journées Doctorales Informatique et Réseau, Nov. 2004, Lannion, France. lirmm-00108649.

Almomani, O., et al., "Impact of Large Block FEC with Different Queue Sizes of Drop Tail and RED Queue Policy on Video Streaming Quality over Internet," 2010 Second International Conference on Network Applications, Protocols and Services (5 pages).

Almomani, O., et al., "Performance Study of Large Block FEC with Drop Tail for Video Streaming over the Internet," 2009 First International Conference on Networks & Communications (4 pages).

Alwahab, D., "A Simulation-Based Survey of Active Queue Management Algorithms," ICCBN 2018, Feb. 24-26, 2018, Singapore, Singapore, DOI: https://doi.org/10.1145/3193092.3193106 (7 pages).

Arulkumaran, K., et al., "A Brief Survey of Deep Reinforcement Learning," IEEE Signal Processing Magazine, Special Issue On Deep Learning For Image Understanding (Arxiv Extended Version), arXiv:1708.05866v2 [cs.LG] Sep. 28, 2017 (16 pages).

Author Unknown, "Series G: Transmission Systems and Media, Digital Systems and Networks, Quality of service and performance," ITU-T, Telecommunication Standardization Sector of ITU, Sep. 2001 (18 pages).

Badr, A., et al., "Embedded MDS Codes for Multicast Streaming," 2015 IEEE International Symposium on Information Theory (ISIT) (5 pages).

Baguda, Y., et al., "Adaptive FEC Error Control Scheme for Wireless video Transmission," 2010 The 12th International Conference on Advanced Communication Technology (ICACT) (5 pages).

Bandung, Y., "QoS Analysis for WebRTC Videoconference on Bandwidth-Limited Network," The 20th International Symposium on Wireless Personal Multimedia Communications (WPMC2017), 2017 IEEE pp. 547-553 (7 pages).

Boykov, Y., et al., "An Experimental Comparison of Min-Cut/Max-Flow Algorithms for Energy Minimization in Vision," IEEE Transactions On Pattern Analysis And Machine Intelligence, vol. 26, No. 9, Sep. 2004, pp. 1124-1137 (14 pages).

Brockners, F. "The Case for FEC fueled TCP-like Congestion Control," Kommunikation in Verteilten Systemen (KiVS) 11. ITG/GI-Fachtagung. Darmstadt, 2.-5. Mar. 1999, retrieved from the internet https://citeseerx.ist.psu.edu/document?repid=rep1&type=pdf&doi=0ddd1c2dcc7166b61e5b9bd713cbf895a24355ee (14 pages).

Canese, L., et al., "Multi-Agent Reinforcement Learning: A Review of Challenges and Applications," Appl. Sci. 2021, 11, 4948. https://doi.org/ 10.3390/app11114948 (25 pages).

Carlucci, G., et al., "Analysis and Design of the Google Congestion Control for Web Real-time Communication (WebRTC)," Proceedings of the 7th International Conference on Multimedia Systems, retrieved from the internet at: https://www.researchgate.net/profile/Luca-De-Cicco/publication/303323771_Analysis_and_design_of_the_google_congestion_control_for_web_real-time_communication_WebRTC/links/601d21c892851c4ed54c6ed0/Analysis-and-design-of-the-google-congestion-control-for-web-real-time-communication-WebRTC.pdf (12 pages).

Chang, H., et al., "Can You See Me Now? A Measurement Study of Zoom, Webex, and Meet," IMC '21, Nov. 2-4, 2021, Virtual Event, USA, pp. 216-228 (13 pages).

Clarke, R., "Image and Video Compression: A Survey," Creative Commons License, vol. 10, pp. 20-32, 1999 (13 pages).

Cohen, A., et al., "Adaptive Causal Network Coding With Feedback," EEE Transactions On Communications, vol. 68, No. 7, Jul. 2020 (17 pages).

Dischinger, M., et al., "Characterizing Residential Broadband Networks," 07, Oct. 24-26, 2007, San Diego, California, USA, pp. 43-56, (14 pages).

Domanovitz, D., "An Explicit Rate-Optimal Streaming Code for Channels With Burst and Arbitrary Erasures," IEEE Transactions On Information Theory, vol. 68, No. 1, Jan. 2022 (19 pages).

Duanmu, et al., "A Quality-of-Experience Index for Streaming Video," IEEE Journal Of Selected Topics In Signal Processing, vol. 11, No. 1, Feb. 2017 (13 pages).

Dudzicz, D., et al., "An Explicit Construction of Optimal Streaming Codes for Channels With Burst and Arbitrary Erasures," IEEE Transactions On Communications, vol. 68, No. 1, Jan. 2020 pp. 12-25 (14 pages).

Falk, B., et al., "Properties of Constacyclic Codes Under the Schur Product," arXiv:1810.07630v2 [cs.IT] Oct. 18, 2018 (24 pages).

Falk, B., et al., "Properties of Constacyclic Codes Under the Schur Product," Designs, Codes and Cryptography (2020) 88:993-1021 (29 pages).

Floyd, S. et al., "Random Early Detection Gateways for Congestion Avoidance," IEEE/ACM Transactions on Networking. vol. I. No. 1. Aug. 1993 (17 pages).

(56) References Cited

OTHER PUBLICATIONS

Forney, Jr., G., "Burst-Correcting Codes for the Classic Bursty Channel," IEEE Transactions On Communications Technology, Oct. 1971, pp. 772-781 (10 pages).
Friedman, T., et al., "RTP Control Protocol Extended Reports (RTCP XR)," Network Working Group, Nov. 2003 (55 pages).
Frossard, P., "Joint Source/FEC Rate Selection for Quality-Optimal MPEG-2 Video Delivery," IEEE Transactions On Image Processing, vol. 10, No. 12, Dec. 2001(11 pages).
Geist, M., et al., "Off-policy Learning With Eligibility Traces: A Survey," Journal of Machine Learning Research 15 (2014) 289-333 (45 pages).
Gettys, J., "Bufferbloat: Dark Buffers in the Internet," Published by the IEEE Computer Society, May/Jun. 2011 (2 pages).
Ghavamzadeh, M., et al., "Bayesian Reinforcement Learning: A Survey," Foundations and Trends® in Machine Learning, vol. 8, No. 5-6 (2015) 359-483, 2015, 28 pages.
Gilbert, E., "Capacity of a Burst-Noise Channel," The Bell System Technical Journal, Sep. 1960, pp. 1253-1265 (13 pages).
Ha, H., et al., "Layer-based RED-FEC (L-RED-FEC) method for wireless scalable video streaming," Electronics Letters Sep. 25, 2014 vol. 50 No. 20 pp. 1438-1440 (2 pages).
Huo, Y., et al., "A Tutorial and Review on Inter-Layer FEC Coded Layered Video Streaming," IEEE Communications Surveys & Tutorials 2015 (44 pages).
Ibrahim, I. et al., "Task Scheduling Algorithms in Cloud Computing: A Review," Turkish Journal of Computer and Mathematics Education, vol. 12 No. 4 (2021), pp. 1041-1053 (13 pages).
Jeon, Y., et al., "Blind Detection for MIMO Systems With Low-Resolution ADCs Using Supervised Learning," IEEE ICC 2017 Signal Processing for Communications Symposium (6 pages).
Jiang, P., et al., "Wireless Semantic Communications for Video Conferencing," IEEE Journal on Selected Areas in Communications, vol. 41, No. 1, Jan. 2023 (15 pages).
Kaelbling, L., et al., "Reinforcement Learning: A Survey," Journal of Articial Intelligence Research 4 (1996) 237-285 (49 pages).
Kazemi, M., et al., "A review of temporal video error concealment techniques and their suitability for HEVC and VVC," Multimedia Tools and Applications (2021) 80:12685-12730 (46 pages).
Kotz, D., et al., "Crawdad: A Community, Resource for Archiving, Wireless Data at Dartmouth," Conferences—HP Labs, www.computer.org/pervasive (3 pages).
Krishan, M., et al., "A Quadratic Field-Size Rate-Optimal Streaming Code for Channels with Burst and Random Erasures," 2019 IEEE (5 pages).
Kuhn, N., et al. "Forward Erasure Correction (FEC) Coding and Congestion Control in Transport," RFC: 9265, Internet Research Task Force (IRTF), Jul. 2022 (21 pages).
Le Gall, D., "MPEG: A Video Compression Standard for Multimedia Applications," Digital Image and Video Standards; Communications of the ACM, vol. 34, No. 4, Apr. 1991 (13 pages).
Levine, S., et al., "Offline Reinforcement Learning: Tutorial, Review, and Perspectives on Open Problems," arXiv:2005.01643v3 [cs.LG] Nov. 1, 2020 (43 pages).
Li, T., "Reparo: Loss-Resilient Generative Codec for Video Conferencing," arXiv:2305.14135v1 [cs.NI] May 23, 2023 (17 pages).
Li, Y., "Deep Reinforcement Learning: An Overview," arXiv:1701.07274v6 [cs.LG] Nov. 26, 2018 (85 pages).
Li, Z., et al., "Correcting Erasure Bursts with Minimum Decoding Delay," https://www.comm.toronto.edu/~akhisti/burst_erasure.pdf, pp. 33-39, 2011 (7 pages).
Li, Z., et al., "Forward Error Protection For Low-Delay Packet Video," Proceedings of 2010 IEEE 18th International Packet Video Workshop, Hong Kong, Dec. 13-14, 2010 (8 pages).
Weiring, M., et al., "Reinforcement Learning, State of the Art," Adaptation, Learning, And Optimization, vol. 12, 2012 (653 pages).
White, G., et al., "A Simulation Study of CoDel, SFQ-CoDel and PIE in DOCSIS 3.0 Network," Active Queue Management Algorithms for Docsis 3.0, Cable Television Laboratories, Inc., Apr. 2013 (45 pages).
Wong, A., et al., "Deep multiagent reinforcement learning: challenges and directions," Artificial Intelligence Review (2023) 56:5023-5056 (34 pages).
Wu, D., et al., "Transporting Real-Time Video over the Internet: Challenges and Approaches," Proceedings of the IEEE, vol. 88, No. 12, Dec. 2000 (21 pages).
Yang, Y., et al., "An Overview of Multi-agent Reinforcement Learning from Game Theoretical Perspective," arXiv:2011.00583v3 [cs.MA] Mar. 18, 2021 (129 pages).
Yaqoob A. et al., "A Survey on Adaptive 360 Video Streaming: Solutions, Challenges and Opportunities," IEEE Communications Surveys & Tutorials, vol. 22, No. 4, Fourth Quarter 2020 (38 pages).
Zadnik, J., et al., "Image and Video Coding Techniques for Ultra-low Latency," ACM Computing Surveys, vol. 54, No. 11s, Article 231. Publication date: Sep. 2022 (35 pages).
Zhang, K., et al., "Multi-Agent Reinforcement Learning: A Selective Overview of Theories and Algorithms," arXiv:1911.10635v2 [cs.LG] Apr. 28, 2021 (73 pages).

\* cited by examiner

Recover all lost symbols of $D[i]$ during time slot $i$ by solving a system of linear equations over $D[i-\tau:i]$ using $D[i-\tau:i-1]$ (assuming they are already available) and the received symbols of (a) $P[i]$, (b) $D[i]$, and (c) $G[i]$ For $z = i, \ldots, j$ : each received symbol of $G[z]$ (i.e., each symbol of $G^R[z]$) is used to recover missing symbol of $Y[z]$; there are $g_i(1 - \ell_i) = \frac{v_i \ell_i^{(G)}}{1 - \ell_i^{(G)}}(1 - \ell_i)$ such symbols

ENHANCED RELIABLE COMMUNICATIONS INCLUDING STREAMING CODES FOR PARTIAL BURSTS AND GUARDSPACES AND SYNERGIZED COMPRESSION

CROSS-REFERENCE TO RELATED APPLICATION(S)

This patent application is a continuation of PCT International Patent Application No. PCT/US2024/043054 entitled ENHANCED RELIABLE COMMUNICATIONS INCLUDING STREAMING CODES FOR PARTIAL BURSTS AND GUARDSPACES AND SYNERGIZED COMPRESSION filed Aug. 20, 2024, which claims the benefit of U.S. Provisional Patent Application No. 63/655,861 filed Jun. 4, 2024, each of which is hereby incorporated herein by reference in its entirety. The subject matter of this patent application may be related to the subject matter of U.S. patent application Ser. No. 18/647,873 filed Apr. 26, 2024, which claims the benefit of U.S. Provisional Patent Application No. 63/523,184 filed Jun. 26, 2023, each of which is hereby incorporated herein by reference in its entirety.

FIELD OF THE INVENTION

The present invention generally relates to the transmission of digital information and methods, software and devices for detecting and preventing errors and/or erasures in the transmitted information. Specifically, the present invention is directed to (a) detecting and recovering bursty, packet losses in live communication systems, for example, those employing the Internet, and (b) compression of information for live communication schemes, for example, video compression used for real-time video communication, in conjunction with packet loss recovery.

BACKGROUND OF THE INVENTION

Data communication is still prone to data loss. For example, videoconferencing calls sometimes experience "partial burst losses," e.g., in which one or more channel frames experience the loss of some fraction of its packets. Despite many previous attempts at packet loss recovery, there is still a need for better mechanisms for packet loss recovery in such communications.

Two general approaches have been used to recover such lost packets, these are: (1) retransmission-based approaches, and (2) forward error correction (FEC) approaches. However, retransmission-based approaches often lead to a packet loss recovery delay time that is greater than the usual short, playback time requirement of live communications. Therefore, videoconferencing applications often focus on using FEC approaches and codes for recovering packet losses in real-time (e.g., for long-distance communication).

Various types of FEC codes have been used for these applications with only limited levels of success. For example, standard FEC codes such as Reed-Solomon codes are inefficient at recovering in real-time the bursts of packet losses, which frequently arise.

A relatively new class of theoretical FEC code constructions, known as "streaming codes," have been specifically designed to decode such losses. However, there are several obstacles (e.g., streaming code constructions have often been designed for transmitting only one packet per frame; however, in videoconferencing multiple packets are frequently sent for individual video frames; their theoretically assumed burst loss patterns are often not those of the packet loss patterns that arise in real-world videoconferencing applications) that have so far limited the practical adoption of these streaming codes.

Examples in the patent literature of prior attempts to address the recovery of lost packets in digital communications can be found in the following numbered U.S. patents: U.S. Pat. No. 8,352,832—"Unequal delay codes for burst-erasure channels," U.S. Pat. No. 9,209,897—"Adaptive forward error correction in passive optical networks," U.S. Pat. No. 9,843,413—"Forward error correction for low-delay recovery from packet loss," U.S. Pat. No. 10,833,710—"Bandwidth efficient FEC scheme supporting uneven levels of protection," U.S. Pat. No. 10,979,175—"Forward error correction for streaming data," U.S. Pat. No. 11,036,525—"Computer system providing hierarchical display remoting optimized with user and system hints and related methods," U.S. Pat. No. 11,489,620—"Loss recovery using streaming codes in forward error correction;" and in U.S. Patent Publication Nos. US20130039410A1—"Methods and systems for adapting error correcting codes," and US20230106959—"Loss recovery using streaming codes in forward error correction." Additional examples also can be found in Kuhn, N. et al., RFC 9265—Forward Erasure Correction (FEC) Coding and Congestion Control in Transport, Internet Research Task Force (IRTF), July 2022.

SUMMARY OF VARIOUS EMBODIMENTS

In accordance with one embodiment of the invention, a frame splitting encoder system, method, computer program product, or integrated circuit comprises a frame splitter configured to split each of a number of data frames i into a plurality of components including at least a first component $\Gamma[i]$ and a second component $\gamma[i]$; a parity symbol generator configured to allocate parity symbols for the components to ensure that (a) if the fraction of packets lost during time slot i is at most (c) and the data of all prior frames is available, then the parity symbols sent during a time slot suffice to recover the lost data during that time slot, and (b) if time slot i is part of a partial burst starting in time slot j (i.e., for each time slot $z \in \{j, \ldots, j+b_j-1\}$, $1_z$ or fewer fraction of the packets sent during the time slot are lost where $i \in \{j, \ldots, j+b_j-1\}$) followed by a partial guard space (i.e., for each time slot $z \in \{j+b_j, \ldots, j+b_j-1+\tau\}$, $1_z^{(G)}$ or fewer fraction of the packets sent during the time slot are lost) and all the data of frames before the start of the partial burst is available, then the data for frame i is recovered within $\tau$ time slots; and a packetizer configured to packetize the components and the parity symbols. Some additional and alternative embodiments are set forth in the original claims and can include a sender device that implements the frame splitter, the parity symbol generator, and/or the packetizer of claim 1 and any other sender functions, a computer program product comprising a tangible, non-transitory computer readable medium having embodied therein program code which, when executed by at least one processor, implements the frame splitter, the parity symbol generator, and/or the packetizer of claim 1 and any other sender functions, an integrated circuit having circuitry configured to implement the frame splitter, the parity symbol generator, and/or the packetizer of claim 1 and any other sender functions, a receiver device that decodes lost data and/or parity symbols in accordance with claim 1 and any other receiver functions, a computer program product comprising a tangible, non-transitory computer readable medium having embodied therein program code which, when executed by at least one processor, decodes lost data and/or parity symbols in accordance with claim 1 and any other receiver functions, and an integrated circuit having circuitry configured to decode lost data and/or parity symbols in accordance with claim 1 and any other receiver functions.

In accordance with another embodiment of the invention, a frame splitting encoder system, method, computer program product, or integrated circuit comprises a frame splitting encoder that receives data frames and splits each data frame i into two or more components and allocates parity symbols for data frame i including at least a first set of parity symbols P[i] and a second set of parity symbols G[i] based on the two or more components, wherein the parity symbols are configured to ensure that (a) some parity symbols of a data frame can be used to recover the first component of the same data frame, (b) some parity symbols of a data frame can be used to recover the second component of the same data frame, and (c) some parity symbols of a data frame cannot be used to recover the second component of the data frame. Some additional and alternative embodiments are set forth in the original claims and can include sender/receiver devices, computer program products, and integrated circuits that perform some or all of the described functions.

In accordance with another embodiment of the invention, a variable frame splitting encoder system, method, computer program product, or integrated circuit comprises a variable frame splitting encoder that receives data frames and splits each data frame into two or more components, wherein the variable frame splitting encoder uses machine learning (e.g., reinforcement learning) to perform at least one of (a) splitting of the data frames into the two or more components or (b) allocating parity symbols for the two or more components or (c) packetizing the two or more components and/or the parity symbols. Some additional and alternative embodiments are set forth in the original claims and can include sender/receiver devices, computer program products, and integrated circuits that perform some or all of the described functions.

In accordance with another embodiment of the invention, a data encoding system, method, computer program product, or integrated circuit comprises an encoder that generates, for each of a number of data frames i, a single component having all symbols of the data frame, in combination with any of the parity generation, packetization, and/or compression techniques disclosed herein. Some additional and alternative embodiments are set forth in the original claims and can include sender/receiver devices, computer program products, and integrated circuits that perform some or all of the described functions.

In accordance with another embodiment of the invention, a data encoding system, method, computer program product, or integrated circuit comprises an FEC-aware frame compressor that utilizes information about FEC methodology and/or parameters (e.g., from a frame splitting encoder or parity allocator or loss estimator) to control compression of data into a one or more compressed frames for the frame splitting encoder (e.g., selective compression based on anticipated parity allocation). Some additional and alternative embodiments are set forth in the original claims and can include sender/receiver devices, computer program products, and integrated circuits that perform some or all of the described functions.

In accordance with another embodiment of the invention, a data encoding system, method, computer program product, or integrated circuit comprises an FEC-aware frame compressor that utilizes information about FEC methodology and/or parameters (e.g., from a frame splitting encoder or parity allocator or loss estimator) to control the target size of the compressed frame for the FEC encoder. Some additional and alternative embodiments are set forth in the original claims and can include sender/receiver devices, computer program products, and integrated circuits that perform some or all of the described functions.

In accordance with another embodiment of the invention, a data encoding system, method, computer program product, or integrated circuit comprises a frame compressor that tunes the amount of data sent per frame without spreading information content, e.g., by choosing to compress to a smaller number of symbols (providing less information/a lower resolution frame) for a frame i and then for the next frame i+1 compressing to more symbols (providing more information about the next frame/higher resolution). Some additional and alternative embodiments are set forth in the original claims and can include sender/receiver devices, computer program products, and integrated circuits that perform some or all of the described functions.

In accordance with another embodiment of the invention, a data encoding system, method, computer program product, or integrated circuit comprises a frame compressor that tunes the amount of data sent per frame and also spreads information content, e.g., by choosing to compress to a smaller number of symbols (providing less information/a lower resolution frame) for a frame i and then for the next frame i+1 (a) compressing to more symbols (providing more information about the next frame/higher resolution) while also (b) sending information to help lead to a better resolution of frame i.

In accordance with another embodiment of the invention, a data encoding system, method, computer program product, or integrated circuit comprises frame compressor that selectively spreads information for a time slot over one or more additional time slots, e.g., by creating a first compression to provide a less refined version of the data for the time slot and sending extra information during one or more later time slots to refine the prior information. Some additional and alternative embodiments are set forth in the original claims and can include sender/receiver devices, computer program products, and integrated circuits that perform some or all of the described functions.

In accordance with another embodiment of the invention, a data encoding system, method, computer program product, or integrated circuit comprising a compression-aware FEC encoder that receives compressed frames from a frame compressor and splits each compressed frame into one or more components to be sent over one or more time slots, wherein the compression-aware FEC encoder uses compression information from the frame compressor to determine FEC parameters for transmitting the compressed frames. Some additional and alternative embodiments are set forth in the original claims and can include sender/receiver devices, computer program products, and integrated circuits that perform some or all of the described functions.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 137 illustrates treatment of compression as a reinforcement learning problem, in accordance with certain embodiments.

FIG. 138 shows the concept of alternating training of compression and streaming code (e.g., splitting, parity allocation, and/or parameter estimation), in accordance with certain embodiments.

FIG. 139 illustrates updating the state during the ith time slot, in accordance with certain embodiments.

FIG. 140 shows an example of a possible type of reward function, in accordance with certain embodiments.

FIG. 141 shows one possible compression scheme, in accordance with certain embodiments.

FIG. 142 shows one possible decompression, in accordance with certain embodiments.

FIG. 143 shows another possible decompression allowing for flagging to wait to decompress until more data is available (e.g., decoded), in accordance with certain embodiments.

FIG. 144 illustrates spreading information content as a simplified approach, in accordance with certain embodiments.

FIG. 145 illustrates decompression after spreading information content. Decompression first improves the decompression of the previous data frame and then uses it to have a better estimate when decompressing the current data frame.

FIG. 146 shows one possible compression to spread information content: create information and then spread some of it until later by deferring sending it.

FIG. 147 illustrates a second possible compression to spread information content is to smooth out when it is generated (e.g., generate less information now and generate more later).

FIG. 148 illustrates decompression after spreading information content. Decompression first improves the decompression of the previous data frames and then uses them to have a better estimate when decompressing the current data frame.

Figure 149:
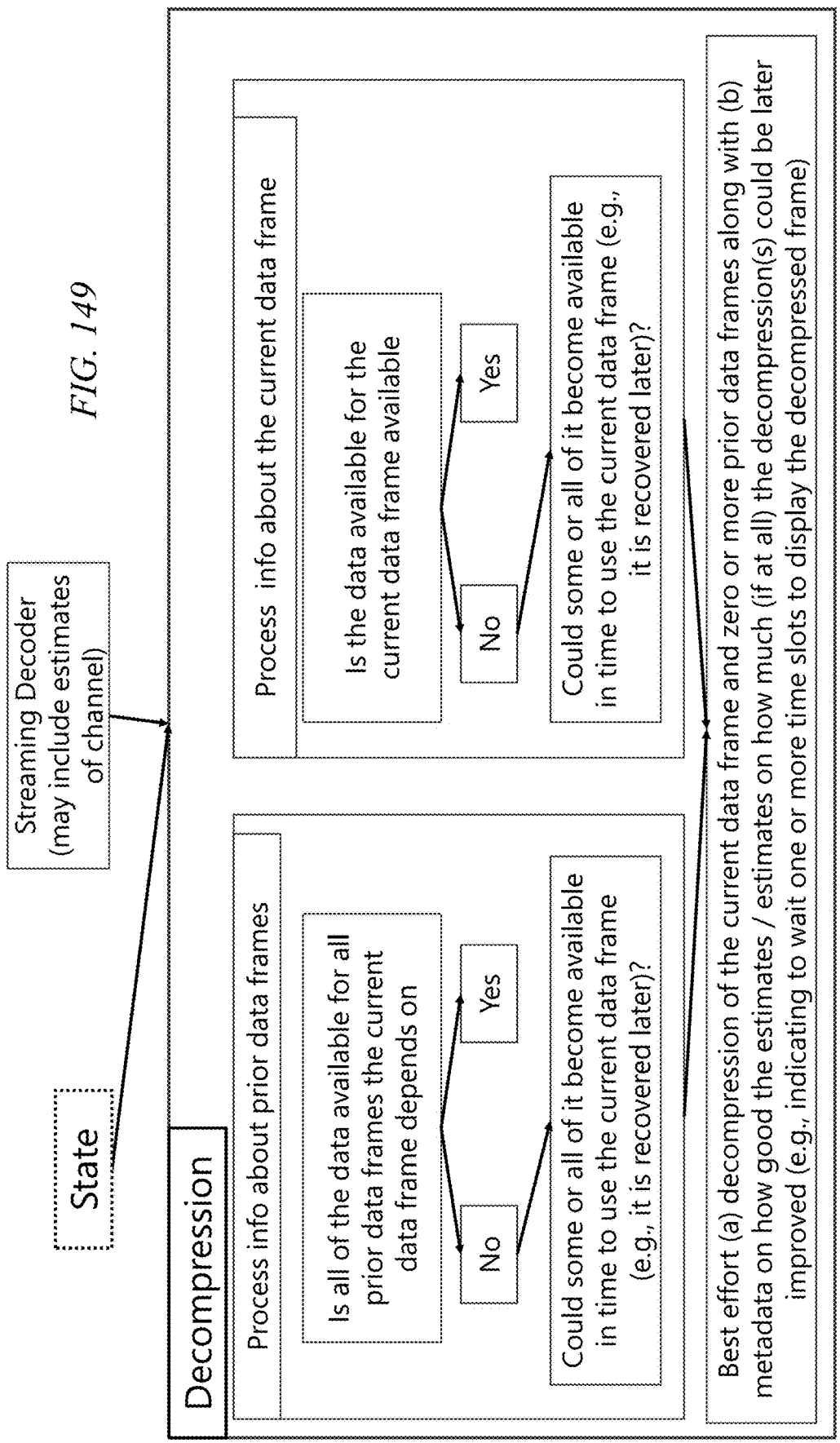

FIG. 149 illustrates one possible decompression allowing for decompressing then flagging to consider waiting for more data to render the frame (once can use the extra data to decompress to a better estimate of the uncompressed frame) detailed example of one way the process could work.

Figure 150:
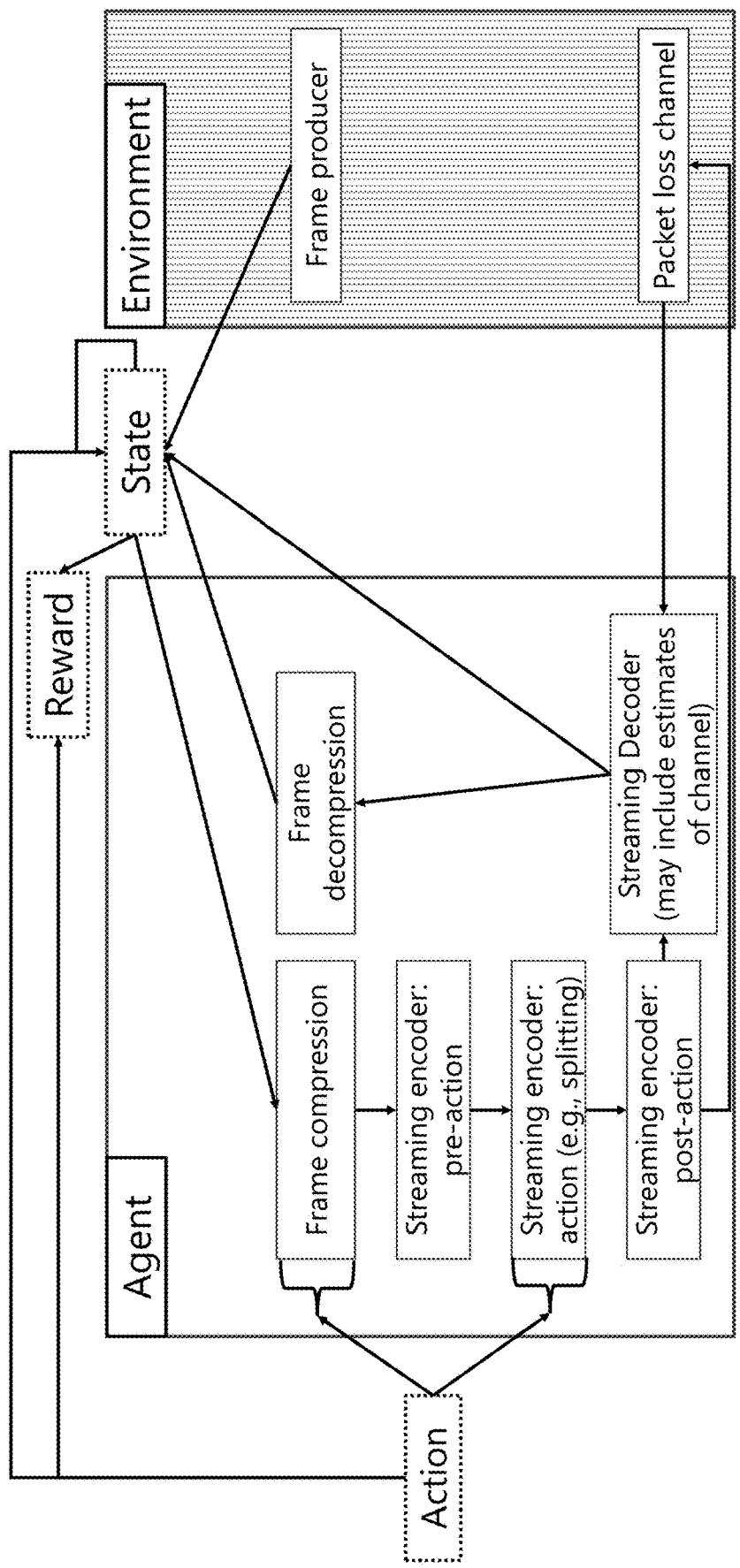

FIG. 150 illustrates treating compression and communication action (e.g., splitting) as a reinforcement learning problem.

FIGS. 151-163 provide an example of frame splitting, parity generation, and packetization under CSIPBRAL, in accordance with certain embodiments.

FIGS. 164-171 provide an example of FEC-aware compression, in accordance with certain embodiments.

Figure 172:
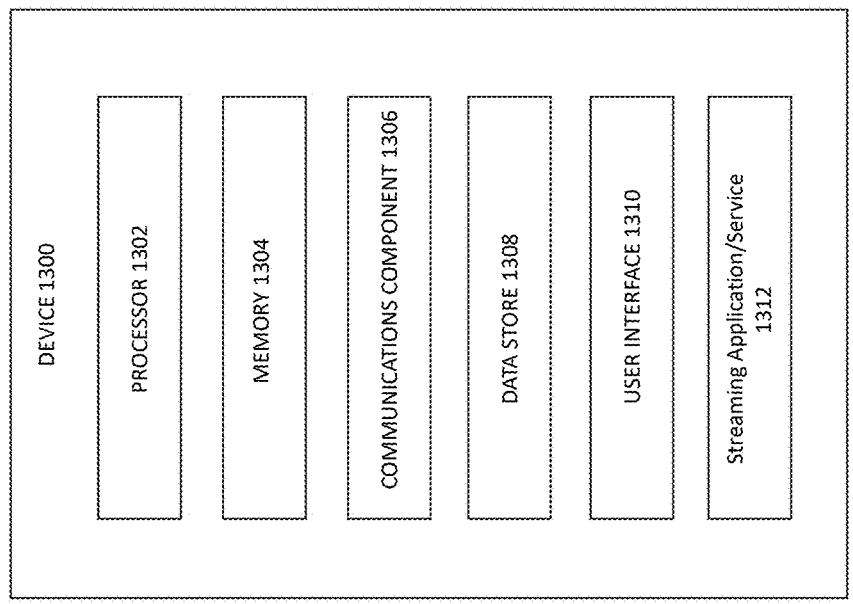

FIG. 172 is a schematic block diagram showing components of a sender device and/or receiver device in accordance with certain embodiments.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

Introduction

Embodiments of the present invention provide various improvements in packet loss recovery, and, likely by extension, the quality-of-experience (QoE) of real-time, digital communications such as videoconferencing, live streaming, remote desktop, cloud gaming, remote controlled vehicles, virtual reality, augmented reality, extended reality, satellite/space communication (including Internet and other communications through satellites), or virtually any video or non-video communication that may be subject to burst or partial burst losses and needs to be decoded within strict constraints.

Some prior works of the inventor relating to the subject matter of this patent application are described in the following publications, which are incorporated herein by reference:

Michael Rudow and K. V. Rashmi, "Online Versus Offline Rate In Streaming Codes For Variable-Size Messages," 2020 *IEEE International Symposium on Information Theory (ISIT)*, 2020;

Rudow, Michael, and K. V. Rashmi. "Online versus offline rate in streaming codes for variable-size messages," *IEEE Transactions on Information Theory*, Vol. 69, No. 6, pp. 3674-3690, 2023;

Rudow, Michael, and K. V. Rashmi. "Streaming codes for variable-size arrivals," 2018 *56th Annual Allerton Conference on Communication, Control, and Computing (Allerton)*. IEEE, 2018;

Rudow, Michael, and K. V. Rashmi. "Streaming Codes for Variable-Size Messages," IEEE Transactions on Information Theory, Vol. 68, No. 9, pp. 5823-5849 September 2022;

Rudow, Michael, and K. V. Rashmi. "Learning-augmented streaming codes are approximately optimal for variable-size messages," 2022 *IEEE International Symposium on Information Theory (ISIT)*. IEEE, pp. 474-479, 2022;

M. Rudow and K. Rashmi. "Learning-Augmented Streaming Codes For Variable-Size Messages Under Partial Burst Losses," In 2023 *IEEE International Symposium on Information Theory (ISIT)*, pp. 1101-1106, 2023;

M. Rudow, et al. "Tambur: Efficient loss recovery for videoconferencing via streaming codes," In Proceedings of the 20th USENIX Symposium on Networked Systems Design and Implementation, Apr. 17-19, 2023;

Rudow, Michael (2024). Efficient loss recovery for videoconferencing via streaming codes and machine learning. Carnegie Mellon University. Thesis. https://doi.org/10.1184/R1/24992973.v1;

M. Rudow, et al. "Compression-informed coded computing," In 2023 IEEE International Symposium on Information Theory (ISIT), pp. 2177-2182, 2023;

U.S. Pat. No. 11,489,620;

United States Patent Application Publication No. US 2023/0106959; and

U.S. patent application Ser. No. 18/647,873 filed Apr. 26, 2024, which claims the benefit of U.S. Provisional Patent Application No. 63/523,184 filed Jun. 26, 2023.

It should be noted that this patent application, and all incorporated or referenced publications, documents, and things, are each considered to be internally consistent, e.g., conventions used in one (e.g., terminology, definitions, notations, representations, etc.) may be used differently in others. To the extent of any inconsistency or conflict in the conventions used in any of the incorporated publications, documents, or things and the present application, those of the present application shall prevail for purposes of this patent application.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. For example, many embodiments refer to the use of machine learning (including reinforcement learning) such as to train any of various aspects of the invention, and it should be understood that this terminology is meant to capture training using any machine learning training methodology including, without limitation, gradient descent, stochastic gradient descent, Q-learning, policy gradient, Monte Carlo methods, temporal difference learning, etc.).

Streaming Encoders

For the sake of the following discussion, a streaming encoder that splits data frames into multiple components and then allocates parity symbols based at least in part on one or more of the components is referred to herein as a "frame splitting encoder." Certain frame splitting encoders split data frames into two components, although other embodiments could split data frames into more than two components. For convenience, embodiments described herein generally include data frames split into two components. It should be noted that, in certain embodiments described herein, the encoder can choose between one component or two (or more) components for a given frame or frames, and, for purposes of this disclosure and claims, such an encoder that can choose between one component and two (or more) components is considered a frame splitting encoder.

Some frame splitting encoders use a fixed frame splitting scheme in which frames are split into multiple components in the same way. For convenience, such a frame splitting encoder is referred to herein as a fixed frame splitting encoder. One example of a fixed frame splitting encoder is Tambur (see, e.g., Tambur paper; U.S. Pat. No. 11,489,620; U.S. Patent Application Publication No. US 2023/0106959), which splits data frames using a constant fraction (i.e., the first component is always XX % of the symbols of the data frame for each data frame) for a constant fraction that is periodically set and held constant for a period of multiple frames (such as setting the constant fraction once every ~2 seconds).

Some frame splitting encoders use a variable frame splitting scheme in which different data frames can be split into two or more components in different ways such as into different size components for different data frames. For convenience, such a frame splitting encoder is referred to herein as a "variable frame splitting encoder." One example of a variable frame splitting encoder is referred to herein as a Communication Scheme Intended for Partial Bursts (CSIPB), some aspects of which are disclosed in the above-referenced paper M. Rudow and K. Rashmi, "Learning-Augmented Streaming Codes For Variable-Size Messages Under Partial Burst Losses," In 2023 *IEEE International Symposium on Information Theory* (*ISIT*), pp. 1101-1106, 2023; and also in U.S. patent application Ser. No. 18/647, 873, which is hereby incorporated herein by reference. Another example of a variable frame splitting encoder is a novel Communication Scheme Intended for Partial Bursts and with Robustness to Arbitrary Losses (CSIPBRAL) described herein.

Certain features described herein apply specifically to variable frame splitting encoders (e.g., CSIPB, CSIPBRAL, etc.) while other features additionally or alternatively may apply to fixed frame splitting encoders (e.g., Tambur) or even to frame splitting encoders and in some cases to non-frame splitting encoders more generally.

Overview of Novel Concepts

Without limitation, the following are some of the novel concepts disclosed herein:
- A new mechanism for allocating and creating parity for frame splitting encoders that generates two or more types of parity symbols such as to address partial guardspace and other types of losses.
- The novel use of reinforcement learning in frame splitting encoders to perform frame splitting and/or parity symbol allocation.
- A new frame splitting heuristic that produces no second component.
- Multimodal operation in which the variable frame splitting encoder can support and switch between different frame splitting mechanisms and/or different parity allocation mechanisms.
- A novel data compression mechanism that leverages knowledge from the streaming encoders (e.g., frame splitting, parity allocation, parameters, etc.), the network conditions (e.g., types of packet losses), etc., to make data compression decisions (referred to herein as "FEC-Aware Compression") including but not limited to (a) tuning the size of the compressed frames based on properties of the FEC scheme, and/or (b) spreading information content over one or a plurality of frames based on properties of the FEC scheme.
- The novel use of knowledge from the data compressor to make frame splitting and/or parity symbol allocation decisions (referred to herein as "Compression-Aware FEC").
- The joint design of data compression and FEC (e.g., through training both the compressor and loss-recovery mechanism where both the compressor and loss-recovery mechanism are learned).

It should be noted that any of the concepts described herein can be used and claimed alone and/or in combinations of any two or more concepts.

Overview of Frame Splitting Encoder Systems

Figure 1:
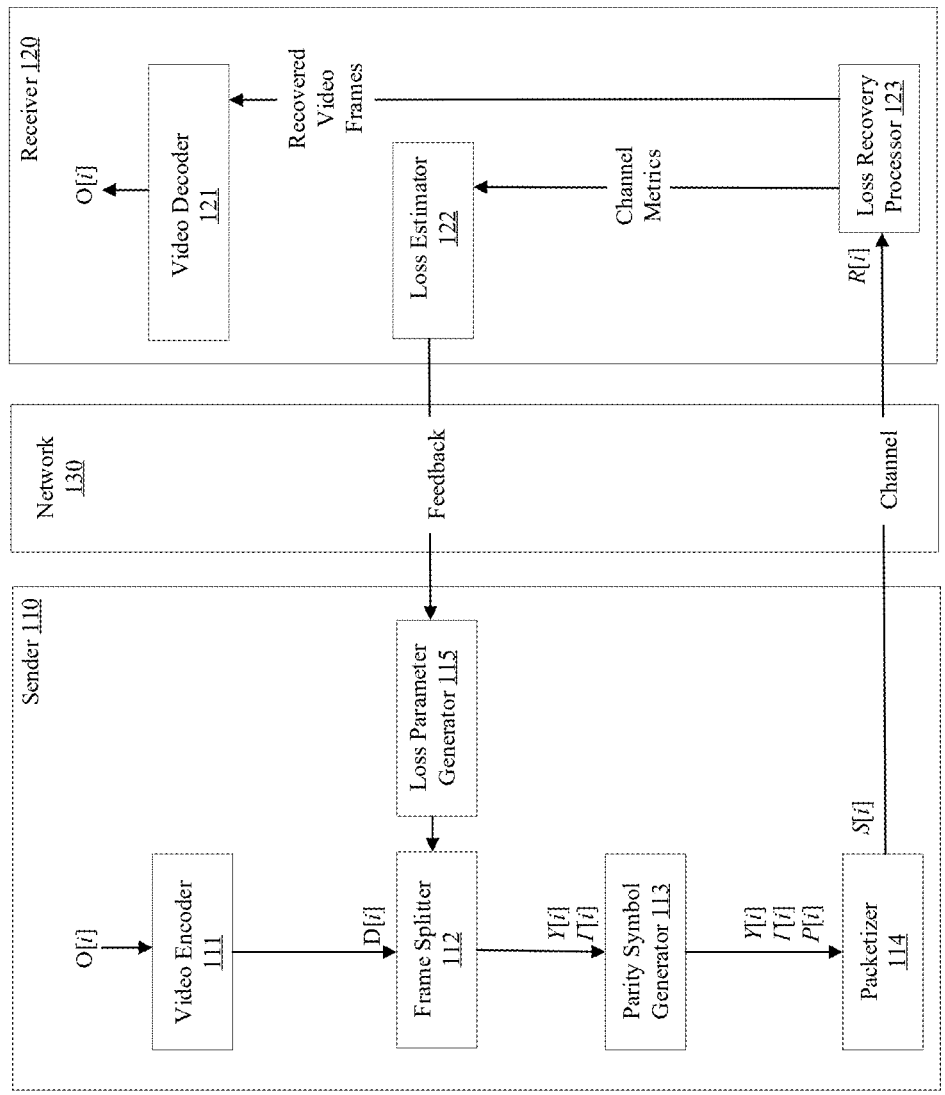
FIG. 1 is a schematic block diagram of a packet loss recovery system generally applicable to frame splitting encoders such as Tambur, CSIPB, and CSIPBRAL, in accordance with certain embodiments of the present invention.

FIG. 1 is a schematic block diagram of a packet loss recovery system 100 generally applicable to frame splitting encoders such as Tambur, CSIPB, and CSIPBRAL, in accordance with certain embodiments of the present invention.

Among other things, the sender 110 includes a video encoder 111, a frame splitter 112, a parity symbol generator 113, a packetizer 114, and a loss parameter generator 115 (which logically may be part of the frame splitter 112 but is shown here separately for the sake of discussion). For convenience, the components encompassing the frame splitter 112, the parity symbol generator 113, the packetizer 114, and the loss parameter generator 115 may be referred to herein collectively as the "streaming encoder."

Among other things, the receiver 120 includes a video decoder 121, a loss estimator 122, and a loss recovery processor 123. For convenience, the loss recovery processor 123 may be referred to herein as the "streaming decoder."

The sender 110 and the receiver 120 communicate over a communication network 130 (sometimes referred to herein as a "communication channel" or just "channel" for communication from the sender 110 to the receiver 120) with the goal of conveying original video content O[i] (e.g., video content from a videoconference, live video stream, or other video source) from the sender 110 with recovery and output of the same original video content O[i] by the receiver 120. It should be noted that the term "video" as used herein can include video-related information (e.g., compressed or uncompressed video data, audio information, secondary audio program information, closed captioning information, and/or other types of data and metadata) although the concepts described herein can be applied more generally to any type of data and therefore embodiments are not limited to video-related data.

In summary, the sender 110 and receiver 120 perform the following operations:
(1a) at the sender 110, the video encoder 111 provides a stream of video frames D[i], which, for example, may be a stream of video frames that are received by the video encoder 111 (which could be compressed video frames) and optionally compressed by the video encoder 111 (e.g., if received video frames O[i] are not compressed),
(1b) at the sender 110, the loss parameter generator 115 provides loss estimation parameters (which are so named but may be set independently of losses in certain embodiments) for each of the video frames that in certain embodiments are modeled as a burst loss estimate and a packet loss estimate for each video frame as discussed herein (where the loss parameter generator 115 may receive burst/packet loss estimates as feedback signals from the loss estimator 122 of the receiver 120 as discussed below, or may generate its own burst/packet loss estimates or otherwise control loss estimation parameters and/or other parameters such as in the absence of feedback signals from the receiver or using machine learning),
(2) at the sender 110, the frame splitter 112 generally splits each video frame D[i] into two components, or a first and a second set of video data symbols, γ[i] and Γ[i], based on the loss estimation parameters and the sizes of the video frames, (3) again at the sender 110, based on the partitioning by the frame splitter 112, the parity symbol generator 113 generates a number of forward error correction parity symbols P[i] (i.e., linear combinations of data symbols from the a number of frames that are used to characterize and recover digital data if it is lost during its transmission), (4) again at the sender 110, the packetizer 114 encodes or allocates the data symbols γ[i] and Γ[i] and parity symbols P[i] into channel frames S[i] (where each channel frame includes one or more channel packets as discussed further below) in a manner that ensures recovery of the channel packets (and hence also the video frames encoded in the channel frames/packets) within a predetermined tolerance and transmits the channel frames S[i] to the receiver 120 over a lossy communication channel, (5) at the receiver 120, the loss recovery processor 123 receives channel frames (referred to in the figure as R[i], as the received channel frames may differ from the transmitted channel frames S[i] due to burst losses, partial burst losses, and other communication issues where lost packets are known to be lost such as by examining sequence numbers in received packets) and recovers video frames using the data symbols and parity symbols from received channel frames/packets (note that the loss recovery processor 123 generally can recover video frames provided network losses do not exceed the tolerance for burst size and fraction of lost packets) and further provides channel metrics (e.g., frame and packet loss patterns, latency, frame/packet sizes, transmit times, etc.) to the loss estimator 122, (6) again at the receiver 120, the video decoder 121 decodes the recovered video frames and outputs the decoded data to an output device, and (7) again at the receiver 120, the loss estimator 122 estimates (e.g., using machine learning or heuristic techniques) future burst losses and fractions of packet losses for at least one future video frame and transmits these burst/packet loss estimates to the sender 110 as feedback signals for use by the loss parameter generator 115, although, alternatively, the loss estimator 122 may set burst/packet loss estimates using other methods (e.g., machine learning) so as to adjust the communication scheme.

It is absolutely critical to note that many of the prior works referenced herein use similar notation to mean very different things. Thus, for example, while many of the prior works split a video frame D[i] into two components (referred to here as γ[i] and Γ[i] to distinguish from U[i] and V[i] components referenced in other works including other works of the inventor), generate parity bits called P[i], and send a channel frame S[i] that can be received as channel frame R[i], the values of γ[i], Γ[i], and P[i] may be significantly different than the values of U[i], V[i], and P[i] referenced in other works, which will be clear from the present disclosure. In some cases, different terminology may be used to represent the same things (e.g., in some of the works, a channel frame may have been referred to as a packet). It should be noted that the concept of "error correction" discussed herein can apply to recovering from erasures (e.g., packet losses).

Generally speaking, the video encoder 111 may receive video frames O[i] periodically or substantially periodically (e.g., one every 33.3 ms for a 30 frame/sec video) and therefore video frames D[i] may be generated periodically or substantially periodically. In some embodiments, there may be a maximum size for incoming video frames O[i] and, if a particular incoming video frame (which may or may not be a compressed video frame) O[i] is larger than the maximum size, the system can split O[i] amongst multiple frames D[i], e.g., the system could create two video frames D[i] and D[i+1] if the size was greater than the maximum size but less than twice the maximum size, etc. This essentially would appear to the system as two or more video frames received back-to-back; it should be noted that when the intended loss recovery occurs, the latency will remain tolerable despite the splitting.

It should be noted that the loss estimation parameters produced by the loss parameter generator 115 and used to generate γ[i], Γ[i], P[i], S[i] (e.g., burst/packet loss estimates) may be set conservatively in certain embodiments so that the losses are strictly better than those of actual burst/packet loss estimates with high probability. However, alternatively, these parameters can be used more generally as parameters to control the generation of γ[i], Γ[i], P[i], S[i], e.g., used only as "knobs" to tune the coding construction (e.g., independently of any actual burst/packet loss estimates). Thus, for example, the loss estimation parameters generated by the loss parameter generator 115 and used by the frame splitter 112 may have no correlation to actual burst/packet losses experienced at the receiver 120 but instead could be set in other ways, e.g., based on expected or worst-case burst/packet loss estimates, or using additional metadata (e.g., one-way delay, channel frame rate, channel bit rate, network congestion information, etc.). Generally speaking, a "burst" can mean different things in different contexts, including but not limited to two or more packet losses within a predetermined number of consecutive frames, and, in this respect, the term "burst" does not limit embodiments to any particular type or length of losses.

In some embodiments, rather than splitting the data of a video frame into the two components γ[i] and Γ[i], the two components may be created in other ways based on the data of the video frame such that, given access to a certain number of prior frames, the components γ[i] and Γ[i] suffice to recover D[i]. For example, rather than γ[i] and Γ[i] containing symbols of D[i], γ[i] and Γ[i] could be full rank random linear combinations of the symbols of D[i]. That is to say, the construction is not required to be systematic.

It should be noted that channel frames/packets S[i] can be transmitted using any appropriate data communication protocol. For example, some embodiments transmit channel frames/packets using the User Datagram Protocol (UDP).

In certain embodiments, when losses do not exceed the estimates, the encoding scheme ensures that the first component is recovered strictly before its playback deadline and the other or second component is recovered by its playback deadline. Overall, estimating loss characteristics for each frame and using the estimates to create parity symbols enables the present invention to provide fine granularity for tuning the communication system's bandwidth overhead for each frame; in particular, the bandwidth overhead associated with a frame can vary from frame to frame. Doing so enables maximizing bandwidth savings while providing formal guarantees for recovering burst losses within a bounded latency.

It should be noted that the loss estimation parameters fed back from the receiver 120 to the sender 110 can be viewed as the receiver 120 conservatively estimating how lossy the network conditions will be based on prior losses or network conditions. For example, the feedback could report on actual prior losses (e.g., a frame or packet loss rate over some number of past channel frames or packets) or the feedback could provide a prediction of an upcoming frame or packet loss rate (e.g., if network conditions are deteriorating, then the feedback could predict a greater channel frame or packet loss rate than was actually detected in the past). In certain embodiments, the loss parameter generator 115 also could estimate loss parameters such as from prior feedback or other information (e.g., network performance information received from the receiver 120 or from other sources). The loss estimator 122 and/or the loss parameter generator 115 may utilize AI/ML or other predictive analytics to produce future loss estimation parameters based on any relevant data source. Additionally, the loss estimation parameters can be treated in some embodiments as a "knob" to adjust the coding scheme (e.g., using machine learning, including reinforcement learning) rather than based on actual burst/packet loss estimates, as discussed above. Certain embodiments therefore perform learning-augmented encoding of video frames to improve QOE (e.g., by optimizing for metrics meant to approximate the QOE, including but not limited to peak signal-to-noise ratio (PSNR), structural similarity (SSIM), or Learned Perceptual Image Patch Similarity (LPIPS)).

It should be noted that the video frames, D[i], may have different numbers of symbols, e.g., due to data compression variability. It should be noted that data compression algorithms usually (but not always) introduce dependencies between compressed video frames, e.g., where the ability to decompress one compressed video frame depends on having correctly decompressed one or more prior compressed video frames.

Each video frame, for example the ith video frame, denoted as D[i], is partitioned, where each symbol in the partitioning can be thought of as a vector where the symbol is an element of a mathematical entity called a field (e.g., a finite field, or other fields like the real numbers). An illustrative example would be a finite field of non-negative integers mod a prime, where all operations are performed over finite fields such as using modular arithmetic or extension fields (the order is a prime power) where arithmetic is field arithmetic and is not necessarily "modular arithmetic." For simplicity, the discussion below is expressed in usual arithmetic without affecting meaning.

Each video frame should be decoded at the receiver 120 within a strict latency for it be most useful in playback (e.g., to avoid video "freeze"). However, it should be noted that even if there is a freeze, recovering a frame late still may be useful to enable playing later frames that are encoded using inter-frame dependencies (e.g., failing to recover frame 10 in time to play it is bad, but recovering frame 10 in time to use frame 10 to decode and play frame 11 still may be useful). In some embodiments, this latency requirement is modeled by imposing the requirement that each video frame "i" is decoded by the time the packets for frame (i+τ) are received. The parameter τ may be chosen, e.g., based on the frame rate and one-way propagation delay so that the latency of decoding each frame is tolerable, and while the value of τ is often fixed for an entire call, the value of τ can be changed by the encoder between calls or even during a call, e.g., after a significant change to the frame rate. For example, if the maximum tolerable latency is 150 ms, the one-way propagation delay is 50 ms, and a frame is encoded every 33.3 ms (i.e., the frame rate), τ could be set to 3 frames, i.e., (150 ms-50 ms)/33.3 ms/frame. In some embodiments, the parameter τ could be changed during a call, e.g., if the frame rate or latency were to change).

It should be noted that the variability in sizes of frames is a challenge to achieving the objective of the present invention since at each frame, the optimal number of symbols to transmit can depend on the sizes of future messages, which are inherently variable and unknown. This leads to the distinction that can be made in this technology between "offline" coding schemes, which have access to (a) the sizes of messages of future frames, and (b) parameters of partial bursts indicative of worst-case losses for each future frame, and "online" schemes, which do not have access to such information. This distinction will be seen below to impact how certain embodiments of the present invention proceed to estimate or predict burst loss characteristics.

When an online setting situation exists where the sizes of future frames are unavailable, certain embodiments use estimated burst loss characteristics to determine a suitable range of values for the split and then employ a learning-augmented algorithm or model, or a heuristic, to determine the split.

In an offline setting, an optimization algorithm (using a linear program) may be used to estimate burst loss characteristics and determine how to split each frame into these two components.

Periodically estimating or predicting future burst loss or burst characteristics enables certain embodiments of the present invention to tune a communication system's bandwidth overhead based on the invariably changing network conditions. For certain calls where the network conditions are consistent (including consistently imposing certain types of losses), the estimate of future burst loss or burst characteristics enables certain embodiments of the present invention to tune the communication system's bandwidth overhead to be well-suited to the network conditions; as such, the predictions for burst loss or burst characteristics also may be consistent.

In some cases, this feedback from the receiver to the sender can be viewed as the receiver conservatively estimating how lossy the network conditions will be based on prior losses or network conditions, although, as discussed above, loss estimation parameters can be based on other information and can be produced in other ways such as using reinforcement learning (e.g., modeling the system as a Markov decision process). For example, the feedback could report on actual prior losses (e.g., a frame or packet loss rate over some number of past frames or packets) or the feedback could provide a prediction of an upcoming frame or packet loss rate (e.g., if network conditions are deteriorating, then the feedback could predict a greater frame or packet loss rate than was actually detected in the past). When there is no feedback, or in other cases, the loss parameter generator 115 may set the parameters in other ways, such as by setting the parameters to prior values or by estimating or predicting future network conditions such as from prior feedback or other information (e.g., network performance information received from the receiver or from other sources). In any case, certain embodiments set (or attempt to set) the parameters to lead to an acceptably low data loss or freeze rate (i.e., post loss recovery) assuming certain network conditions (e.g., estimating the data loss rate as being at most a certain value with probability at least some possibly different value where the probability is over the state of the system, which includes the network conditions).

In order to make these estimates of burst characteristics, one embodiment of the present invention assumes M to be the maximum possible number of packets sent per frame. For the ith frame, suppose $c_i$ packets are sent. Let $L_i$ be a length M vector where the jth position is +1 if the jth packet is received, −1 if the jth packet is lost, and 0 for all but the first $c_i$ positions. To then compute these characteristics or parameters, a machine learning model is applied to (a) the concatenation of a recent window of w of such loss vectors (i.e., $(L_{i-w+1}, \ldots, L_i)$), or (b) $L_i$ if the model (used by the sender to set the parameters $b_j$ and $l_j$ for $j=i, \ldots, i+b_i-1$ which have not yet been set) has a state that can capture information about prior values $L_j$ for $j<i$.

At times, there could be an underestimation of losses, which could lead to some packets not being recovered. In certain applications (e.g., where data compression is used such as in videoconferencing or video streaming), there may be interpacket dependencies (e.g., the ability to decompress one packet could depend on having successfully received and decompressed one or more other packets) such that failure to recover one packet could result in several subsequent packets being unusable even if received intact. Thus, in some embodiments, the receiver can send additional feedback to indicate that a reset is needed, in which case the sender could reset data compression starting with a packet that is not dependent on past packets (sometimes referred to herein as a "keyframe," which is essentially a self-sufficient frame).

Overview of CSIPB

A description of CSIPB is included herein mainly to provide background information on the concept of a variable frame splitting encoder and also to contrast with the novel CSIPBRAL variable frame splitting encoder described herein below. Also, certain features described herein can be applied to CSIPBRAL.

CSIPB adaptively splits a data frame into two components referred to herein as $\gamma[i]$ and $\Gamma[i]$, including based on (a) parameters that may sometimes be interpreted as worst-case loss characteristics determining the acceptable range of value then (b) a method (e.g., an ML or heuristic) to choose which value to pick for each data frame. Consequently, the fraction of symbols within each component can vary from data frame to data frame. Also, in some embodiments of CSIPB, the splitting into two different components (including the size and which symbols to place in which component) can be based on metadata (e.g., from compression if compression was used) of the data frames (if it exists).

The number of parity symbols allocated for data frame i is a function (e.g., a machine learning model or heuristic) based on the state of the system that includes the sizes of all prior data frames, the sizes of the first component of all prior data frames, the loss characteristics that have previously occurred, and application-level properties (e.g., for videoconferencing the distribution of sizes of future data frames given previous data frames). For example, it may be chosen as the number of symbols of the first component that can be lost in a partial burst.

Consequently, under CSIPB, the example choice of setting the number of parity symbols, $p_i$, to equal the number of lost symbols of the first component of the data frame from $\tau$ time slots before, $l_{i-\tau}u_{i-\tau}$, ensures that all data frames are recovered as long as the packet losses are no worse than the adversarial model. In contrast, under Tambur, loss-recovery of certain data frames is more vulnerable to certain patterns of packet losses than others (e.g., certain losses lead to worse loss-recovery despite dropping the same amount of data, such as losses concentrated exactly $\tau$ time slots apart), and there are no formal guarantees of loss recovery given a model of packet losses.

In CSIPB, the symbols of the first component, $\gamma[i]$ are not included in the linear combinations of the parity symbols of the data frame, P[i]. In contrast, the symbols of Tambur's first component are included in the parity symbols of the data frame, P[i]. Hence, although similar notations are used in Tambur (e.g., U[i], V[i], P[i]) and CSIPB (e.g., $\gamma[i]$, $\Gamma[i]$, P[i]), the notations mean different things. One consequence is that under Tambur, the parity symbols received under data frame j during a burst cannot be used to recover earlier data frames unless all lost symbols of data frame j are also recovered. In contrast, in CSIPB, the parity symbols received during a burst can be used for loss recovery of symbols of previous data frames when only the second component of the data frame, $\Gamma[i]$, has been recovered (i.e., when $\gamma[i]$ has not yet been recovered).

Also, the number of packets transmitted per data frame, the sizes of these packets, and how symbols of $\gamma[i]$, $\Gamma[i]$, and P[i] are spread over these packets differ in CSIPB from Tambur. Under CSIPB, any methodology wherein it is anticipated that approximately $l_i$ fraction of the symbols of each of $\gamma[i]$, $\Gamma[i]$, and P[i] might be lost is suitable. For example, CSIPB may involve spreading parity symbols evenly over the packets; alternatively CSIPB may send symbols of only one of (a) $\gamma[i]$, (b) $\Gamma[i]$, or (c) P[i] in each packet. In Tambur, the parity symbols are sent in different packets from the data symbols and also it is the intention for packets containing data symbols to all contain the same ratio of symbols of U[i] and V[i].

Certain features are now described with reference to CSIPB. The following is a glossary for the CSIPB discussion:

| Term | Definition | Example |
| --- | --- | --- |
| Call | A call refers to the entire sequence of communication of data from a sender to a receiver | |
| Symbol | An element of a finite field | The field of integers mod 4 comprises four symbols: 0, 1, 2 and 3 |
| data frame | An ordered sequence of frames constitutes the data that is to be communicated (e.g., they could be compressed frames) | A call of length 4 comprises data frame 0, then data frame 1, then data frame 2, and then data frame 3 |
| Time slot (or timeslot) | A time slot, i, reflects the time period corresponding to the ith data frame | A call of length 4 comprises data frame 0, then data frame 1, then data frame 2, and then data frame 3 wherein the sender obtains data frame 0 during time slot 0, data frame 1 during time slot 1, data frame 2 during time slot 2, and then data frame 3 during time slot 3 |

-continued

| Term | Definition | Example |
| --- | --- | --- |
| D[i] | The data of the ith data frame, which is a vector of symbols of a field. | Consider a call where data comprises symbols of the field of integers mod 4. Suppose data frame 0 comprises the following symbols: 0, then 1, then 2. Then D[0] = <0, 1, 2>. |
| $d_i$ | An integer that constitutes the number of symbols of the ith data frame | Consider a call where data comprises symbols of the field of integers mod 4. Suppose D[0] = <0, 1, 2>. Then $d_0$ = 3. |
| m | An integer that constitutes the maximum number of symbols of a data frame | |
| Vector notation | Consider any vector, V. Its length is given by v. It is zero-indexed with a coefficient, where Vj is its jth symbol for an integer j between zero and (v − 1). For any two integers i, j between zero and (v − 1) where i is no more than j, the vector of symbols of V between these two positions (i.e., $<V_i, \ldots, V_j>$ is denoted as $V_{i:j}$ | Consider a length three vector over the field of integers mod 4, V = <0, 1, 2>. Then $V_1$ = 1 and $V_{1:2}$ = <1, 2> |
| Index notation [i] | For any non-negative integer, i, the set of integers between 0 and i inclusive (i.e., $\{0, \ldots, i\}$) is denoted as [i]. | The meaning of [3] is $\{0, 1, 2, 3\}$. |
| Index variables, e.g., i, j, z, and r | In various situations, an index variable, such as i, j, z, or r is defined to be taken from a set or to iterate over multiple values | A reference to any i ∈ [n] means that i may be any value out of 0 through n. |
| Partition | To split into multiple disjoint parts | A vector V = $<v_0, v_1, v_2, v_3, v_4>$ is partitioned into $V_0$ = $<v_0, v_1, v_2>$ and $V_1$ = $<v_3, v_4>$ |
| Data symbol | A symbol of a data frame. Each data symbol can be transmitted only once. | Consider the the ith data frame, D[i]. Then for any j ∈ $[k_i]$, $D_j[i]$ is a data symbol. |
| packets | A group of symbols that are sent from the sender to the receiver. One possible implementation is to use User Datagram Protocol (UDP), wherein a packet refers to the payload of the datagram. | |
| $c_i$ | The number of packets sent during the ith time slot | Suppose the sender sends 4 packets to the receiver during time slot 0. Then $c_0$ = 4. |
| $c_i'$ | One less than the number of packets sent during the ith time slot (i.e., $c_i$ − 1) | Suppose the sender sends 4 packets to the receiver during time slot 0. Then $c_0'$ = 3. |
| $c_i^v, c_i^\gamma, c_i^p$ | $c_i$ packets sent during time slot i in certain embodiments may be split into three pieces, $c_i^v$, $c_i^\gamma$, and $c_i^p$, that (a) sum to $c_i$, and (b) correspond to the number of packets sent for Y[i], Γ[i], and P[i], respectively. | |
| M | The maximum number of packets for a data frame | |
| $[0,1]^{<z>}$ | The z-wise cartesian product of the closed interval, [0,1] | $[0,1]^{<2>}$ equals $[0,1] \times [0,1]$ |
| MTU (Maximum transmittable unit) | The maximum possible size of a packet | |
| $S^{(j)}[i]$ | For any time slot, i, and any j ∈ $[c_i']$, $S^{(j)}[i]$ denotes the jth packet sent during the ith time slot | Suppose the sender sends 4 packets to the receiver during time slot 0. Then these 4 packets are called $S^{(0)}[0], S^{(1)}[0], S^{(2)}[0]$, and $S^{(3)}[0]$, respectively. |
| $s_i^{(j)}$ | For any time slot, i, and any j ∈ $[c_i']$, $s_i^{(j)}$ denotes the size of $S^{(j)}[i]$. | Consider a call where data comprises symbols of the field of integers mod 4. Suppose D [0] comprises three symbols, <0, 1, 2>, which the sender sends over two packets: S(0)[0] = $<D_0[0]>$ and $S^{(1)}[0]$ = $<D_1[0], D_2[0]>$. Then $s_0^{(0)}$ = 1 and $s_0^{(1)}$ = 2. |

-continued

| Term | Definition | Example |
| --- | --- | --- |
| $s_i$ | The total number of symbols sent during the ith time slot; this is computed as $s_i = \sum_{j=0}^{c'_i} s_i^{(j)}$. | Consider a call where data comprises symbols of the field of integers mod 4. Suppose D[0] comprises three symbols, <0, 1, 2>, which the sender sends over two packets: $S^{(0)}[0] = \langle D_0[0]\rangle$ and $S^{(1)}[0] = \langle D_1[0], D_2[0]\rangle$. Then $s_0^{(0)} = 3$. |
| Macropacket | The vector of packets during each time slot | |
| S[i] | For any time slot, i, S[i] denotes the vector of packets, $\langle S^{(0)}[i], \ldots, S^{(c'_i)}[i]\rangle$ | Suppose the sender sends 4 packets to the receiver during time slot 0, $S^{(0)}[0], S^{(1)}[0], S^{(2)}[0],$ and $S^{(3)}[0]$. Then $S[i] = \langle S^{(0)}[0], S^{(1)}[0], S^{(2)}[0], S^{(3)}[0]\rangle$. |
| Lost | A packet is called "lost" if it is not received. | |
| Dropped | A packet is called "dropped" if and only if it is lost. | |
| $R^{(j)}[i]$ | For any time slot, i, and any j ∈ [$c'_i$], $R^{(j)}[i]$ denotes $S^{(j)}[i]$ if the jth packet sent during the ith time slot is received and otherwise $R^{(j)}[i]$ denotes that the jth packet sent during the ith time slot is lost. One possible way to try to implement this is by adding a small header to the packets with a sequence number so as to identify which packets were lost. One possible way for $R^{(j)}[i]$ to denote that the jth packet during the ith time slot is lost is to set $R^{(j)}[i]$ to be a unique symbol that does not appear in the finite field (e.g., *) which is reserved for the sole purpose of reflecting a dropped packet. | Suppose the sender sends 4 packets to the receiver during time slot 0, the first 3 are received and the final one is lost. Then $R^{(0)}[0] = S^{(0)}[0]$, $R^{(1)}[0] = S^{(1)}[0]$, $R^{(2)}[0] = S^{(2)}[0]$, and $R^{(3)}[0]$ indicates a lost packet (e.g., by setting $R^{(3)}[0]$ to equal a unique symbol not in the finite field, *). |
| Received packets | The packets that the receiver obtains or infers to be lost. | For any time slot, i, the received packets are $R^{(0)}[i], \ldots, R^{(c_i)}[i]$. |
| Reception packet | The vector of the received packets | |
| R[i] | For any time slot, i, R[i] denotes the vector of received packets, $\langle R^{(0)}[i], \ldots, R^{(c_i)}[i])\rangle$ | Suppose the receiver obtains 4 received packets to the receiver during time slot 0, $R^{(0)}[0], R^{(1)}[0], R^{(2)}[0],$ and $R^{(3)}[0]$. Then $R[i] = \langle R^{(0)}[0], R^{(1)}[0], R^{(2)}[0], R^{(3)}[0]\rangle$. |
| Parity symbol(s) | The symbols that are sent in packets which are not needed to recover data symbols when (a) all packets are received and (b) the decoder uses the earliest received symbols to decode a data frame. Under this definition, packets of lower index are viewed as being sent sooner than those of a higher index; similarly, symbols of a transmit packet of lower index are viewed as being sent sooner than those of a higher index. | Suppose the sender sends one packet to the receiver during time slot 0 comprising $n_0 = 3k_0$ symbols where the first $k_0$ symbols are D[0], the next $k_0$ symbols are also D[0], and the final $k_0$ symbols are uniformly randomly chosen from the field. Then all but the first $k_0$ symbols of the packet are parity symbols. In certain embodiments, the coding scheme is systematic (i.e., the data of video frames is sent within packets directly) and the parity symbols are the non-systematic symbols (e.g., parity symbols are linear combinations of data symbols). |
| P[i] | The vector of parity symbols sent in packets of the ith data frame. | Consider a call where data comprises symbols of the field of integers mod 4. Suppose for vectors V1 and V2 that two packets are sent: $S^{(0)}[0] = \langle D[0], V_1\rangle$ and $S^{(1)}[0] = \langle D[0], V_2\rangle$. Then the symbols of $V_1$ and $S^{(1)}[0]$ are parity symbols, and $P[0] = \langle V_1, S^{(1)}[0]\rangle$. |
| $P^R[i]$ | The vector of received parity symbols during time slot i (i.e., P[i] after removing all positions corresponding to a symbol that was dropped) | Suppose $P[i] = \langle P_{part\ 0}[i], P_{part\ 1}[i]\rangle$ two packets are sent: $S^{(0)}[0] = \langle D[0], P_{part\ 0}[i]\rangle$ and $S^{(1)}[0] = P_{part\ 1}[i]$. If the first packet (i.e., $S^{(0)}[0]$) is lost then $P^R[i] = P_{part\ 1}[i]$ |
| $p^R_i$ | The size of $P^R[i]$ | Suppose $P[i] = \langle P_{part\ 0}[i], P_{part\ 1}[i]\rangle$ where $P_{part\ 0}[i]$ and $P_{part\ 1}[i]$ comprise two and three symbols, respectively. Suppose two packets are sent: $S^{(0)}[0] = \langle D[0], P_{part\ 0}[i]\rangle$ and $S^{(0)}[0] = P_{part\ 1}[i]$. If the first packet (i.e., $S^{(0)}[0]$) is lost then $p^R_i = 3$ |

-continued

| Term | Definition | Example |
| --- | --- | --- |
| $P^L[i]$ | The vector of lost parity symbols during time slot i (i.e., P[i] after removing all positions corresponding to a symbol that was not dropped) | Suppose $P[i] = <P_{part\ 0}[i], P_{part\ 1}[i]>$ two packets are sent: $S^{(0)}[0] = <D[0], P_{part\ 0}[i]>$ and $S^{(1)}[0] = P_{part\ 1}[i]$. If the first packet (i.e., $S^{(0)}[0]$) is lost then $P^L[i] = P_{part\ 0}[i]$ |
| $p^L_i$ | The size of $P^L[i]$ | Suppose $P[i] = <P_{part\ 0}[i], P_{part\ 1}[i]>$ where $P_{part\ 0}$ and $P_{part\ 1}[i]$ comprise two and three symbols, respectively. Suppose two packets are sent: $S^{(0)}[0] = <D[0], P_{part\ 0}[i]>$ and $S^{(1)}[0] = P_{part\ 1}[i]$. If the first packet (i.e., $S^{(0)}[0]$) is lost then $p^L_i = 2$ |
| Frame rate | The number of frames per unit time; the number of time slots per unit time. | A frame rate of 30 frames per second (FPS) means that on average there are approximately 33.33 milliseconds (ms) between frames/timeslots |
| Recovered/ decoded | A symbol is recovered (or decoded) if (a) it is included in a packet which is not lost obtained by the receiver. A data frame is recovered (or decoded) if its symbols are all received or obtained by the receiver. | |
| Decoding deadline | The time slot by which a data frame must be decoded due to latency constraints; this is a function of the frame rate (i.e., the time duration between time slots), the one-way delay (i.e., the time to for a sent packet to travel to the receiver), application-specific latency requirements, user preferences, etc. | Suppose that a video occurs at 30 fps, each data frame must be recovered within approximately 150 ms, and the one-way delay is 50 ms. Then if data frame 0 occurs at time 0 ms, data frame 0 has a decoding deadline of time slot 3; this reflects the end-to-end latency of (a) 50 ms for the one-way delay, plus (b) waiting 3 extra time slots means waiting approximately 100 ms. |
| $\tau$ (tau) | The number of extra time slots the receiver can use to recover a data frame to meet the decoding deadline | Suppose that $\tau = 3$. Then the ith data frame must be recovered by time slot $(i + 3)$ |
| Communication scheme | A methodology wherein the sender obtains one data frame during each time slot, the sender constructs packet(s) and sends them to the receiver, and the receiver attempts to use the received packets to recover (or decode) the data frames | |
| Partial burst | Refers to one or more consecutive time slots that is no more than a parameter number ($b_i$, introduced below) where during each of these time slots the number of packets that may be lost is no more than a parameter ($l_i$, introduced below) times the number of packets (where the product is then rounded up); there is a guard space (e.g., containing no losses) for the $\tau$ time slots after the end of a partial burst; similarly, there is a guard space (e.g., containing no losses) for the $\tau$ time slots before the start of a partial burst | Suppose that four packets are sent during time slot i, eight packets are sent during time slot $(i + 1)$, and five transmit packets are sent during time slot $(i + 2)$. Suppose $b_i = 3$, $l_i = 1/2$, $l_{i+1} = 1/2$, and $l_{i+2} = 1/4$. Suppose there are no losses during time slots $(i - \tau)$ through $(i - 1)$. Then if there are losses during (a) time slot i, (b) time slots i and $(i + 1)$, or (c) time slots i, $(i + 1)$, and $(i + 2)$, followed by no losses in the next $\tau$ time slots after the final of these time slots where a loss occurred, and at most 2 (i.e., $\lceil 8/2 \rceil$) packets are lost during time slot i, at most 4 (i.e., $\lceil 8/2 \rceil$) packets are lost during time slot $(i + 1)$, and at most 2 (i.e., $\lceil 5/4 \rceil$) packets are lost during time slot $(i + 2)$, then a partial burst occurred. |
| Guard space (or guardspace) | A sequence of at least $\tau$ consecutive time slots immediately after a partial burst during which all packets are received. | Suppose that a partial burst occurs over time slots 0 through 2 and is followed by at least $\tau$ consecutive time slots where all packets are received. Then time slots 3 through $(2 + \tau)$ are referred to as a guard space. |
| Worst-case delay | It is the intention to provide loss recovery within the decoding deadline (i.e., of $\tau$ time slots) with high probability as long as loss only occurs as partial bursts where each partial burst. | Suppose that losses occur only as partial bursts. Then for any data frame, i, it is decoded by time slot $(i + \tau)$. For example, data frame 0 is decoded by time slot $\tau$. |

| Term | Definition | Example |
| --- | --- | --- |
| $b_i$ | For any time slot i, the length of the longest partial burst starting in time slot i for which loss recovery will be guaranteed with high probability is denoted as $b_i$. | Suppose that $b_0 = 2$. Then a partial burst starting in time slot 0 ends strictly before time slot 2. |
| $B_i$ | $B_i$ denotes the set of time slots where a partial burst starting in one of these time slots may be long enough to include time slot i | Suppose that $b_0 = 4$, $b_1 = 4$, $b_2 = 3$, $b_3 = 2$, and $b_4 = 2$. Then $B_4 = \{1, 2, 3, 4\}$. |
| li | For any time slot i, $l_i$ reflects the largest fraction of packets that may be lost (before rounding up) in a worst-case partial burst. Formally, suppose for any time slot i that is part of a partial burst that at most $\lceil l_i c_i \rceil$ packets are lost during time slot i; then loss recovery will be guaranteed with high probability if the length of the partial burst is at most $b_j$ where j is the first time slot of the partial burst. Sometimes $l_i$ is written with a script (e.g., as "$\ell$"). | Suppose that $l_1 = 0.5$ and $c_1$ is an even integer. Then a partial burst that includes time slot 1 involves dropping at most half of the packets sent during time slot 1. |
| $q_i$ and $h_i$ | It is the intention to sometimes restrict $l_i$ to rational values, where the simplified form is $l_i = q_i/h_i$. | Suppose that $l_0 = 0.5$. Then $q_i = 1$ and $h_i = 2$. |
| t | The largest time slot. | |
| Rate | The ratio of the amount of data to send to the amount of data that is sent. Formally, it is $$\left(\sum_{i=0}^{t} d_i\right)\Big/\left(\sum_{i=0}^{t} s_i\right)$$ | |
| Zero padded data frames | It may be assumed that the final $(\tau + 1)$ data frames are of size zero; this can be accomplished without loss of generality (without impacting the rate) by appending $(\tau + 1)$ time slots during which the data frames all have size 0 | |
| Keyframe | An uncompressed frame whose data is self-sufficient (i.e., it is useful for the receiver even if all previous data has been lost) | Under videoconferencing, an I-frame may be referred to as a keyframe because it can be played without any other data. |
| Reset | A reset is when the receiver informs the sender that it cannot decode one or more frames by their decoding deadline(s) and therefore to make the next a uncompressed frame (and the corresponding data frame) a keyframe | During time slot i the sender obtains a reset, so D[i] is chosen to be a keyframe. |
| $\eta_i$ (eta) | A binary value that is 0 if and only if there is no reset during the ith time slot | |
| Feedback | It is the intention that the receiver may send feedback to the sender during any time slot to indicate how to set $b_i$, $l_i$, and $\eta_i$. It is the intention that the receiver often will not send feedback, in which case the three parameters can take the values from the last time slot (i.e., set $b_i$, $l_i$, and $\eta_i$ to equal $b_{i-1}$, $l_{i-1}$, and $\eta_{i-1}$, respectively). In certain embodiments, $l_{i+b_i-1}$ is set during time slot i, and in the absence of feedback, $l_{i+b_i-1}$ may be set equal to $l_{i+b_i-2}$. These parameters may be set in other ways in various embodiments. | |
| $\Gamma[i]$ (Gamma) | The first component of a split data frame, D [i], that corresponds to symbols that are encoded to be recovered together with the first component of the previous one or | Suppose a partial burst occurs starting in time slot i. Then $\Gamma[i], \ldots, \Gamma[i + b_i - 1]$ are recovered with high probability by time slot $(i + \tau - 1)$. |

-continued

| Term | Definition | Example |
|---|---|---|
| | more data frames and the next one or more data frames. It is denoted $\Gamma[i]$. If there are losses during the ith time slot, is the intention to recover $\Gamma[i]$ by time slot $(i + \tau - 1)$. | |
| First component | Another way to refer to $\Gamma[i]$ is as the first component of data frame i | |
| $\Gamma^R[i]$ | The vector of received symbols of the first component during time slot i (i.e., $\Gamma[i]$ after removing all positions corresponding to a symbol that was dropped) | Suppose $\Gamma[i] = \langle \Gamma_{part\ 0}[i], \Gamma_{part\ 1}[i]\rangle$ two packets are sent: $S^{(0)}[0] = \Gamma_{part\ 0}[i]$ and $S^{(1)}[0] = \Gamma_{part\ 1}[i]$. If the first packet (i.e., $S^{(0)}[0]$) is lost then $\Gamma^R[i] = \Gamma_{part\ 1}[i]$ |
| $\gamma^R_i$ | The size of $\Gamma^R[i]$ | Suppose $\Gamma[i] = \langle \Gamma_{part\ 0}[i], \Gamma_{part\ 1}[i]\rangle$ two packets are sent: $S^{(0)}[0] = \Gamma_{part\ 0}[i]$ and $S^{(1)}[0] = \Gamma_{part\ 1}[i]$ of sizes 2 and 3, respectively. If the first packet (i.e., $S^{(0)}[0]$) is lost then $\gamma^R_i = 3$. |
| $\Gamma^L[i]$ | The vector of lost symbols of the first component during time slot i (i.e., $\Gamma[i]$ after removing all positions corresponding to a symbol that was not dropped) | Suppose $\Gamma[i] = \langle \Gamma_{part\ 0}[i], \Gamma_{part\ 1}[i]\rangle$ two packets are sent: $S^{(0)}[0] = \Gamma_{part\ 0}[i]$ and $S^{(1)}[0] = \Gamma_{part\ 1}[i]$. If the first packet (i.e., $S^{(0)}[0]$) is lost then $\Gamma^L[i] = \Gamma_{part\ 0}[i]$ |
| $\gamma^L_i$ | The size of $\Gamma^L[i]$ | Suppose $\Gamma[i] = \langle \Gamma_{part\ 0}[i], \Gamma_{part\ 1}[i]\rangle$ two packets are sent: $S^{(0)}[0] = \Gamma_{part\ 0}[i]$ and $S^{(1)}[0] = \Gamma_{part\ 1}[i]$ of sizes 2 and 3, respectively. If the first packet (i.e., $S^{(0)}[0]$) is lost then $\gamma^L_i = 2$ |
| $\gamma_i$ (gamma) | The size of the vector $\Gamma[i]$ | For any time slot i, the size of $\Gamma[i]$ is $\gamma_i$ |
| $\gamma^{(max)}_i$ or $\gamma_i^{max}$ or $\gamma_i'$ | The largest admissible value of $\gamma_i$ under a particular communication scheme | |
| $Y[i]$ (Upsilon) | The second component of a split data frame, $D[i]$, that corresponds to symbols that are encoded to be recovered t time slots later. It is denoted $Y[i]$. If there are losses during the ith time slot, is the intention to recover $Y[i]$ during time slot $(i + \tau)$. | Suppose a worst-case partial burst occurs starting in time slot i. Then for each j in $\{i, \ldots, i + b_i - 1\}$, $Y[j]$ is recovered with high probability during time slot $(j + \tau)$. |
| Second component | Another way to refer to $Y[i]$ is as the second component of data frame i | |
| $\upsilon_i$ (upsilon) | The size of the vector $Y[i]$ | For any time slot i, the size of $Y[i]$ is $\upsilon_i$ |
| $Y^R[i]$ | The vector of received symbols of the second component during time slot i (i.e., $Y[i]$ after removing all positions corresponding to a symbol that was dropped) | Suppose $Y[i] = \langle Y_{part\ 0}[i], Y_{part\ 1}[i]\rangle$ two packets are sent: $S^{(0)}[0] = Y_{part\ 0}[i]$ and $S^{(1)}[0] = Y_{part\ 1}[i]$. If the first packet (i.e., $S^{(0)}[0]$) is lost then $Y^R[i] = Y_{part\ 1}[i]$ |
| $\upsilon^R_i$ | The size of $Y^R[i]$ | Suppose $Y[i] = \langle Y_{part\ 0}[i], Y_{part\ 1}[i]\rangle$ two packets are sent: $S^{(0)}[0] = Y_{part\ 0}[i]$ and $S^{(1)}[0] = Y_{part\ 1}[i]$ of sizes 2 and 3, respectively. If the first packet (i.e., $S^{(0)}[0]$) is lost then $\upsilon^R_i = 3$ |
| $Y^L[i]$ | The vector of lost symbols of the second component during time slot i (i.e., $Y[i]$ after removing all positions corresponding to a symbol that was not dropped) | Suppose $Y[i] = \langle Y_{part\ 0}[i], Y_{part\ 1}[i]\rangle$ two packets are sent: $S^{(0)}[0] = Y_{part\ 0}[i]$ and $S^{(1)}[0] = Y_{part\ 1}[i]$. If the first packet (i.e., $S^{(0)}[0]$) is lost then $Y^L[i] = Y_{part\ 0}[i]$ |
| $\upsilon^L_i$ | The size of $Y^L[i]$ | Suppose $Y[i] = \langle Y_{part\ 0}[i], Y_{part\ 1}[i]\rangle$ two packets are sent: $S^{(0)}[0] = Y_{part\ 0}[i]$ and $S^{(1)}[0] = Y_{part\ 1}[i]$ of sizes 2 and 3, respectively. If the first packet (i.e., $S^{(0)}[0]$) is lost then $\upsilon^L_i = 2$ |
| Zero padding (symbols) | Appending a non-negative integral number of zeros to a vector to ensure it is of the desired length. | The vector $V = \langle 0, 1, 2, 3\rangle$ is zero padded to be of length 6, leading to $\langle 0, 1, 2, 3, 0, 0\rangle$ |
| $0^{\langle i\rangle}$ | For any non-negative integer i, the term $0^{\langle i\rangle}$ refers to the vector of i zeroes | The vector $V = \langle 0, 1, 2, 3\rangle$ is zero padded to be of length 6, leading to $\langle 0, 1, 2, 3, 0^{\langle 2\rangle}\rangle$ |
| $1^{\langle i\rangle}$ | For any non-negative integer i, the term $1^{\langle i\rangle}$ refers to the vector of i ones | The vector $V = \langle 0, 1, 1, 1\rangle$ is equal to $\langle 0, 1^{\langle 3\rangle}\rangle$ |
| Vector notation over time indices | Consider any time slots i and j where i is no more than j. Suppose V is selected from: (a) D, (b) P, (c) Y or (d) $\Gamma$. Then the | Consider a call where data comprises symbols of the field of integers mod 4. Suppose that the first three data frames are $D[0] = \langle 0\rangle$, $D[1] = \langle 1, 1\rangle$, and |

-continued

| Term | Definition | Example |
|---|---|---|
| | vector from concatenating the symbols of V or time slot i through j can be denoted as or V[i:j] | D[2] = <2, 2, 2>. Then one can denote concatenating the first three data frames in order (i.e., <0, 1, 1, 2, 2, 2>) as D[0: 2] or <D[0], D[1], D [2]>. |
| loss vector $L_i$ | During time slot i, let $L_i$ be a length M vector where the jth position is + 1 if the jth packet is received, −1 if the jth packet is lost, and 0 for all but the first $c_i$ positions. | |
| $u_i$ | The number of symbols worth of information that are received in the ith time slot; formally, the entropy of the vector of received symbols given all information received in prior time slots normalized by the entropy of a random symbol of the finite field. | |
| $p^u_{i,j}$ | Consider a partial burst starting in time slot i and suppose each parity symbol of $P^R[z]$ for z = i, . . . , j is used in order to recover one missing and not yet recovered symbol of the earliest symbol of $\Gamma^L[i: z]$. Then $p^u_{i,j}$ is the number of symbols of $P^R[j]$ that are used as such. Note that the notation uses "u" to stand for "used." | |
| S[i] | A vector over $[0, 1]^{<M+1>}$ whose jth position reflects the probability that $\gamma_i$ is to be set to j | Suppose that di = 2, M = 4, and $\mathbb{S}$ [i] = <.25, .25, 0.5, 0, 0> then $\gamma_i$ equals 0 with probability ¼, $\gamma_i$ equals 1 with probability ¼, and $\gamma_i$ equals 2 with probability ½. |
| uncompressed frame | The data to be displayed or used; if compression was not used, this is the same as the data frame | |
| U[i] | The uncompressed frame for time slot i | |
| Decompressed frame | The result of uncompressing a compressed frame (e.g., an estimate of the uncompressed frame using the current and/or previous compressed frames and a decompression method) | |
| Action | What the agent does during the time slot | |
| $A_i$ | The action during time slot i | |
| Environment | Physical and or virtual world in which the agent operates (including the application) | |
| Reward | The value arising from the action, the state of the system, and (potentially) the environment | |
| $R_i(A_i)$ | The reward from selecting action $A_i$ during the ith time slot | |
| State | The current situation (e.g., of the agent) | |
| $\sigma_i$ | The state of the system during time slot i. Includes parameters of the current and previous time slots, characteristics of the call like fps, etc. | |
| Policy | Method to map agent's state to actions | |
| $P(\sigma_i)$ | During time slot i, the result of applying the policy to the state is the action taken (i.e., $A^{<i>}$ = $P(\sigma_i)$) | |
| FEC | Forward erasure correction (FEC)-an erasure code intended to be used to recover data when packet loss occurs | |
| $D^{(j)}[i]$ | One can divide a data frame into stripes of size s where the vector of the jth position across all stripes is $D^{(j)}[i]$ (i.e., D[i] = <$D^{(j)}[i]$ \| j ∈ [s − 1]>) | |

-continued

| Term | Definition | Example |
|---|---|---|
| Side information | extra information about decoding a stripe to help in decoding other stripes (e.g., if decoding involves solving a system of linear equations by inverting a full-rank matrix corresponding to the system, then the side information may be the inverse matrix) | |
| $-1^{<i>}$ | $-1^{<i>}$ for a non-negative integer i is the vector of i positions each containing $-1$. | For example, $-1^{<3>}$ = $<-1, -1, -1>$ |
| $A_i^j$ | a matrix used to encode symbols of the first component of data frame j into the parity symbols of data frame i | |
| $B_i^{i-\tau}$ | a matrix used to encode symbols of the second component of data frame $i - \tau$ into the parity symbols of data frame i | |
| $P^+[i]$ | the vector of symbols to add to the parity symbols P[i] to add the failsafe | |

Rapidly recovering and decoding lost data packets is a requirement for providing high quality-of-experience (QoE), for real-time, digital communications. Despite streaming codes having not yet been commonly applied to real-time, digital communications, their framework is well-suited for videoconferencing applications (for example, where a sequence of a video frames are generated periodically, e.g., one every 33.3 milliseconds (ms) for a 30 frame/second video) for at least the following reasons: (a) it captures the streaming nature of incoming data via sequential encoding (where data symbols and parity symbols are sent for each video frame through the described erasure coding scheme, and with the parity symbols being a function of the data symbols from the current frame and previous frames that fall within a predefined window); (b) it incorporates the per-frame decoding latency that can be tolerated for real-time playback via sequential decoding; and (c) it enables optimizing for recovering bursty losses with minimal bandwidth overhead.

In certain embodiments, burst characteristics are periodically estimated by the receiver. This enables CSIPB to tune the bandwidth overhead based on the changing network conditions. The estimates comprise two sets of parameters to reflect the length of the partial burst and the fraction of packets lost per time slot. Specifically, for the ith time slot, the maximum length of a burst starting with time slot i is estimated as $b_i$, and the maximum fraction of packets lost for the ith time slot is estimated as $l_i$. Partial bursts are modeled as being followed by guard spaces of length at least $\tau$ time slots with no losses. Although loss recovery is not guaranteed if there are losses in the guard space, the code design will enable recovering from certain losses in the guard spaces when burst losses are not worst case. The feedback can be viewed as the receiver conservatively estimating how lossy the network conditions will be based on prior losses. In certain embodiments, when there is no feedback, the parameters do not change in which case $b_i$ is set to $b_{i-1}$ and $l_{i+b_i-1}$ is set to $l_{i+b_i-2}$. However, in alternative embodiments, the streaming encoder may set these values in other ways even in the absence of feedback. When encoding the ith data frame, the sender has access to $b_j$ for any $j \leq i$ and to $l_j$ for any $j \leq (i+b_j-1)$. The value for each $l_j$ is set exactly once.

Figure 2:
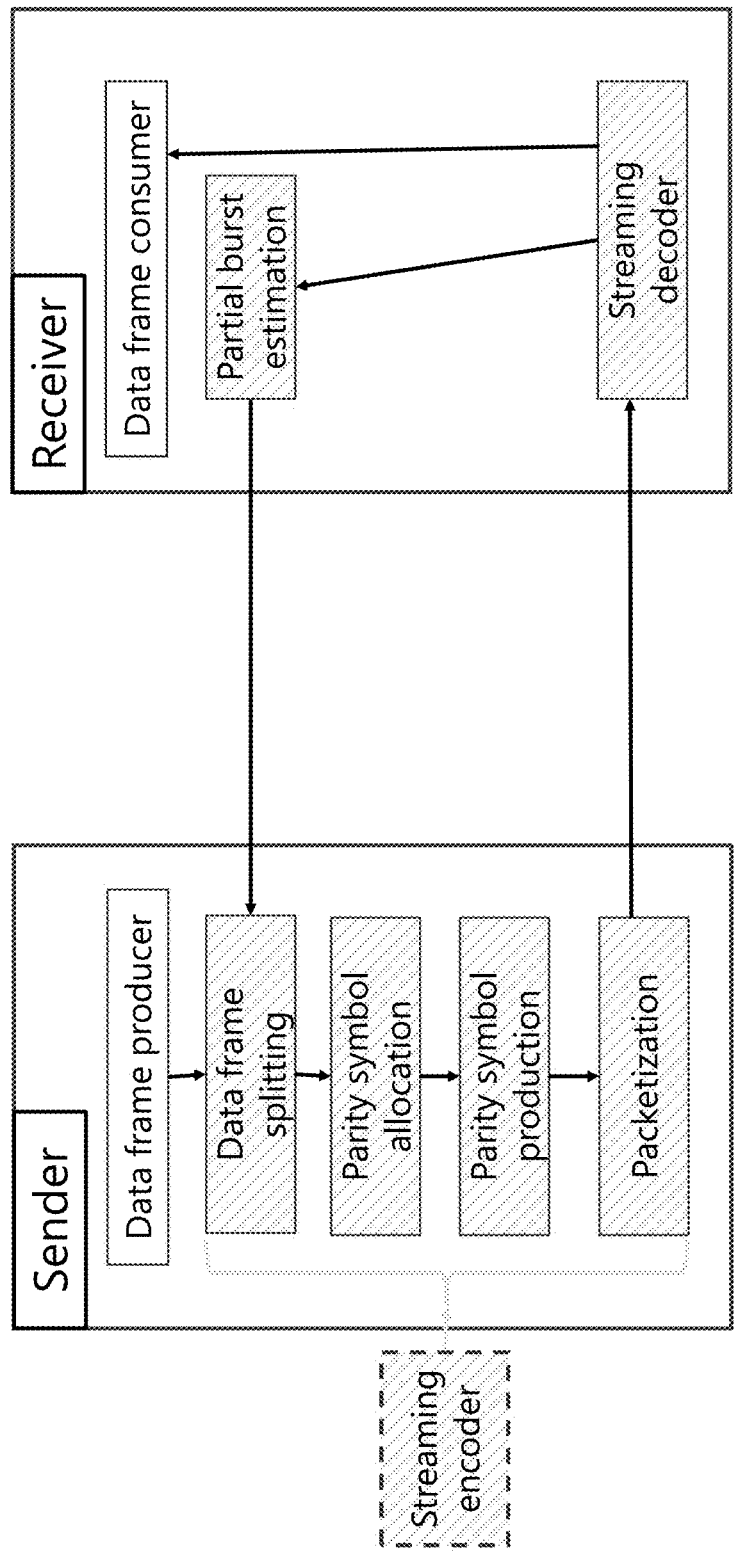
FIG. 2 is a schematic diagram showing logical elements of the streaming encoder for CSIPB, in accordance with certain embodiments.

FIG. 2 is a schematic diagram showing logical elements of the streaming encoder for CSIPB, in accordance with certain embodiments.

Figure 3:
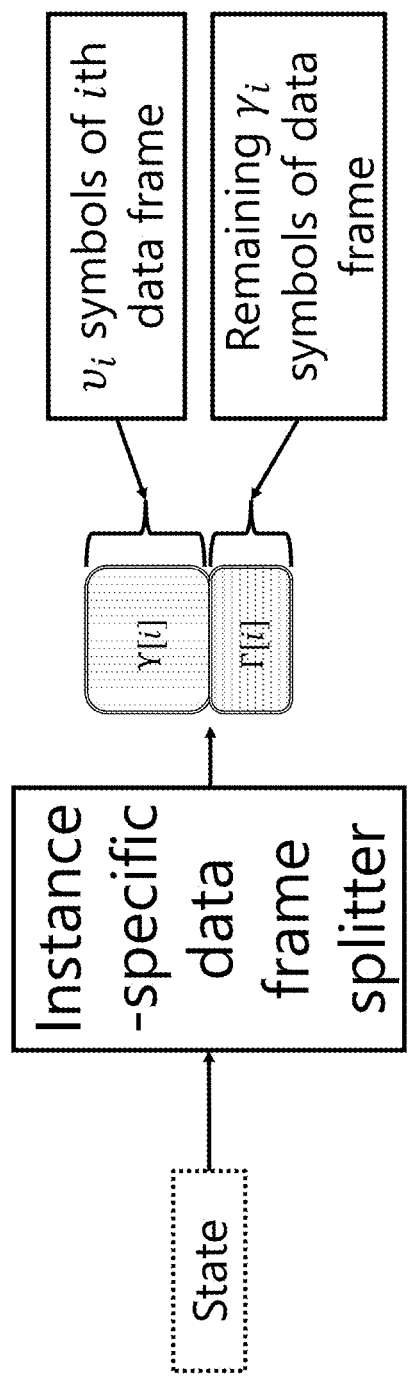
FIG. 3 is a schematic diagram showing the concept of data frame splitting for CSIPB, in accordance with certain embodiments.

FIG. 3 is a schematic diagram showing the concept of data frame splitting for CSIPB, in accordance with certain embodiments. Here, the data frame splitter enables for each data frame to allocate as many as $d_i$ or as few as 0 symbols to each of the two components. This is done using a methodology that can leverage information about the call (i.e., its inputs) as well as properties of the application, user preference, etc. Hence, this may be referred to as "instance specific" frame splitting. For example, it may be a machine learning model trained to optimize key metrics of the QoE (e.g., rate, freeze, fraction of rendered decompressed frames, latency of rendered decompressed frames, etc.); such a model may make use of properties of prior calls in the decision (e.g., if a very large data frame is likely to be followed by a smaller data frame, the model may exploit such a property). Another possible data frame splitter is a heuristic.

The ith data frame, D[i], is partitioned into two components: γ[i] and Γ[i]. In the event of a partial burst involving time slot i, it is the intention that (a) Γ[i:i+τ] will be recovered by timeslot (i+τ) (it suffices for Γ[i:i+τ−1] to be recovered by time slot (i+τ−1) and Γ[i+τ] to be recovered during time slot (i+τ), and (b) for each j∈{i, . . . , i+$b_i$−1} that γ[j] will be recovered within τ additional time slots (i.e., by time slot (j+τ)). In some cases, the size of Γ[i] ranges from 0 to some maximum value, $\gamma_i'$ (sometimes called $\gamma_i'^{max}$), set to be as large as possible subject to the following constraint. Consider any partial burst starting in time slot j of length $b_j$ that encompasses time slot i. Then the first component of data frames j through i can be recovered by time slot (j+τ−1) assuming that all symbols of data frames after data frame i have all of their symbols allocated to the second component (i.e., if $\gamma_z$=0 for z∈{i+1, . . . , j+$b_j$−1}). Then a procedure is used to select an integral value between 0 and $\gamma_i'$ reflecting the number of symbols allocated to Γ[i]. For example, this procedure may be a learning-based approach.

The splitting of the data frame may depend on metadata of data frame such as its compression; for example, if certain symbols of D[i] are supplementary (i.e., the data frame is useful without them but even better with them), the size of the split and the decision of which symbols to allocate to the second component may be chosen so that the second component (i.e., γ[i]) contains the supplementary information. The reason for this is that it is the intention that for certain partial bursts the symbols of the first component (i.e., Γ[i]) are recovered strictly before the symbols of the second component, so such a decision may improve the QoE. In some instances, no such metadata will be available (i.e., it may not be tracked under the state in certain embodiments), so this type of information about the compression may not come into play.

Figure 4:
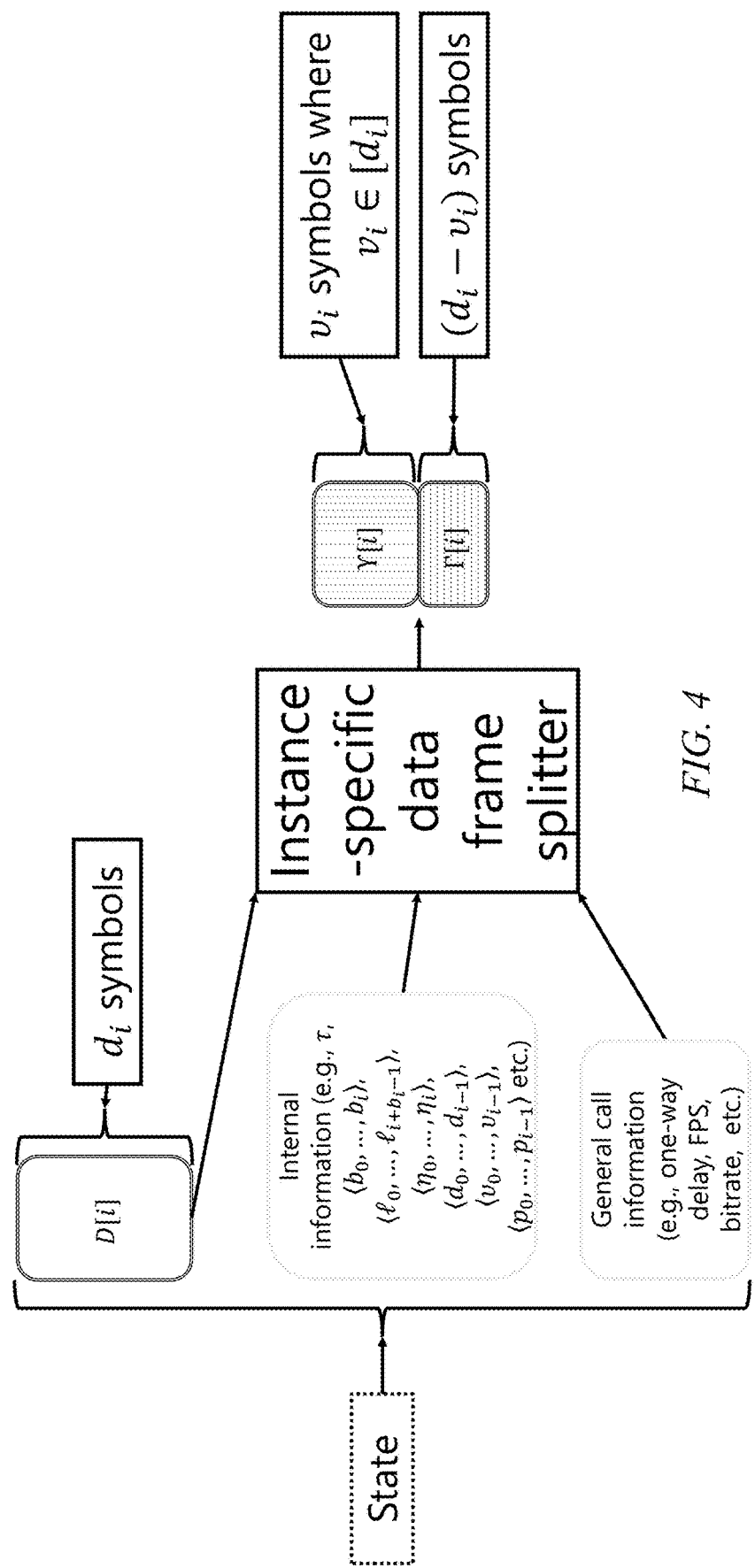
FIG. 4 is a schematic diagram showing one possible frame splitting scheme for CSIPB, in accordance with certain embodiments.

FIG. 4 is a schematic diagram showing one possible frame splitting scheme for CSIPB, in accordance with certain embodiments.

Figure 5:
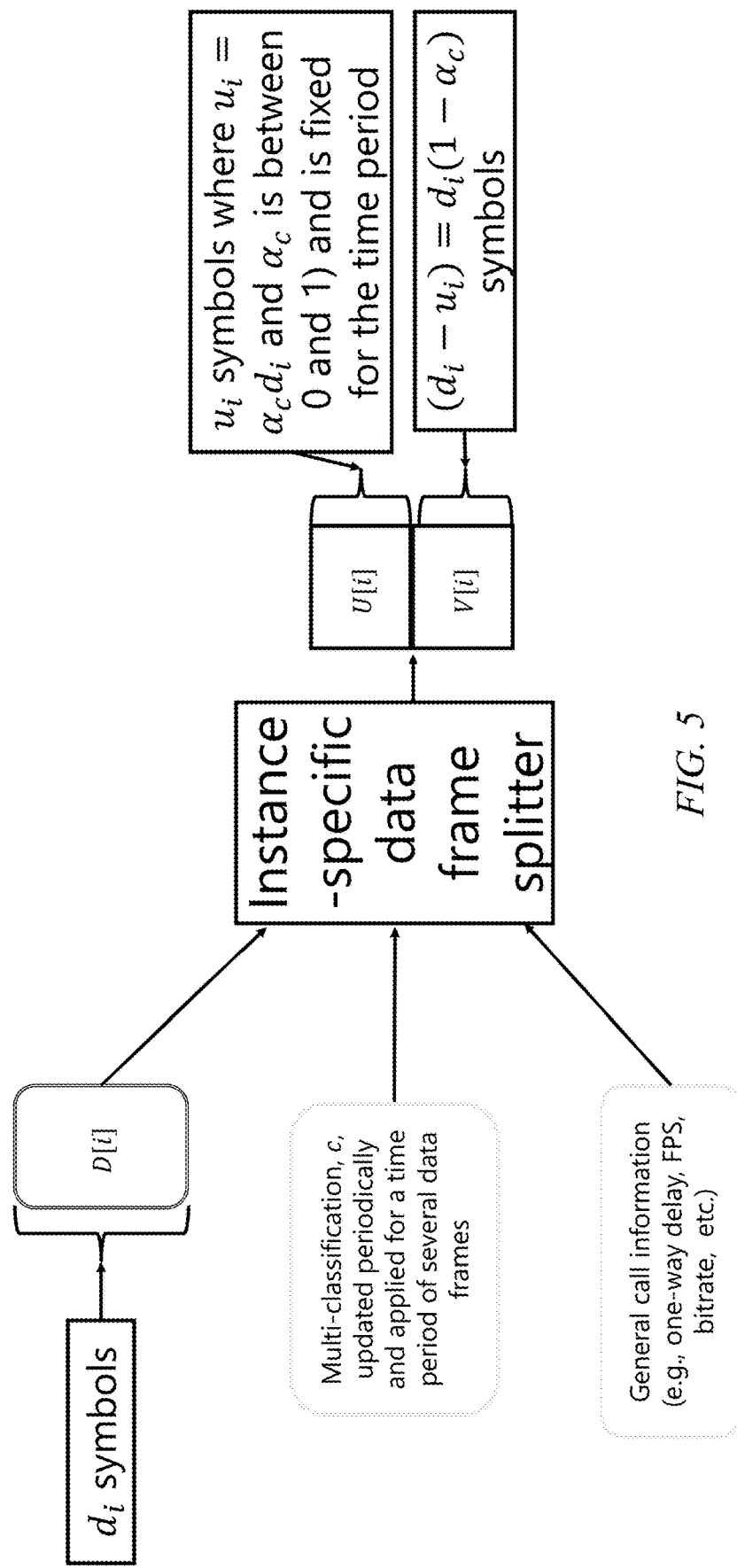
FIG. 5 shows data frame splitting from Tambur using this patent application's notation.

FIG. 5 shows data frame splitting from Tambur using this patent application's notation. Here, the receiver periodically updates the sender with a bandwidth overhead from a discrete set of possible bandwidth overheads forming a multi-classification, c. Then, for the next several data frames, the data frame is split into two components, called U[i] and V[i] (which are different from the two components in CSIPB). The split is to allocate a constant fraction, ac of the data frame's symbols to U[i] where ac is fixed for the time-period (i.e., until the next update is received, where a typical value would be approximately 2 seconds in certain embodiments). For example, in one embodiment, $α_c$=0.5, leading to allocating an equal amount of symbols to each of U[i] and V[i].

Figure 6:
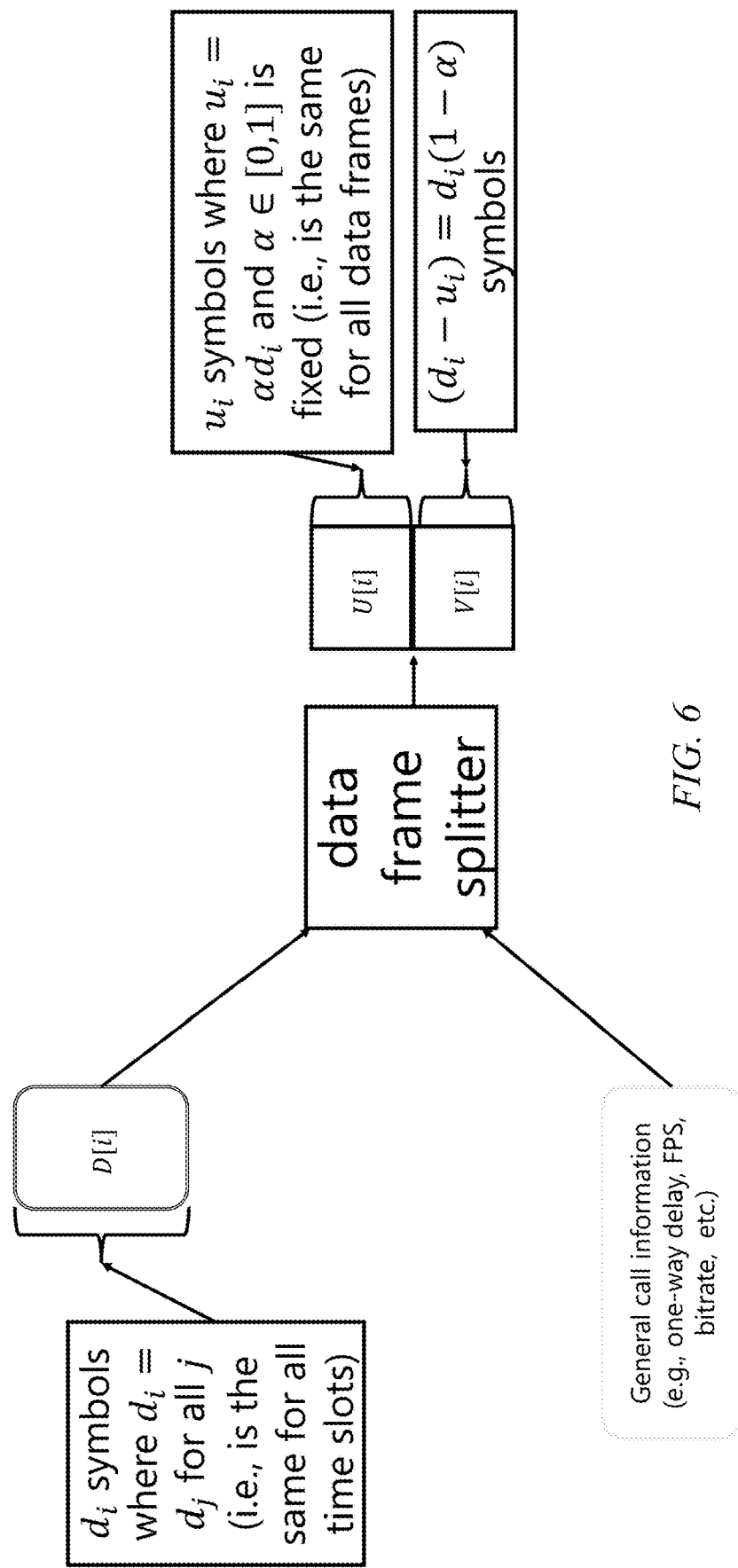
FIG. 6 shows data frame splitting under Cisco (U.S. Pat. No. 9,843,413, which is hereby incorporated herein by reference) patent example code 2 using this patent application's notation.

FIG. 6 shows data frame splitting under Cisco (U.S. Pat. No. 9,843,413, which is hereby incorporated herein by reference) patent example code 2 using this patent application's notation. Here, for each data frame, i, a fixed fraction of the symbols is allocated to each of V[i] and U[i] (two components that are different from the two components in CSIPB). In other words, the same fixed fraction of the symbols is allocated to the first component for all data frames.

Figure 7:
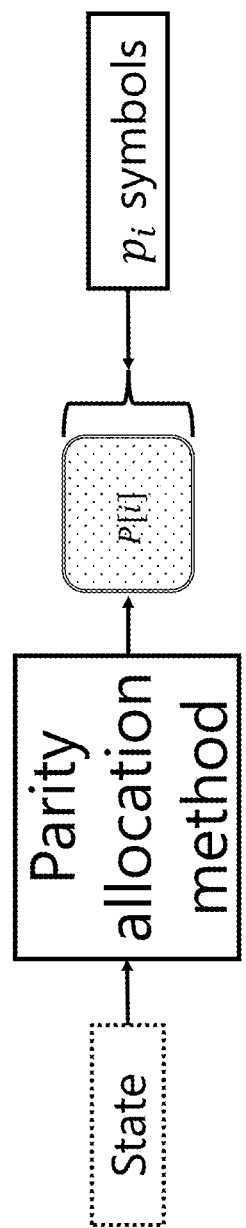
FIG. 7 is a schematic diagram showing the concept of parity allocation for CSIPB, in accordance with certain embodiments.

FIG. 7 is a schematic diagram showing the concept of parity allocation for CSIPB, in accordance with certain embodiments. Here, parity allocation enables for each data frame to allocate an arbitrary number of parity symbols. This is done using a methodology that can leverage information about the call (i.e., its inputs) as well as properties of the application, user preference, etc. For example, it may be a machine learning model trained to optimize key metrics of the QoE (e.g., rate, freeze, fraction of rendered decompressed frames, latency of rendered decompressed frames, etc.); such a model may make use of properties of prior calls in the decision (e.g., if a very large data frame is likely to be followed by a smaller data frame, the model may exploit such a property). Another possible parity allocation method is a heuristic. The parity allocation of the frame may depend on metadata of data frame such as its compression; for example, if certain symbols of D[i] are supplementary (i.e., the data frame is useful without them but even better with them), that information may be used. In some instances, no such metadata will be available (i.e., it may not be tracked under the state in certain embodiments), so this type of information about the compression may not come into play.

Figure 8:
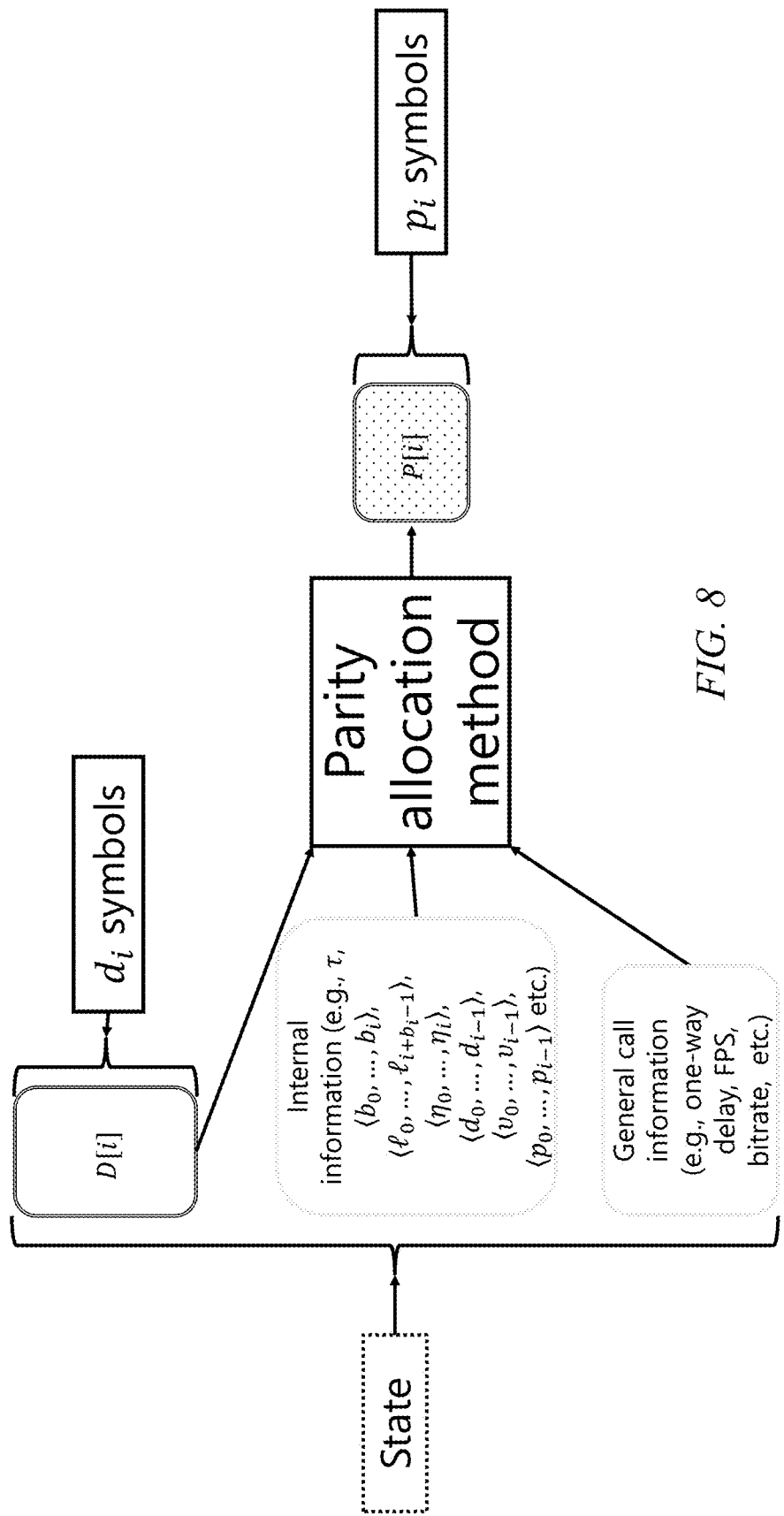
FIG. 8 is a schematic diagram showing one possible parity allocation scheme.

FIG. 8 is a schematic diagram showing one possible parity allocation scheme.

Figure 9:
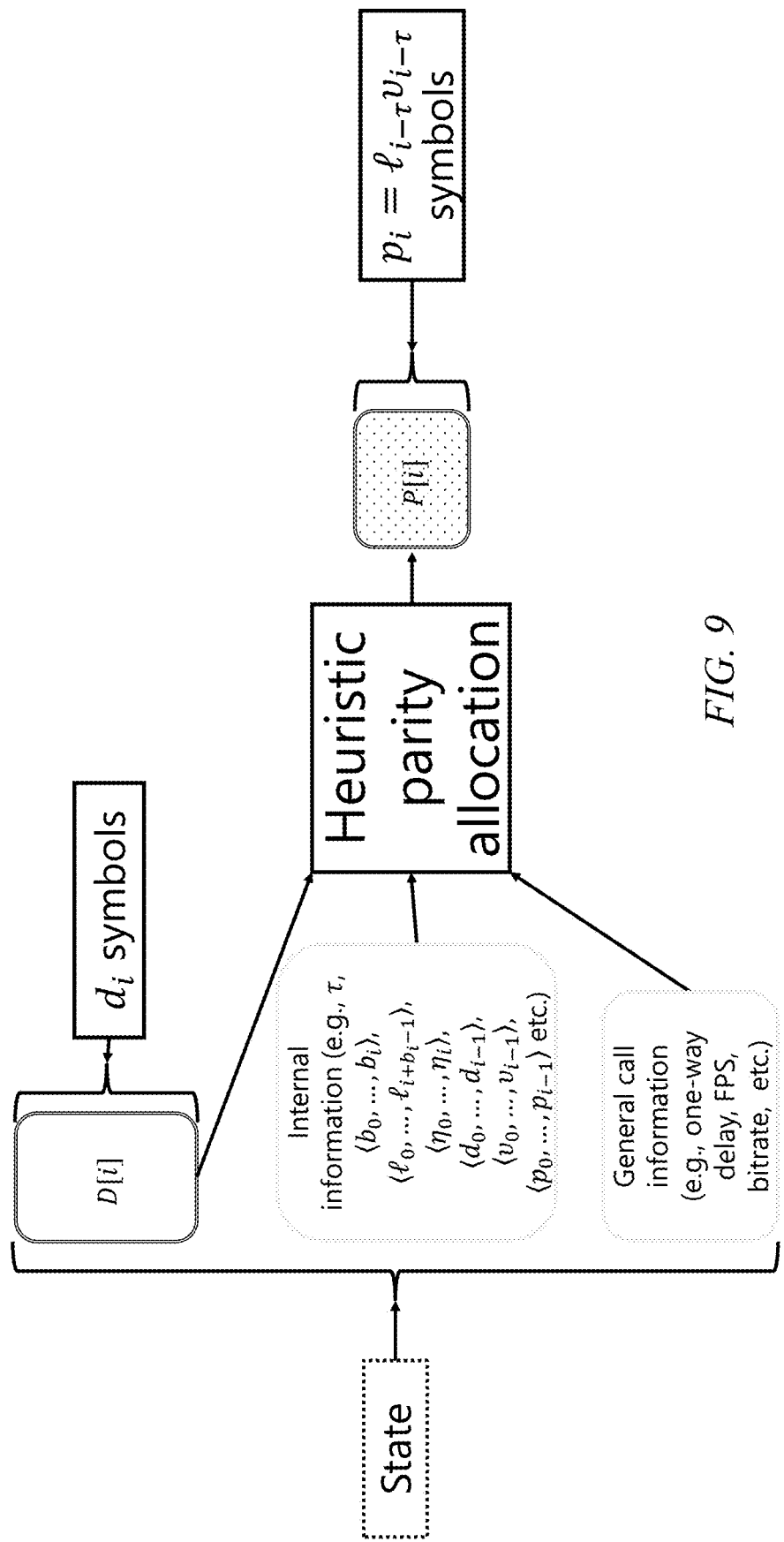
FIG. 9 is a schematic diagram showing another possible parity allocation scheme using a heuristic.

FIG. 9 is a schematic diagram showing another possible parity allocation scheme using a heuristic. Here, a heuristic is used to determine how to allocate parity symbols. A first example heuristic (Heuristic 1) splits data frames to minimize parity associated with each data frame. Specifically, the number of parity symbols to be sent with the data of data frame i may be allocated to be a function of the size of γ[i−τ]; for example, the number of parity symbols could be set with the intention to equal the size of γ[i−τ] times $l_{i-τ}$. A second example heuristic (Heuristic 2, not shown in FIG. 9) allocates enough symbols of P[i] to recover Γ[i] during time slot i.

Figure 10:
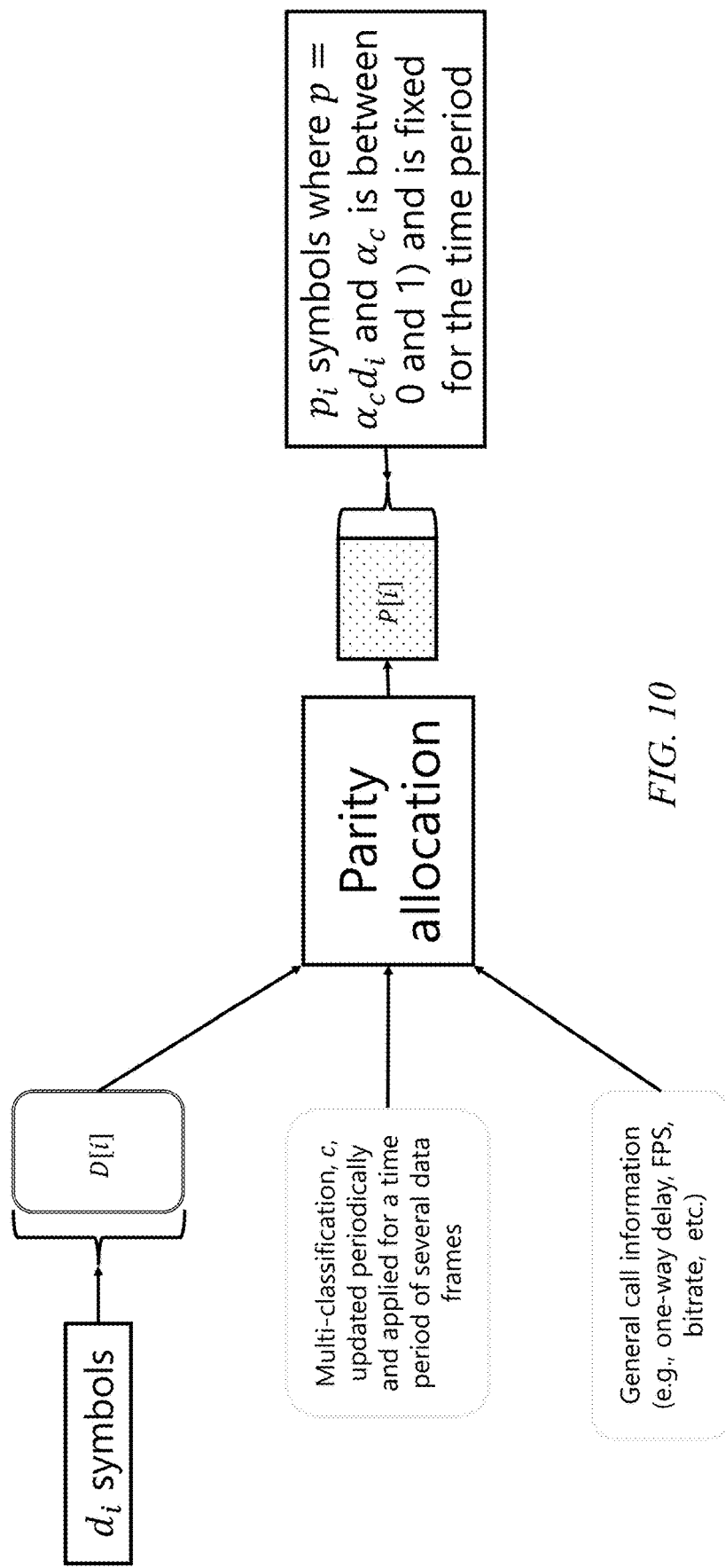
FIG. 10 shows parity allocation from Tambur using this patent application's notation.

FIG. 10 shows parity allocation from Tambur using this patent application's notation. Under Tambur, the state of the system can be viewed as including a parameter from a small discrete set reflecting the bandwidth overhead (i.e., portion of bandwidth allocated to parity) for the time period (which typically would be approximately 2 seconds in certain embodiments) of several data frames. During this time period, the amount of parity symbols allocated per data frame is the product of this parameter and the size of the data frame. Thus, the fraction of sent symbols that are parity symbols is fixed for the period (i.e., it does not vary from data frame to data frame).

Figure 11:
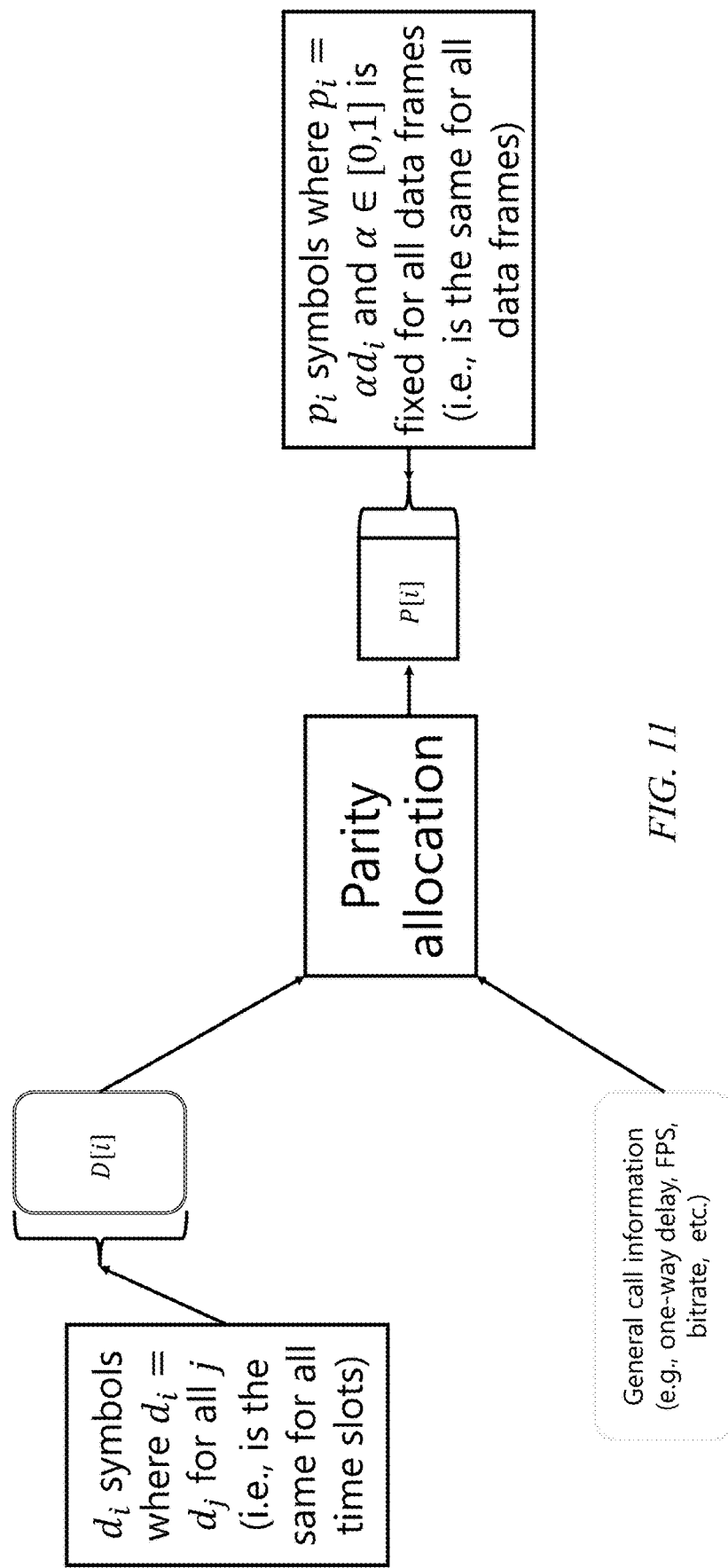
FIG. 11 shows parity allocation under Cisco patent example code 2 using this patent application's notation.

FIG. 11 shows parity allocation under Cisco patent example code 2 using this patent application's notation. Here, for each data frame, i, a fixed bandwidth overhead is used by sending ad; parity symbols associated with data frame i. Thus, the amount of parity symbols sent is fixed for each data frame. Note that in this work, each data frame is of the same size.

Figure 12:
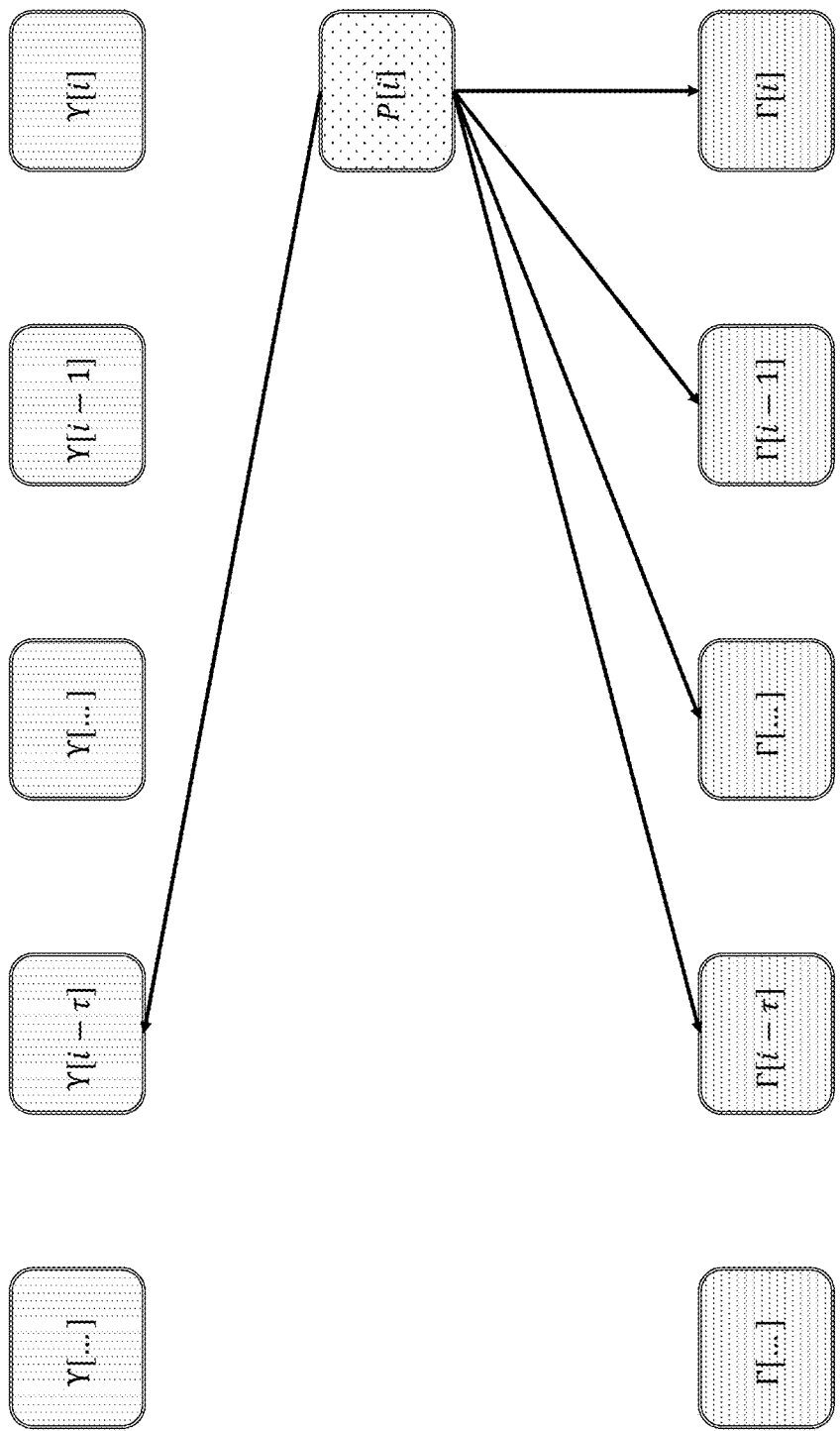
FIG. 12 is a factor graph of parity symbols for CSIPB that is complete for P[i].

FIG. 12 is a factor graph of parity symbols for CSIPB that is complete for P[i]. Here, the parity symbols for data frame i are functions of (a) the first component of the current and previous τ data frames (i.e., Γ[i−τ:i]), and (b) the second component of the data frame from τ time slots before (i.e., γ[i−τ]). For example, each symbol of P[i] may be a linear combination of the symbols from (a) and (b).

Figure 13:
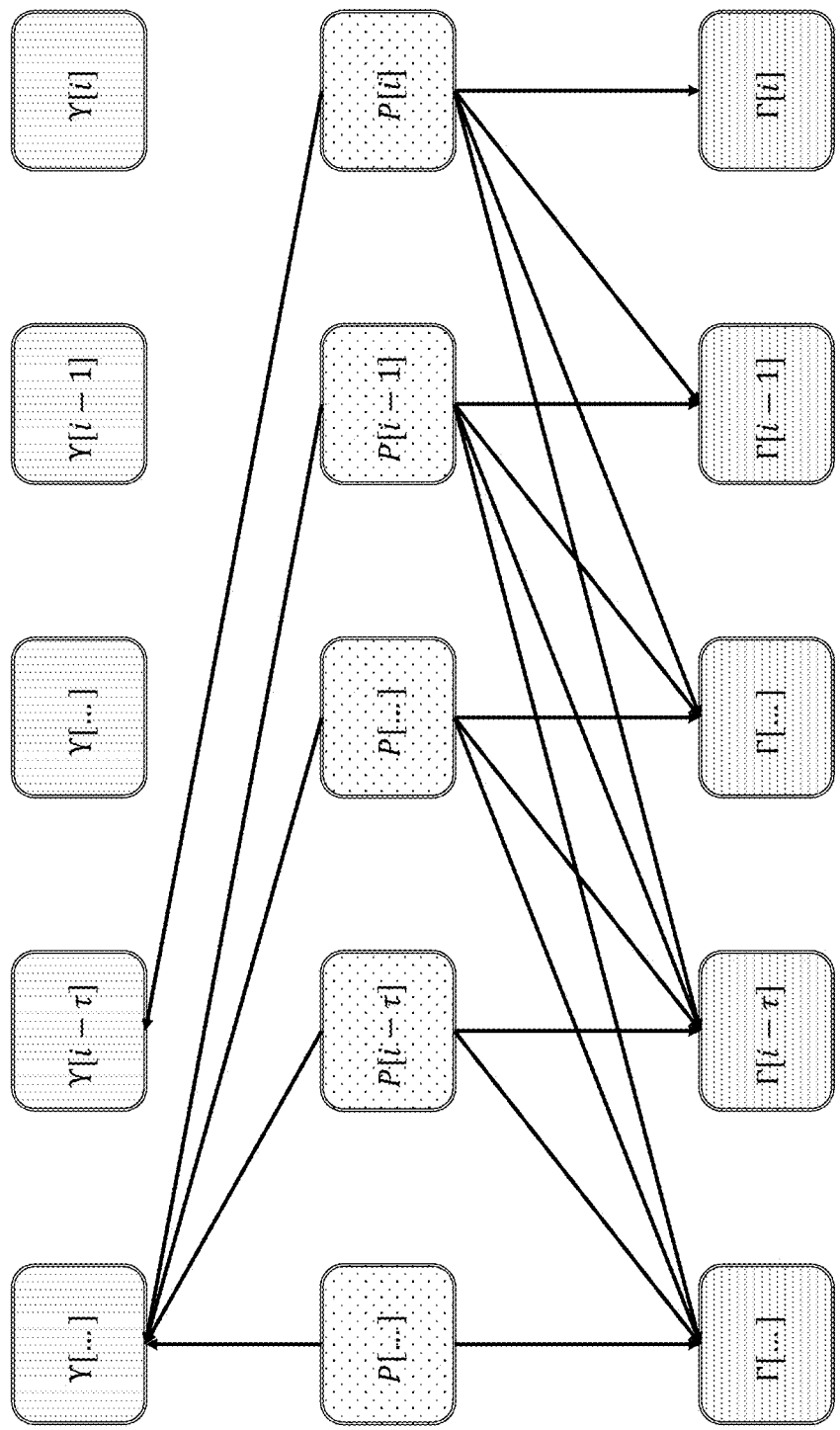
FIG. 13 is a factor graph of parity symbols for all parity.

FIG. 13 is a factor graph of parity symbols for CSIPB for P[i] and all prior parities (i.e., P[j] for j<i). Here, the parity symbols for data frame i are functions of (a) the first component of the current and previous τ data frames (i.e., Γ[i−τ:i]), and (b) the second component of the data frame from τ time slots before (i.e., γ[i−τ]). Thus, the parity symbols for data frame i are functions of Γ[i−τ] through Γ[i−1], γ[i−τ], and Γ[i] but not γ[i]. For example, each symbol of P[i] may be a linear combination of the symbols from (a) and (b).

Figure 14:
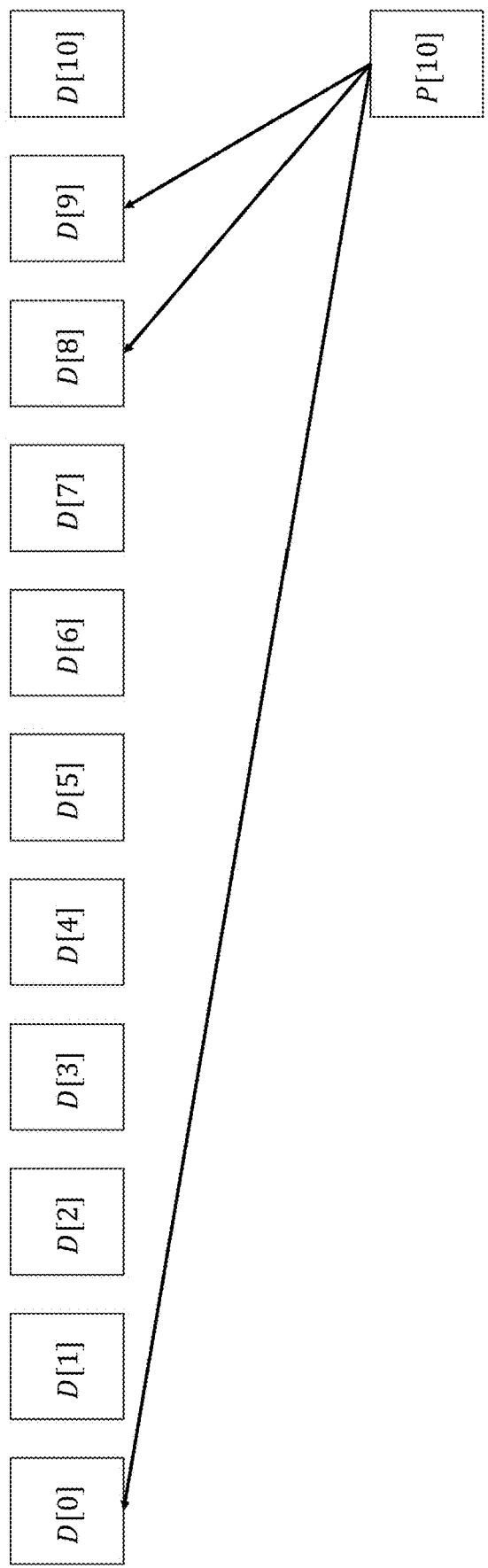
FIG. 14 shows an example factor graph for $\tau=10$ under the Cisco patent example code 1 using this patent application's notation.

FIG. 14 shows an example factor graph for τ=10 under the Cisco patent example code 1 using this patent application's notation. Here, the parity symbols sent for the 10$^{th}$ data frame are linear combinations of the data symbols of data frames 0, 8, and 9. Compared to CSIPB, P[10] is independent of D[10] (i.e., no connection from P[10] to D[10]), P[10] is independent of all symbols of D[1] through D[7] (i.e., no connection from P[10] to D[1] through D[7]), P[10] is a linear combination of all symbols of D[8] and D[9] (i.e., connected to D[8] and D[9] rather than connected to a subset of their symbols), and each data frame is presumed to be the same size.

Figure 15:
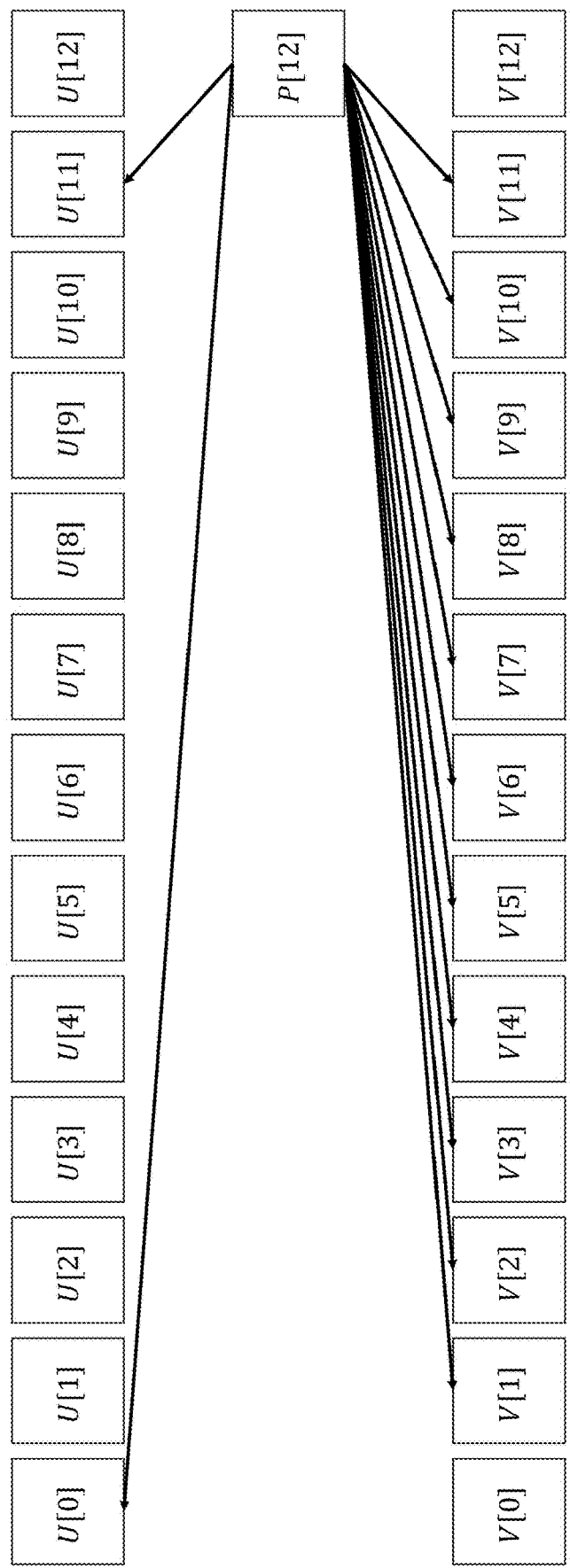
FIG. 15 shows an example factor graph for $\tau=12$ under the Cisco patent example code 2 using this patent application's notation.

FIG. 15 shows an example factor graph for τ=12 under the Cisco patent example code 2 using this patent application's notation. Here, parity symbols sent for the 12$^{th}$ data frame are linear combinations of the two components of data frame 11, the first component of data frames 0 through 10 and the first component of data frame 0 Compared to CSIPB, P[10] is independent of D (i.e., no connection from P[10] to D[10]), P[10] is independent of certain symbols of D[0] (i.e., V[0]) (i.e., no connection from P[10] to V[10]), P[10] is a linear combination of all symbols of D[11] (i.e., connected to U[11] and V[11]) rather than connected to a subset of its symbols, and each data frame is presumed to be the same size.

Figure 16:
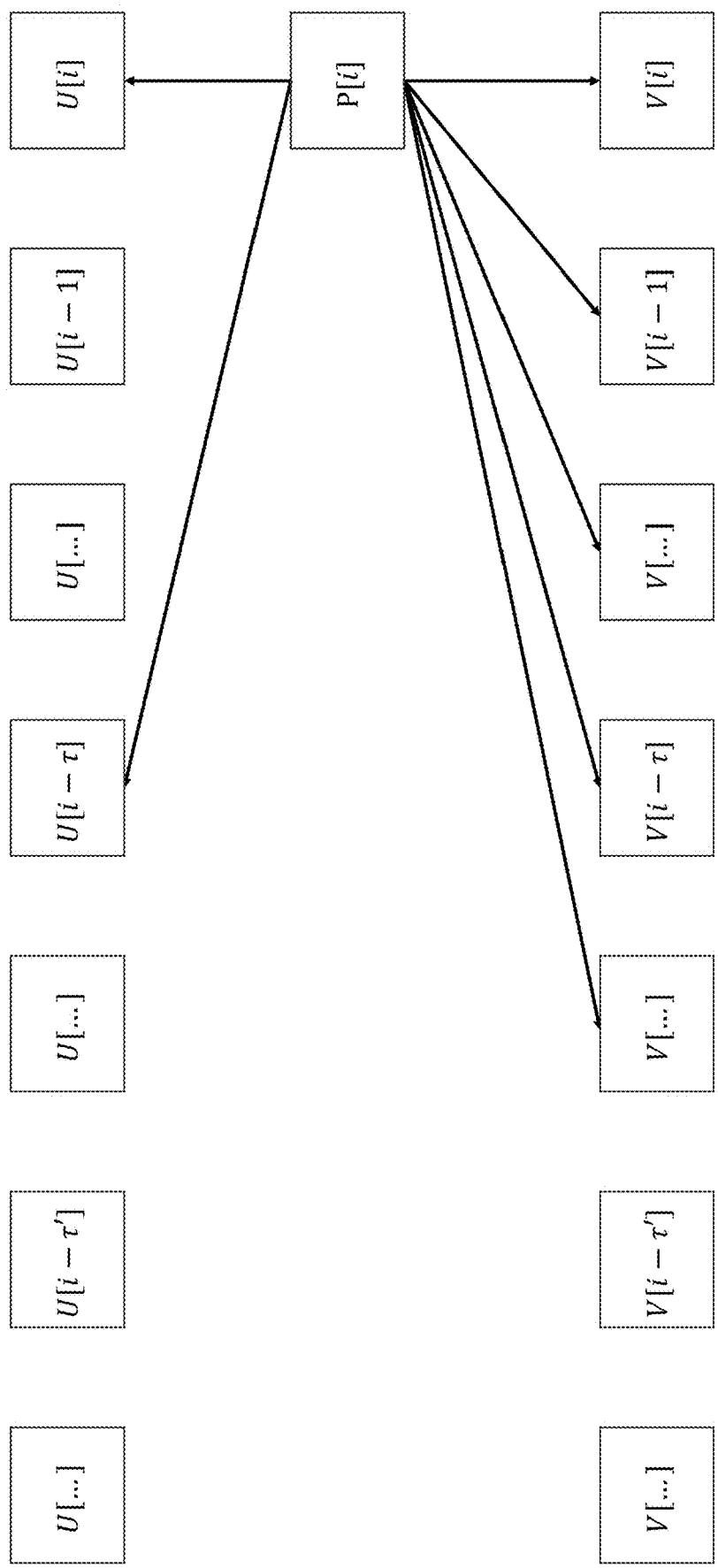
FIG. 16 shows an example factor graph from Tambur using this patent application's notation.

FIG. 16 shows an example factor graph from Tambur using this patent application's notation. Here, the parity symbols for data frame i are functions of (a) the first component of the current and previous $\tau$ data frames (i.e., $\Gamma[i-\tau:i]$), (b) the second component of the data frame from $\tau$ time slots before (i.e., $\gamma[i-\tau]$), and (c) the second component of the current data frame (i.e., $\gamma[i]$). Compared to CSIPB, all symbols of P[i] depend on all symbols of D[i] (i.e., connection from P[i] to each of U[i] and V[i]) and there is no connection from P[i] to symbols of D[j] for $j<(i-\tau)$, whereas, for example, there is a connection for CSIPB construction when the failsafe is applied. As a reminder, the size of P[i] under CSIPB is set differently than the size of P[i] under Tambur even though the factor graph may not highlight this fact.

Figure 17:
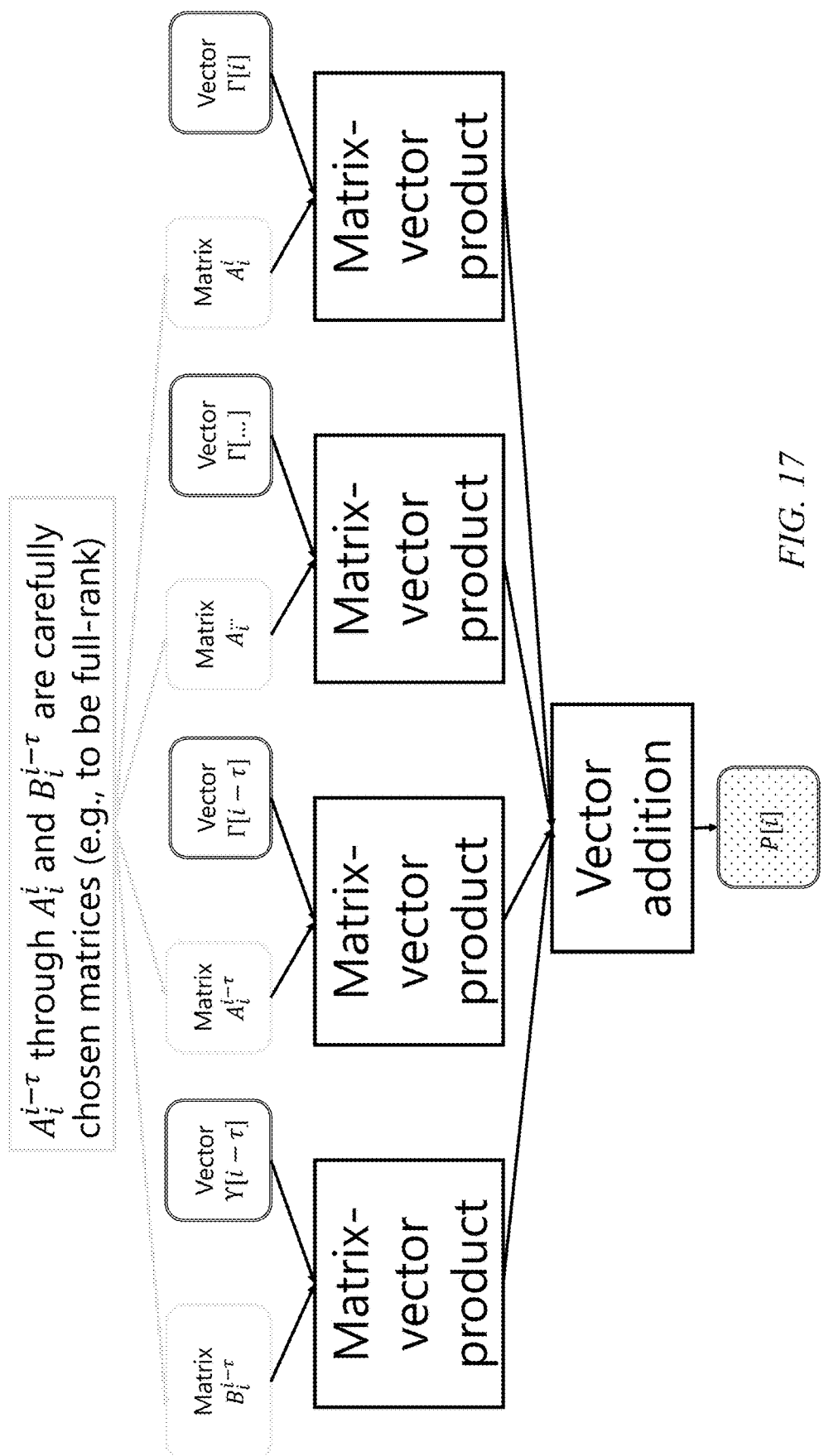
FIG. 17 shows parity symbol generation for the ith data frame in accordance with CSIPB, in accordance with certain embodiments.

FIG. 17 shows parity symbol generation for the ith data frame in accordance with CSIPB, in accordance with certain embodiments. Here, the symbols of P[i] are linear combinations of the symbols of the current data frame and previous $\tau$ data frames. Specifically, the symbols of P[i] are designed linear combinations of (a) the first component of the current and previous $\tau$ data frames, and (b) the second component of the frame from $\tau$ time slots earlier. All linear combinations are carefully chosen to be linearly independent linear equations (e.g., to be full rank).

One way to construct the matrices is for (a) $B_i^{i-\tau}$ to be the parity check matrix of a systematic MDS code (e.g., Reed-Solomon) and (b) for $A_i^{i-T}$ through $A_i^i$ to be parity check matrices of a systematic m-MDS convolutional code. Alternatively, $A_i^{i-\tau}$ through $A_i^i$ (and perhaps $B_i^{i-\tau}$) can be matrices with each entry drawn independently and uniformly at random over the elements of the field; in this case, loss recovery can be shown with a high probability for a sufficiently large field size, as opposed to being guaranteed with probability of 1.

More generally, CSIPB can be characterized as including any structure for encoding parity symbols for the current data frame, i, that is a function of the symbols of $\Gamma[i-\tau:i]$, and $\gamma[i-\tau]$ so that, for any partial burst, the symbols of first component of data frames are all recovered by $\tau$ time slots after the start of the burst (e.g., one method to accomplish this is to ensure recovery by $\tau-1$ time slots after the start of the burst of the first component of all frames in the partial burst and guard space up to $\tau-1$ time slots after the start of the burst) and the symbols of the second component of each data frame are recovered $\tau$ time slots later (i.e., frame $\gamma[i-\tau]$ is recovered during time slot i; in certain embodiments, D[i] is also recovered during time slot i, although it may not be necessary to recover D[i] during time slot i in other embodiments such as if a non-systematic scheme is used). For example, linear combinations of the symbols of $\Gamma[i-\tau:i]$ can be chosen according to a sliding window rateless code to create a vector of symbols, P'[i]. Then, linear combinations of the symbols of $\gamma[i-\tau]$ may be chosen according to an MDS code, leading to the vector of symbols P*[i]. Adding P*[i] to P'[i] can then form the parity symbols to be sent, P[i]=P'[i]+P*[i]. The number of parity symbols may be chosen to be high enough so that loss recovery occurs with high probability. This may involve allocating extra parity symbols compared to how many are needed when the linear combinations of symbols of the first component are full rank. Using such a rateless code may improve the complexity of encoding/decoding but require sending extra parity symbols.

Figure 18:
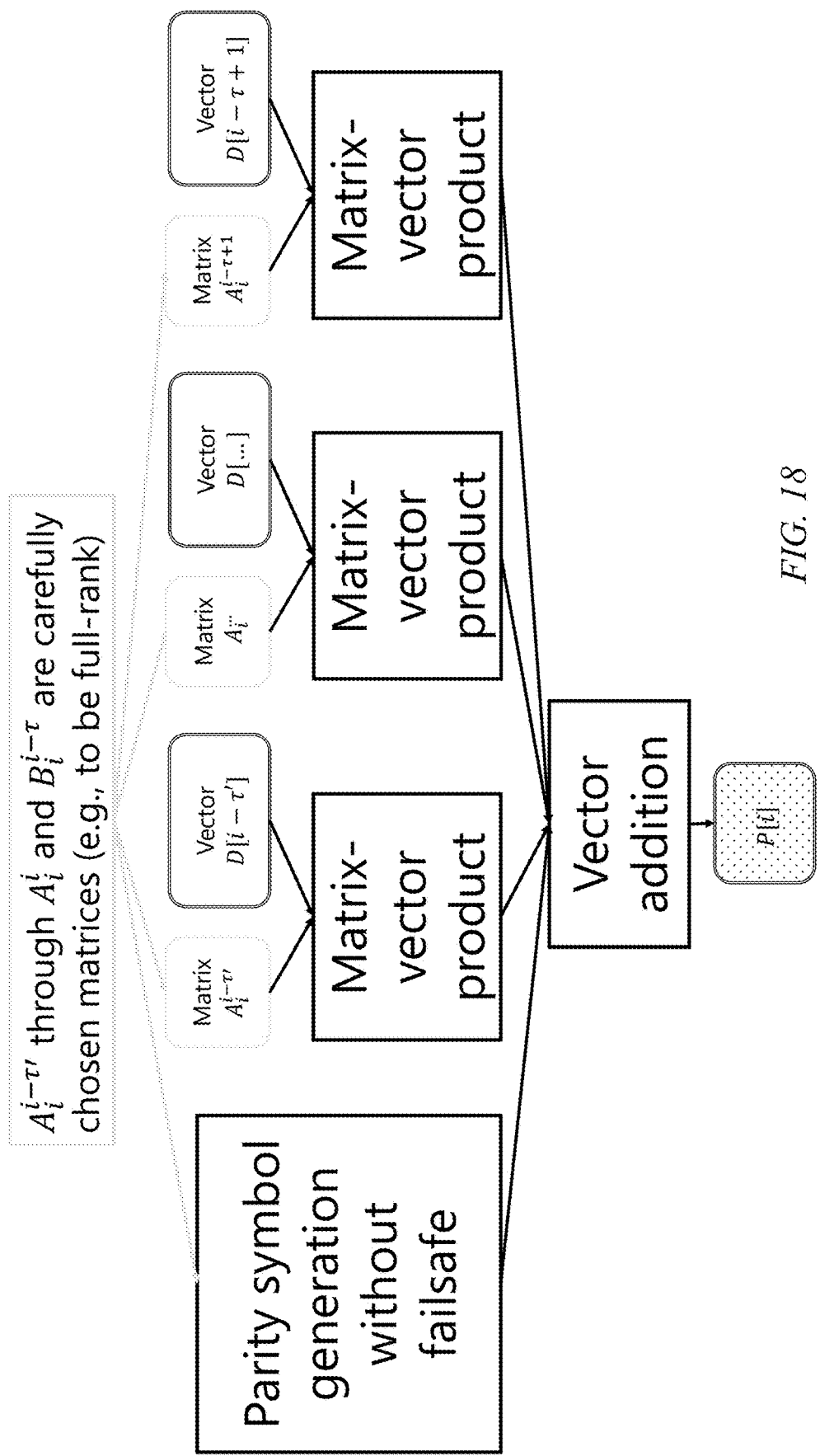
FIG. 18 shows parity symbol generation for the ith data frame for CSIPB with fail safe, in accordance with certain embodiments.

It should be noted that alternate embodiments of CSIPB can include a failsafe mechanism, e.g., by including earlier data frames into the parity symbols. FIG. 18 shows parity symbol generation for the ith data frame for CSIPB with fail safe, in accordance with certain embodiments. CSIPB's loss-recovery mechanism provides guarantees as long as losses are no worse than the type of loss that is admissible under the channel parameters (i.e., $b_i$ and $l_i$ for each data frame i). Embodiments can include a failsafe mechanism (which applies to CSIPB or to CSIPB under variations of the coding matrices) by which information from one or more additional prior data frames are added to parity symbols of the current data frame. This enables loss recovery even in cases where losses are worse than the anticipated values (i.e., a burst of length $b_i$ starting in data frame i where $l_i$ fraction of the packets are lost for each data frame j in the burst). For example, if P[i] is the parity symbols as defined under CSIPB, the parity symbols to be sent may be P[i]+ $P^+[i]$ where $P^+[i]$ can be random linear combinations of the symbols of data frames $(i-\tau')$ through $(i-\tau-1)$ for some $\tau'$ larger than $\tau$. Formally, $P^+[i]=\Sigma_{j=i-\tau'}^{i-\tau-1} A_i^j D[j]$, where each $A_i^j$ is a matrix with entries drawn uniformly at random from the field, although it should be noted that embodiments are not limited to linear combinations but instead could use other techniques to incorporate information about prior frames into the parity symbols (e.g., if each symbol is over an extension field, they could include information about only part of certain symbol(s)). Even if CSIPB might not be able to recover certain lost packets, the failsafe mechanism on top of CSIPB may lead to loss recovery (albeit with a latency of more than $\tau$). Recovering data frames after their deadline can be useful due to inter-frame dependencies, as later uncompressed frames are playable once all prior data frames have been recovered. A complementary failsafe of sending feedback from the receiver to the sender to generate a keyframe (i.e., an uncompressed frame that does not depend on prior uncompressed frames) can be applied on top of the new failsafe by triggering the new keyframe when frame i has not been recovered, e.g., by some number of time slots, such as $(i+\tau'+1)$. The keyframe may also be requested sooner if frame i is deemed unlikely to be recovered, e.g., if the fraction of packets lost during time slot i greatly exceeds $l_i$.

Figure 19:
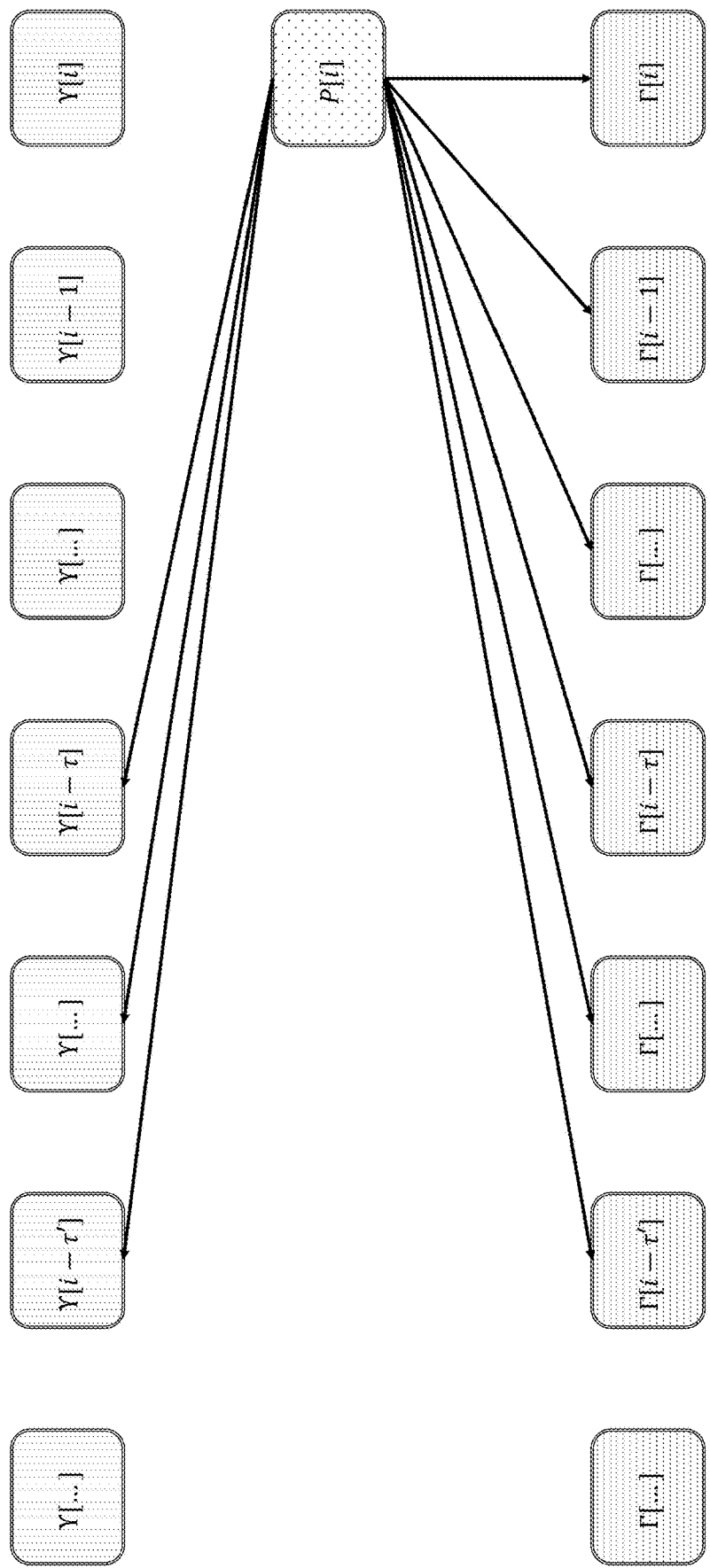
FIG. 19 is a factor graph of parity symbols for CSIPB with failsafe, in accordance with certain embodiments.

FIG. 19 is a factor graph of parity symbols for CSIPB with failsafe, in accordance with certain embodiments. Here, the parity symbols for data frame i are functions of (a) the first component of the current and previous $\tau$ data frames (i.e., $\Gamma[i-\tau:i]$), (b) the second component of the data frame from $\tau$ time slots before (i.e., $\gamma[i-\tau]$), and (c) the data symbols of the remaining data frames among the $\tau'$ data frames before data frame i (i.e., $D[i-\tau':i-\tau-1]$). For example, each symbol of P[i] may be a linear combination of the symbols from (a), (b), and (c).

Figure 20:
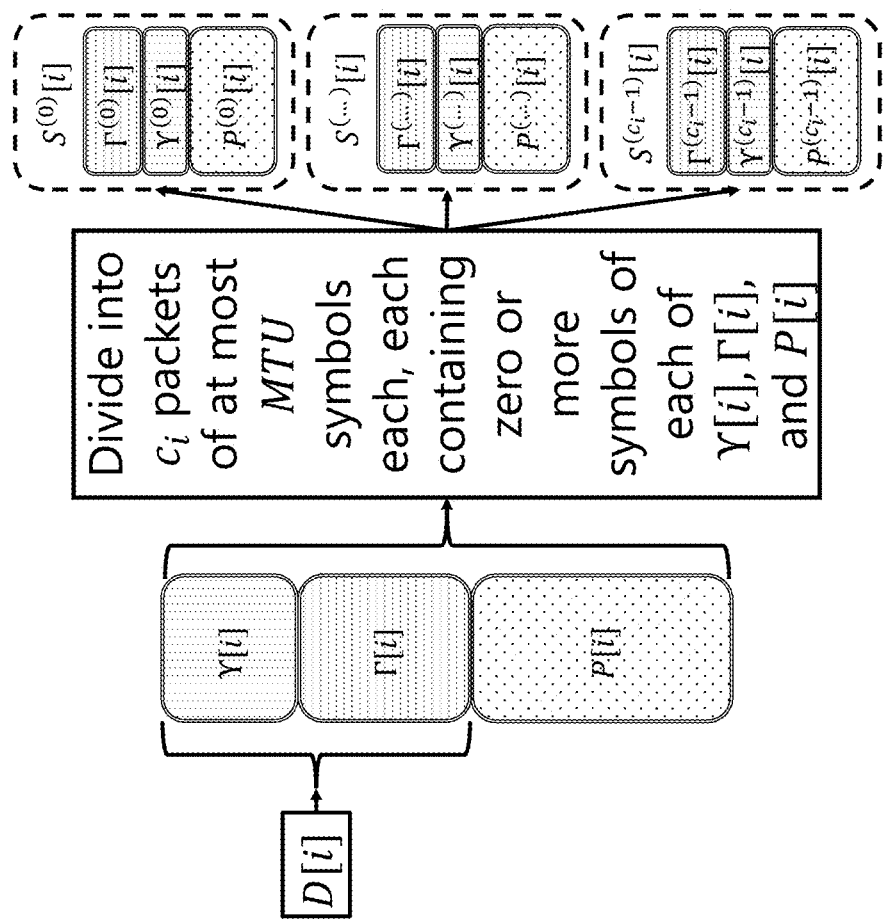
FIG. 20 shows the concept of packetization in accordance with CSIPB.

FIG. 20 shows the concept of packetization in accordance with CSIPB. Here, packetization involves distributing the symbols of $\gamma[i]$, $\Gamma[i]$, and P[i] over some number, $c_i$, of packets such that (a) each packet has size at most MTU symbols, and (b) losses under a partial burst channel are recoverable such that each data frame is recovered within $\tau$ time slots. In certain embodiments, it suffices to receive approximately $(1-l_i)$ fraction of each of $\gamma[i]$, $\Gamma[i]$, and P[i]. Each packet may contain symbols from one, two, or three of: $\gamma[i]$, $\Gamma[i]$, and P[i].

Figure 21:
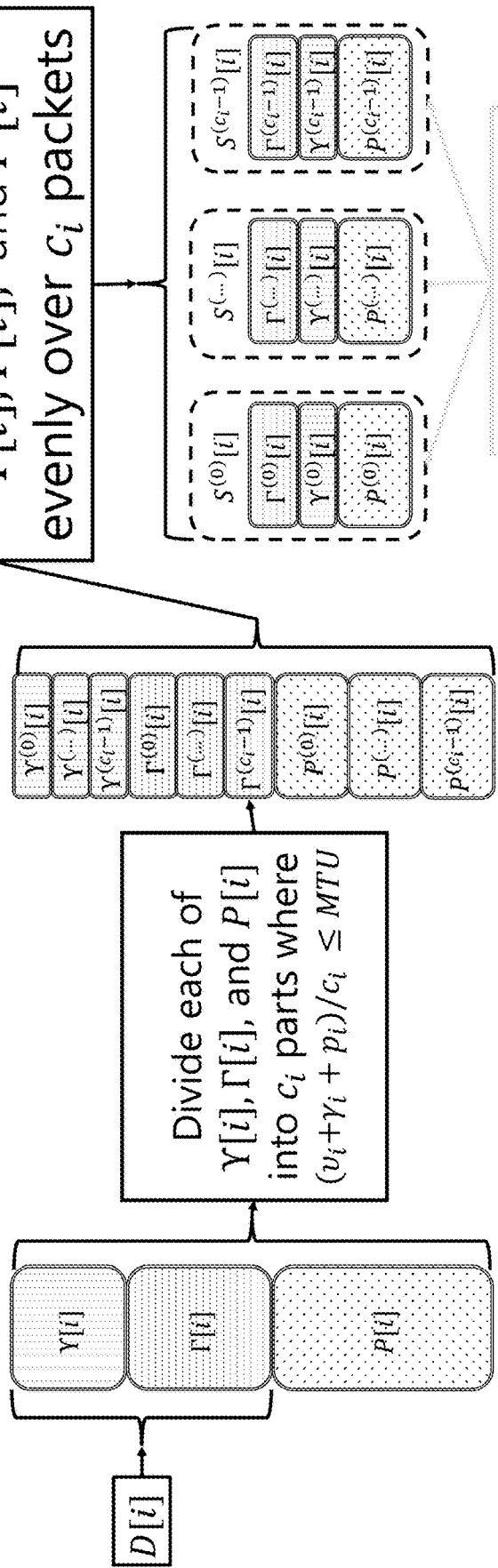
FIG. 21 shows one way for packetizing the ith data frame in accordance with CSIPB (referred to herein as Packetization #1).

FIG. 21 shows one way for packetizing the ith data frame in accordance with CSIPB (referred to herein as Packetization #1). Here, as few packets, $c_i$, are transmitted as possible so that when the data and parity symbols of a data frame are spread evenly over these packets, the following conditions hold: (a) each packet's size does not exceed the maximum transmittable unit (for example, 1500 bytes), and (b) the number of packets times $l_i$ is an integer (or, it is slightly less than an integer where the difference is deemed sufficiently small relative to the number of packets). Then, $\gamma[i]$ and $\Gamma[i]$ are zero-padded and the size of P[i] is increased, each by as little as possible to ensure the sizes of $\gamma[i]$, $\Gamma[i]$, and P[i] are evenly divisible by $c_i$. Each of $\gamma[i]$, $\Gamma[i]$, and P[i] are then evenly distributed over the $c_i$ packets. This approach deviates from Tambur, in which all parity symbols are sent in separate packets from data symbols and the number of packets is not chosen based on loss-recovery characteristics. Also, in Tambur, the parity packets are generally sent after the data packets, whereas certain embodiments of the present invention perform packetization in other, more flexible, ways.

Figure 22:
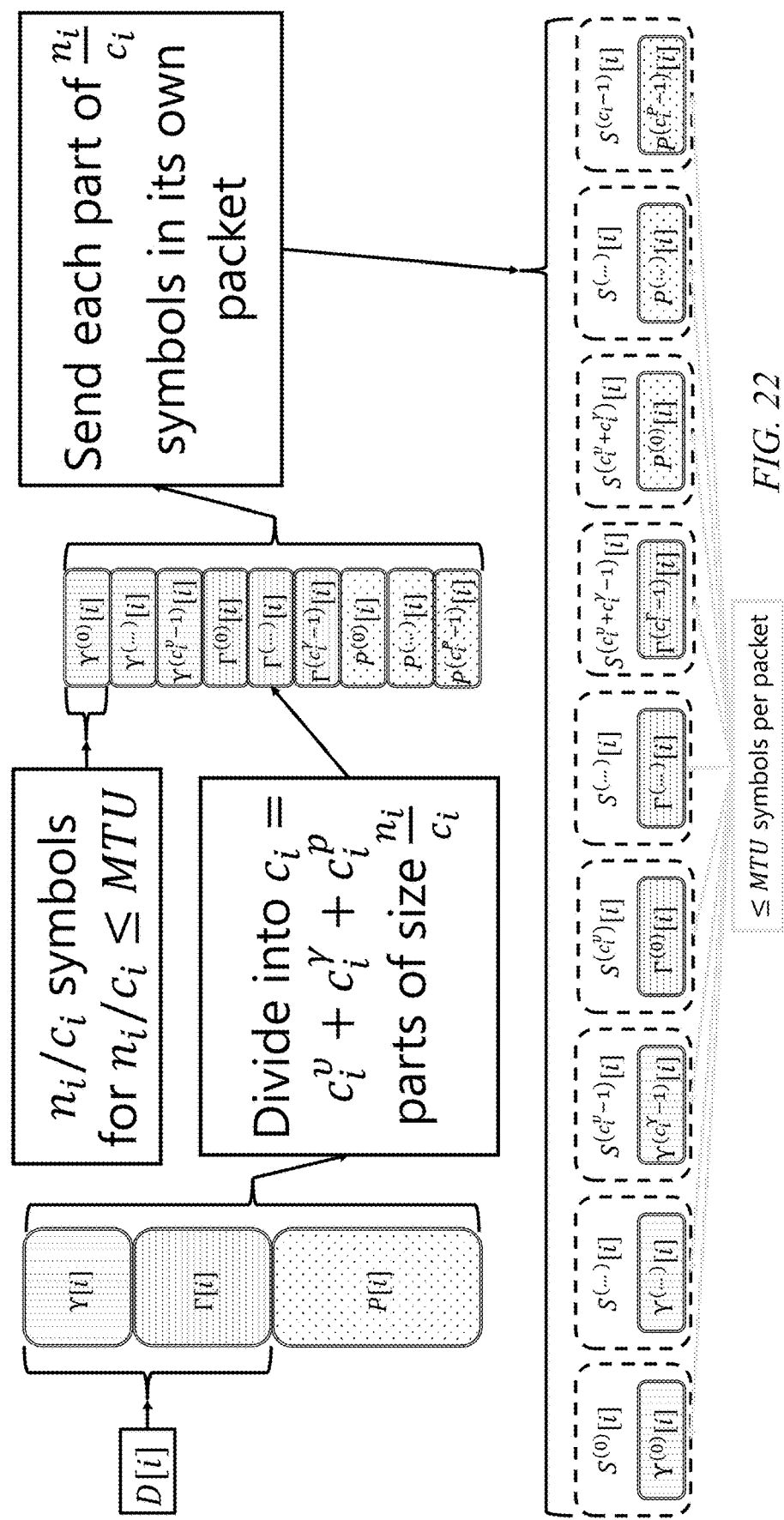
FIG. 22 shows a second way for packetizing the ith data frame in accordance with CSIPB.

FIG. 22 shows a second way for packetizing the ith data frame in accordance with CSIPB. Here, $\Gamma[i]$ is divided into $c_i^\gamma$ packets of size $$\frac{n_i}{c_i}$$

where $$\frac{n_i}{c_i} \le MTU,$$

$\gamma[i]$ is divided into $c_i^\upsilon$ packets of size $$\frac{n_i}{c_i}$$

where $$\frac{n_i}{c_i} \le MTU,$$

and P[i] is divided into $c_i^p$ packets of size $$\frac{n_i}{c_i}$$

where $$\frac{n_i}{c_i} \le MTU;$$

then $c_i=(c_i^\upsilon+c_i^\gamma+c_i^p)$ packets are sent. Packetizing may involve zero padding and or pushing the boundary between $\gamma[i]$ and $\Gamma[i]$. This approach deviates from Tambur where two components (which are different, U[i] and V[i]) are intended to be sent in together in the same packets and the number of packets is not chosen based on loss-recovery characteristics.

Figure 23:
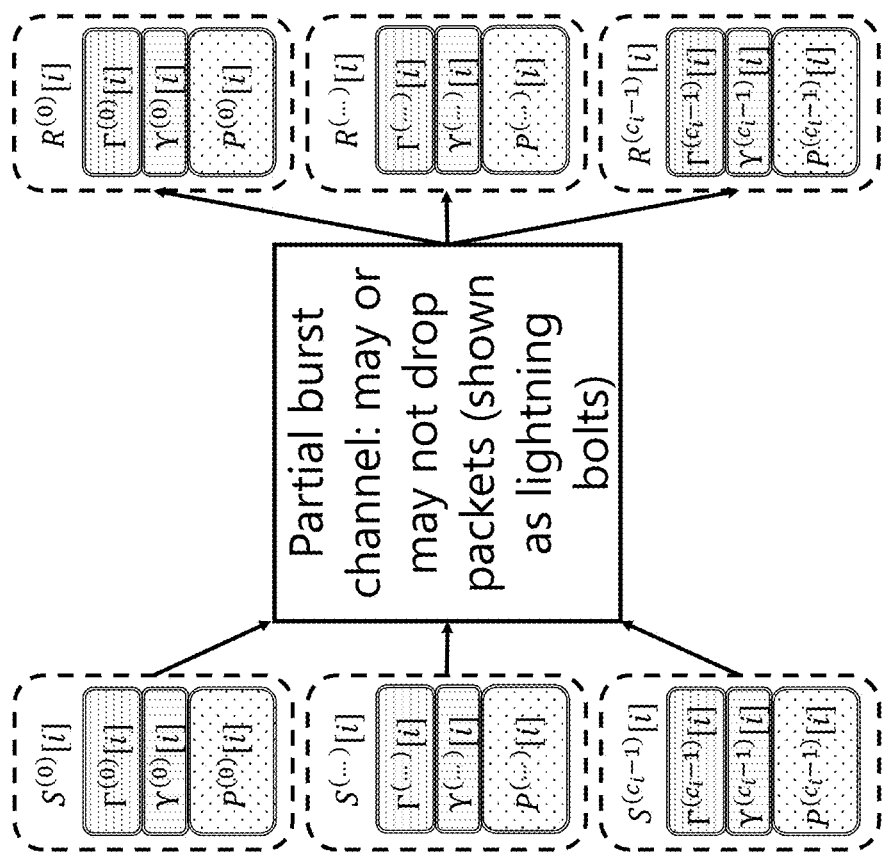
FIG. 23 illustrates how transmission switching is reflected from sent packets to received packets (e.g., based on packet loss/reception).

FIG. 23 illustrates how transmission switching is reflected from sent packets to received packets (e.g., based on packet loss/reception).

Figure 24:
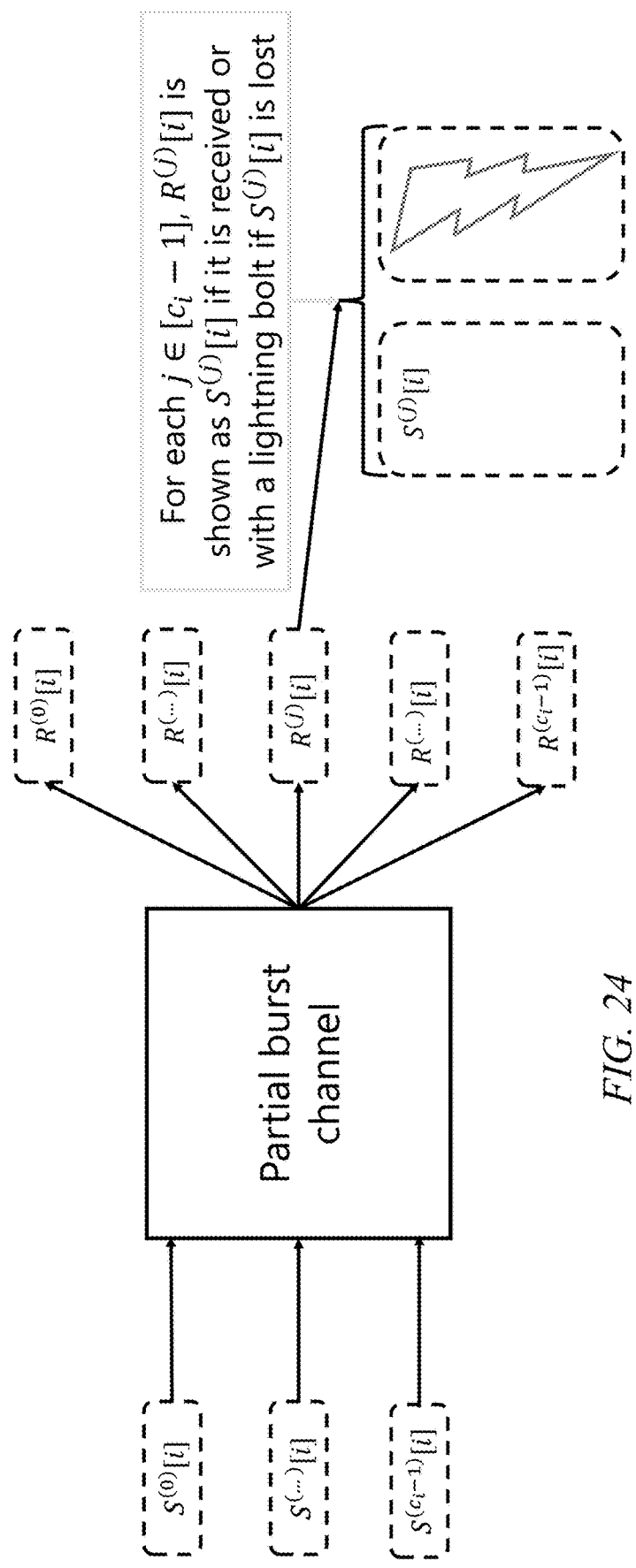
FIG. 24 provides a simplified illustration of how transmission switching is reflected from sent packets to received packets (e.g., based on packet loss/reception).

FIG. 24 provides a simplified illustration of how transmission switching is reflected from sent packets to received packets (e.g., based on packet loss/reception).

Figure 25:
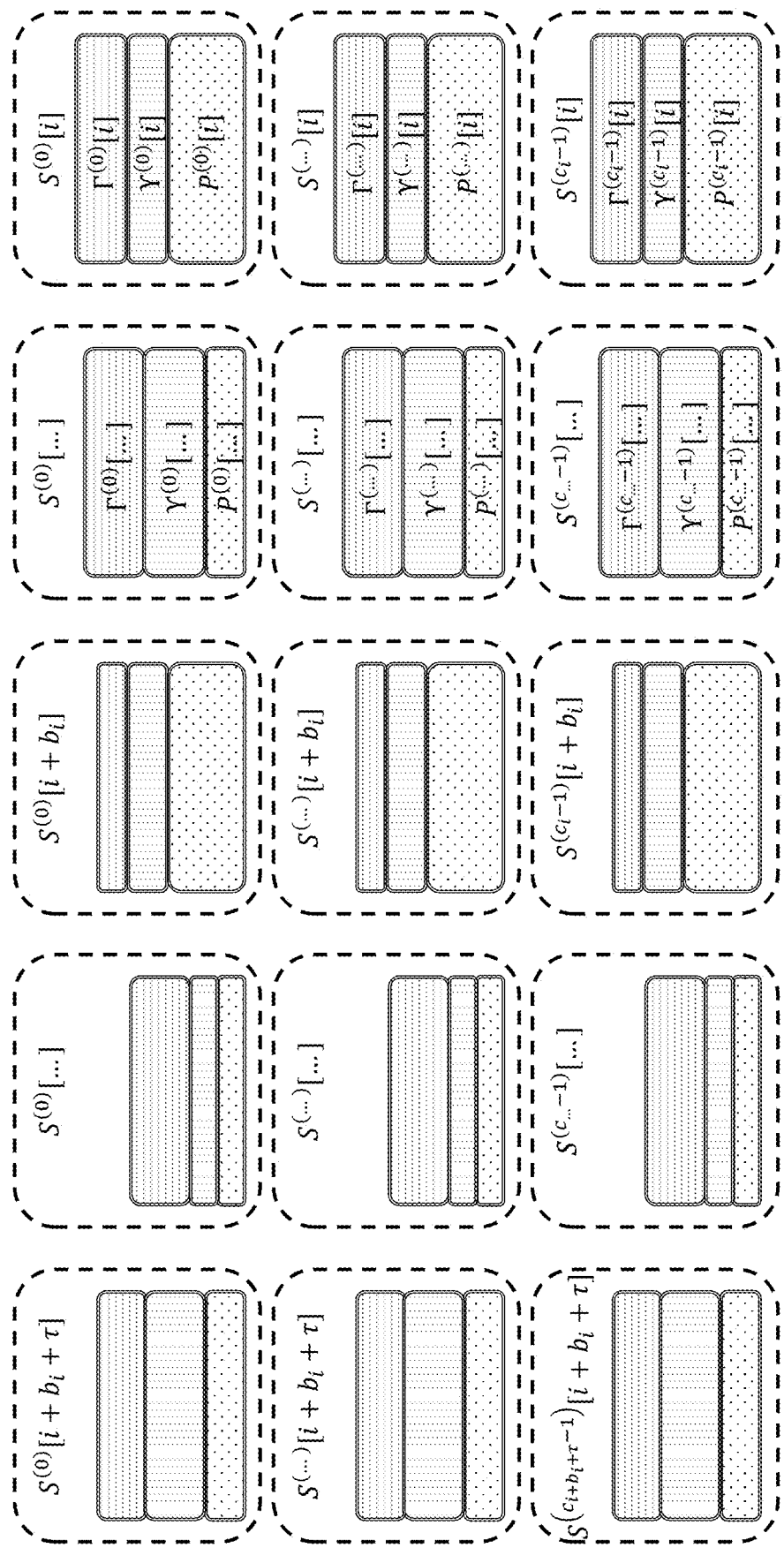
FIG. 25 shows an example of what is sent for time slots i through $(i+b_i+\tau)$ for non-negative integers i, $b_i$, and $\tau$.

FIG. 25 shows an example of what is sent for time slots i through $(i+b_i+\tau)$ for non-negative integers i, $b_i$, and $\tau$. Here, for each $j \in \{i+b_i, \ldots, i+b_i+\tau\}$ and each $z \in [c_j-1]$, (a) the box with horizontal lines inside of $S^{(z)}[j]$ is $\Gamma^{(z)}[j]$, (b) the box with vertical lines inside of $S^{(z)}[j]$ is $\gamma^{(z)}[j]$, and (c) the box with black dots inside of $S^{(z)}[j]$ is $P^{(z)}[j]$. This notation is applicable to other figures with similar boxes (unless otherwise specified).

Figure 26:
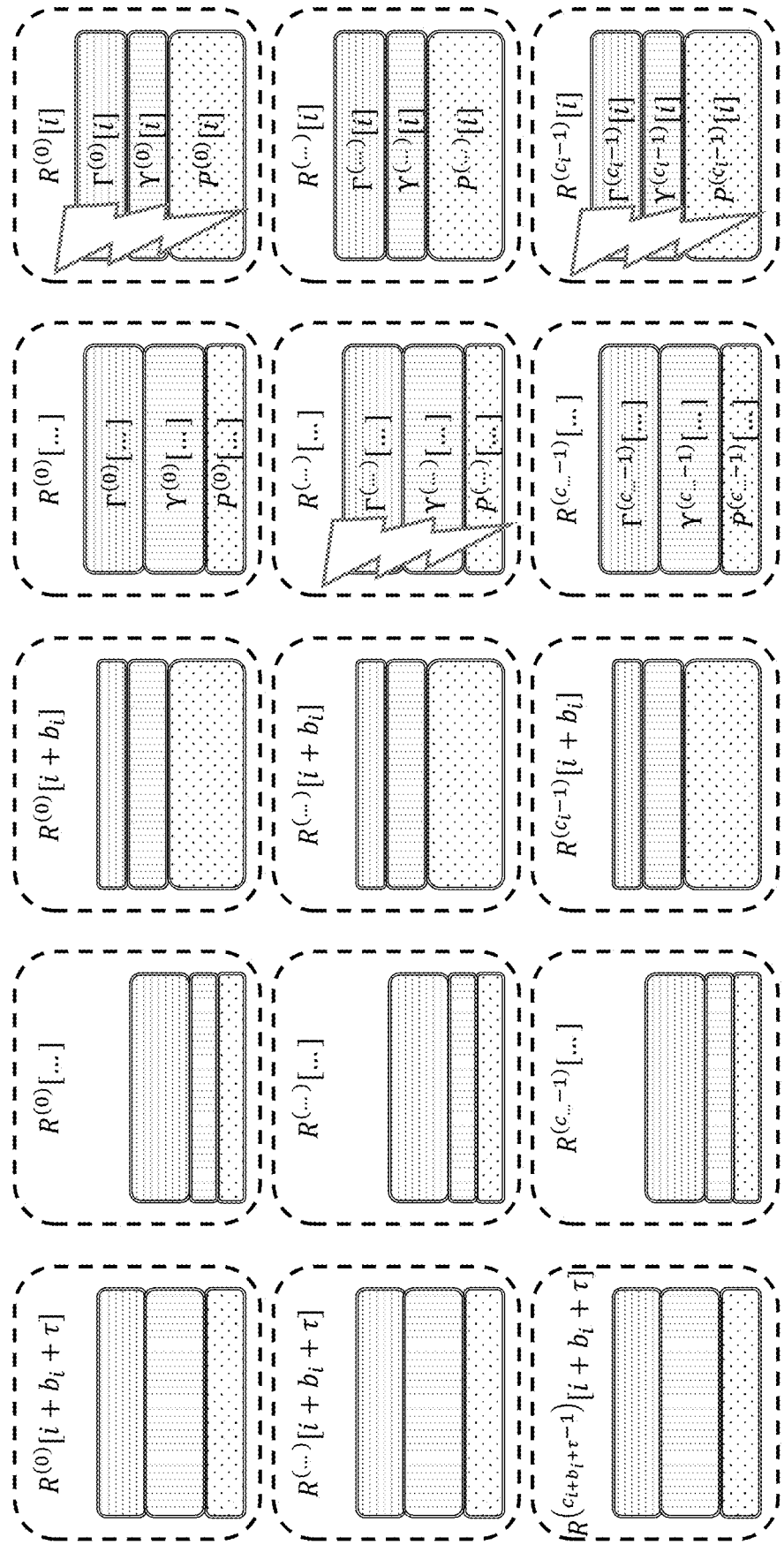
FIG. 26 shows an example of what may be received for time slots i through $(i+b+\tau)$ for non-negative integers i, $b_i$, and $\tau$.

FIG. 26 shows an example of what may be received for time slots i through $(i+b_i+\tau)$ for non-negative integers i, $b_i$, and $\tau$. Here, for each $j \in \{i+b_i, \ldots, i+b_i+\tau\}$ and each $z \in [c_j-1]$, (a) the box with horizontal lines inside of $S^{(z)}[j]$ is $\Gamma^{(z)}[j]$, (b) the box with vertical lines inside of $S^{(z)}[j]$ is $\gamma^{(z)}[j]$, and (c) the box with black dots inside of $S^{(z)}[j]$ is $P^{(z)}[j]$. This notation is applicable to other figures with similar boxes (unless otherwise specified).

Figure 27:
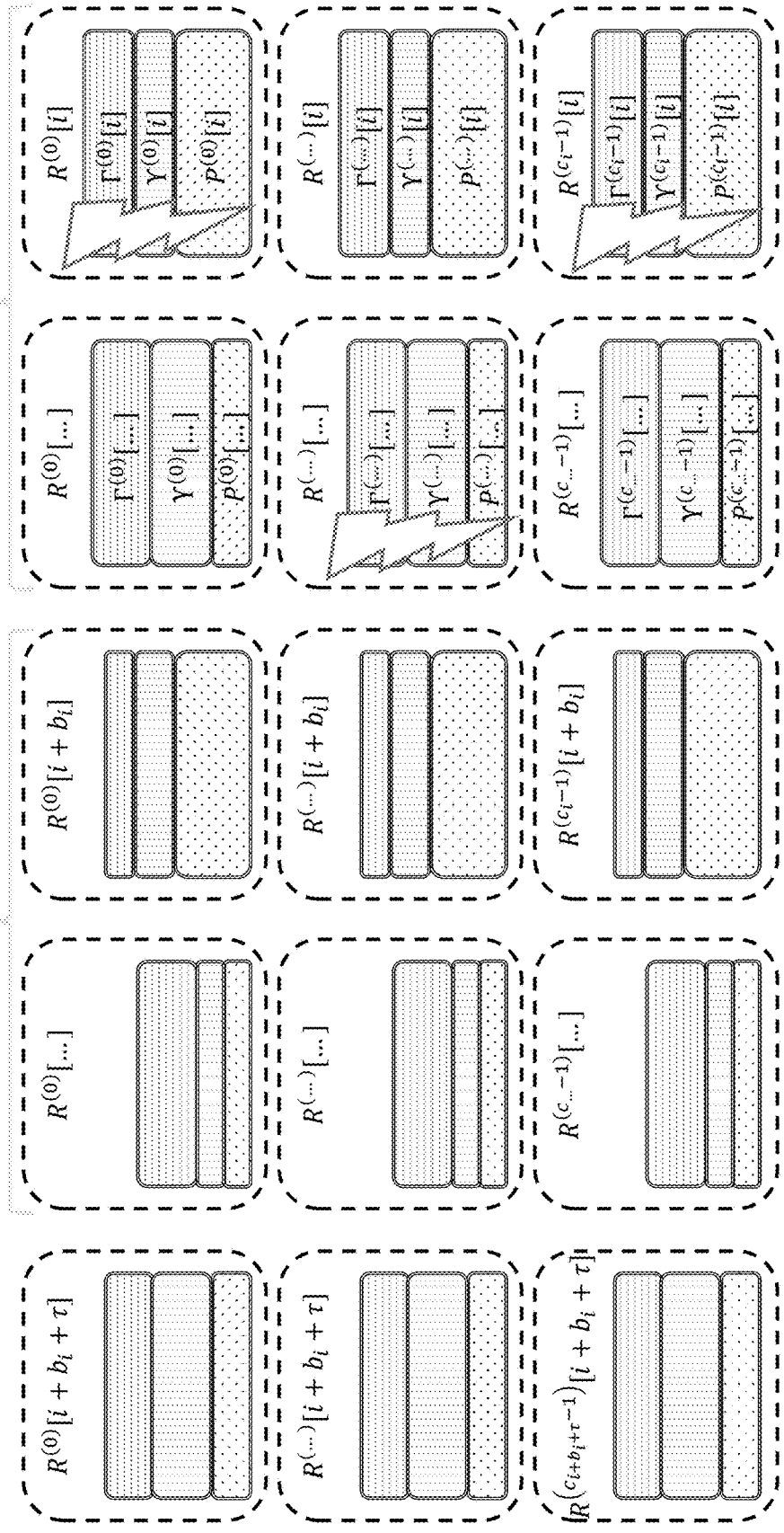
FIGS. 27 and 28 illustrate the streaming loss model in which a partial burst loss over $\leq b_i$ time slots (up to $\lceil l_j c_j \rceil$ of $S^{(0)}[j], \ldots, S^{(c_j-1)}[j]$ are lost for $j \in \{i, \ldots, i+b_i-1\}$) is followed by a guard space of $\geq \tau$ time slots (FIG. 28 removes some notation from FIG. 27) for non-negative integers i, $c_j$, $b_i$, and $\tau$ and real number between 0 and 1 (inclusive) $l_j$.
Figure 28:
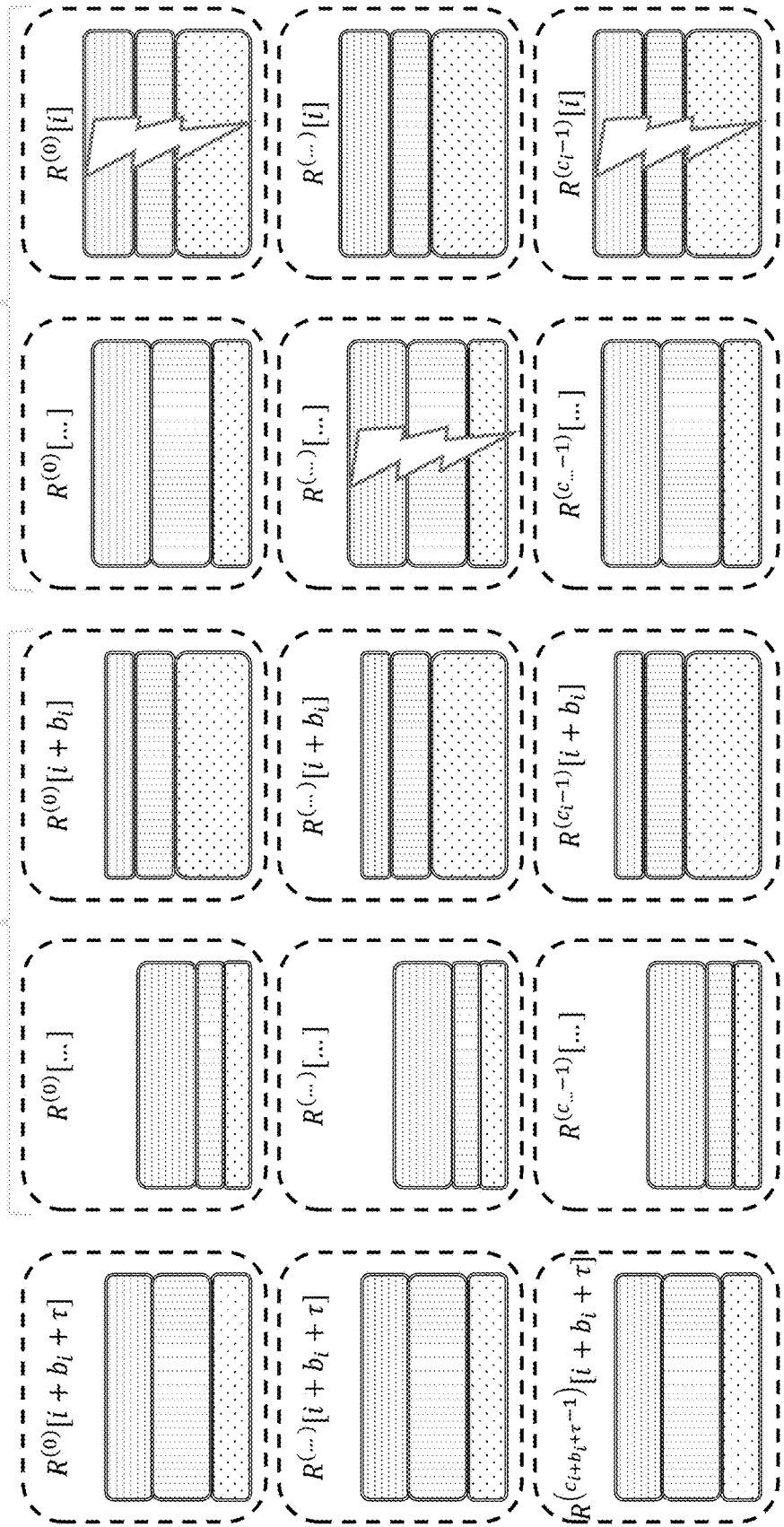

FIGS. 27 and 28 illustrate the streaming loss model in which a partial burst loss over$\le b_i$ time slots (up to $[l_j c_j]$ of $S^{(0)}[j], \ldots, S^{(c_j-1)}[j]$ are lost for $j \in \{i, \ldots, i+b_i-1\}$) is followed by a guard space of $\ge \tau$ time slots (FIG. 28 removes some notation from FIG. 27) for non-negative integers i, $c_j$, $b_i$, and $\tau$ and real number between 0 and 1 (inclusive) $l_j$.

Figure 29:
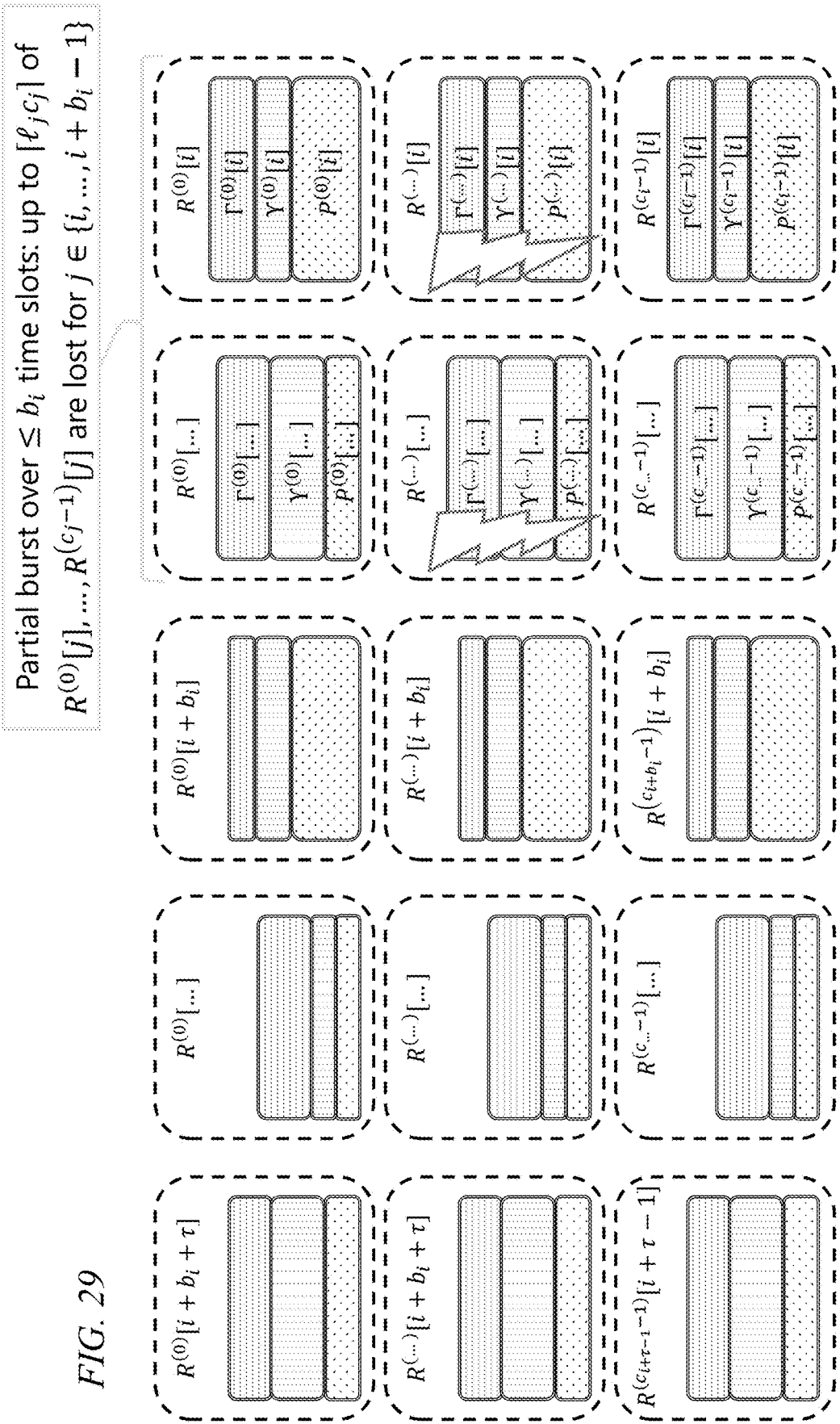
FIGS. 29-33 depict intended loss recovery of a partial burst loss using CSIPB.
Figure 30:
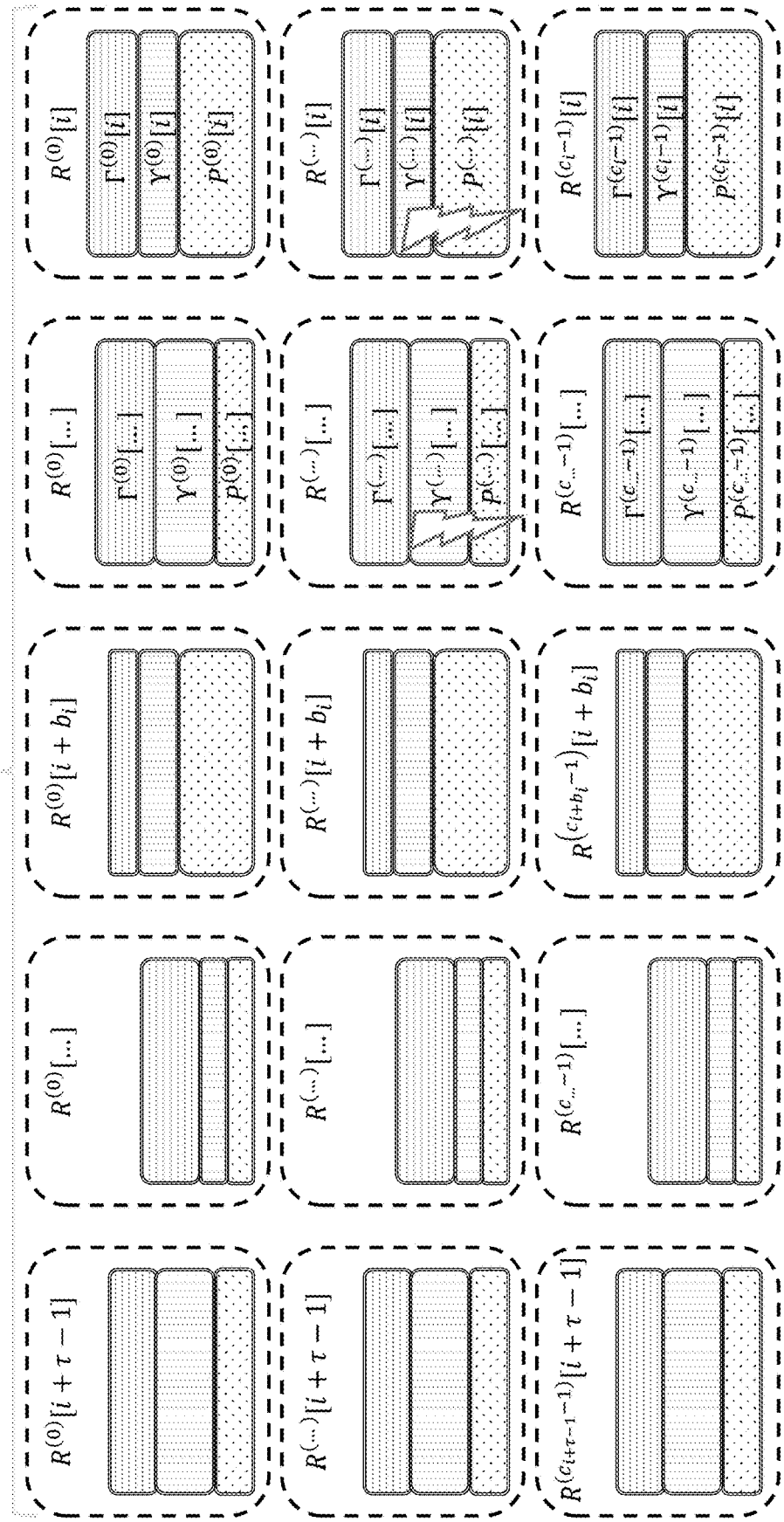
Figure 31:
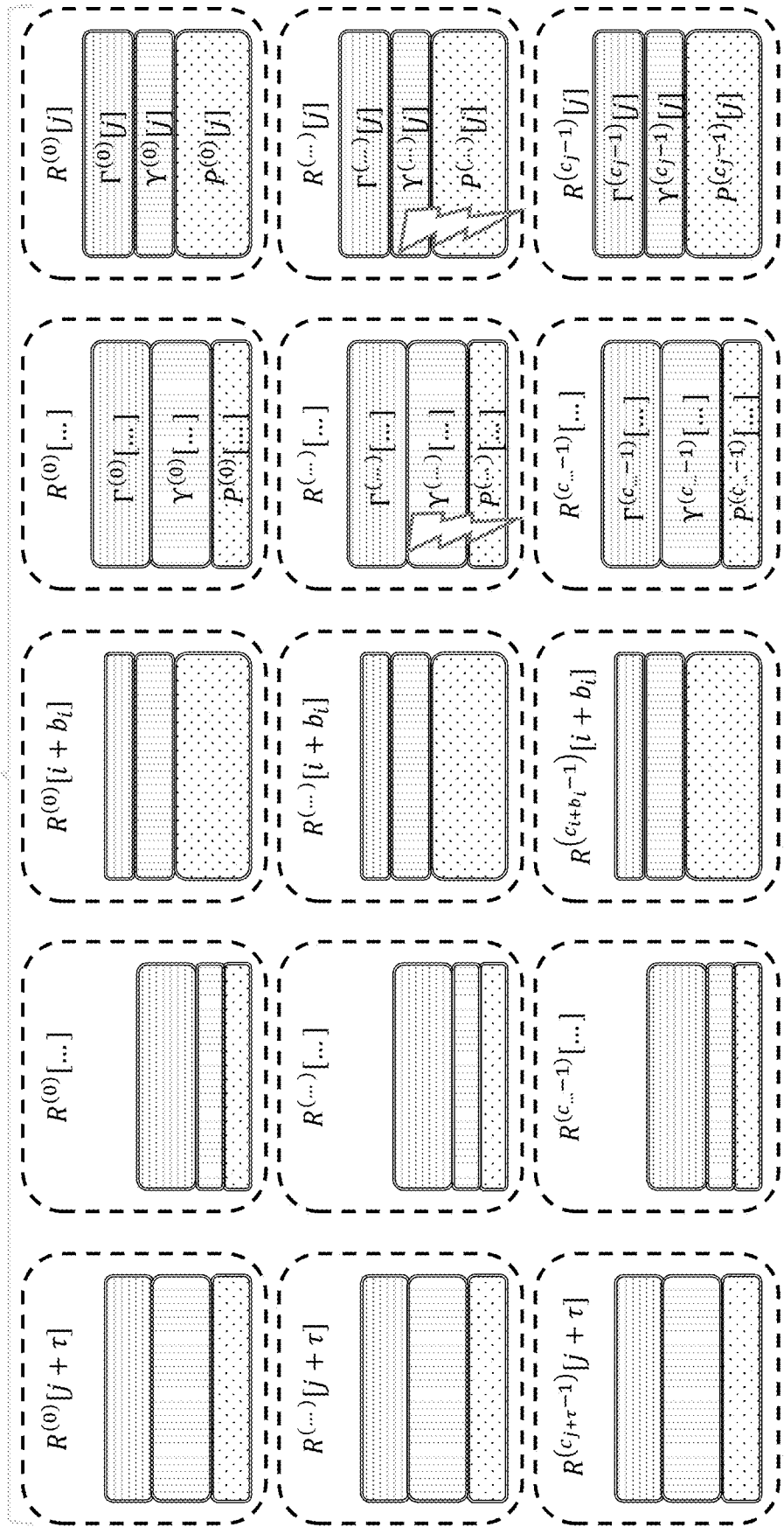

The intended loss recovery of a partial burst loss using CSIPB is now described with reference to FIGS. 29-33. Note that sometimes lightning bolts are changed to no longer overlap a vector (e.g., $\Gamma \cdots [i]$) once it has been recovered. FIG. 29 shows an example of a partial burst over $\le b_i$ time slots: up to $[l_j c_j]$ of $R^{(0)}[j], \ldots, R^{(c_j-1)}[j]$ are lost for $j \in \{i, \ldots, i+b_i-1\}$. In accordance with CSIPB, lost symbols of $\Gamma[i], \ldots \Gamma[i+b_i-1]$ are recovered by time slot $(i+\tau-1)$ using (a) received symbols of $P[i:i+b_i-1]$ and $\Gamma[i:i+b_i-1]$, (b) $P[i+b_i:i+\tau-1]$ and $\Gamma[i+b_i:i+\tau-1]$, and (c) $D[i-\tau:i-1]$, as depicted schematically in FIG. 30, where the symbols of $D[i-\tau:i-1]$ are assumed to already be decoded by time slot $(i+\tau-1)$. Also, lost symbols of $\gamma[j]$ are recovered during time slot $(j+\tau)$ with $P[j+\tau]$, $\Gamma[j:j+\tau]$, and the received symbols of $\gamma[j]$, as depicted schematically in FIG. 31, where the symbols of $\Gamma[j:i+b_i-1]$ are assumed to already be decoded by time slot $(i+\tau-1) \le (j+\tau)$; also, the symbols of $\Gamma[i+b_i:j+\tau]$ and $P[j+\tau]$ are received.

Figure 32:
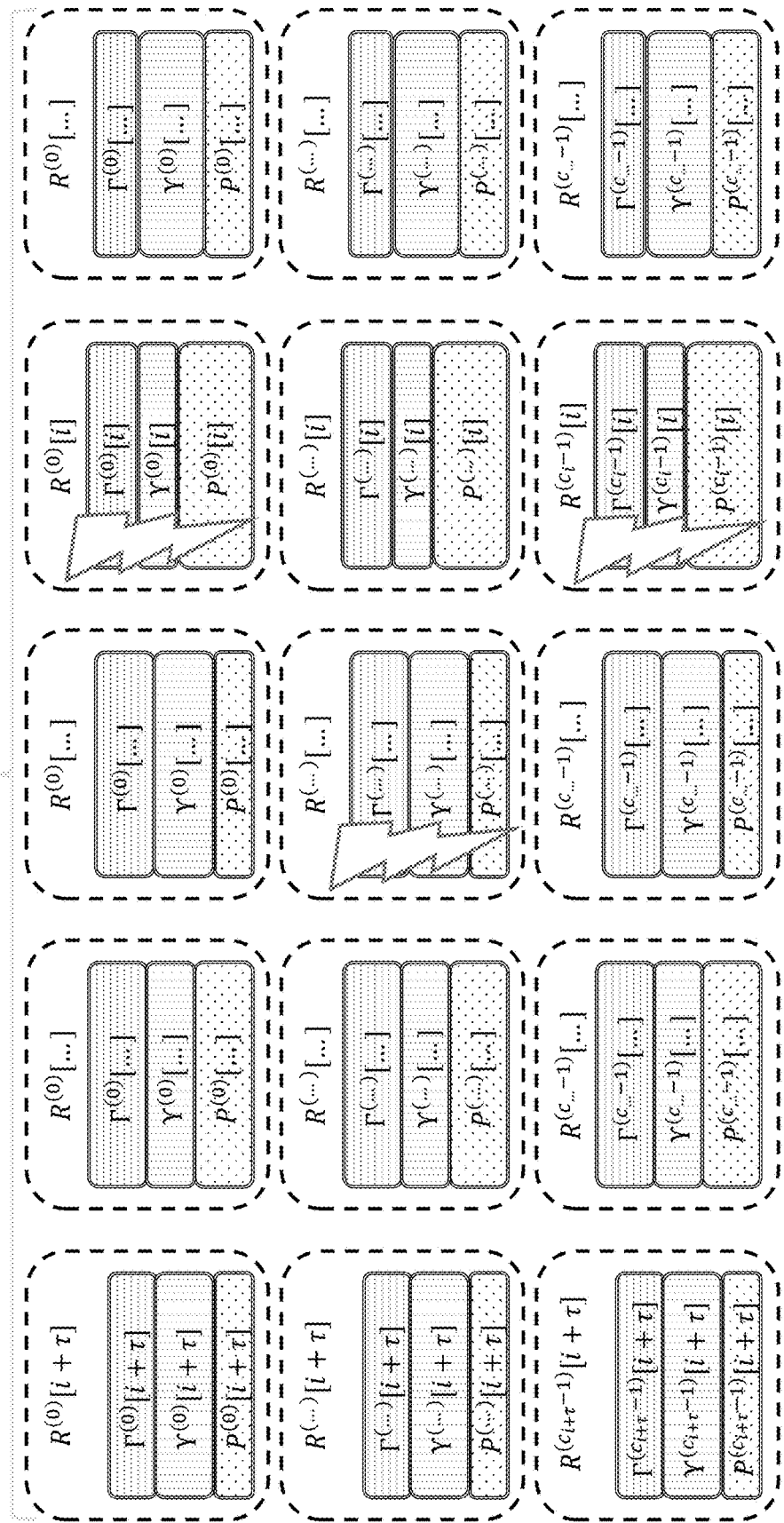
Figure 33:
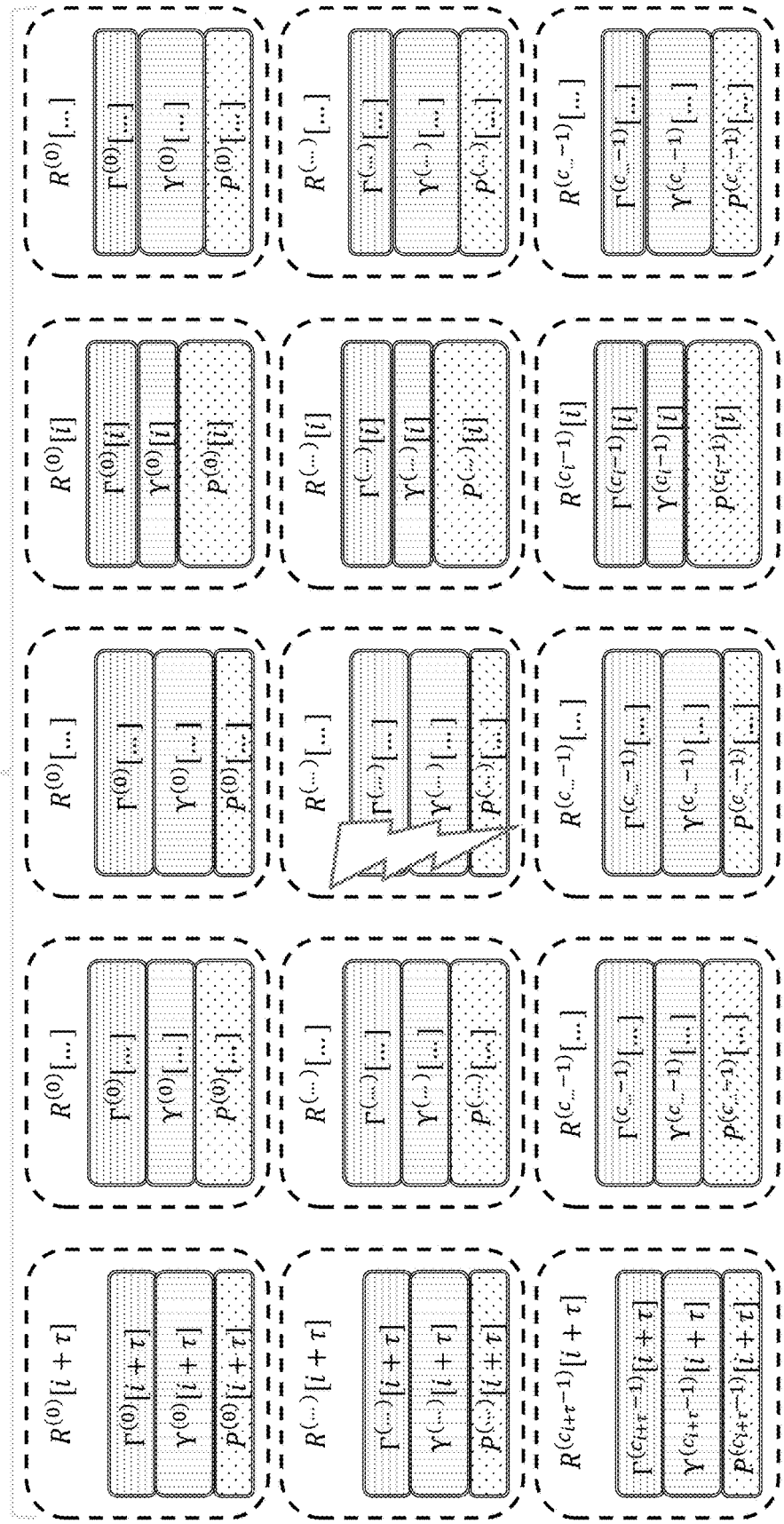

The intended loss recovery from the perspective of a single frame i is now described with reference to FIGS. 32-33. FIG. 32 shows an example of a partial burst loss. In accordance with CSIPB, all lost symbols of D[i] are recovered during time slot $(i+\tau)$ by solving a system of linear equations over (a) the received symbols of $P[i:i+\tau]$, (b) the received symbols of D[i], (c) the received symbols of $\Gamma[i+1:i+\tau]$, and (d) $D[i-\tau:i-1]$. The symbols of $D[i-\tau:i-1]$ are assumed to already be decoded by time slot $(i+\tau)$. In summary, as depicted schematically in FIG. 33, loss recovery can be viewed as follows. Recover all lost symbols of D[i] during time slot $(i+\tau)$ by solving a system of linear equations over (a) the received symbols of $P[i:i+\tau]$, (b) the received symbols of D[i], (c) the received symbols of $\Gamma[i+1:i+\tau]$, and (d) $D[i-\tau:i-1]$. One way to do so is to use Gaussian Elimination to solve the system of linear equations. Here, the lightning bolt reflects that symbols of $R[i+1:i+b_i-1]$ may be lost; however, it is possible that the symbols of $\Gamma[i+1:i+b_i-1]$ are already decoded by time slot $(i+\tau-1)$ for certain embodiments.

In an offline setting, where sizes of future frames are available, an offline optimization can be used to find splits and parity allocation, e.g., via a linear program. FIGS. 34-46 schematically show an offline optimization to find splits and parity allocation via a linear program, in accordance with one embodiment.

Figure 34:
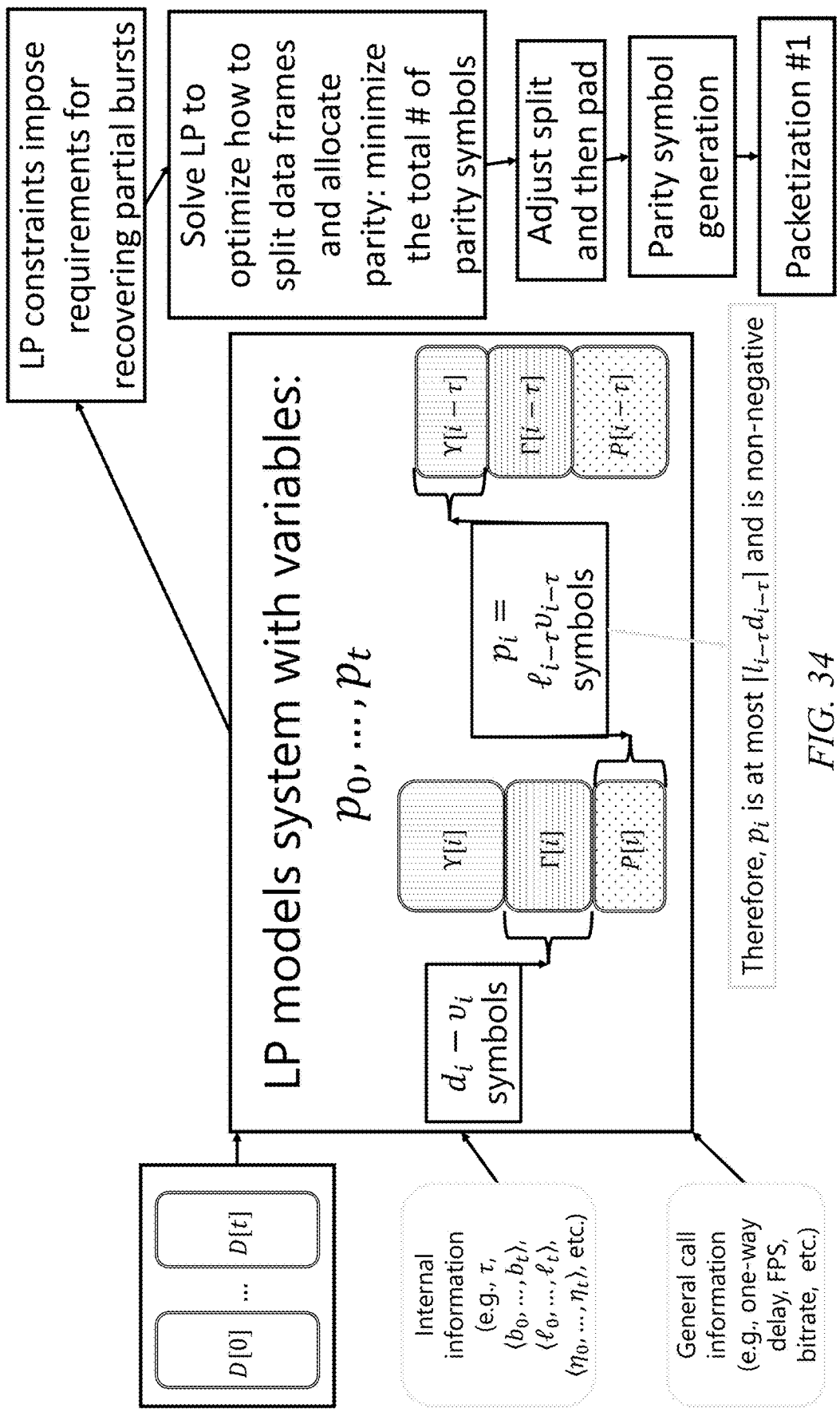
FIGS. 34-46 schematically show an offline optimization to find splits and parity allocation via a linear program, in accordance with one embodiment.

FIG. 34 shows a general linear program model to be solved for offline optimization, in accordance with one embodiment. In this example the total number of parity symbols is just the summation over all time slots, i, of $p_i$, where t is the length of the call in this example.

Figure 35:
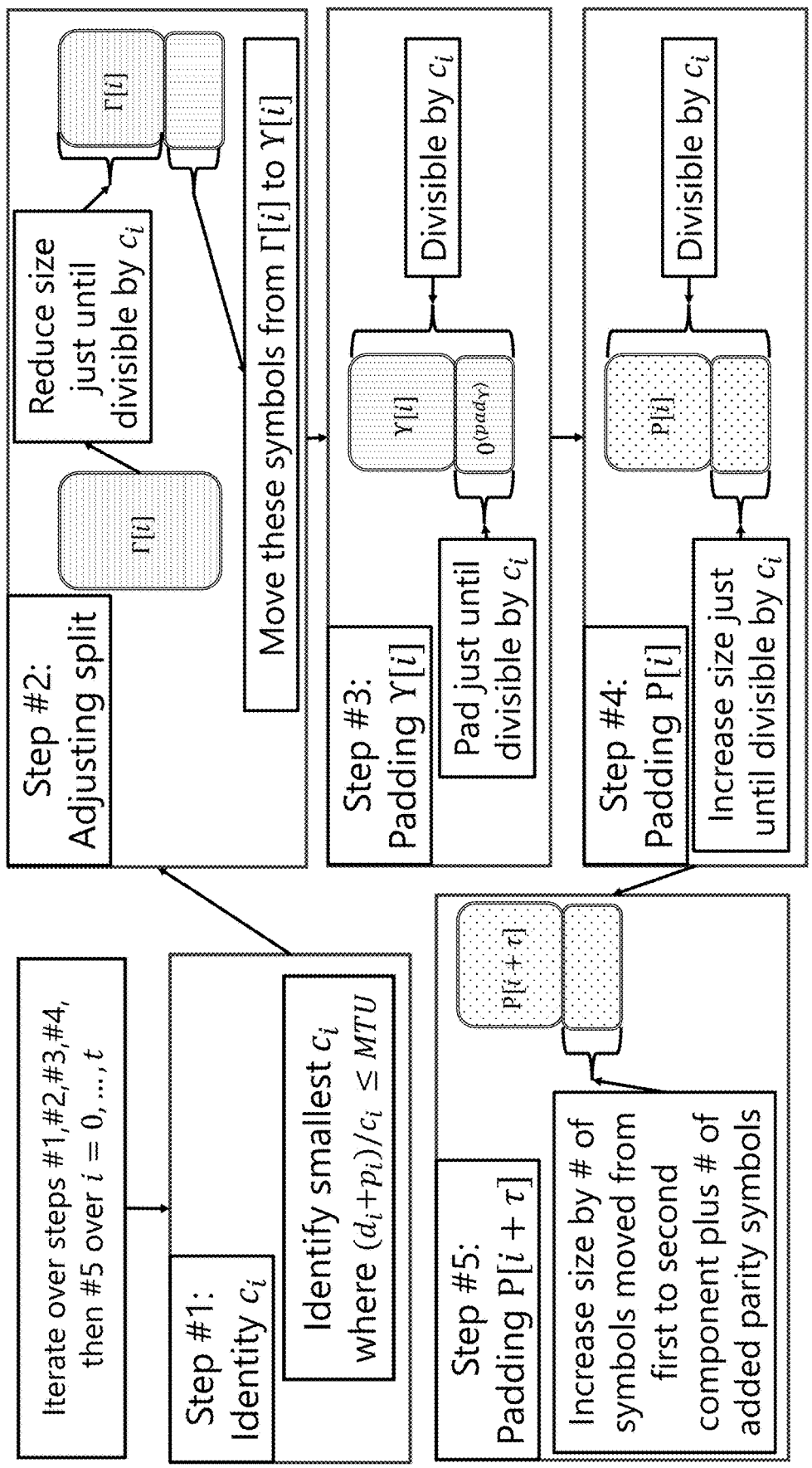

FIG. 35 shows the general steps for using the variables computed as part of the offline optimization using the linear program model of FIG. 34 to then determine the sizes of $\upsilon_j$, $\gamma_j$, $p_j$ for each time slot j, in accordance with one embodiment. In this example, padding is added, and the number of parity symbols is padded, parity symbol generation is applied, and then packetization #1 is applied. This ensures (a) the packetization is well defined while (b) maintaining the intended recovery properties for partial bursts (i.e., for a partial burst starting in time slot i with high probability (a) for each time slot i that $\Gamma[i:i+b_i-1]$ are recovered by time slot $(i+\tau-1)$ and (b) each $\gamma[j]$ is recovered by time slot $(j+\tau)$ for $j \in \{i, \ldots, i+b_i-1\}$.

Figure 36:
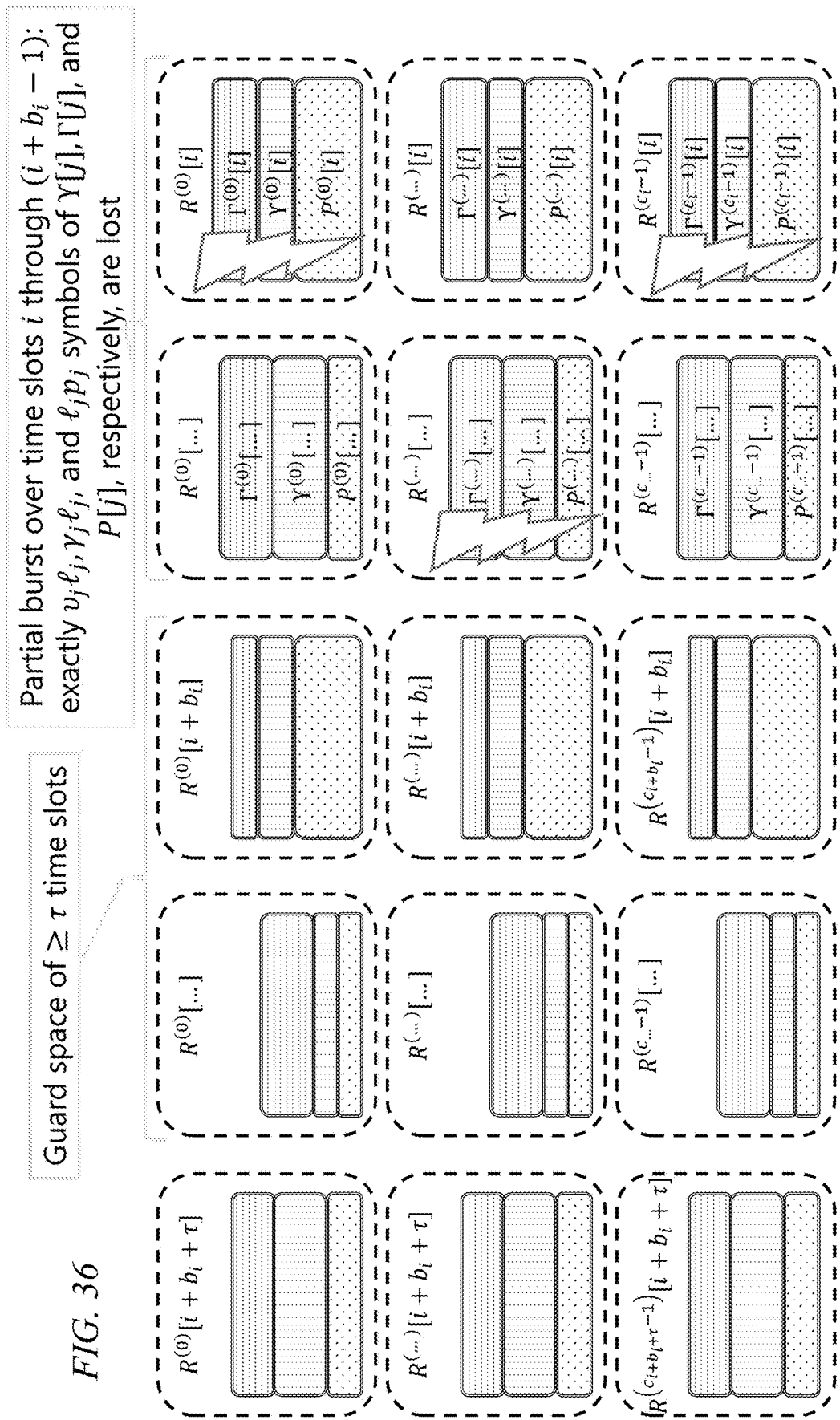

FIG. 36 models a partial burst starting in time slot i for constraints on loss recovery (under a relaxation of $l_i$ fraction of the symbols of $\gamma[i]$, $\Gamma[i]$, and $P[i]$ are modeled as being lost). Note that the steps shown in FIG. 35 address the relaxation.

Figure 37:
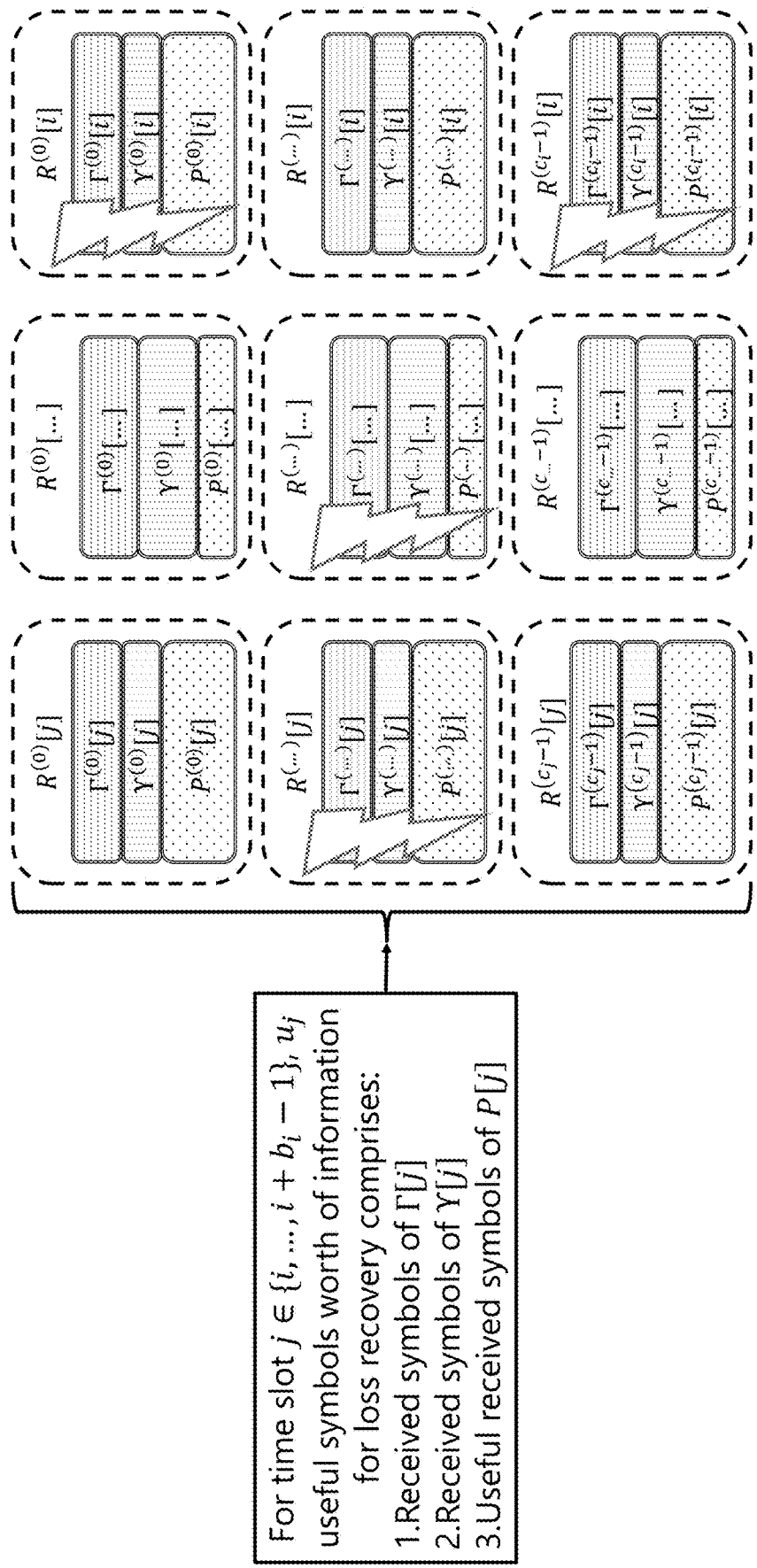

FIG. 37 shows useful symbols for loss recovery in time slot $j \in \{i, \ldots, i+b_i-1\}$, in accordance with one embodiment.

Figure 38:
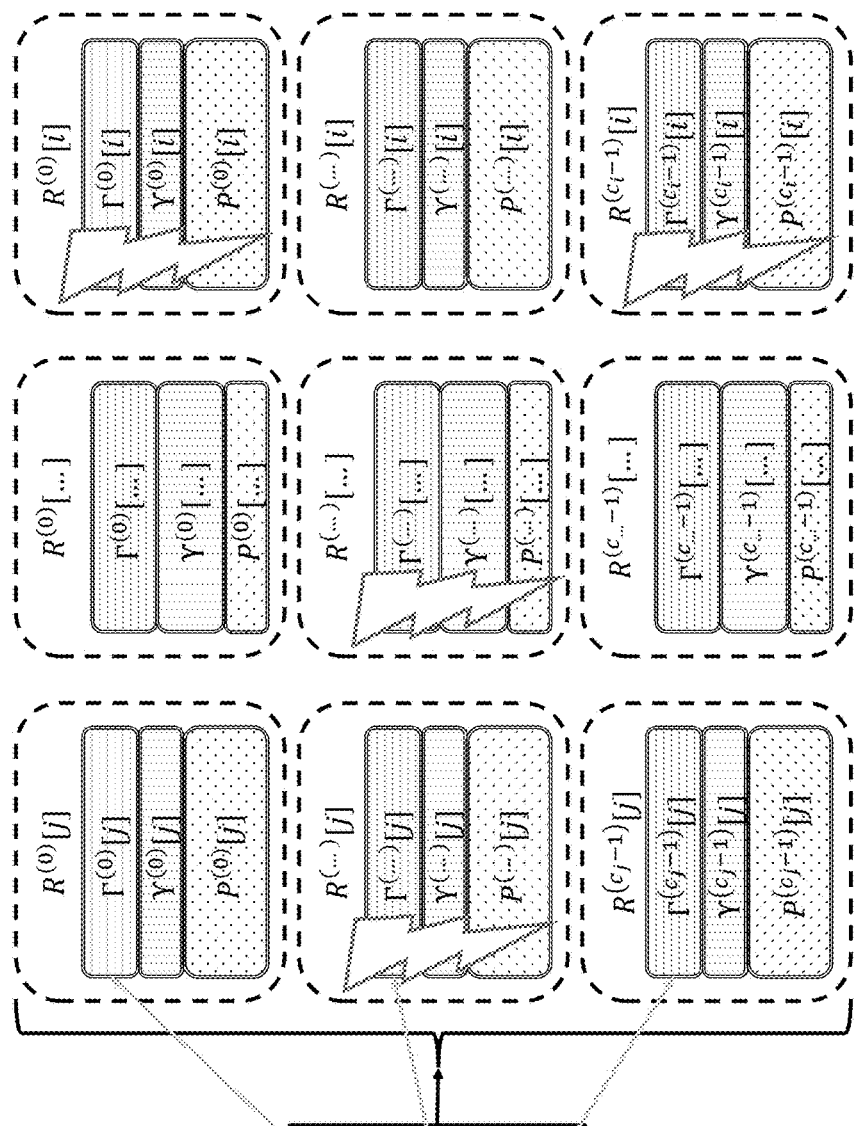

FIG. 38 highlights received symbols $\Gamma[j]$.

Figure 39:
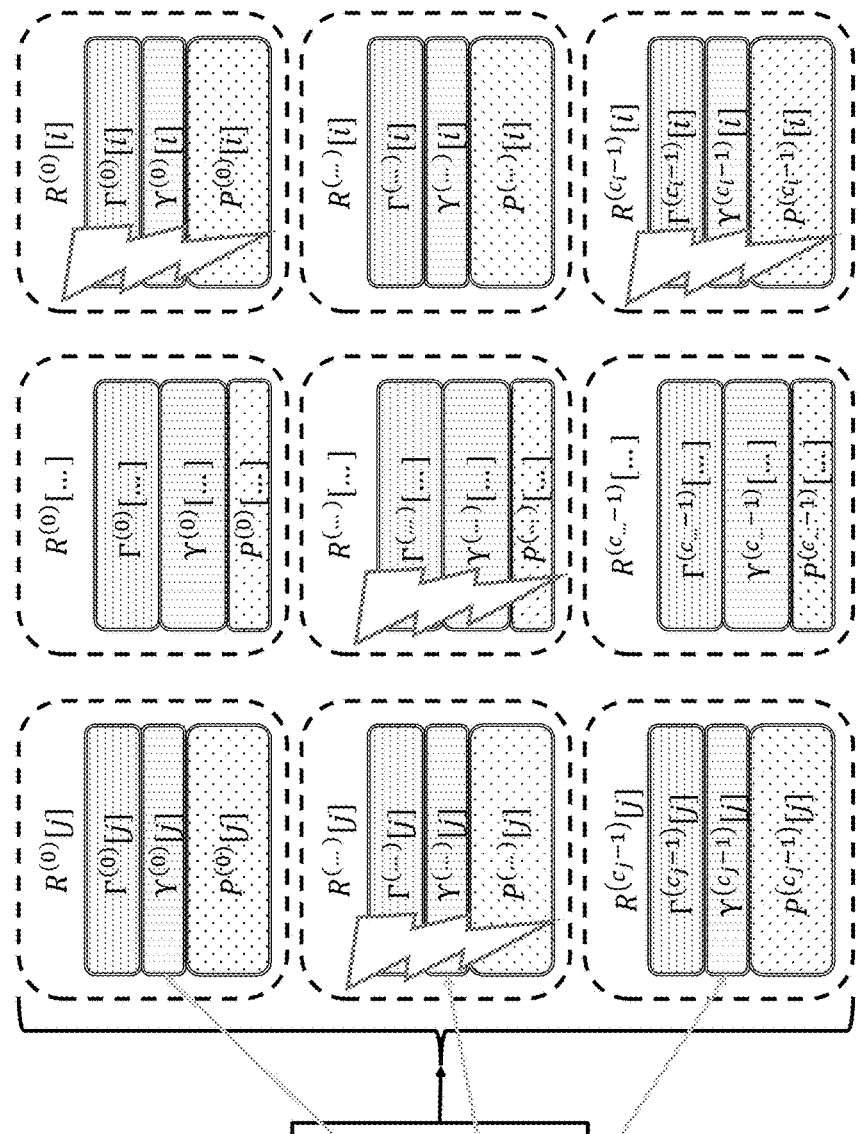

FIG. 39 highlights received symbols $\gamma[j]$.

Figure 40:
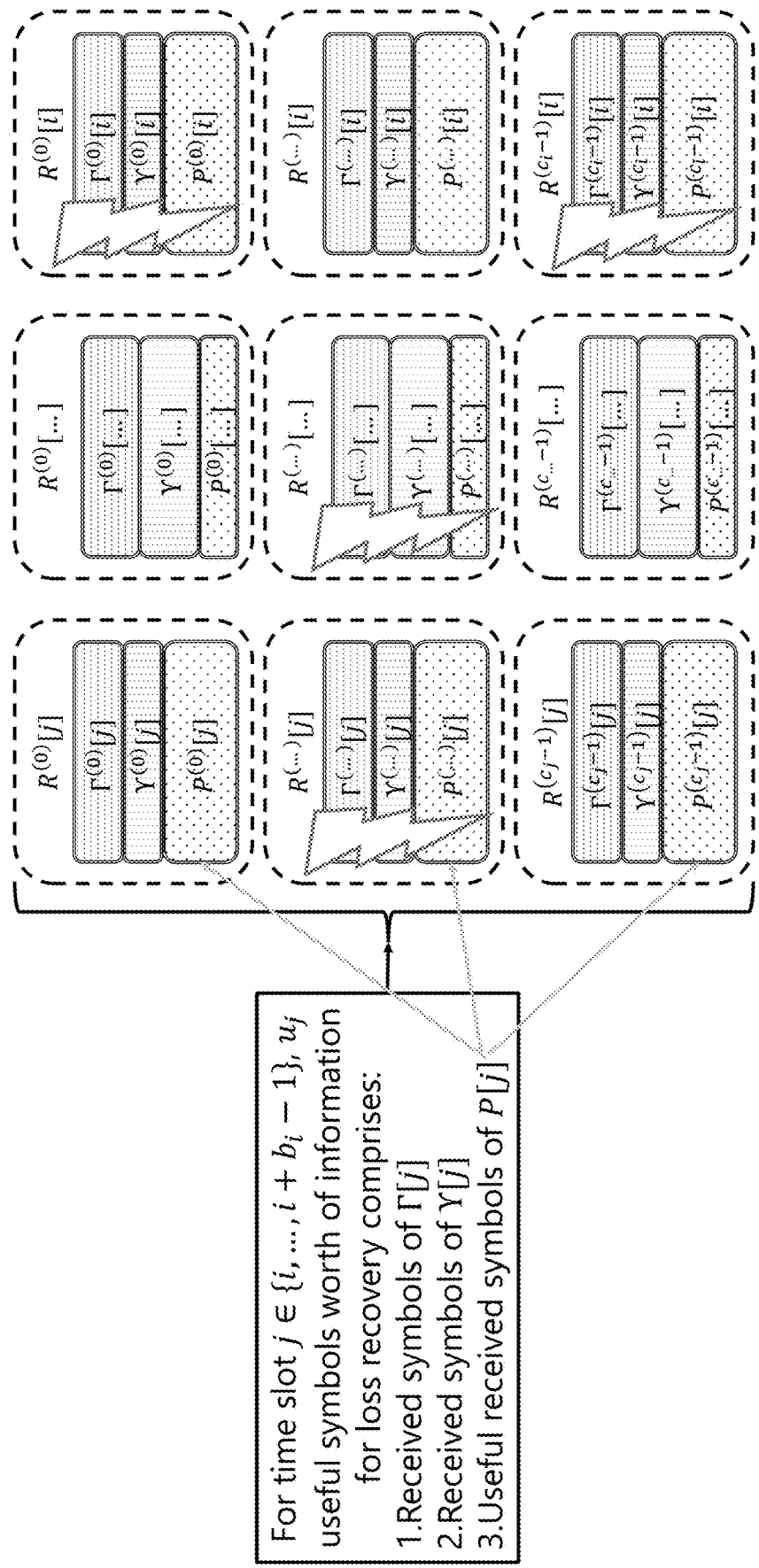

FIG. 40 highlights received symbols $P[j]$.

Figure 41:
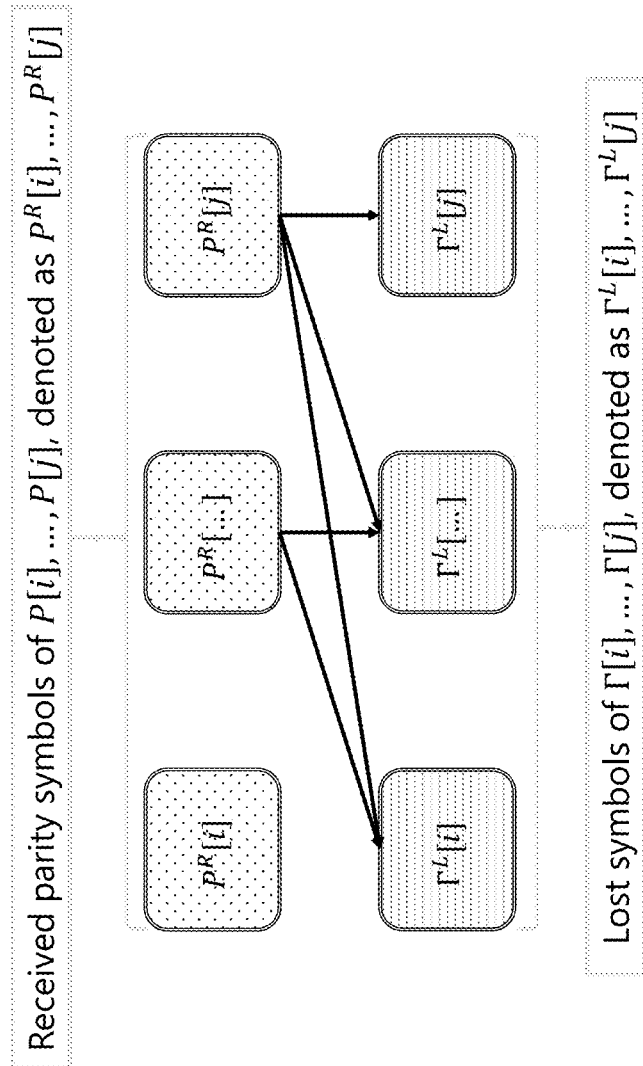

FIG. 41 shows useful parity symbols for loss recovery, in accordance with this example.

Figure 42:
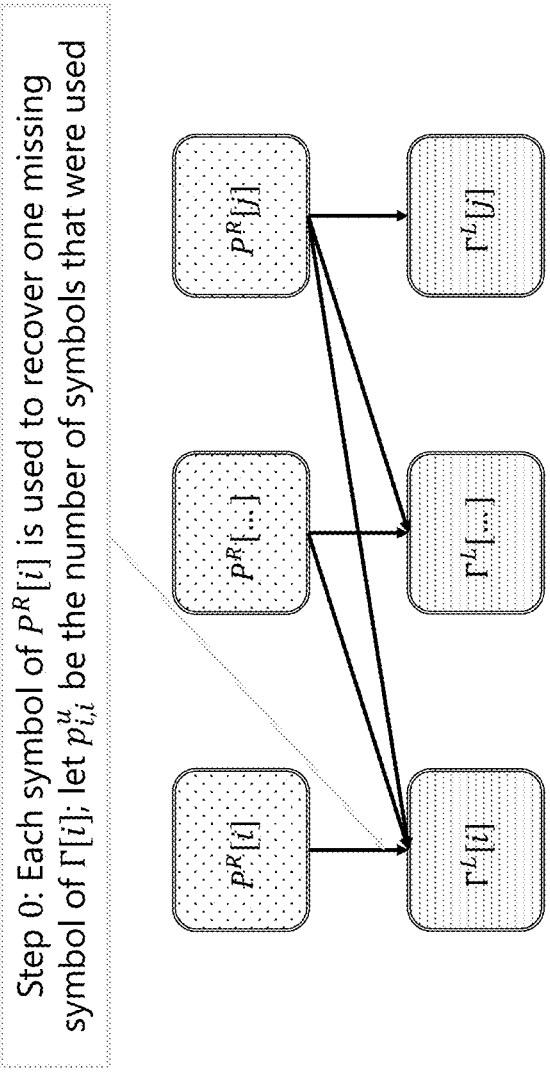

FIG. 42 shows an initial step for loss recovery in accordance with this example.

Figure 43:
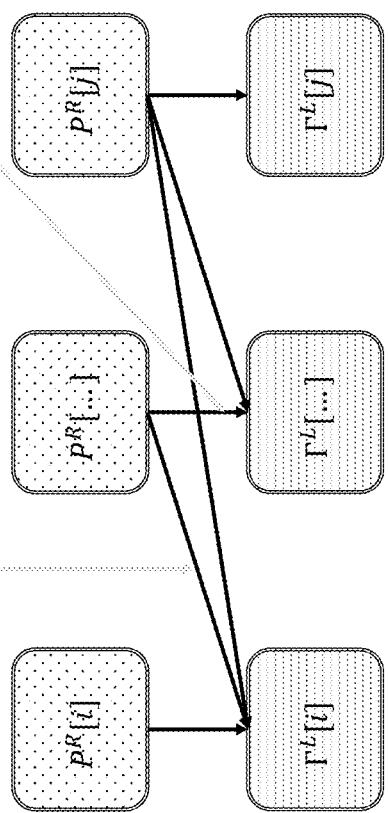

FIG. 43 shows intermediate steps for loss recovery in accordance with this example.

Figure 44:
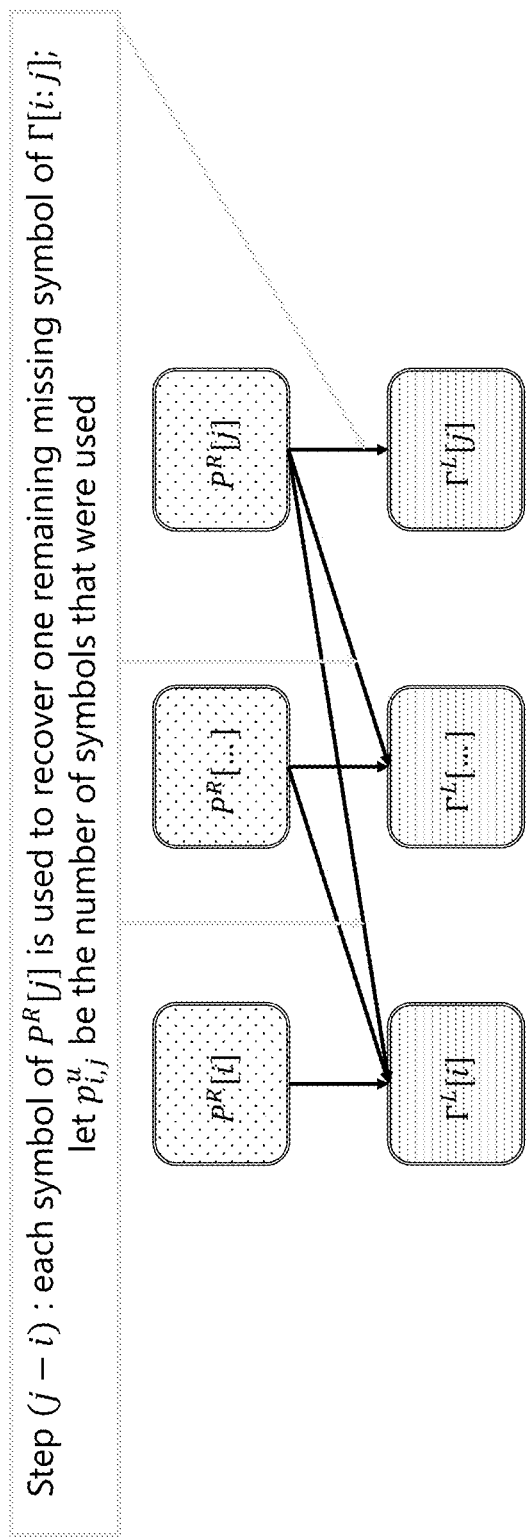

FIG. 44 shows the final step for loss recovery of the first component of frames from the partial burst in accordance with this example.

Figure 45:
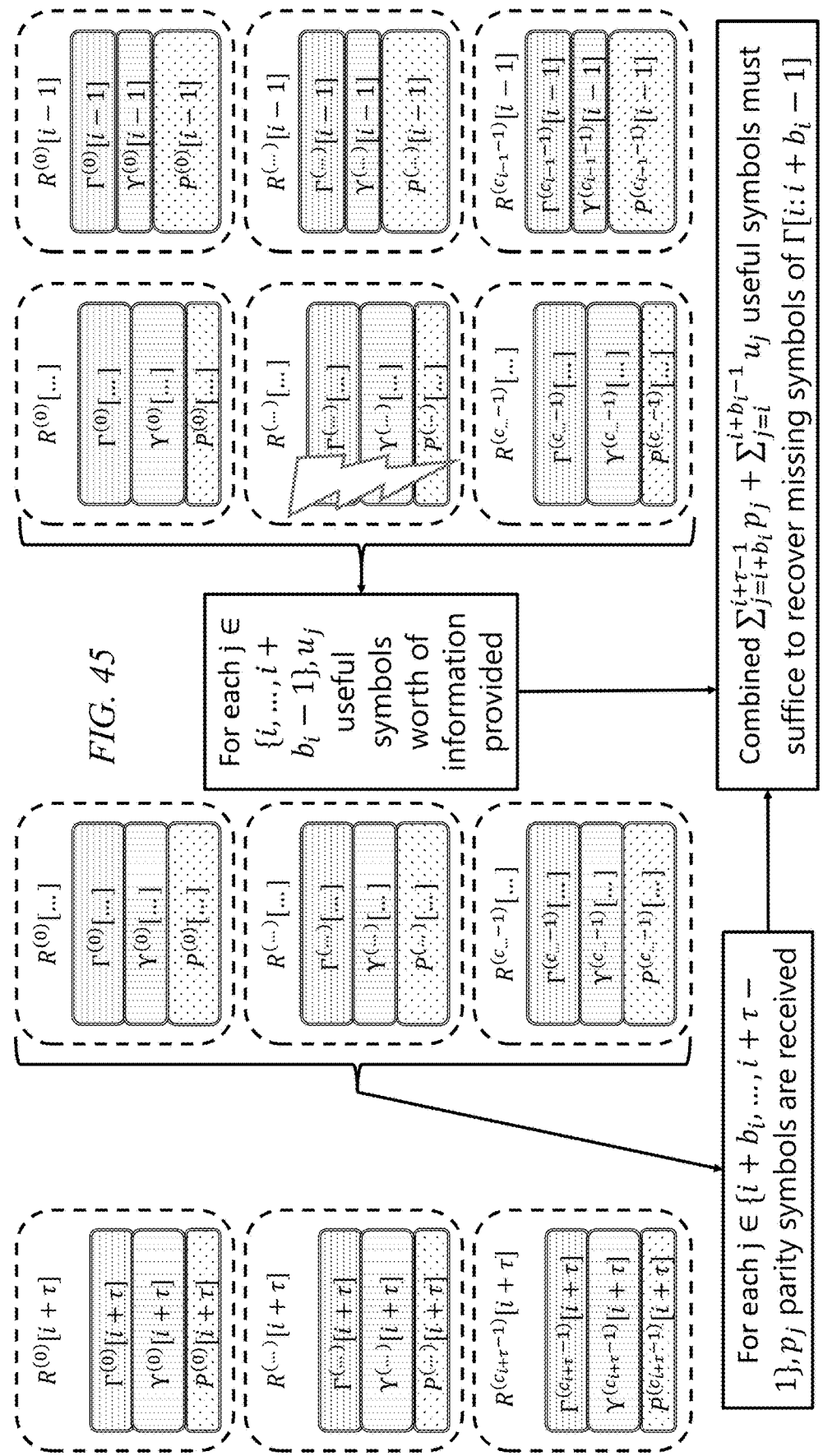

FIG. 45 shows how an upper bound on how many useful symbols are available to recover missing symbols of $\Gamma[i:i+b_i-1]$ by times lot $(i+\tau-1)$. Then recall for a partial burst starting in time slot i and each $j \in \{i, \ldots, i+b_i-1\}$ that the number of lost symbols of $\gamma[j]$ equals $p_{j+\tau}$. So, the optimization is accomplished by minimizing $$\sum_{i=0}^{t} p_i$$

subject to (a) the loss recovery constraint shown in the lower right box of FIG. 45, (b) bounding the size of each $p_i$ to be at least 0 and for $i > \tau$ to be at most $[d_{i-96} \, l_{i-\tau}]$, and (c) (optionally) add the constraint that the first $\tau-1$ time slots involve sending 0 parity symbols using a linear program. Then, padding is performed if needed to ensure divisibility by $c_i$ of sizes of $\gamma[i]$, $\Gamma[i]$, and $P[i]$ as discussed herein and then the sizes of $\gamma[i]$, $\Gamma[i]$, and $P[i]$ are matched (i.e., handling splitting and allocating parity symbols) and the parity symbol generation/loss recovery is performed. To deal with resets, for each time slot i where there is a reset among time slots $(i+1), \ldots, (i+\tau)$, $d_i$ is modeled as being of size 0 in the linear program and split so that $\gamma[i]=D[i]$ and $p_{i+\tau}=0$.

Figure 46:
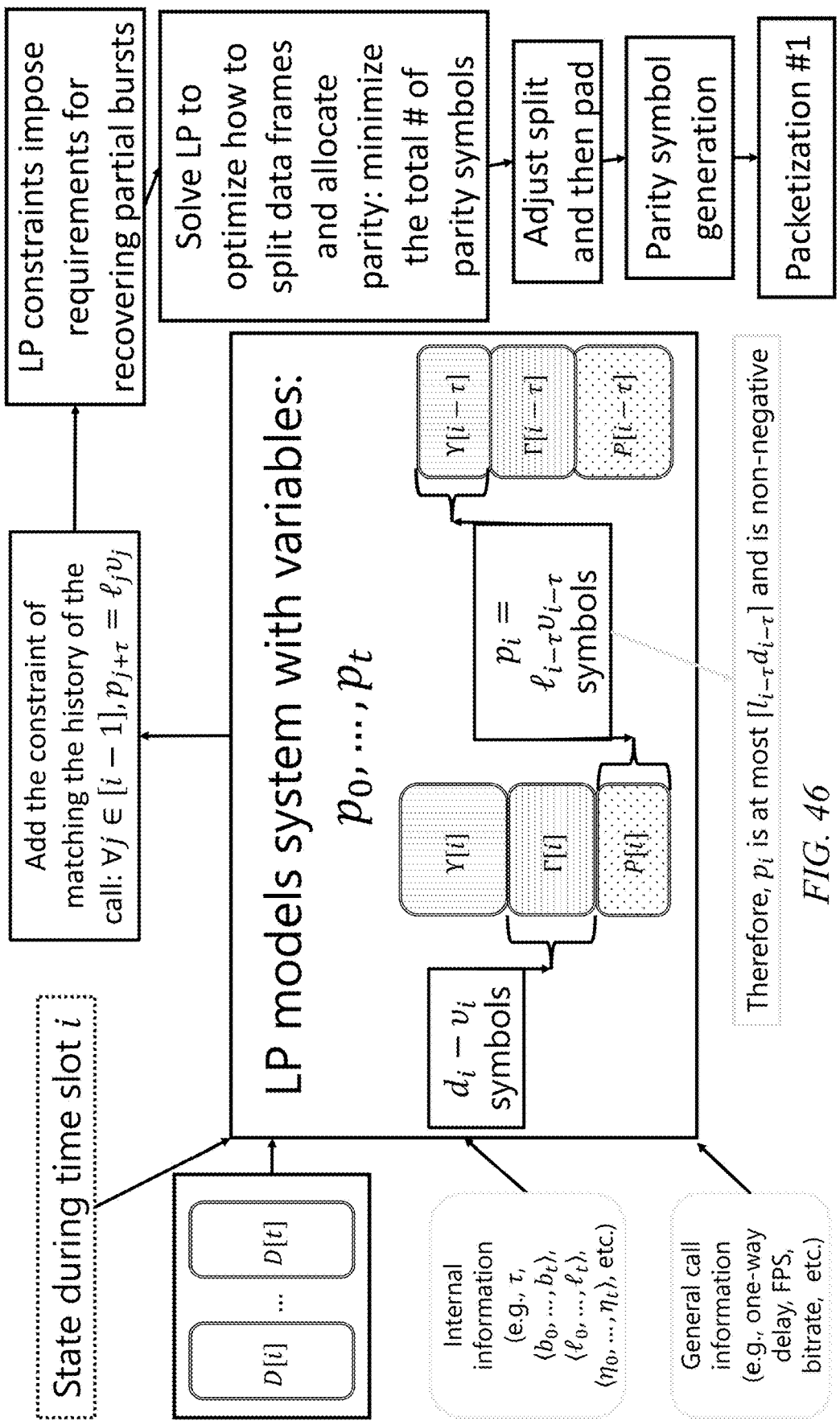

FIG. 46 shows that the optimization can be modified to apply during time slot i (i.e., after packets have been sent for previous time slots) by adding constraints to reflect the actions from earlier in the call (e.g., how much parity was allocated) and then using the offline linear program solver to determine the splits for the remainder of the call, where the total number of parity symbols is just the summation over all time slots, i, of $p_i$ (where the length of the call is represented by t). For convenience, this optimization may be referred to herein as the "offline solver").

Figure 47:
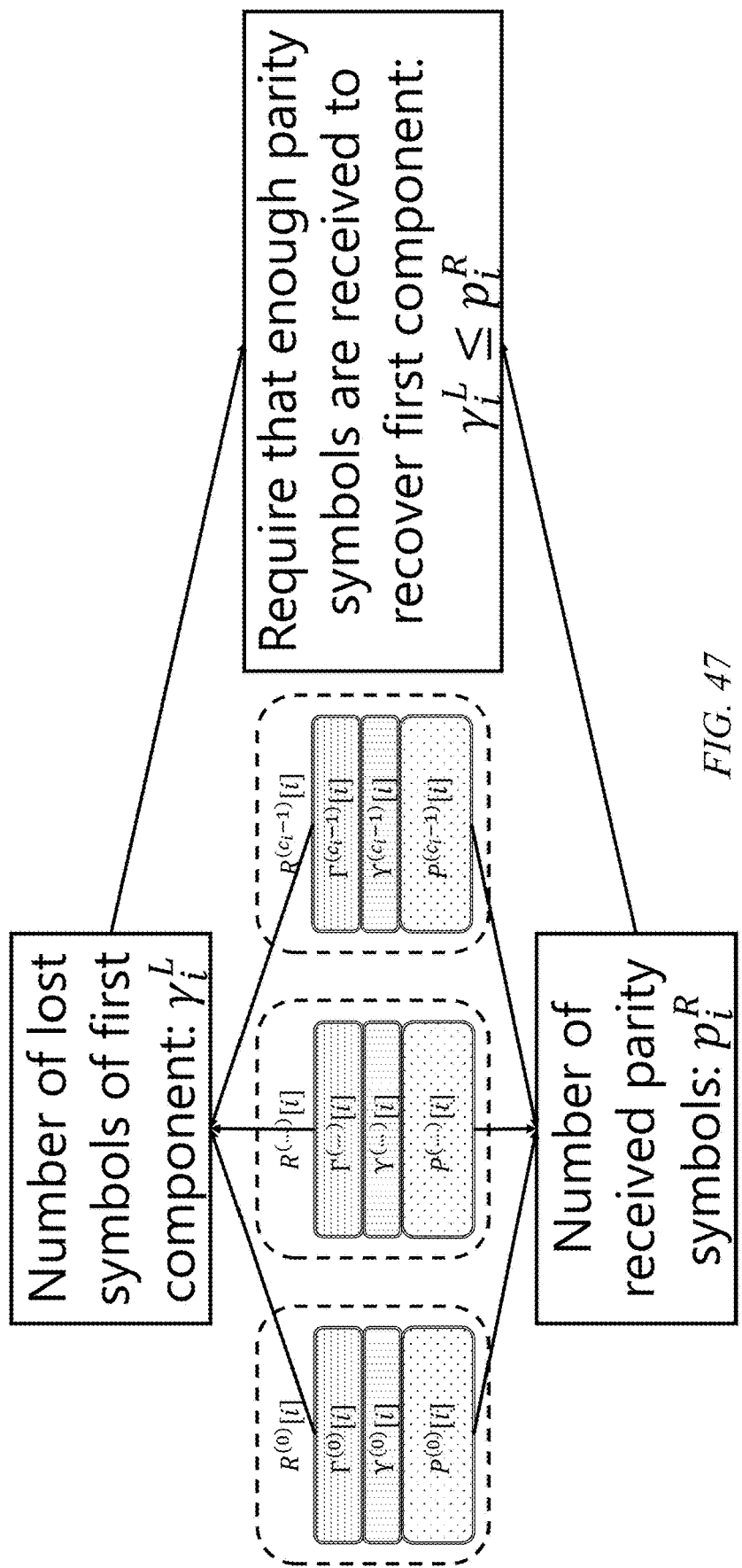
FIG. 47 is a schematic diagram representing a heuristic for splitting video frames to recover type "I" immediately for any partial burst, in accordance with one embodiment.
Figure 48:
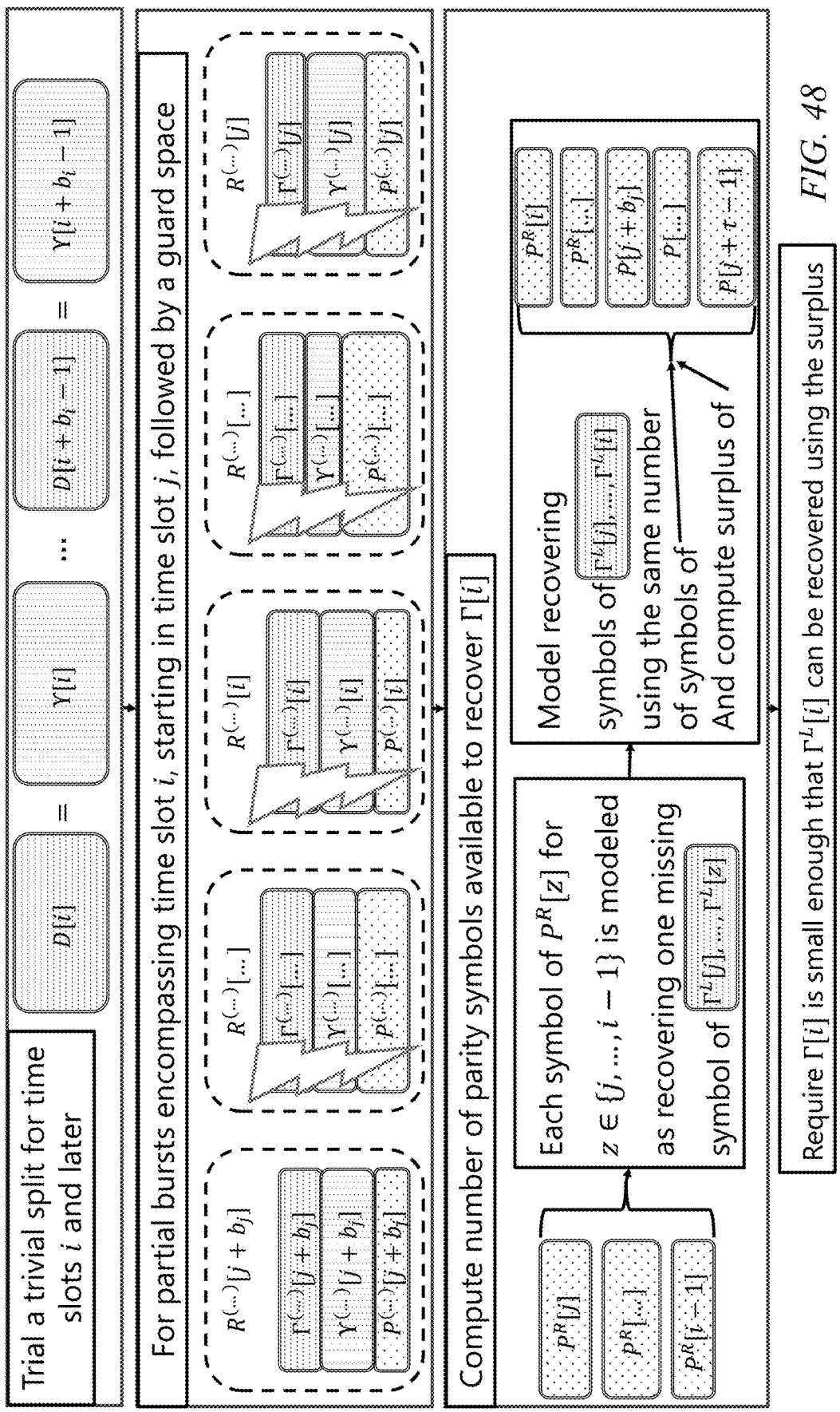
FIG. 48 is a schematic diagram representing a process for splitting video frames using the heuristic of FIG. 47.

One way to split data frames is to use a heuristic. FIG. 47 is a schematic diagram representing a heuristic for splitting video frames to recover type "Γ" immediately for any partial burst, in accordance with one embodiment. FIG. 48 is a schematic diagram representing a process for splitting video frames using the heuristic of FIG. 47. One heuristic determines the size of the first component should be as large as possible subject to ensuring that it is recoverable using the received parity of the same time slot with high probability. Another heuristic determines the size of the first component should be as large as possible subject to the following constraint. Suppose the first component is empty for the next τ time slots. For any partial burst that includes the current time slot, then all symbols of the first component that are lost in the partial burst are recovered by τ−1 time slots after the start of the partial burst with high probability (which may be referred to herein as a "max heuristic"). The value of the heuristic for time slot i is $\gamma_i^{max}$.

Another way to split data frames is to treat splitting as a reinforcement learning problem. As is generally known, reinforcement learning is a type of machine learning technique in which the system learns through training to make decisions (e.g., using trial-and-error) based on feedback from a reward function.

Figure 49:
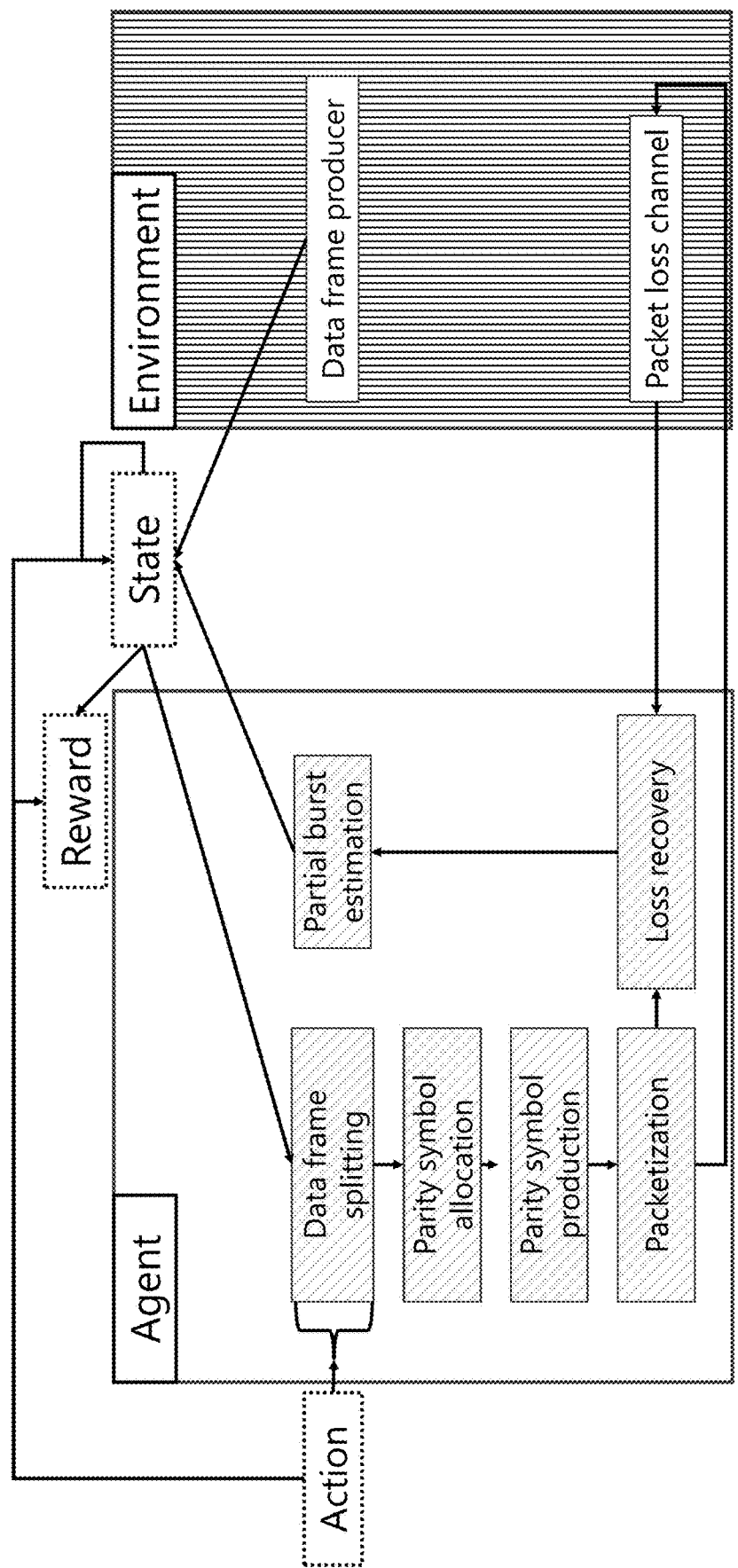
FIG. 49 illustrates a general methodology for splitting frames using reinforcement learning, in accordance with certain embodiments.

FIG. 49 illustrates a general methodology for splitting frames using reinforcement learning, in accordance with certain embodiments. Here, the key intuition is that the choice of how to split a data frame changes the state of the system and potentially incurs a cost (e.g., requiring that more parity symbols are sent). The total cost must account for both the change in state and the incurred cost. Our approach enables optimizing the policy for splitting based on both factors with the goal of minimizing how many symbols are sent in total to reliably communicate the sequence of data frames in real time.

To do so, splitting within a framework can be modeled in a way that is reminiscent of reinforcement learning. An agent applies a communication scheme (e.g., CSIPB) to communicate the data frame from one or more sender(s) to one or more receiver(s). The action can be viewed as the decision of how to split the data frame. A reward is obtained based on the action and state of the system. For example, the reward may involve costs such as bandwidth usage (including parity symbols sent under the communication scheme) and consequences arising from this usage (e.g., sending too much data may incur loss by overflowing the buffer(s) of network router(s)), and metrics to estimate the QoE of the received video, such as PSNR, SSIM, or LPIPS. The environment reflects (a) how an application produces data frames, and (b) how packets may be lost. The state reflects the situation and may include information like previous data frames, how many packets have been sent, what sizes were the packets that have been sent, etc. Then one can use methods from reinforcement learning to solve for a suitable policy for how the data frame should be split.

The general methodology of FIG. 49 can be extended to encompass frame splitting and/or parity symbol allocation using reinforcement learning.

Figure 50:
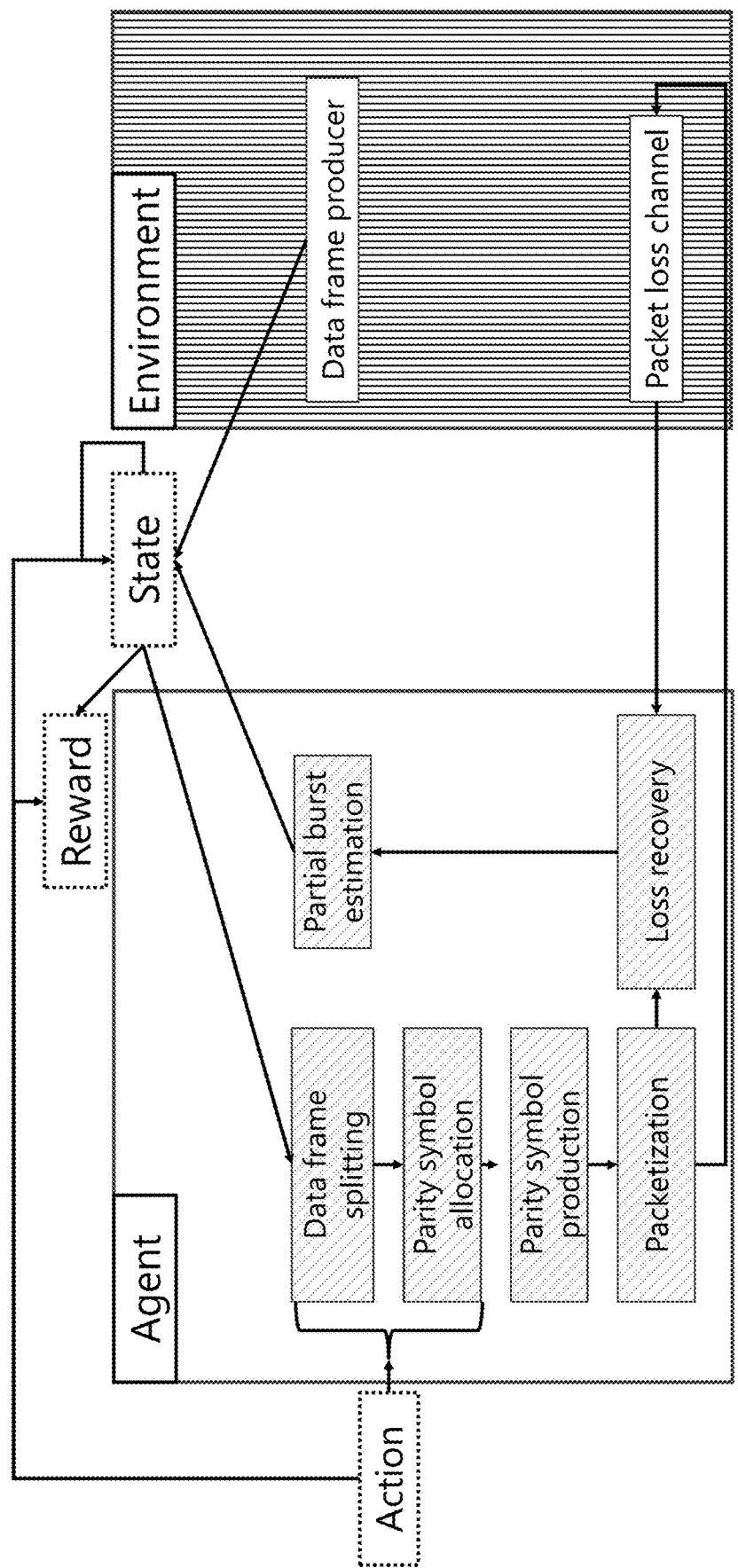
FIG. 50 illustrates a general methodology for splitting frames and allocating parity symbols using reinforcement learning, in accordance with certain embodiments.

FIG. 50 illustrates a general methodology for splitting frames and allocating parity symbols using reinforcement learning, in accordance with certain embodiments. Here, the key intuition is that the choices of how to split and allocate parity for a data frame change the state of the system and potentially incur a cost (e.g., requiring that more parity symbols are sent). The total cost can account for both the change in state and the incurred cost. In one embodiment, the approach enables optimizing the policy for splitting based on both factors with the goal of minimizing how many symbols are sent in total to reliably communicate the sequence of data frames in real time.

To do so, splitting within a framework can be modeled in a way that is reminiscent of reinforcement learning. An agent applies a communication scheme (e.g., CSIPB) to communicate the data frame from one or more sender(s) to one or more receiver(s). The action can be viewed as the decision of how to split and allocate parity for a data frame. A reward is obtained based on the action and state of the system. For example, the reward may involve costs such as bandwidth usage (including parity symbols sent under the communication scheme) and consequences arising from this usage (e.g., sending too much data may incur loss by overflowing the buffer(s) of network router(s)), and metrics to estimate the QoE of the received video, such as PSNR, SSIM, or LPIPS. The environment reflects (a) how an application produces data frames, and (b) how packets may be lost. The state reflects the situation and may include information like previous data frames, how many packets have been sent, what sizes were the packets that have been sent, etc. Then, methods from reinforcement learning can be used to solve for a suitable policy for how the data frame should be split and how much parity should be allocated for the data frame.

Figure 51:
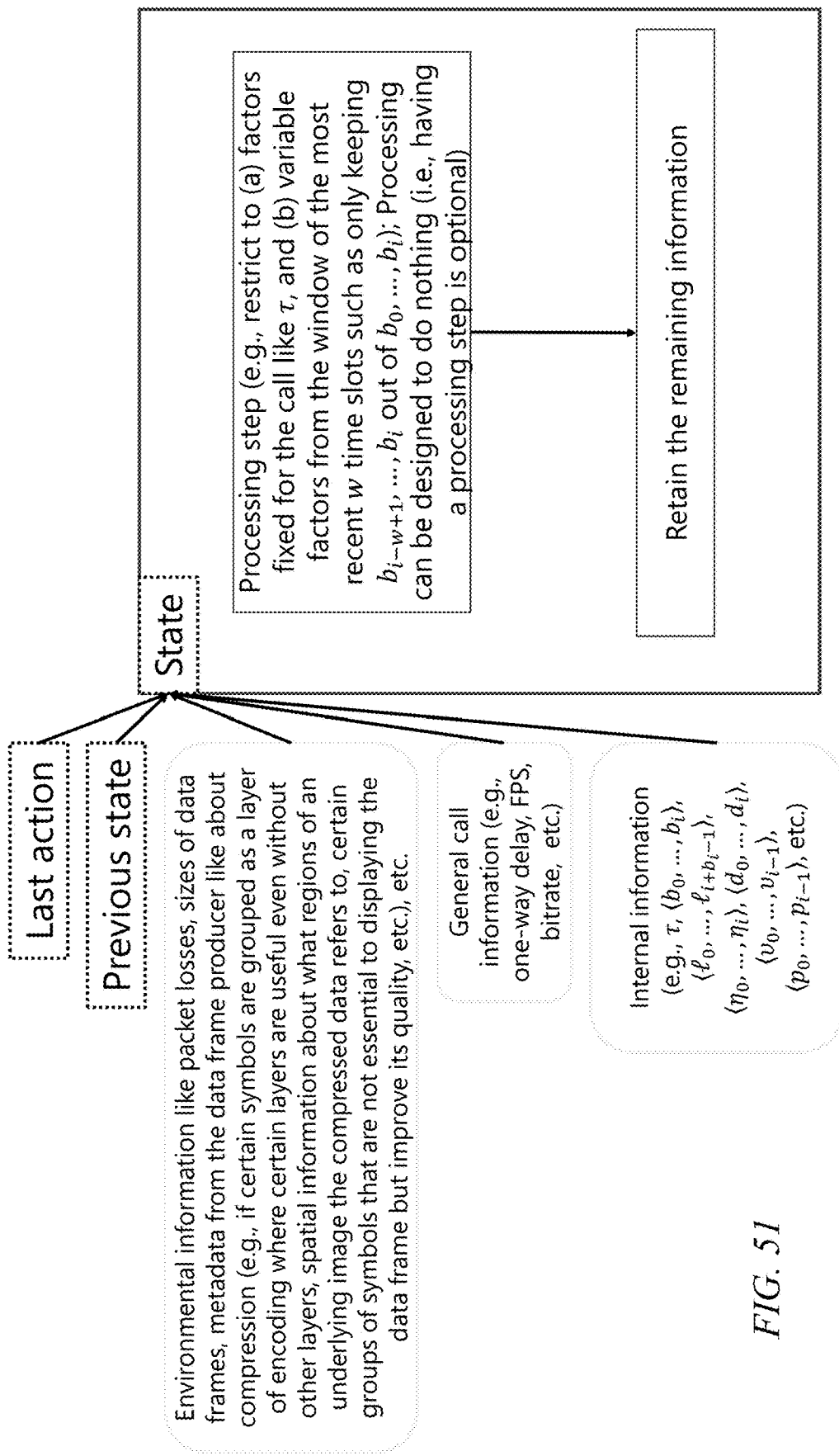
FIG. 51 schematically illustrates the concept of "state" for reinforcement learning, in accordance with certain embodiments.

FIG. 51 schematically illustrates the concept of "state" for reinforcement learning, in accordance with certain embodiments. Here, the state is meant to capture the situation; by assumption, the state can track any piece of information pertaining to the system, although some may not be tracked in certain embodiments (as can be accomplished via an additional processing step). To aid in the compute costs of reinforcement learning (e.g., to avoid the curse of dimensionality), some information may be dropped. Also, one may reduce the number of possible states by reducing the granularity of information (e.g., list the number of symbols of each component and/or parity symbols sent per time slot as integral multiples of a number, like 100, and applying rounding).

Figure 52:
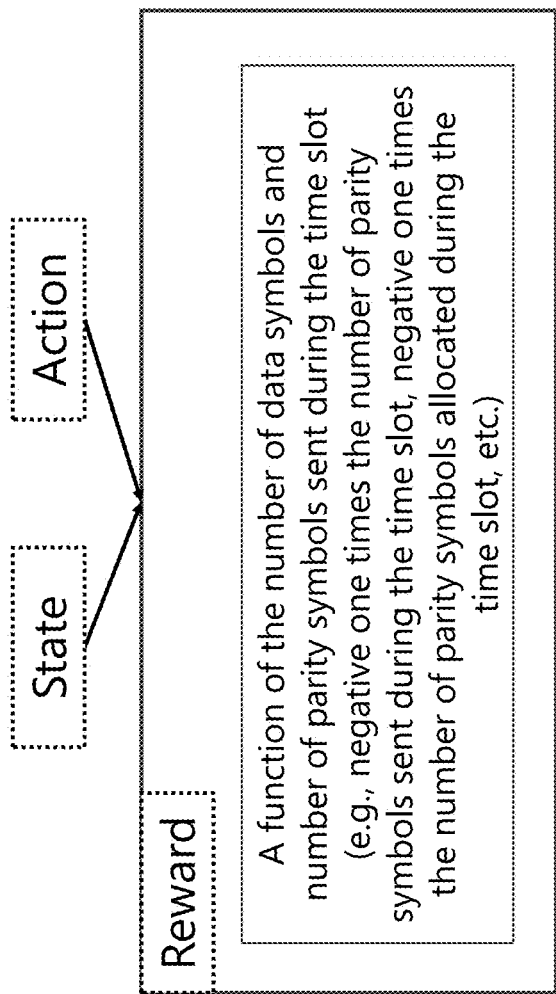
FIG. 52 shows one example of a reward function for training frame splitting and/or parity allocation, in accordance with certain embodiments.

FIG. 52 shows one example of a reward function for training frame splitting and/or parity allocation, in accordance with certain embodiments. Here, the reward is given once per time slot after the action is taken. It is given as input (a) the state of the system and (b) the action that was taken. The reward is meant to encourage a high-rate code with loss recovery capabilities and/or perhaps metric(s) pertaining to QoE such as PSNR, SSIM, or LPIPS. The reward is only given once per time slot after the action has been taken. One example of how to do so is to give a negative reward based on the number of parity symbols sent during each time slot to encourage sending fewer parity symbols.

Figure 53:
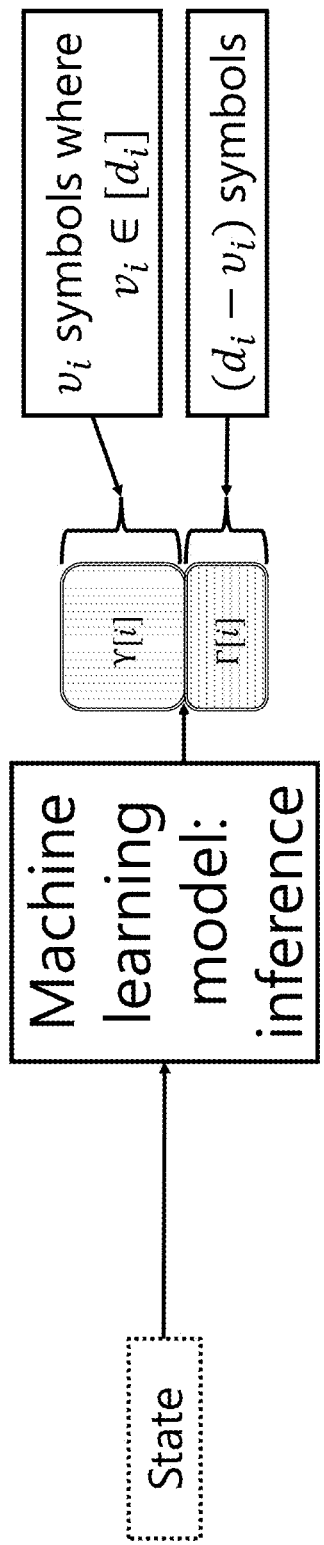
FIG. 53 shows a machine learning model such as a reinforcement learning model that can be applied at inference time, e.g., at the time of deciding how to split frames and/or allocate parity symbols.

As depicted in FIG. 53, a machine learning model such as a reinforcement learning model can be applied at inference time, e.g., at the time of deciding how to split frames and/or allocate parity symbols.

Figure 54:
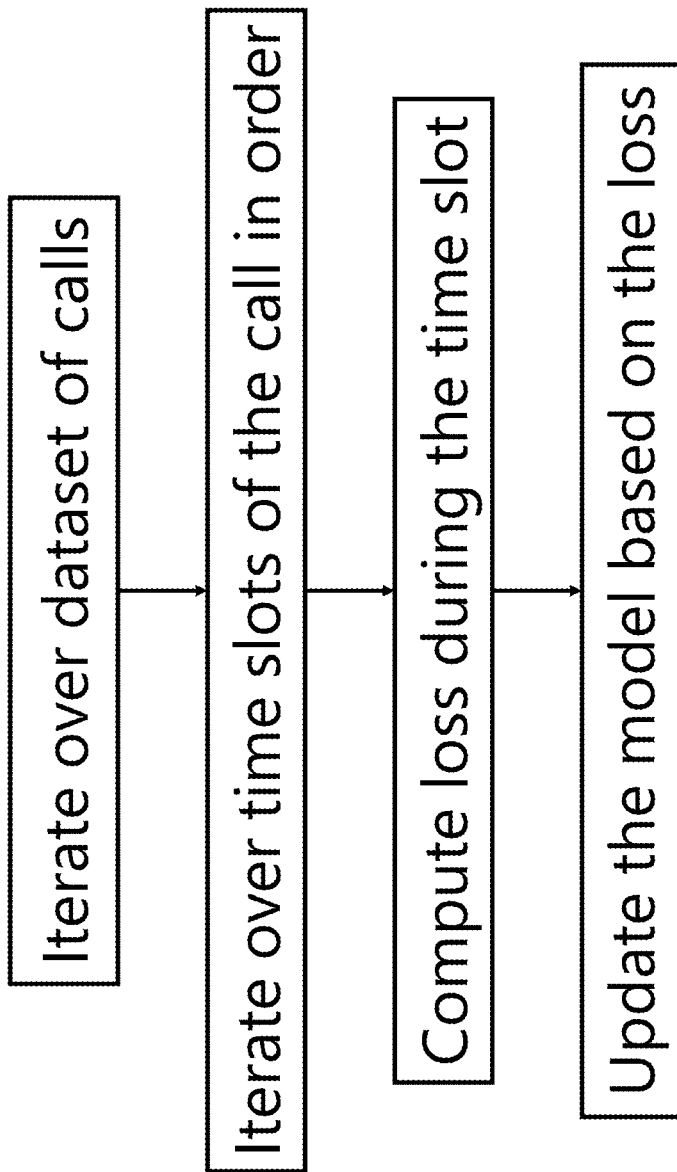
FIG. 54 shows a machine learning model that generally would be trained offline using actual and/or simulated data (e.g., data representing a number of calls) and generally involves iterating over the dataset, computing the loss during each time slot, and updating the model using the loss.

As depicted in FIG. 54, in certain embodiments, a machine learning model generally would be trained offline using actual and/or simulated data (e.g., data representing a number of calls) and generally involves iterating over the dataset, computing the loss during each time slot, and updating the model using the loss. Embodiments can allow for human feedback such as to fine-tune the model.

Figure 55:
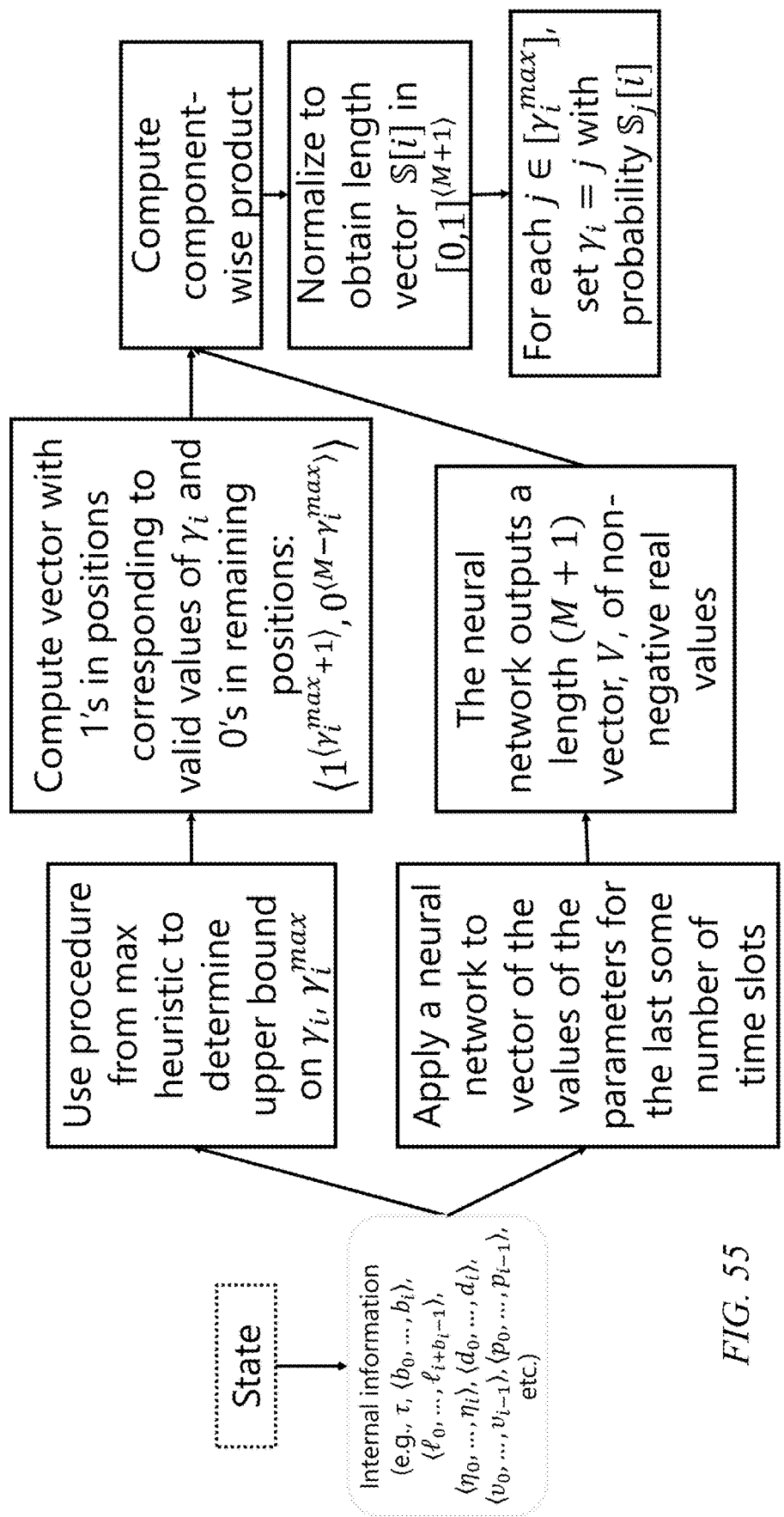
FIG. 55 shows one example of neural network (NN) model for training frame splitting, in accordance with certain embodiments.

FIG. 55 shows one example of neural network (NN) model for training frame splitting, in accordance with certain embodiments. In this example, the neural network architecture is a 2-layer fully connected feedforward NN with ReLU activations in the hidden layer and a softmax activation on the outer layer. This shows the probability that each split should be chosen. Then the size of the first component is bounded, e.g., based on the max heuristic, which eliminates some possible choices of the split. The remaining values are then normalized to create a distribution of how large the split should be, and the size is sampled from this distribution.

Figure 56:
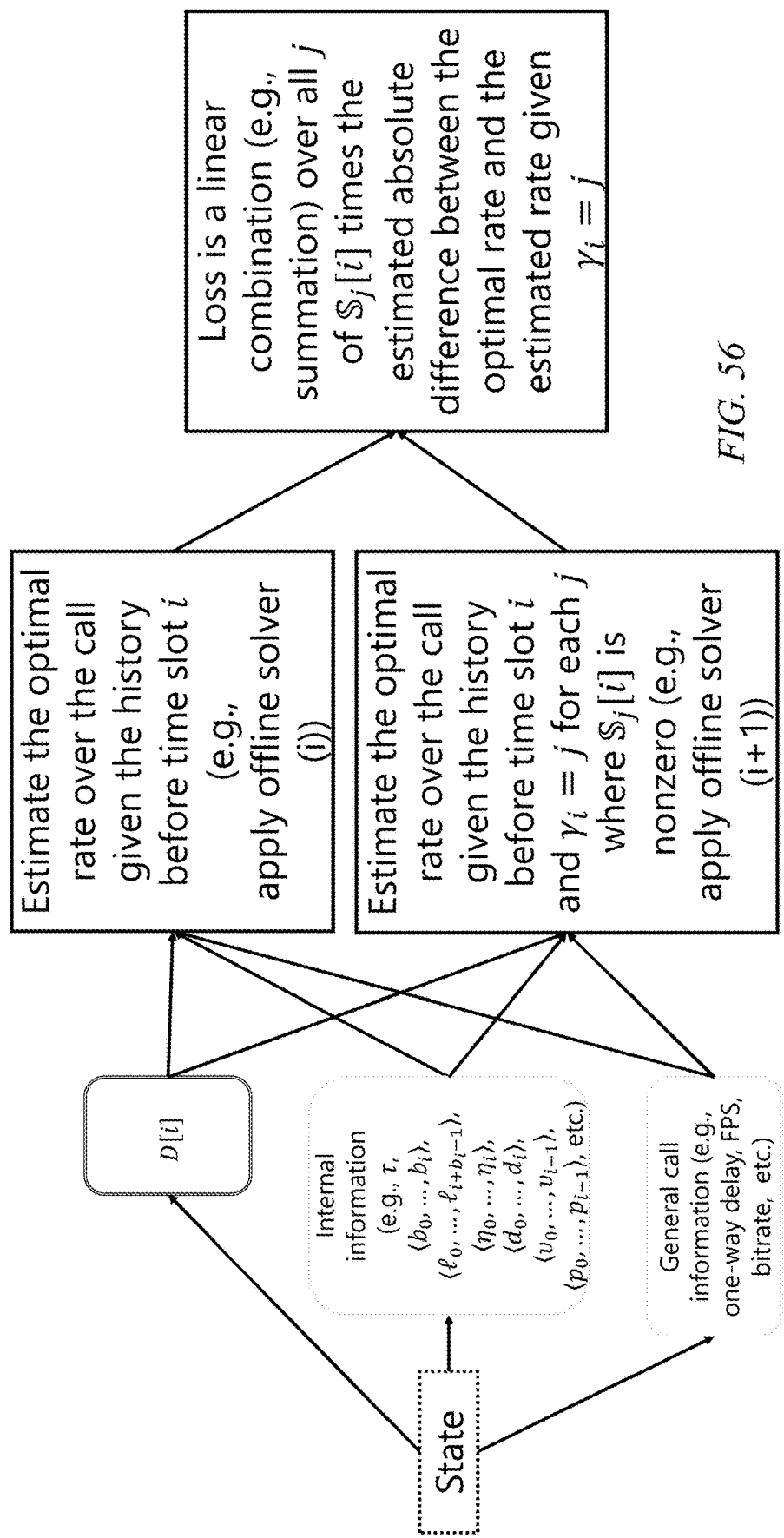
FIG. 56 shows one possible loss function (referred to herein as "loss function 1"), in accordance with certain embodiments.

FIG. 56 shows one possible loss function (referred to herein as "loss function 1"), in accordance with certain embodiments. Here, to train the neural network, the system determines the loss incurred from its output. To do so, the optimal rate that can be obtained over any choice for how to split data frames is estimated (e.g., by applying the offline solver up to the current time slot, i, and given the next action applying the offline solver up to the next time slot, i+1). Then this rate is compared to the optimal rate given each choice for splitting that can be selected based on the neural network's output. This loss of this particular choice of splitting is weighted based on the probability it is selected.

Figure 57:
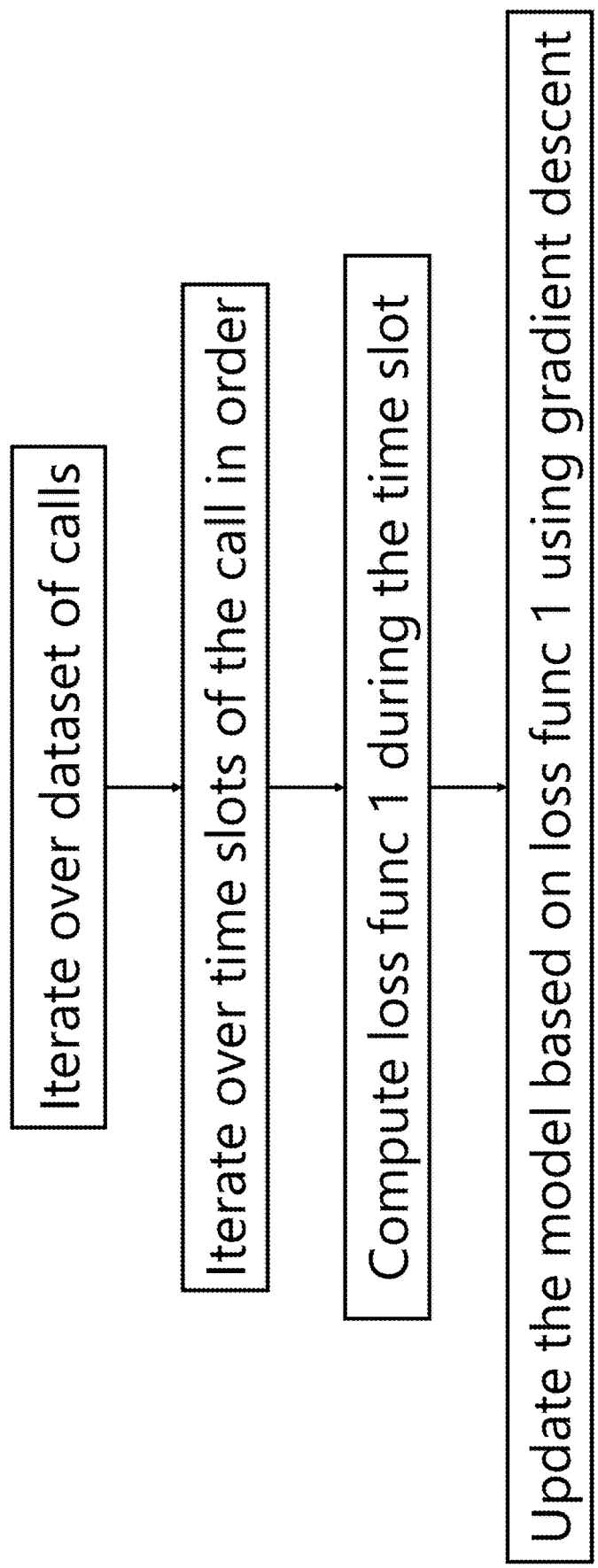
FIG. 57 shows one possible way to train the NN during jth call and ith time slot, in accordance with certain embodiments.

FIG. 57 shows one possible way to train the NN during jth call and ith time slot, in accordance with certain embodiments. Here, the system takes a dataset of calls, iterates over the dataset, computes the loss during the time slot using loss function 1, then updates the model using the loss.

Additionally or alternatively, the partial burst parameters can be set using reinforcement learning.

Figure 59:
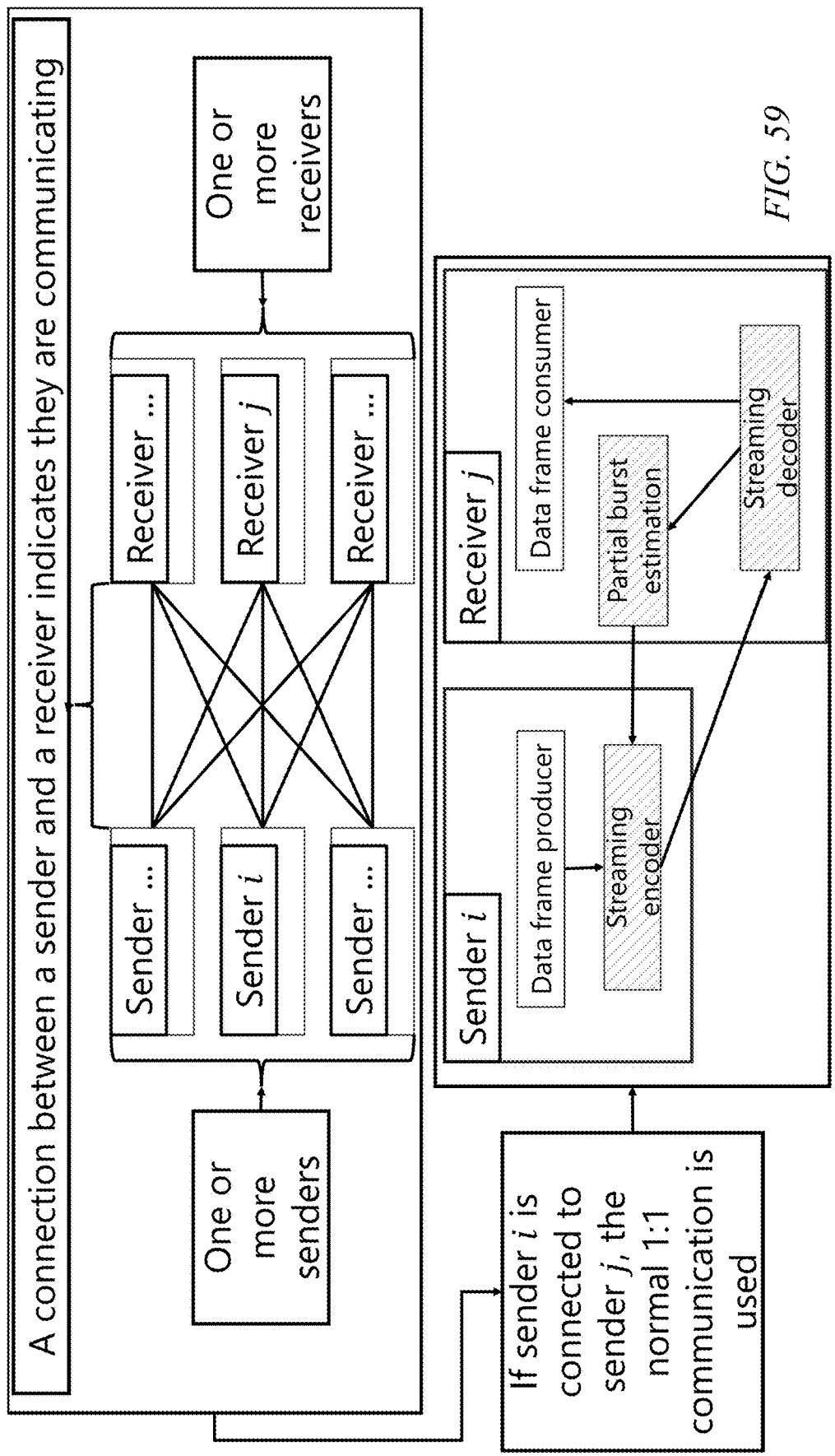
FIG. 59 shows the concept of multiparty communication (e.g., videoconferencing with any number of people, such as by applying the methodology for each pair of people).

FIG. 59 shows how communication can occur between one or more senders and one or more receivers in certain embodiments by employing the 1:1 communication scheme between each pair of sender and receiver.

Figure 61:
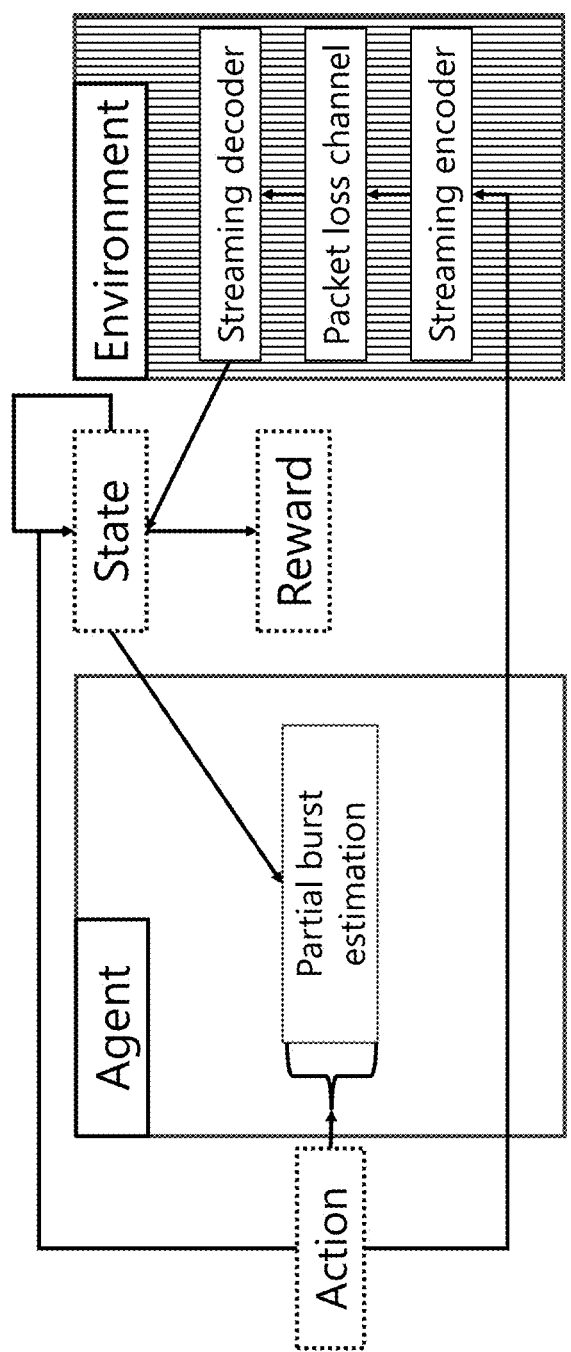
FIG. 61 provides an overview of how one can model estimating the partial burst parameters using a model conducive to reinforcement learning, in accordance with certain embodiments.

FIG. 61 provides an overview of how one can model estimating the partial burst parameters using a model conducive to reinforcement learning, in accordance with certain embodiments. Here, calling the parameters $l_i$, $b_i$ "burst parameters" or similar notation is meant to explain one way the embodiment of the communication schemes could be. Another (more general) viewpoint is that these parameters can be considered knobs to tune the communication scheme, e.g., they may be based on explicit characteristics of packet loss, or they may just be used to tweak the communication scheme until it behaves as desired (e.g., scores high on average on certain metrics of QoE). Thus, these parameters impact the code construction itself, which varies from data frame to data frame; these parameters do not merely change the bandwidth overhead (although that is one thing they will impact).

Figure 62:
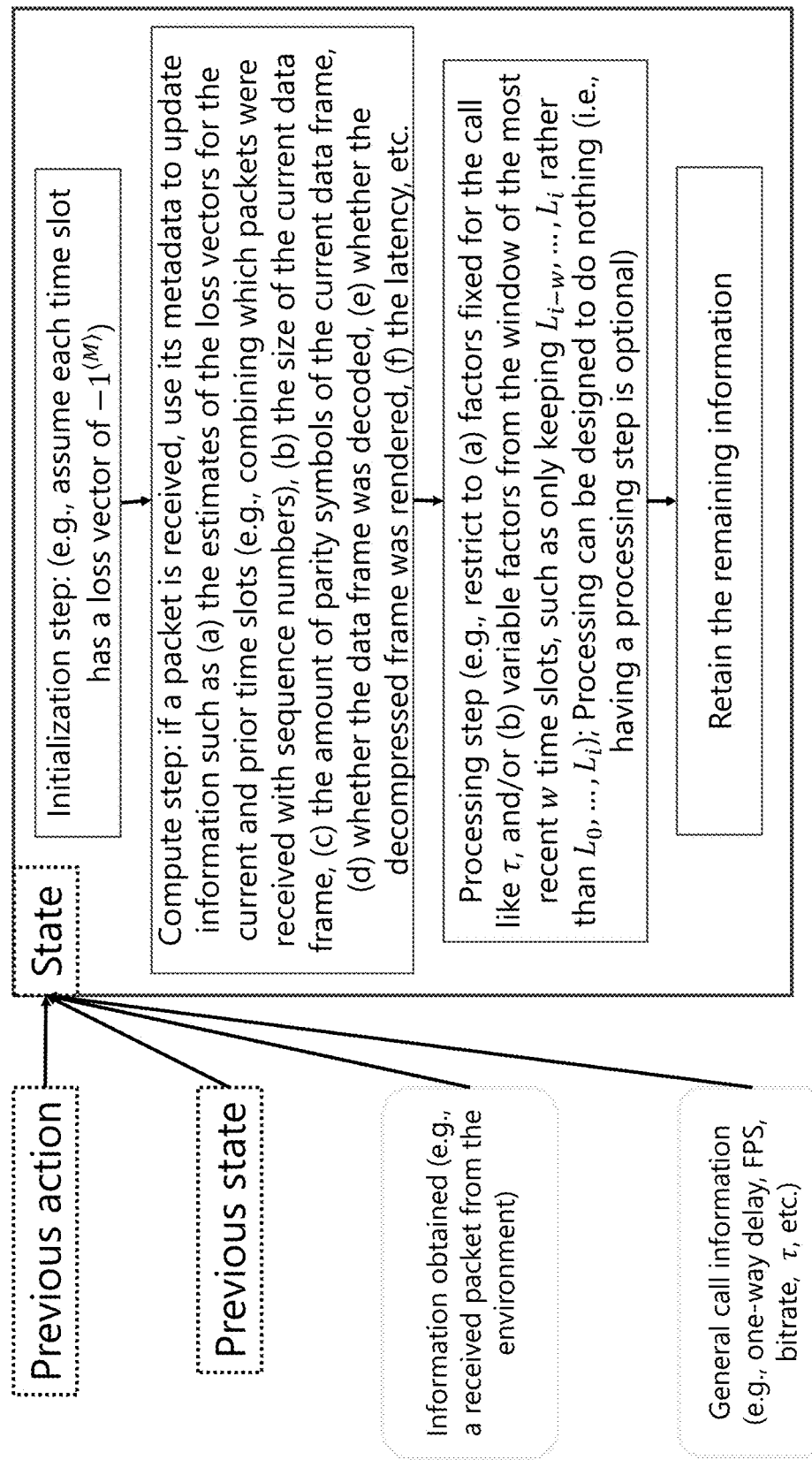
FIG. 62 illustrates the concept of "state" for the modeling of FIG. 61, in accordance with certain embodiments.

FIG. 62 illustrates the concept of "state" for the modeling of FIG. 61, in accordance with certain embodiments. Here, the state is meant to capture the situation; by assumption, the state can track any piece of information pertaining to the system, although some may not be tracked in certain embodiments (as can be accomplished via the processing step). To aid in the compute costs of reinforcement learning (e.g., to avoid the curse of dimensionality), some information may be dropped. Also, one may reduce the granularity of information such as by bucketing the number of parity symbols sent per time slot (e.g., list the number of symbols sent per time slot as integral multiples of a number, like 100, and applying rounding).

Figure 63:
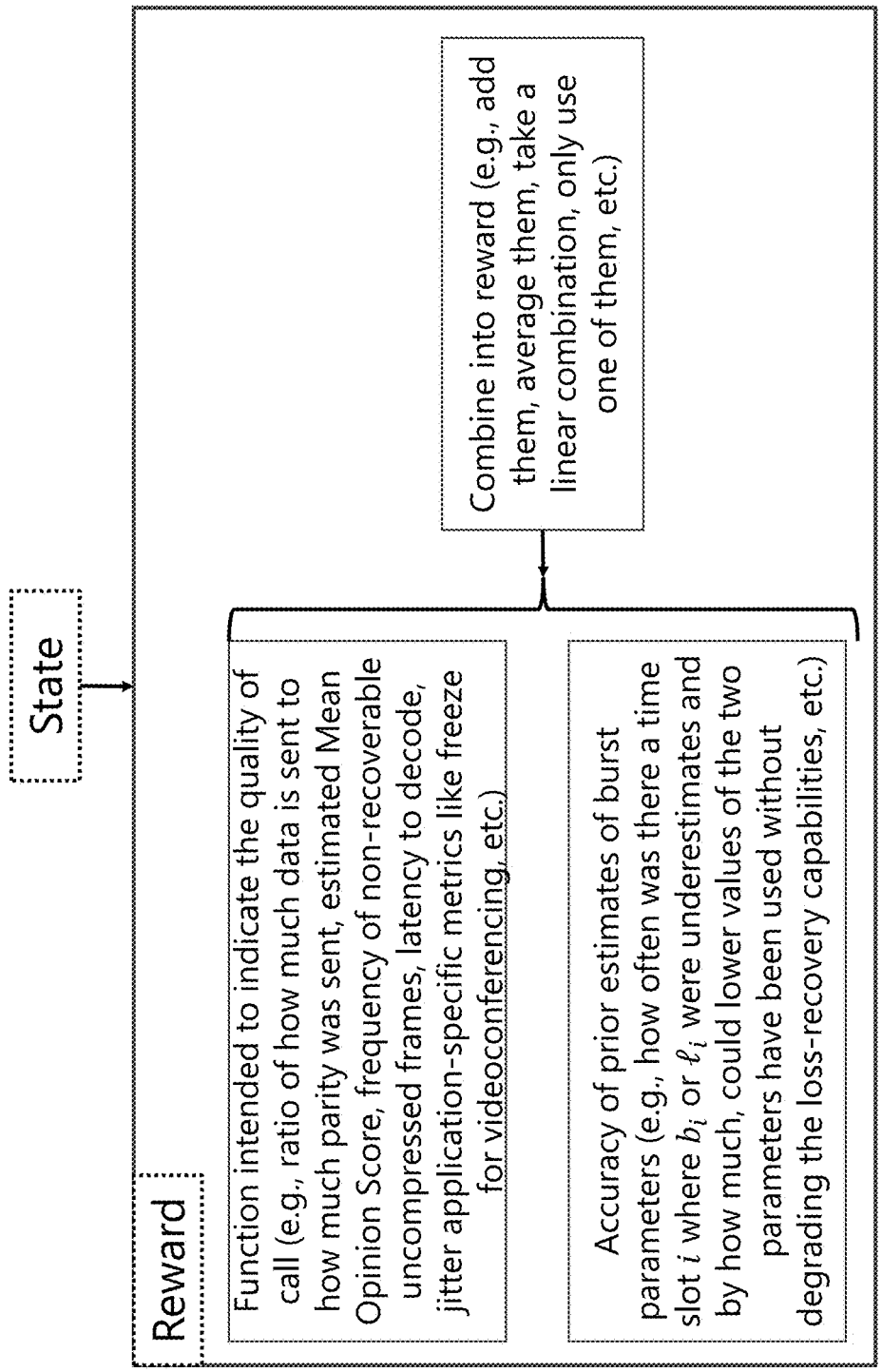
FIG. 63 shows one example of a possible reward function for the modeling of FIG. 62, in accordance with certain embodiments.

FIG. 63 shows one example of a possible reward function for the modeling of FIG. 62, in accordance with certain embodiments. One approach is to only give a reward when a packet is received (otherwise give 0 reward). Then one might consider two main intrinsic sources of reward (a) the quality of the call, and (b) the quality of the estimates. For each of these values, a function can be applied to score the performance (e.g., output a value between 0 and 1 where 1 is the optimal and 0 is the worst possible). Certain embodiments use a reward function that combines these three factors in a predetermined manner. For example, create a function (e.g., a metric) to measure the value/costs of an action for each metric. Then, create a second function to combine these three factors into a reward. One way is to add them. Another way is to ignore one and just use the other; for example, it may be much easier computationally just to use (b) to aim to select parameters that are intended to be upper bounds on how lossy the packet losses will be with reasonably high probability. Instead, another example is that one may ignore the "accuracy" of prior estimates and/or view these parameters not as estimates of future packet loss but as knobs for how to run the Streaming Encoder/Decoder; in this case, one can tune these parameters simply to optimize only for metrics of the quality of the call (e.g., frequency of video freeze if the desired application is videoconferencing).

Figure 64:
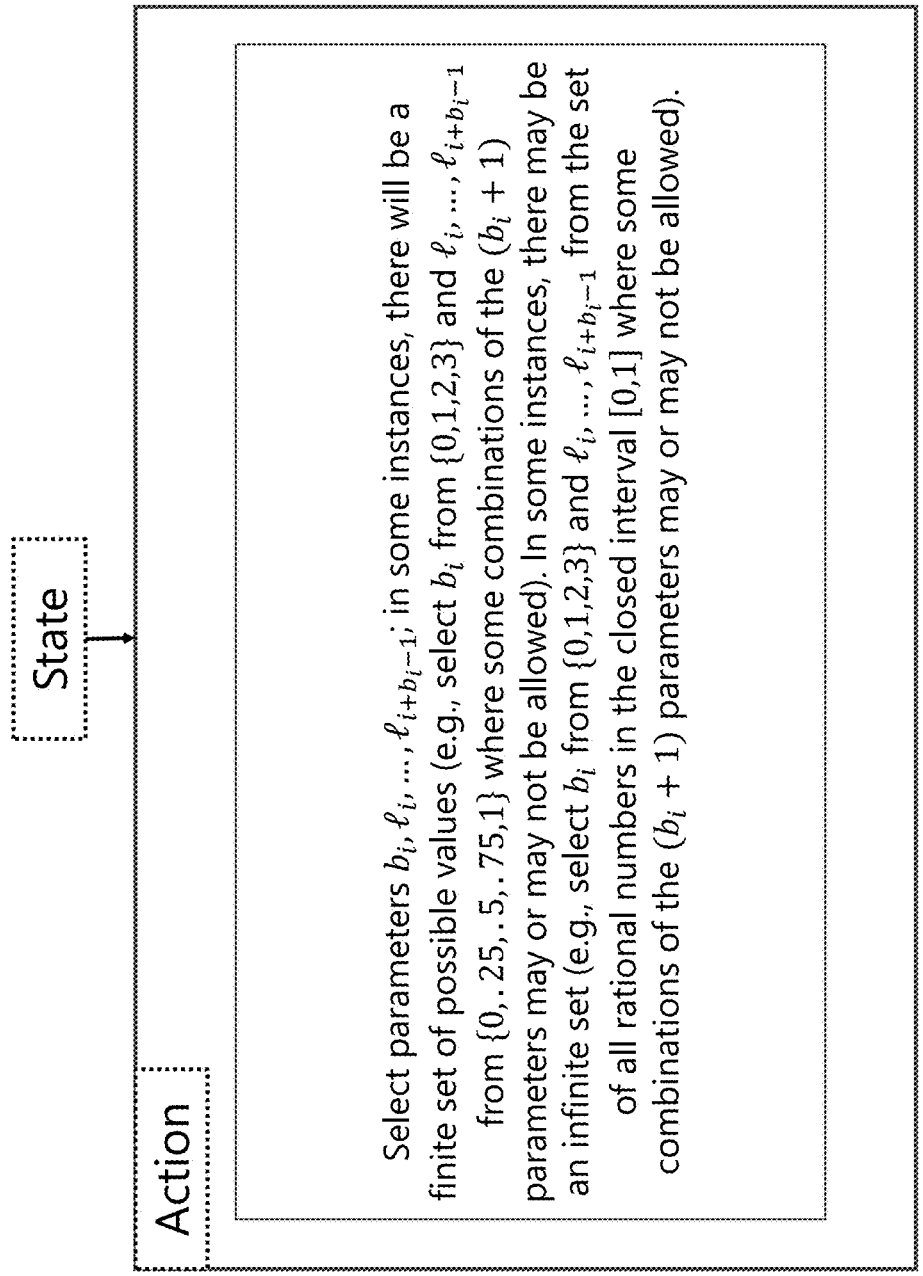
FIG. 64 shows one example for the action block of FIG. 61, in accordance with certain embodiments.

FIG. 64 shows one example for the action block of FIG. 61, in accordance with certain embodiments. The action may be taken as often as once a time slot. It may instead be less frequent; one example is to be periodic (e.g., every some fixed number of time slots), in which case feedback may or may not be returned to the streaming encoder that time slot (i+1) should maintain the estimate of $b_i$ (e.g., $b_{i+1} = b_i$) and likewise not change the estimated parameter for the fraction of packets lost (e.g., $l_{i+b_{i+1}} = l_{i+b_{i+1}-1}$).

Figure 65:
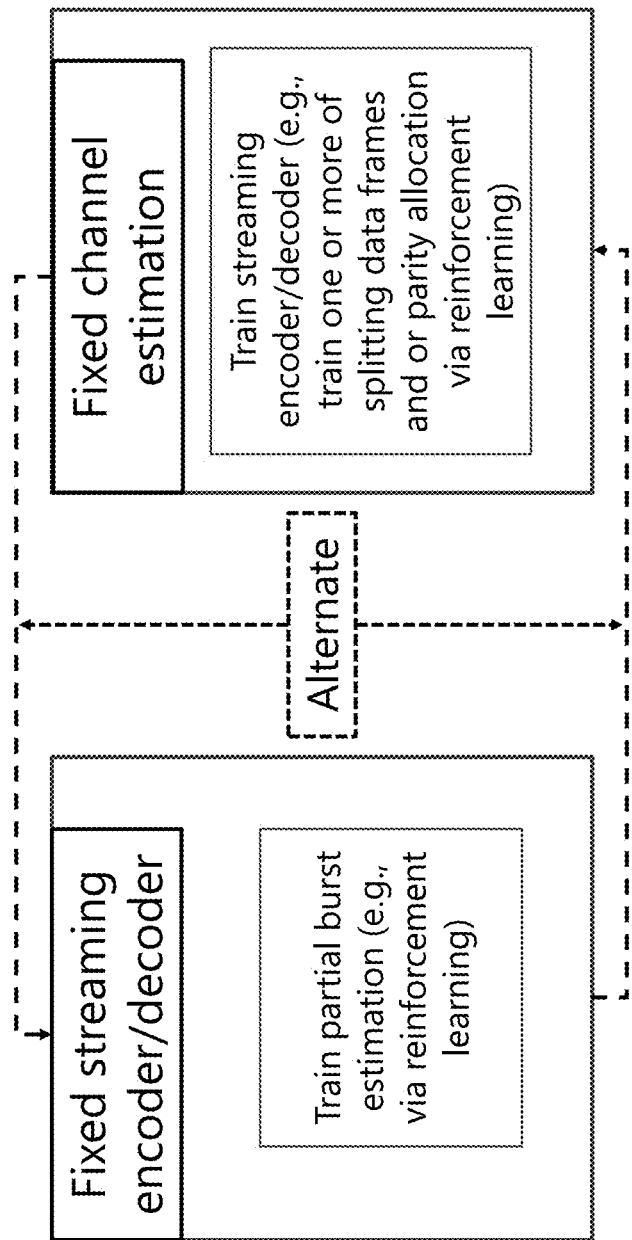
FIG. 65 shows an example of alternating training of (a) estimating the partial burst, and (b) the streaming code (e.g., splitting and/or parity allocation), in accordance with certain embodiments.

FIG. 65 shows an example of alternating training of (a) estimating the partial burst, and (b) the streaming code (e.g., splitting and/or parity allocation), in accordance with certain embodiments. Here, one methodology is introduced to synergize the actions for estimating the partial burst parameters and the streaming code (e.g., splitting, spreading, splitting and spreading, etc.), specifically by alternating between (a) fixing partial burst estimation and optimizing the policy for communication (e.g., how to split data frames), and (b) fixing streaming encoder/decoder and optimizing the policy for estimating partial burst parameters. The optimization can be done using techniques from reinforcement learning. This can continue until the user is satisfied with performance.

Figure 66:
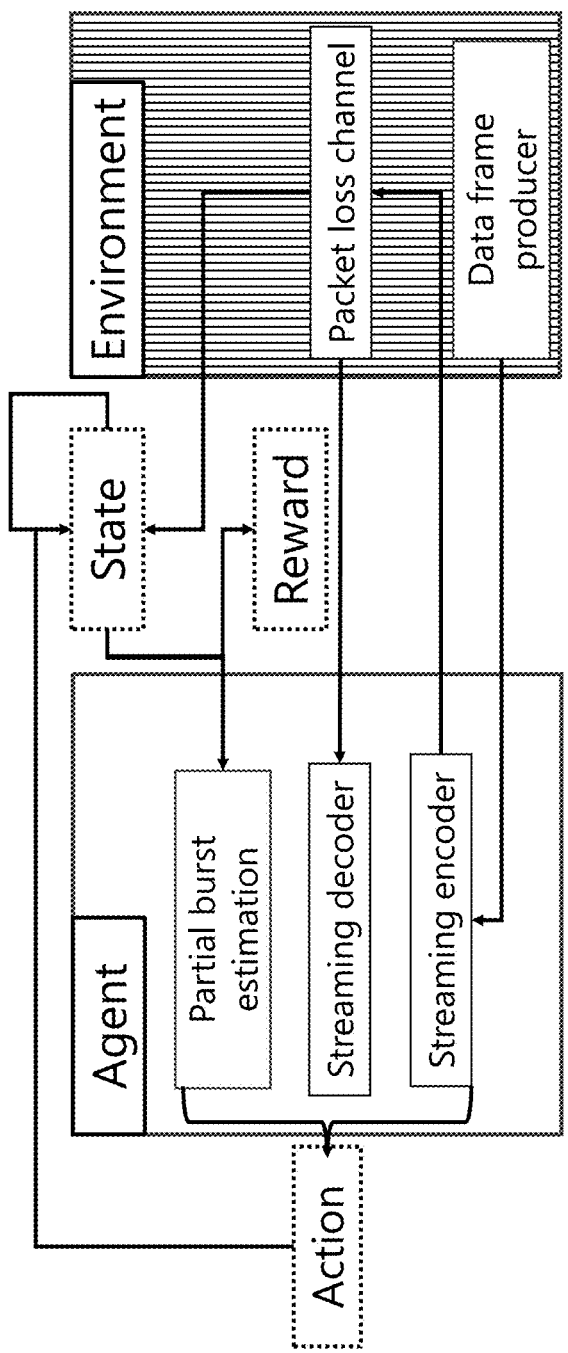
FIG. 66 shows an example of jointly training (a) estimating the partial burst, and (b) the streaming code (e.g., splitting and/or parity allocation), in accordance with certain embodiments.

FIG. 66 shows an example of jointly training (a) estimating the partial burst, and (b) the streaming code (e.g., splitting and/or parity allocation), in accordance with certain embodiments. Here, the system jointly trains both (a) partial burst estimation and (b) the streaming encoder/decoder (e.g., splitting data frames and/or parity allocation by using the state to track all information tracked by the (a) state from the partial burst estimation and (b) the state from the streaming encoder, combining their two rewards (e.g., adding them), and letting actions be the combination of actions of the partial burst estimation and the streaming encoder/decoder. Reward might still only occur every time a packet is received. Or it may be once per time slot now that complete information about what packets were lost is now available.

Figure 58:
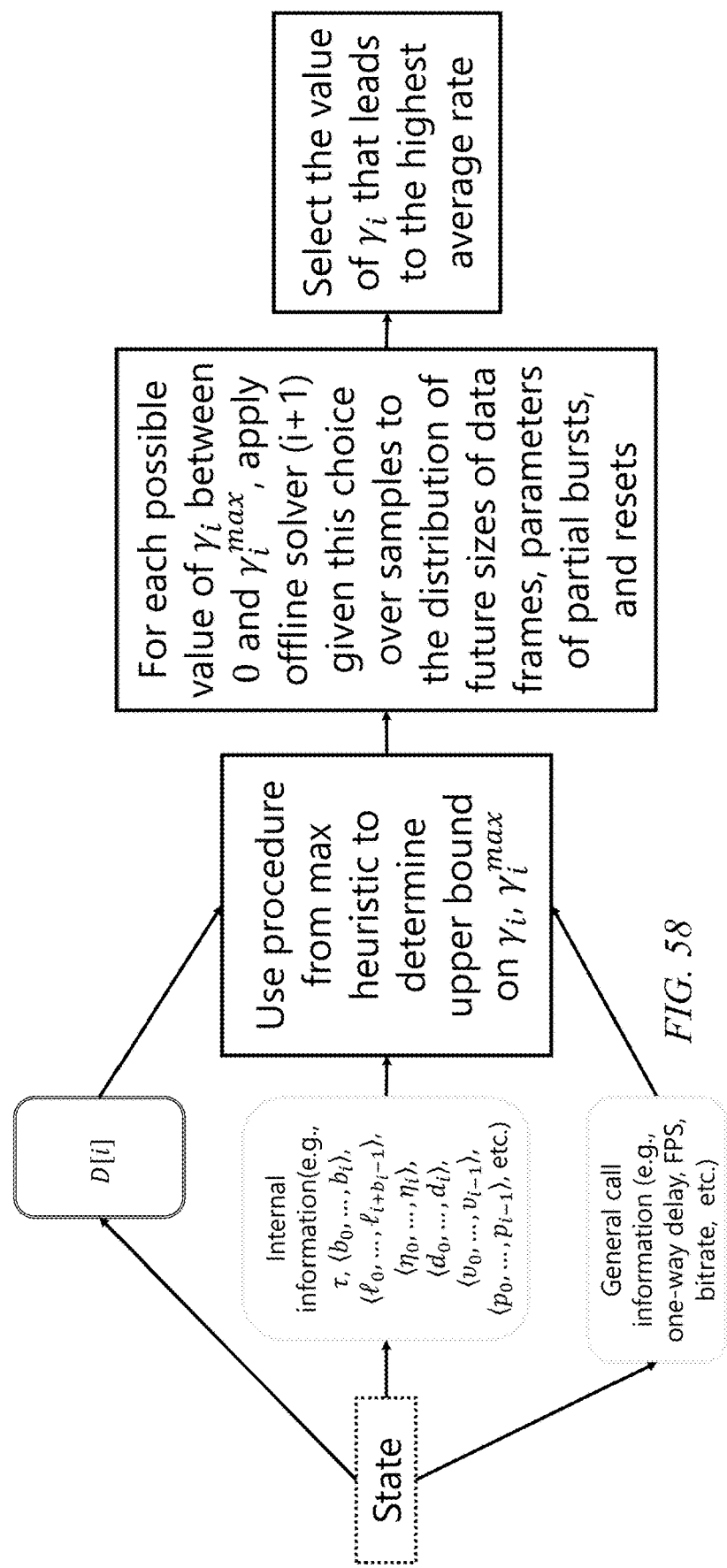
FIG. 58 shows an example of another way to split frames using stochastic optimization to split frames on-the-fly.

Another way to split frames is using stochastic optimization to split frames on-the-fly, for example, as depicted schematically in FIG. 58. Here, one methodology to split data frames is to (a) first determine the range of suitable values of the size of the first component using the procedure from the max heuristic, (b) estimate the expected optimal offline rate given each possible choice of how to split the data frame by determining the empirical offline optimal rate over samples to the distribution of future information (e.g., sizes of future frames, parameters of partial bursts and partial guard spaces, etc.), and (c) choosing the value that has the highest empirical rate.

Figure 60:
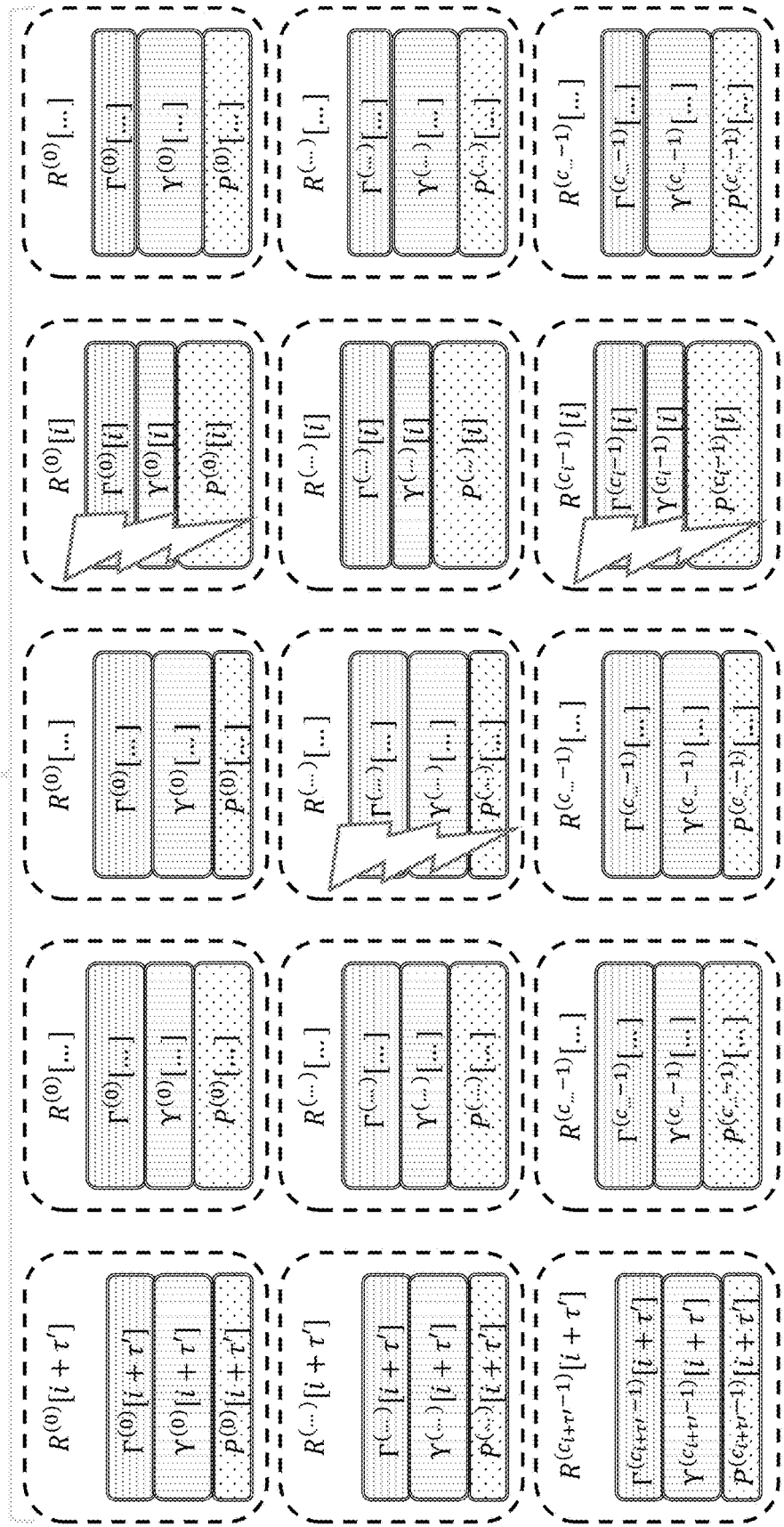
FIG. 60 shows an example of intended loss recover from the perspective of a frame when using a failsafe for CSIPB, in accordance with certain embodiments.

FIG. 60 shows an example of intended loss recover from the perspective of a frame when using a failsafe for CSIPB, in accordance with certain embodiments. Here, the goal is to recover all lost symbols of D[i] during time slot (i+τ') by solving a system of linear equations over (a) the received symbols of P[i:i+τ'], (b) the received symbols of D[i:i+τ'], and (c) D[i−τ':i−1]. One way to do so is to use Gaussian Elimination to solve the system of linear equations. The symbols of D[i−τ':i−1] are assumed to already be decoded by time slot (i+τ').

Figure 67:
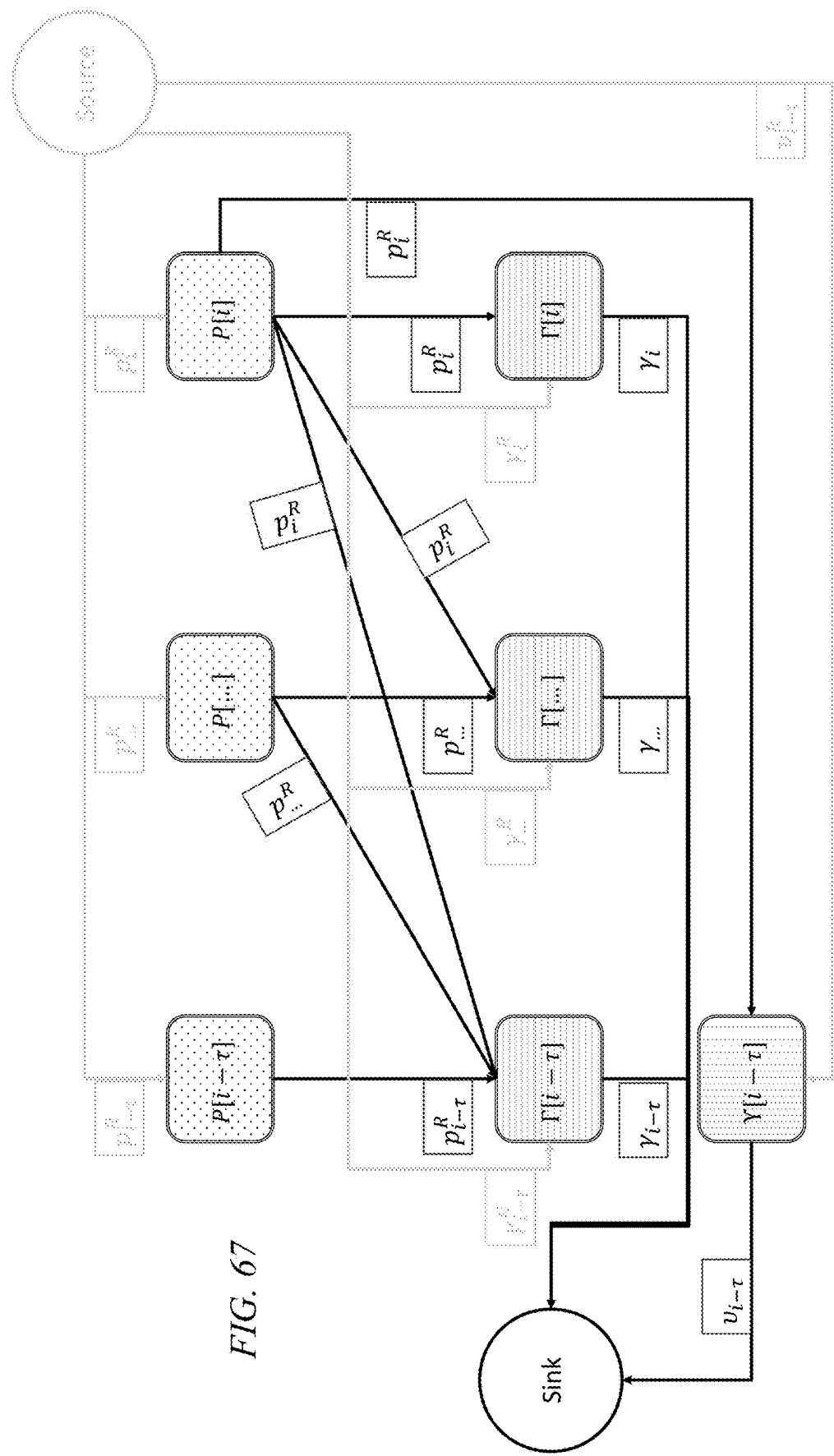
FIG. 67 is a schematic diagram for a method to determine whether the lost data of the ith data frame can be recovered assuming the prior τ data frames have been recovered, in accordance with one embodiment.

Certain embodiments can include a method to quickly determine if a data frame cannot be decoded, which can be used to avoid the expensive decoding operation (e.g., using Gaussian Elimination to solve a system of linear equations) unless the data frame is able to be decoded. FIG. 67 is a schematic diagram for a method to determine whether the lost data of the ith data frame can be recovered assuming the prior τ data frames have been recovered, in accordance with one embodiment. A maxflow can be computed (e.g., by using the Ford-Fulkerson algorithm) to determine whether decoding is possible. Essentially, the flow may reflect whether enough relevant parity symbols are received to decode each of Γ[i] and γ[i]; based on the code's structure, this also necessitates recovering Γ[i+1] through Γ[i+τ]. For example, there may be three vertices (labeled as γ[i], Γ[i], and P[i]) for each data frame to reflect the three quantities γ[i], Γ[i], and P[i], respectively. A Source is connected to all vertices reflecting parity for data frames i through i+τ, all vertices reflecting the first component of data frames i through (i+τ), and the first component of data frame i. Edge capacities are shown in the graph; for edges between Source and vertices representing a first or second component of a data frame, the capacity is the number of received symbols of that component of that data frame. For edges between the Source and vertices representing the parity symbols of a data frame, the edge capacity is the number of received parity symbols of that data frame. Vertices representing parity are connected to the vertices reflecting data that was used to create the parity (i.e., if there was an edge between corresponding components of the factor graph). All vertices representing the first or second component of a data frame are connected to the Sink; the capacity of the edge from one such vertex to the Sink is the size of the corresponding component. A maxflow is computed (e.g., by using the Ford-Fulkerson algorithm). Decoding of data frame i−τ is deemed possible if and only if the flow to Sink is at least the sum of (a) the sizes of the first component of data frames i−τ through i plus (b) the size of the second component of fame (i−τ).

It should be noted that embodiments can be applied to batch encoding and decoding with striping.

Figure 68:
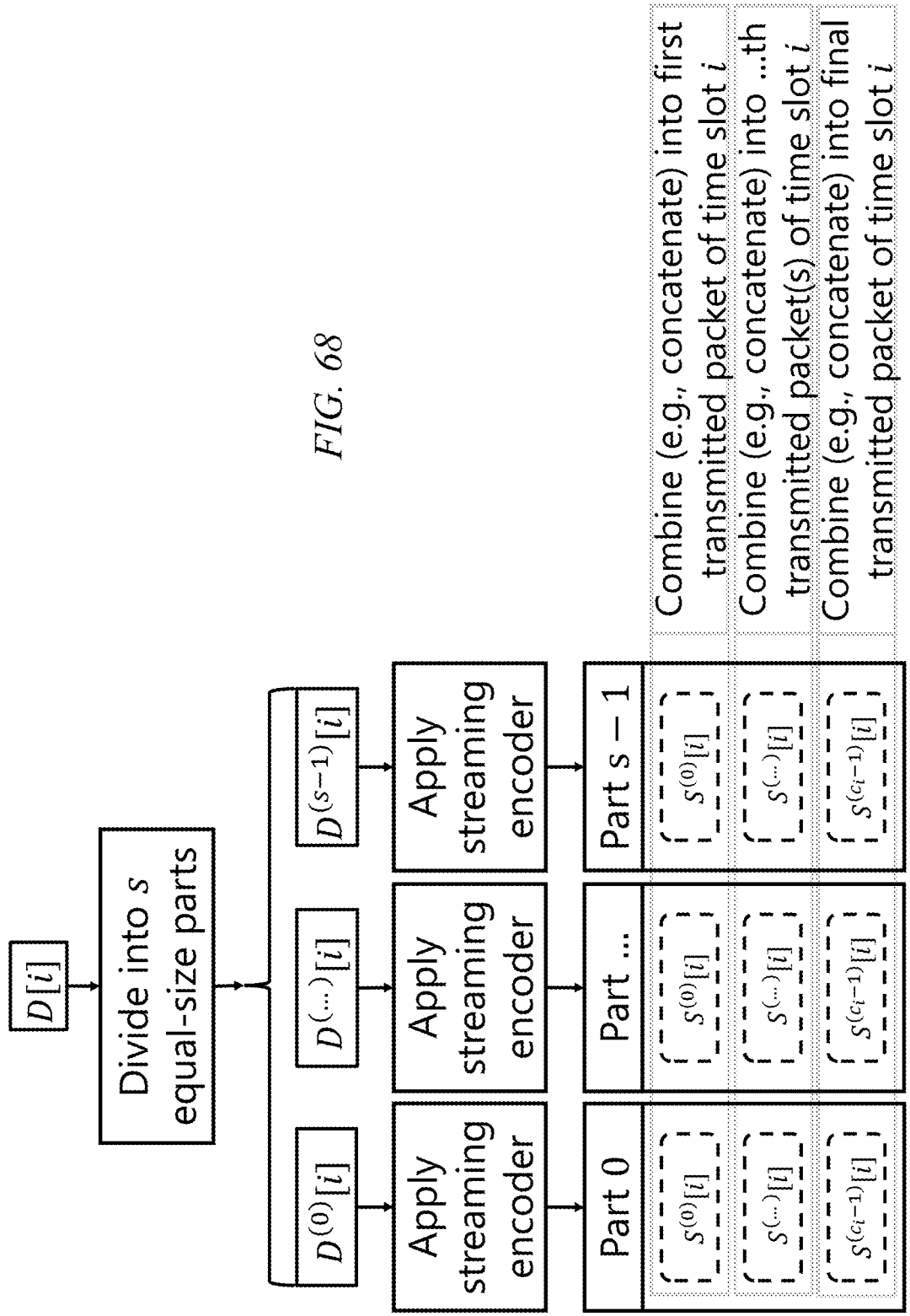
FIG. 68 is a schematic diagram showing a representation of encoding with stripes, in accordance with one embodiment.

FIG. 68 is a schematic diagram showing a representation of encoding with stripes, in accordance with one embodiment. The idea of batching symbols into stripes is well-known in the coding theory literature. Generally speaking, striping is a methodology for (a) how linear combinations of symbols are taken and (b) how they are spread over packets so that decoding is more efficient/requires less computational resources. In the context of certain embodiments, striping provides a mechanism by which each of Γ[i], γ[i], and P[i] are split into so-called "stripes" of s symbols each. To generate the parity symbols of a stripe, the same function (e.g., taking a linear combination) is used to create the symbol of each position by applying the function to different inputs. For example, to create the jth parity symbol of the stripe, one may apply the function to the jth position of all relevant stripes of Γ[i−τ:i] and γ[i−τ] (the inputs may also include the jth position stripes of Γ[i−τ':i−τ−1] and γ[i−τ': i−τ−1] too if the failsafe is used as discussed herein).

Figure 69:
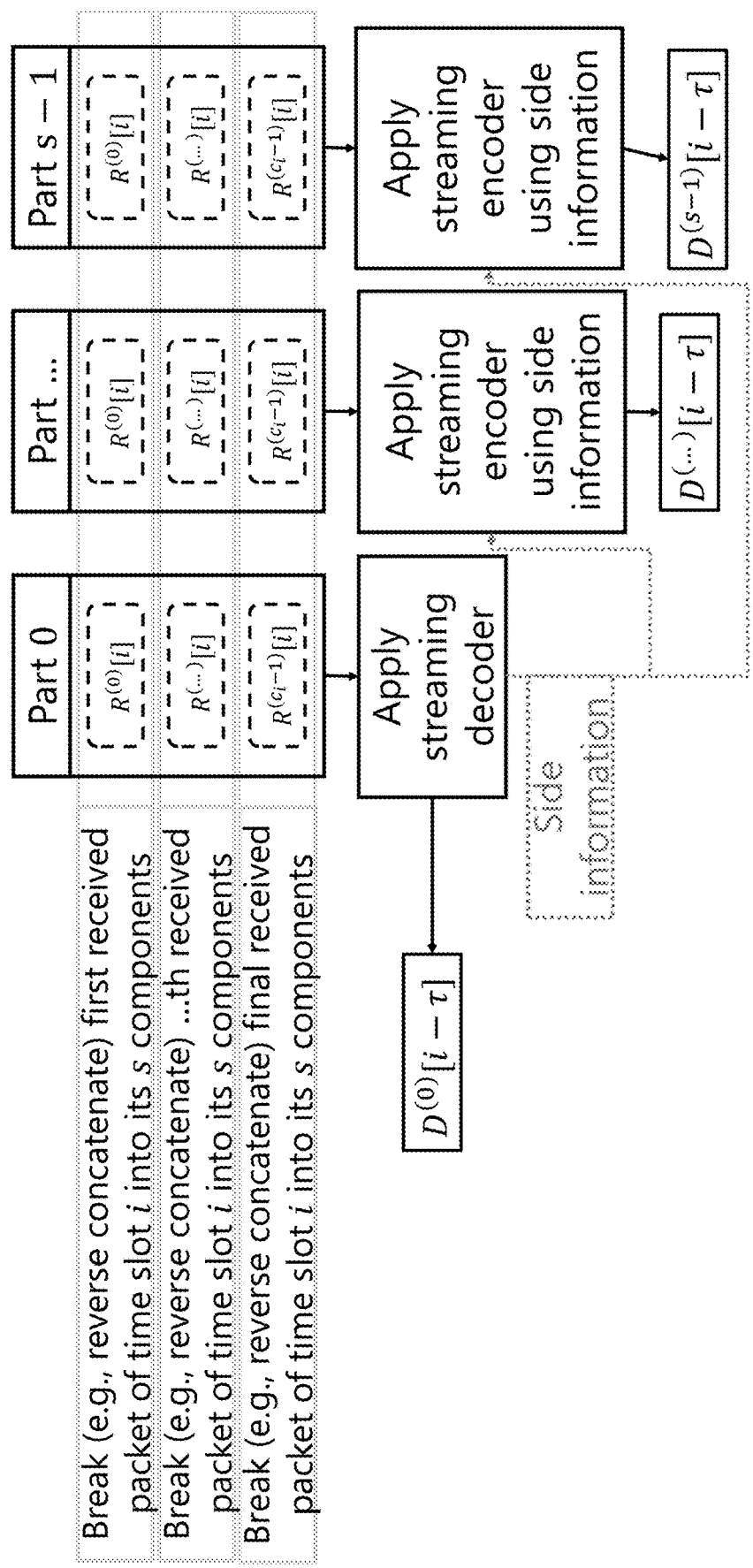
FIG. 69 is a schematic diagram showing a representation of decoding with stripes in accordance with FIG. 68.

In certain embodiments, packetization for striping would be performed in a manner that distributes symbols such that all symbols of each stripe are always placed in the same packet. One way to do packetization is shown in FIG. 68 (and may involve using a smaller "MTU" by dividing the true MTU by s). One advantage is that after solving a system of linear equations to recover any one position of a stripe, j, the solution to the system of linear equations can be reused to decode each remaining position of the stripe. This reduces the complexity of decoding, as depicted in FIG. 69. In the step of dividing D[i] into s equal-size parts, one may add zero padding of up to (s−1) symbols to ensure the number of symbols is divisible by s. As with zero-padding discussed herein, embodiments could optimize to not send these symbols and instead have the receiver infer them.

FIG. 69 is a schematic diagram showing a representation of decoding with stripes in accordance with FIG. 68. Here, the decoder essentially undoes the combination step from encoding with stripes to obtain the received packets as if part 0 was the entire communication. This can involve applying the streaming decoder in order to solve for the data of the (i−τ)th data frame when restricted to part 0 and stores the useful information computed during decoding (referred to herein as "side information") for use when decoding parts 1 through (s−1). Specifically, since decoding follows from solving a system of linear equations by inverting a matrix, one possibility for using the side information is to set the side information to be this matrix such that that decoding parts 1 through (s−1) will be able to reuse this matrix inverse rather than computing it again. By using stripes of size s, the size of matrix that is inverted in part 0 is much smaller than if no stripes had been used (and the underlying streaming encoder/decoder were used directly). Then, each additional part can be decoded as if the part was the entire communication but using the side information in the decoding to reduce computational complexity. The computational complexity of decoding all data is intended to be much less than if stripes were not used (i.e., if the underlying streaming encoder/decoder were used directly). Alternatively, instead of using side information, one could decode each of the s parts in parallel.

It should be noted that the same streaming encoder/decoder could be applied to all parts. For example, the streaming encoder may be the variant of CSIPB with packetization #1, heuristic #1 for splitting data frames, and a heuristic parity allocation (e.g., allocate roughly $v_j l_i$ parity symbols for $p_{i+\tau}$). Alternatively, a different streaming encoder/decoder could be used for each stripe (e.g., different randomly generated encoding matrices) such that both encoding and decoding can be done in parallel (i.e., at the sender and receiver, respectively); in this case, the "side information" generally would not be needed or used.

It also should be noted that CSIPB can be extended to include frame splitting into more than two components.

Exemplary Embodiments Based on CSIPBRAL

Certain features are now described with reference to CSIPBRAL. The following is a glossary provides some additional and/or modified terms for the CSIPBRAL discussion:

| Term | Definition | Example |
| --- | --- | --- |
| Partial guard space | A sequence of τ or more time slots after a partial burst wherein another partial burst is not intended to start but rather for each such time slot, j, at most $\lceil l_j^{(G)} c_j \rceil$ of the packets are expected to be lost. In essence, if $l_j^{(G)}$ is always set to 0, CSIPBRAL essentially degenerates to the CSIPB model. | A burst occurs across time slots 0 and 1 where half the packets are lost. Then a partial guard space occurs over time slots 2 through τ + 1 = 4 (i.e., τ = 3) where only $1/10$ packets are lost. In this example, there are 10 packets sent for each of the first five time slots. |
| $l_i^{(G)}$ | For any time slot i, $l_i^{(G)}$ is intended to reflect the largest fraction of packets that may be lost during time slot i (before rounding up) if there is no partial burst encompassing time slot i for which loss recovery is needed. Formally, for any time slot i, up to $\lceil l_i^{(G)} c_i \rceil$ packets may be lost and loss recovery will be guaranteed with high probability (provided the only time that a greater number of packets are lost during any such time slot, i, is part of a partial burst). Sometimes $l_i^{(G)}$ is written with a script (e.g., as "$\ell$"). | Suppose that $l_1^{(G)} = 0.25$ and $c_1$ is an integer divisible by 4. Then up to a quarter of the packets sent during time slot 1 may be lost even not as part of a partial burst and loss recovery is still meant to apply |
| G[i] | The vector of parity symbols of the ith data frame that depend on the symbols of the second component of the ith data frame | |

| Term | Definition | Example |
|---|---|---|
| $G^R[i]$ | The vector of received parity symbols of G[i] (i.e., G[i] after removing all positions corresponding to a symbol that was dropped). Vector notation may be used where G[i:j] represents G[i], . . . , G[j] for non-negative integers i, j where i ≤ j. | |
| $g^R_i$ | The size of $P^R[i]$ | |
| $G^L[i]$ | The vector of lost parity symbols of G[i] during time slot i (i.e., G[i] after removing all positions corresponding to a symbol that was not dropped) | |
| $g^L_i$ | The size of $G^L[i]$ | |
| Pre-allocated symbols $p_i^{pre}$ | During time slot i-τ, some number of symbols, $p_i^{pre}$ are pre-allocated such that the size of P[i] will be at least $p_i^{pre}$ (although it may be higher). These symbols are intended to ensure loss recovery of D[i − τ] by time slot i in the event of a partial burst | |
| $A_i^j$ | a matrix used to encode symbols of the first component of data frame j into the first type parity symbols of data frame i | |
| $B_i^{j-\tau}$ | a matrix used to encode symbols of the second component of data frame i − τ into the first type parity symbols of data frame i | |
| $C_i^{i,2}$ | a matrix used to encode symbols of the second component of data frame i into the second type parity symbols of data frame i | |
| $C_i^j$ | a matrix used to encode symbols of the jth data frame into the second type parity symbols of data frame i; may be full rank or zero in one or more positions to remove the effect of the first and or second component. | |
| $G^+[i]$ | a matrix used to encode symbols of the jth data frame into the second type parity symbols of data frame i; may be full rank or zero in one or more positions to remove the effect of the first and or second component. | |
| First type of parity symbol | symbols of P[i] that are intended to be used to recover (a) earlier data frames and/or (b) the first component of the ith data frame in the event of a partial burst that ends within τ time slots before time slot i | |
| Second type of parity symbol | symbols of G[i] that are intended to be used to recover symbols of the second component of the current data frame when at most $\lceil c_i l_i^{(G)} \rceil$ of its packets are lost | |
| $c_i^\gamma, c_i^\gamma, c_i^P, c_i^g$ | $c_i$ in certain embodiments can be split into four parts, $c_i^\gamma, c_i^\gamma, c_i^P$, and $c_i^g$, corresponding to packets sent for γ[i], Γ[i], P[i], and G[i], respectively. | |

The following is a summary of changes from the CSIPB glossary:

| | | |
|---|---|---|
| Partial burst (now generalized from the | Refers to one or more consecutive time slots that is no more than a parameter number ($b_i$) where during each of these time slots the | A burst occurs across time slots 0 and 1 where half the packets are lost. Then a guard space occurs over time slots 2 through τ + 1 = 4 (i.e., τ = 3) where |

| | | |
|---|---|---|
| definition with guard spaces) | number of packets that may be lost is no more than a parameter ($l_i$) times the number of packets (where the product is then rounded up); there is a partial guard space (e.g., where for time slot j of the partial guard space the number of packets that may be lost is no more than a parameter ($l_i^{(G)}$, defined below) times the number of packets (where the product is then rounded up) for the $\tau$ time slots after the end of a partial burst; similarly, there is a partial guard space for the $\tau$ time slots before the start of a partial burst | only $\frac{1}{10}$ packets are lost. In this example, there are 10 packets sent for each of the first five time slots. Then a partial guard space occurred |
| P[i] | The vector of parity symbols of the ith data frame that do not depend on the symbols of the second component of the ith data frame | |
| $P^R[i]$ | The vector of received symbols of P[i] during time slot i (i.e., P[i] after removing all positions corresponding to a symbol that was dropped) | |
| $p^R_i$ | The size of $P^R[i]$ | |
| $p^L[i]$ | The vector of lost parity symbols of P[i] during time slot i (i.e., P[i] after removing all positions corresponding to a symbol that was not dropped) | |
| $p^L_i$ | The size of $P^L[i]$ | |
| $P^+[i]$ | the vector of symbols to add to the first type parity symbols P[i] to add the failsafe | |

CSIPBRAL addresses the issue of loss recovery when there are losses during $\tau$ time slots under a partial burst. CSIPBRAL addresses this challenge in two ways. First, a new extra type of parity symbol, G[i], is added. These parity symbols are sent with the ith data frame. This ensures that (a) some parity symbols of a data frame can be used to recover the first component of the same data frame and some parity symbols of a data frame can be used to recover the second component of the same data frame, and (b) some parity symbols of a data frame cannot be used to recover the second component of the data frame. Thus, a different form of parity symbols is used (e.g., a distinct factor graph). Second, the mechanism for allocating parity is changed. These changes will likely lead to different frame splitting (e.g., versus what would occur under CSIPB).

Specifically, an additional parameter $l_i^{(G)}$ is added and will impact how many parity symbols are allocated to P[i] and how many are allocated to the new additional type of parity symbol, G[i], which is structurally different from P[i] and requires another step of allocating $g_i$ symbols (i.e., the size of G[i]) during time slot i. Another novelty is a two-stage parity allocation of (a) pre-allocating $p_{i+\tau}$ during time slot i for robustness to partial bursts then (b) increasing the size of $p_i$ during time slot i for robustness to loss in the partial guard space.

In certain embodiments, burst characteristics may be periodically estimated by the receiver and used to set frame splitting, parity generation, and other operating parameters, although, as discussed above, frame splitting, parity generation, and other operating parameters may be set in other ways including by the sender. This enables tuning the bandwidth overhead based on the changing network conditions. In certain embodiments, the estimates comprise three sets of parameters to reflect the length of the partial burst, fraction of packets lost per data frame during the period of high loss of the partial burst, and fraction of packets lost outside of the highly lossy period of a partial burst. Specifically, for the ith data frame, the maximum length of a burst starting with data frame i is estimated as $b_i$, the maximum fraction of packets lost for the ith data frame is estimated as $l_i$, and during any time slot up to $l_i^G$ fraction of the packets sent during time slot i may be lost. In certain embodiments, partial bursts are modeled as being followed by partial guard spaces of length at least $\tau$ data frames; during these time slots, the worst-case losses of a partial burst cannot occur; so for time slot j of the partial guard space up to $l_j^G$ fraction of the packets may be lost. In certain embodiments, feedback from the receiver can be viewed as the receiver conservatively estimating how lossy the network conditions will be based on prior losses. In certain embodiments, when there is no feedback, the parameters do not change; formally, $b_i$ is set to $b_i-1$, $l_i+b_i-1$ is set to $l_{i+b_i-2}$, and $l_i^{(G)}$ is set to $l_{i-1}^{(G)}$. When encoding the ith data frame, the sender has access to $b_j$ and $l_j^{(G)}$ for any $j \leq i$ and to $l_j$ for any $j \leq (i+b_j-1)$. In some embodiments, the values for each $l_j$ and $l_j^{(G)}$ are each set exactly once.

Figure 70:
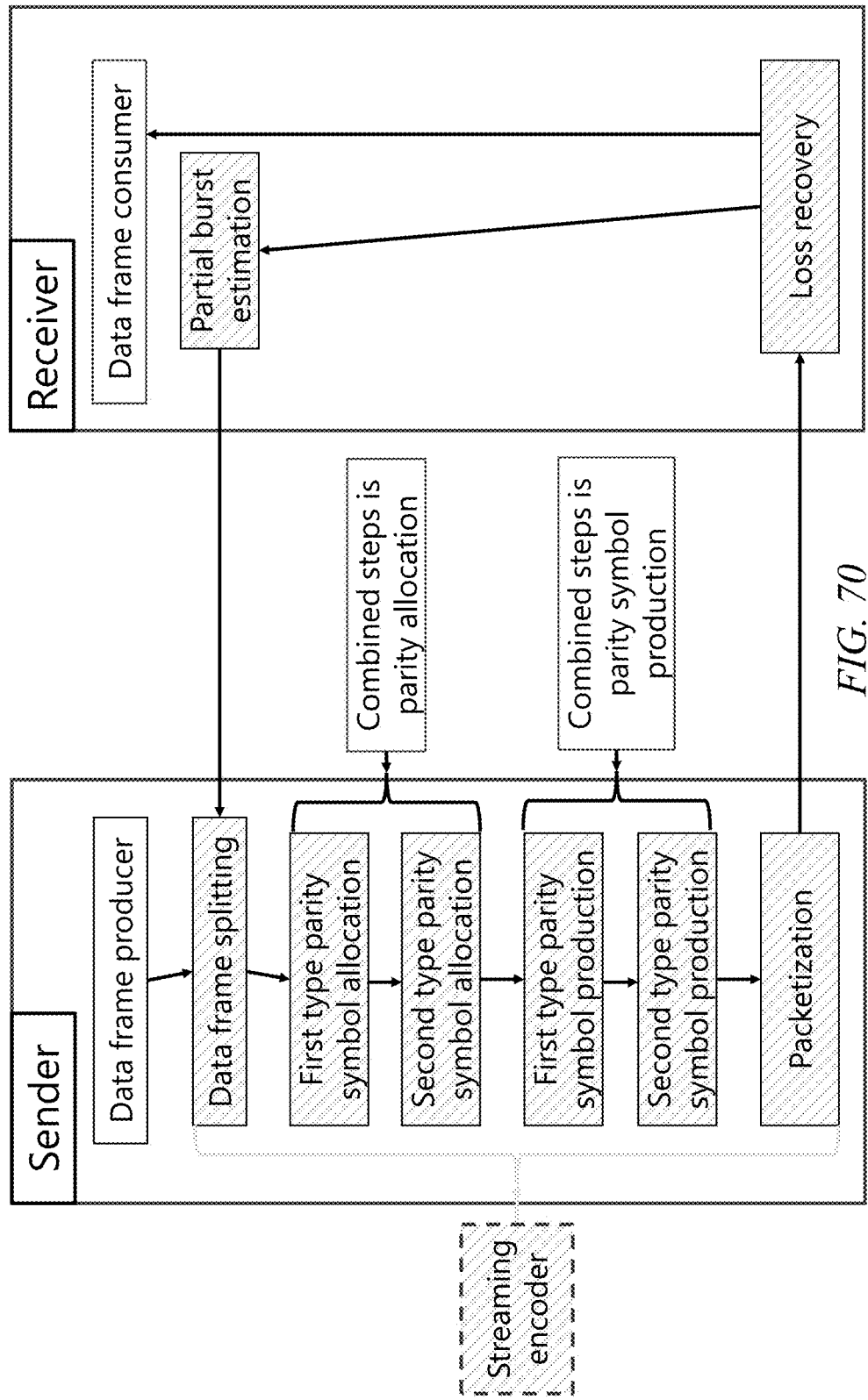
FIG. 70 is a schematic diagram showing logical elements of the streaming encoder for CSIPBRAL, in accordance with certain embodiments.

FIG. 70 is a schematic diagram showing logical elements of the streaming encoder for CSIPBRAL, in accordance with certain embodiments. CSIPBRAL involves sending two different types of parity symbols where the second type did not exist under CSIPB. These symbols are both allocated and created. The construction is similar to CSIPB in the meaning of the two components of a data frame formed by splitting (e.g., can be defined with similar terminology in terms of loss-recovery) for partial bursts, although the definition of partial bursts is different than under the model considered for CSIPB.

Figure 71:
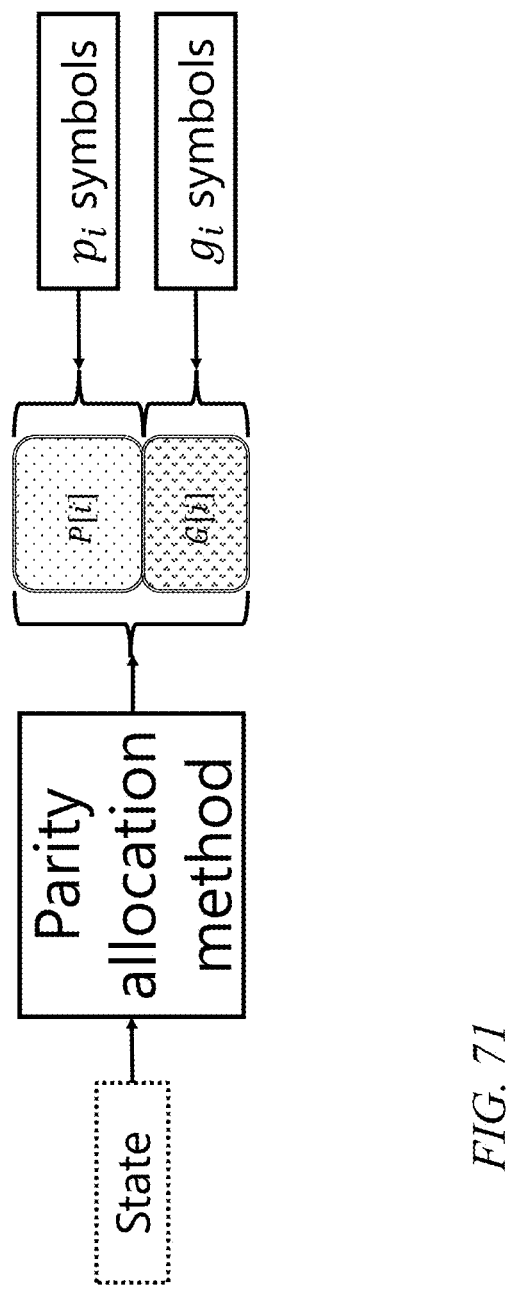
FIG. 71 is a schematic diagram showing the concept of parity allocation for CSIPBRAL, in accordance with certain embodiments.

FIG. 71 is a schematic diagram showing the concept of parity allocation for CSIPBRAL, in accordance with certain embodiments. Here, parity allocation enables for each data frame to allocate an arbitrary number of parity symbols into two types. This is done using a methodology that leverages information about the call (i.e., its inputs) as well as properties of the application, user preference, sizes of prior frames, sizes of the first and second components of prior frames, etc. For example, it may be a machine learning model trained to optimize key metrics of the QoE (e.g., rate, freeze, fraction of rendered decompressed frames, latency of rendered decompressed frames, PSNR, SSIM, LPIPS, etc.); such a model may make use of properties of prior calls in the decision (e.g., if a very large data frame is likely to be followed by a smaller data frame, the model may exploit such a property). Another possible parity allocation method is a heuristic.

The parity allocation of the data frame may depend on metadata of data frame such as its compression; for example, if certain symbols of D[i] are supplementary (i.e., the data frame is useful without them but even better with them), that information may be used (e.g., they may be placed in γ[i] so that the non-supplementary symbols fit into Γ[i] to be recovered sooner). In some instances, no such metadata will be available (i.e., it may not be tracked under the state in certain embodiments), so this type of information about the compression may not come into play.

Figure 72:
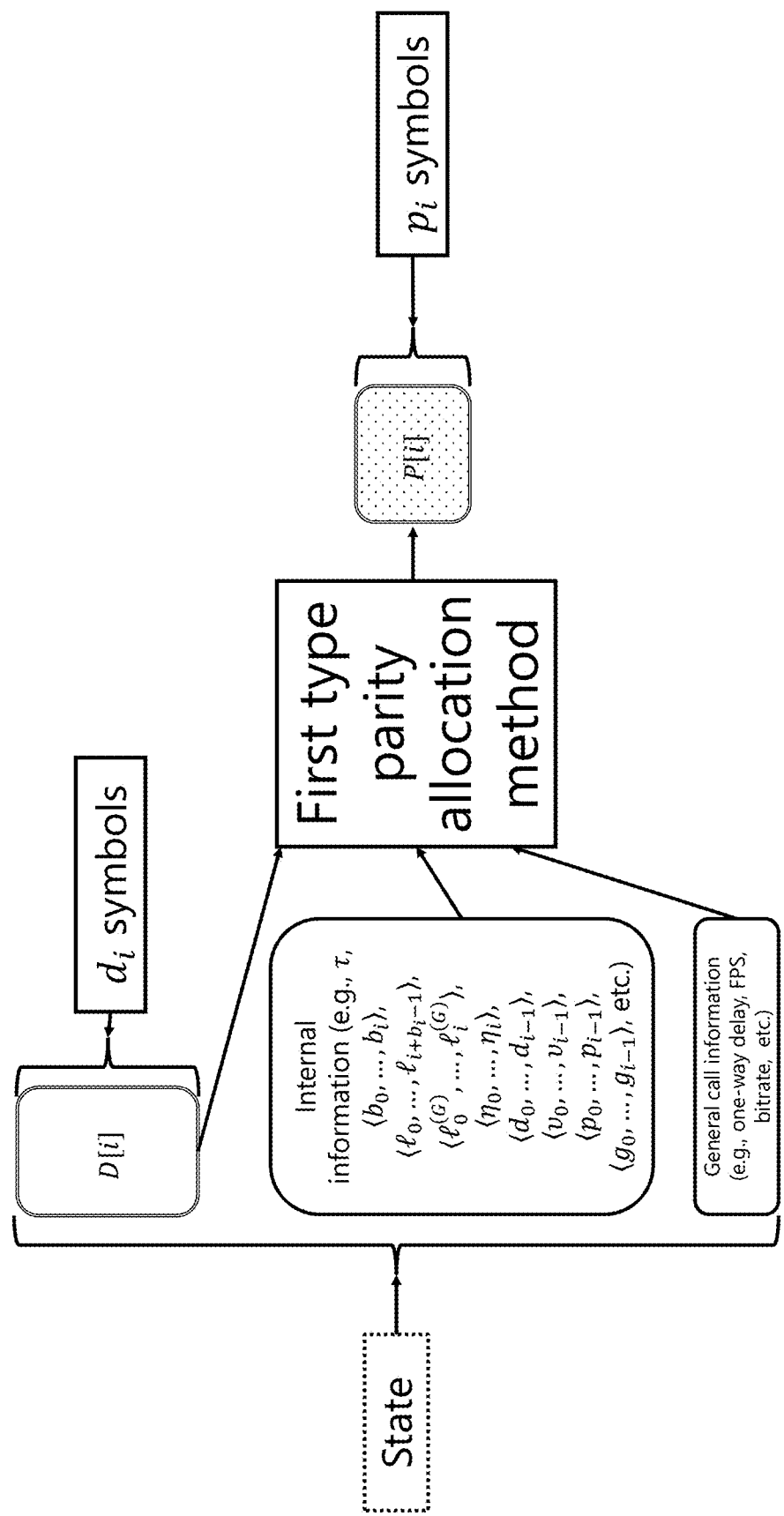
FIG. 72 is a schematic diagram showing the concept of a parity allocation scheme for the first type of parity symbols in accordance with CSIPBRAL.

FIG. 72 is a schematic diagram showing the concept of a parity allocation scheme for the first type of parity symbols in accordance with CSIPBRAL.

Figure 73:
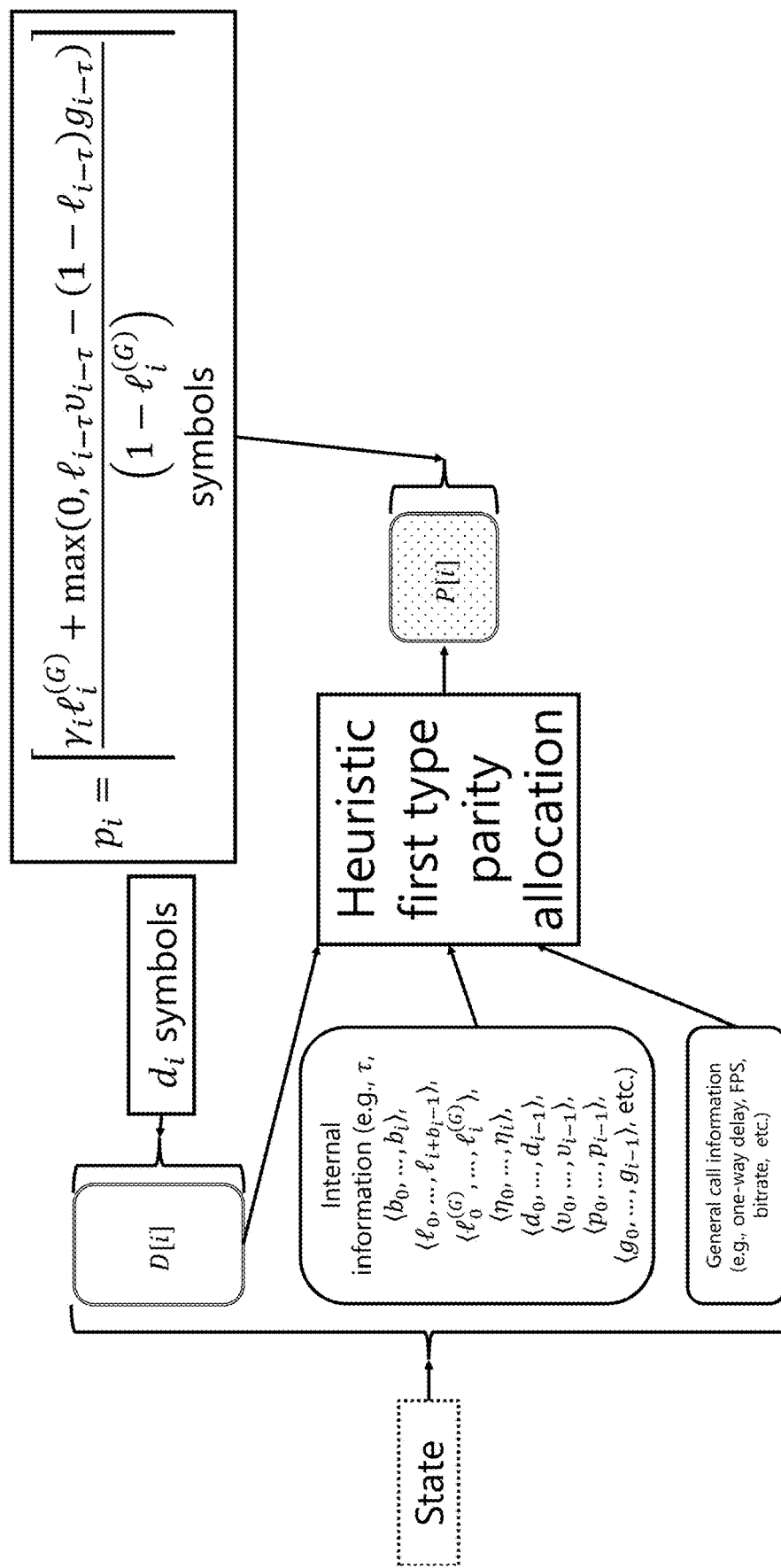
FIG. 73 is a schematic diagram showing a first heuristic to allocate first type parity symbols, in accordance with certain embodiments.

FIG. 73 is a schematic diagram showing a first heuristic to allocate first type parity symbols, in accordance with certain embodiments. A first example heuristic (Heuristic 1) splits data frames to minimize parity associated with each data frame. Specifically, the number of parity symbols to be sent with the data of data frame i may be allocated to be a function of the size of γ[i−τ] and Γ[i]; for example, the number of parity symbols could be set with the intention that when $l_i^{(G)}$ fraction of them are lost, the number of received ones (i.e., $p_i^R$) is to equal (a) the number of missing symbols Γ[i] plus (b) the number of missing symbols of γ[i−τ] less the number of received symbols of G[i−τ] (where this subtraction is bounded below by 0); in other words:

$$p_i(1-l_i^{(G)})=\gamma_i l_i^{(G)}+\max(0,l_{i-\tau}v_{i-\tau}-(1-l_{i-\tau})g_{i-\tau}),$$

leading to:

$$p_i = \left\lceil \frac{\gamma_i l_i^{(G)} + \max(0, l_{i-\tau}v_{i-\tau} - (1 - l_{i-\tau})g_{i-\tau})}{(1 - l_i^{(G)})} \right\rceil.$$

Note that one must take the ceiling as well to ensure $p_i$ is an integer.

A second example heuristic (Heuristic 2, not shown) allocates enough symbols of P[i] to recover Γ[i] during time slot i (i.e., $$p_i = \left\lceil \frac{l_i \gamma_i}{1 - l_i^{(G)}} \right\rceil).$$

Figure 74:
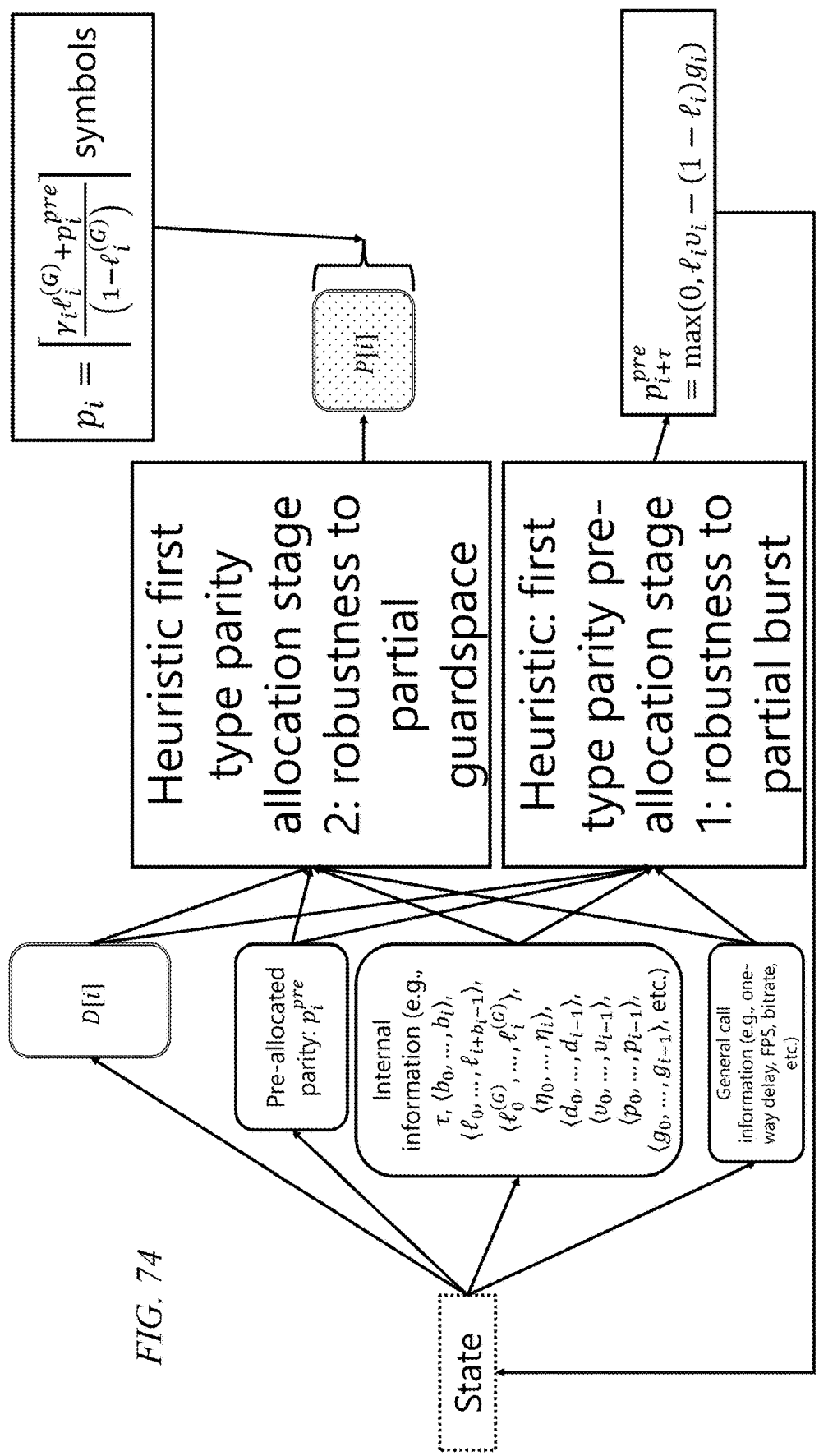
FIG. 74 is a schematic diagram showing a second heuristic to allocate first type parity symbols, in accordance with certain embodiments.

FIG. 74 is a schematic diagram showing a second heuristic to allocate first type parity symbols, in accordance with certain embodiments. Here, the heuristic is modeled as occurring in two stages. First, during time slot i−τ, some number of symbols, $p_i^{pre}$ are pre-allocated in that at least $p_i^{pre}$ symbols will be sent in P[i] (which would suffice to ensure loss recovery of D[i−τ] if no packets can be lost in time slot i if a partial burst occurred encompassing time slot (i−τ), such as if $l_i^{(G)}$=0). Then some additional number of symbols may be allocated during time slot i to add robustness to losing $l_i^{(G)}$ fraction of the packets sent during time slot i (e.g., a partial guard space).

Figure 75:
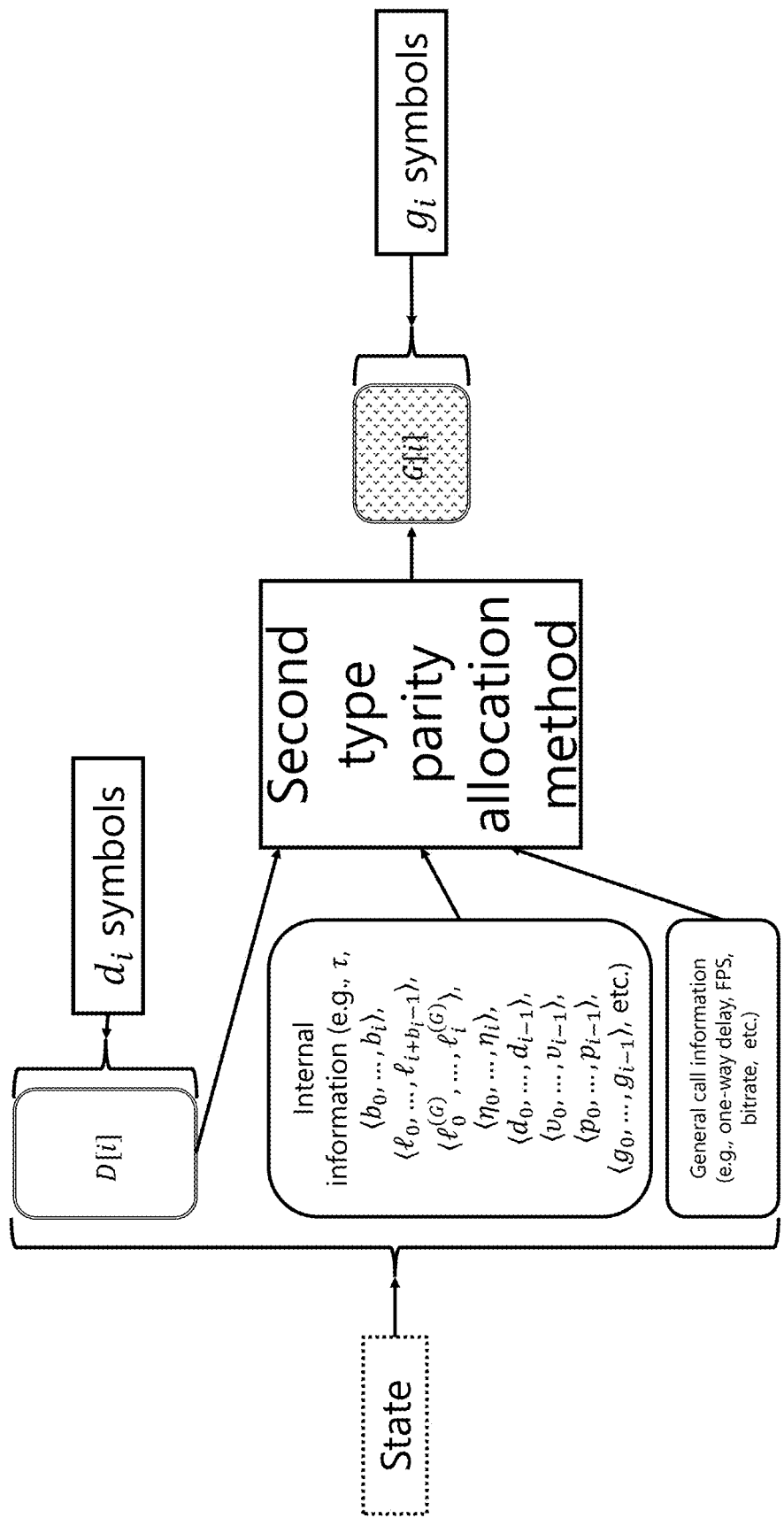
FIG. 75 is a schematic diagram showing the concept of a heuristic to allocate second type parity symbols, in accordance with certain embodiments.

FIG. 75 is a schematic diagram showing the concept of a heuristic to allocate second type parity symbols, in accordance with certain embodiments.

Figure 76:
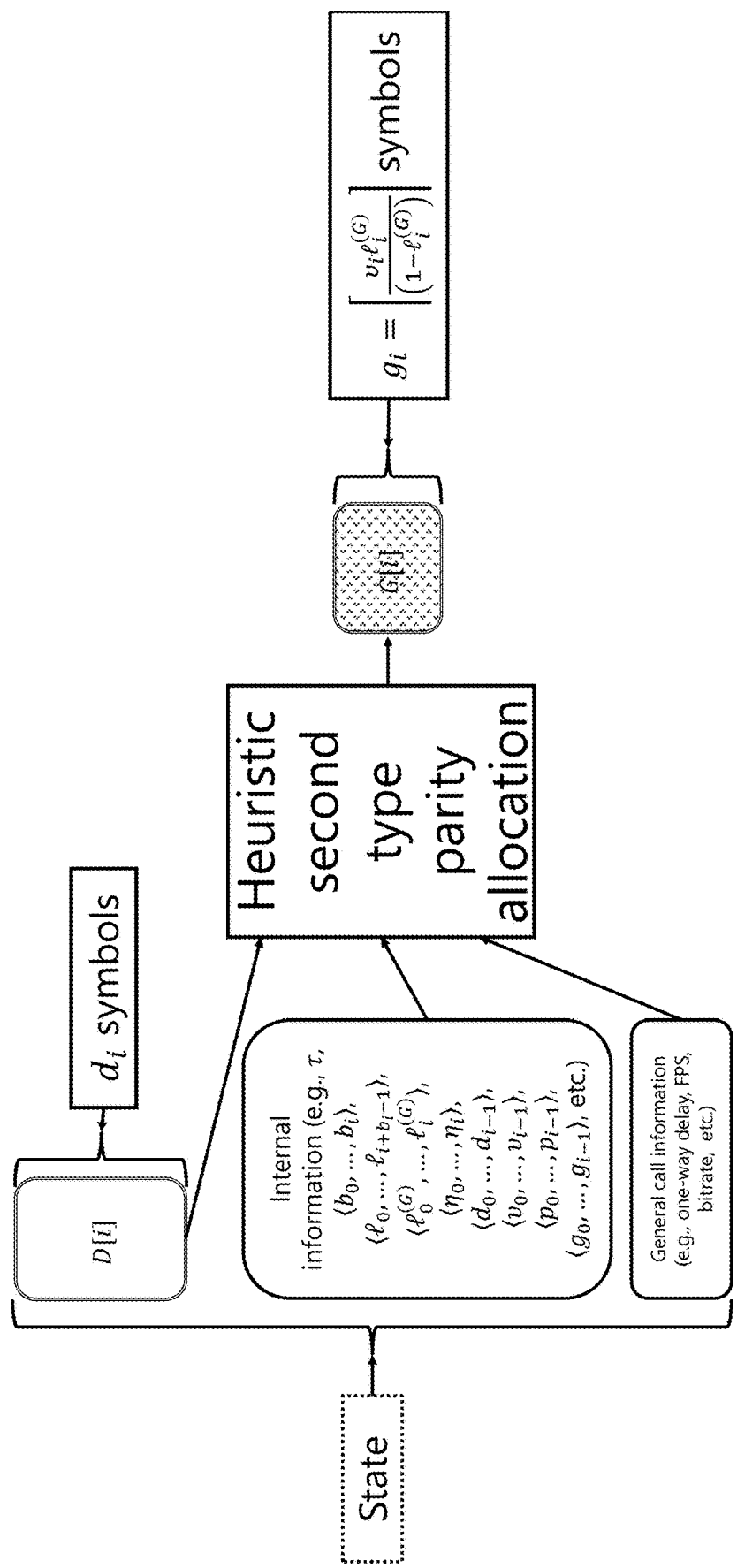
FIG. 76 is a schematic diagram showing a heuristic to allocate second type parity symbols, in accordance with certain embodiments.

FIG. 76 is a schematic diagram showing a heuristic to allocate second type parity symbols, in accordance with certain embodiments. Here, the heuristic is to recover the partial guard space by sending just enough second type parity symbols that the number that are received suffice to recover the lost symbols of the second component if a partial burst has not occurred in the previous τ time slots; formally, this may look like $g_i(1-l_i^{(G)})=v_i l_i^{(G)}$ (but may also be slightly increased to address rounding and or packetization issues).

Figure 77:
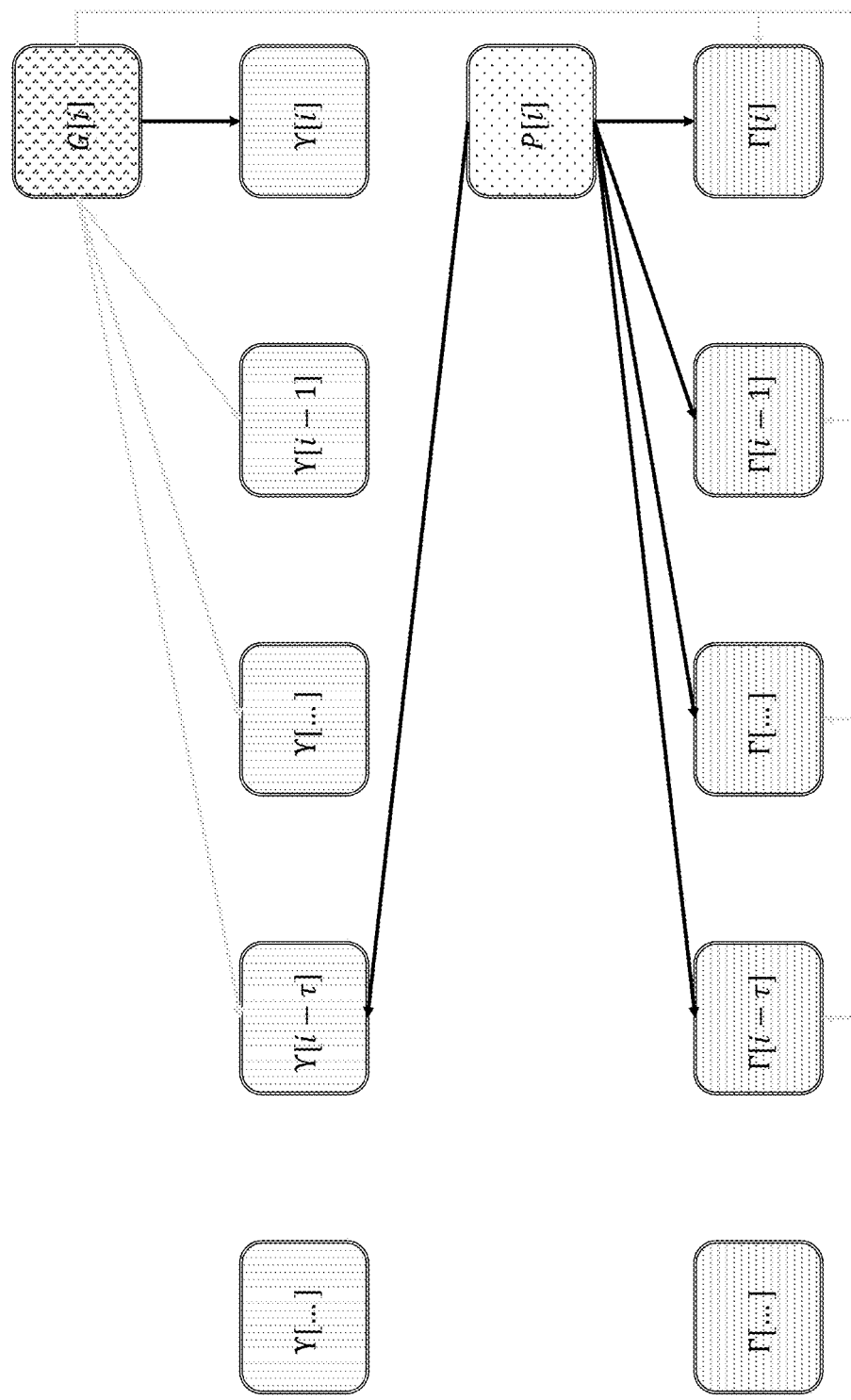
FIG. 77 is a factor graph of parity symbols for CSIPBRAL complete for parity symbols of ith data frame, in accordance with certain embodiments.

FIG. 77 is a factor graph of parity symbols for CSIPBRAL complete for parity symbols of ith data frame, in accordance with certain embodiments. Here, the first type parity symbols for data frame i are functions of (a) the first component of the current and previous τ data frames (i.e., Γ[i−τ:i]), and (b) the second component of the data frame from τ time slots before (i.e., γ[i−τ]). For example, each symbol of P[i] may be a linear combination of the symbols from (a) and (b). The second type parity symbols for data frame i are meant to be functions of the second component of the data frame. They also may or may not be functions of the first component of the same data frame and/or data of previous data frames (so these connections are shown in grey because each of them may or may not exist, i.e., depending on the embodiment, such connections may or may not be included).

For example, each symbol of G[i] may be a linear combination of the symbols from the second component of data frame i and may or may not also be linear combinations of the symbols of the first component of data frame i and/or the first and/or second components of the previous τ data frames. Note that it is the intention in certain embodiments that second type parity symbols are used to recover lost symbols of the second component; it is the intention that this convention can hold without loss of generality if losses only occur as if the partial bursts then partial guard spaces. The concept is that other parity symbols will be used to recover all symbols corresponding to components that the grey arrows point to. Hence, actions like adding linear combinations of these symbols to the symbols of G[i] will not harm loss recovery. One may add the grey edges and then use second type parity symbols to recover other quantities in certain scenarios where the partial bursts then partial guard-spaces do not occur (e.g., when all grey lines are included, in some instances when the fraction of losses during some time slot i is greater than $l_i$ but then no losses occur during time slots (i+$b_i$) to (i+τ), the symbols of G[i+$b_i$:i+τ] may be used to recover lost symbols of D[i] within τ time slots). Adding one or more of these grey edges is optional and may be done in certain embodiments and not in others.

Figure 78:
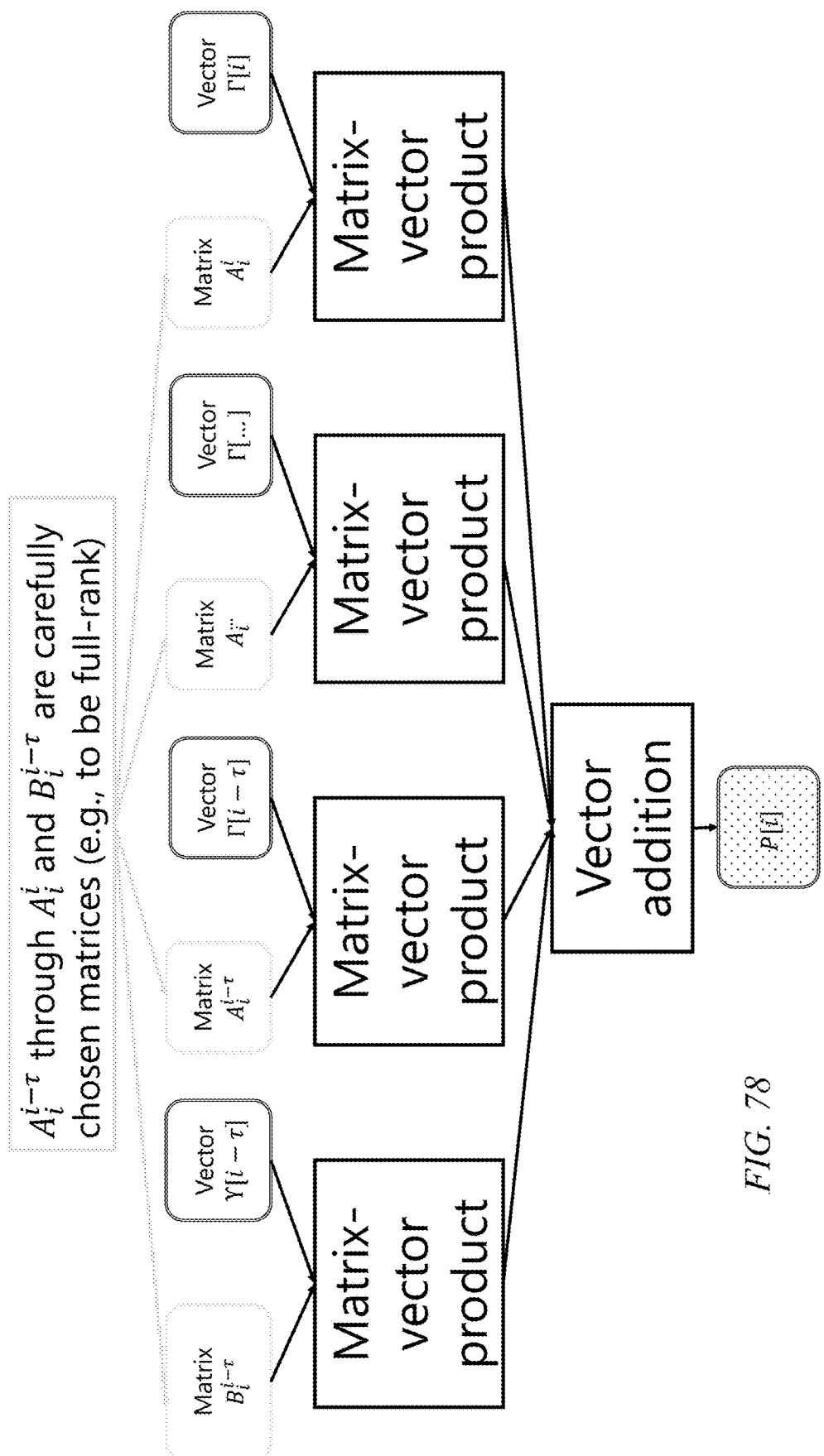
FIG. 78 shows first type parity symbol generation for the ith data frame in accordance with FIG. 77, in accordance with certain embodiments.

FIG. 78 shows first type parity symbol generation for the ith data frame in accordance with FIG. 77, in accordance with certain embodiments. Here, the symbols of P[i] are linear combinations of the symbols of the current data frame and previous τ data frames. Specifically, the symbols of P[i] are designed linear combinations of (a) the first component of the current and previous τ data frames, and (b) the second component of the data frame from τ time slots earlier. All linear combinations are carefully chosen to be linearly independent linear equations (e.g., to be full rank).

One way to construct the matrices is for (a) $B_i^{i-\tau}$ and (b) for $A_i^{i-\tau}$ through $A_i^i$ to be matrices with each entry drawn independently and uniformly at random over the elements of the field; in this case, loss recovery is shown with a high probability for a sufficiently large field size instead of being guaranteed with probability 1.

Figure 79:
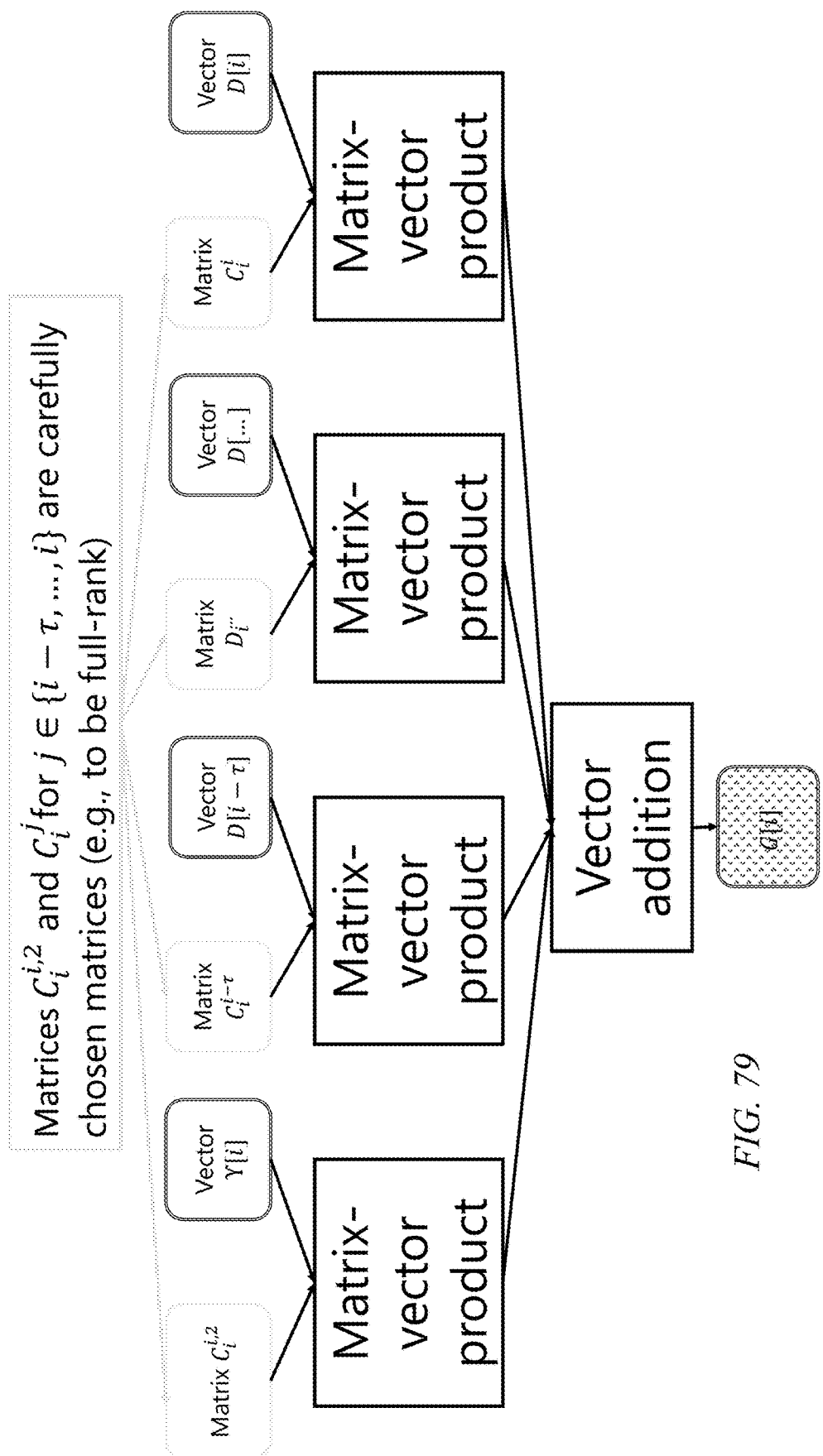
FIG. 79 shows second type parity symbol generation for the ith data frame in accordance with FIG. 77, in accordance with certain embodiments.

FIG. 79 shows second type parity symbol generation for the ith data frame in accordance with FIG. 77, in accordance with certain embodiments. Here, the symbols of G[i] are linear combinations of the symbols of the second component of the current data frame. The symbols may or may not be functions of the first component of the current data frame and/or the first/or second components of the previous τ data frames; this is reflected by adding additional matrix-vector products. One can remove any combination of these optional matrix-vector products by setting the relevant matrices among $C_i^i, \ldots, C_i^{i-\tau}$ to be all-zeroes matrices.

One way to construct the matrices is for (a) $C_i^{i,2}$ to have each entry drawn independently and uniformly at random over the elements of the field, and (b) each submatrix of $C_i^j$ that will be multiplied by a coordinate of D[j] corresponding to the first component of data frame j is either the all-zeroes matrix (if this component is not included) or has each entry drawn independently and uniformly at random over the elements of the field, and (c) each submatrix of $C_i^j$ that will be multiplied by a coordinate of D[j] corresponding to the second component of data frame j is either the all-zeroes matrix (if this component is not included) or has each entry drawn independently and uniformly at random over the elements of the field; in this case, loss recovery is shown with a high probability for a sufficiently large field size instead of being guaranteed with probability 1.

Figure 80:
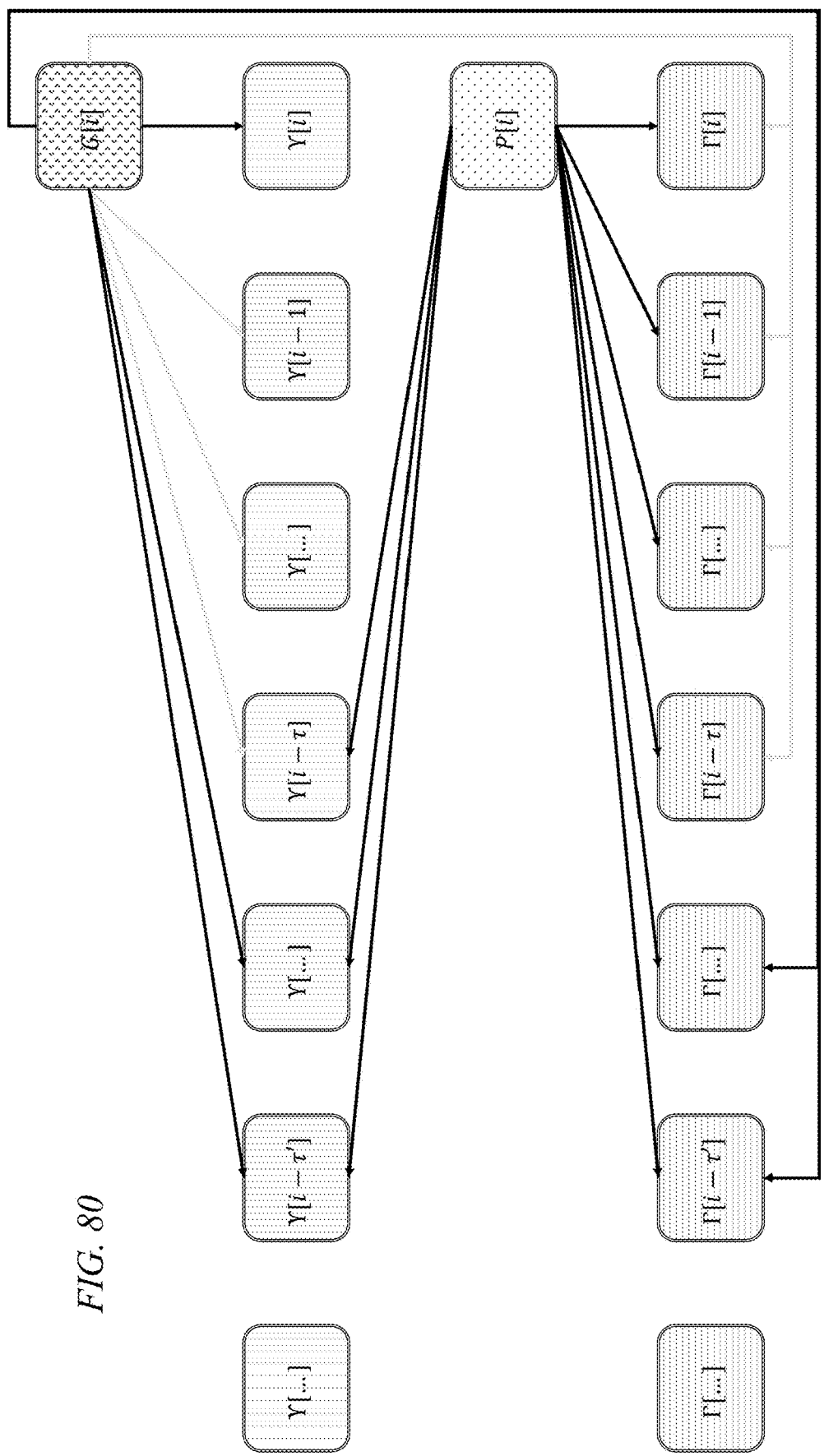
FIG. 80 is a factor graph of parity symbols for CSIPBRAL with failsafe, in accordance with certain embodiments.

As in CSIPB, CSIPBRAL can include a failsafe mechanism, e.g., by including earlier data frames into the parity symbols. FIG. 80 is a factor graph of parity symbols for CSIPBRAL with failsafe, in accordance with certain embodiments. Here, the parity symbols for time slot i can now also be functions of some or all of both components of data frames i−τ−1 through i−τ' in addition to being functions of the same data from without the failsafe. This change occurs for both P[i] and G[i] (i.e., for the first and second type parity symbols). One way to reflect this is by adding linear combinations of the symbols of the first and second components of data frames i−τ−1 through i−τ' to the parity symbols compared to what would be there without the failsafe.

Figure 81:
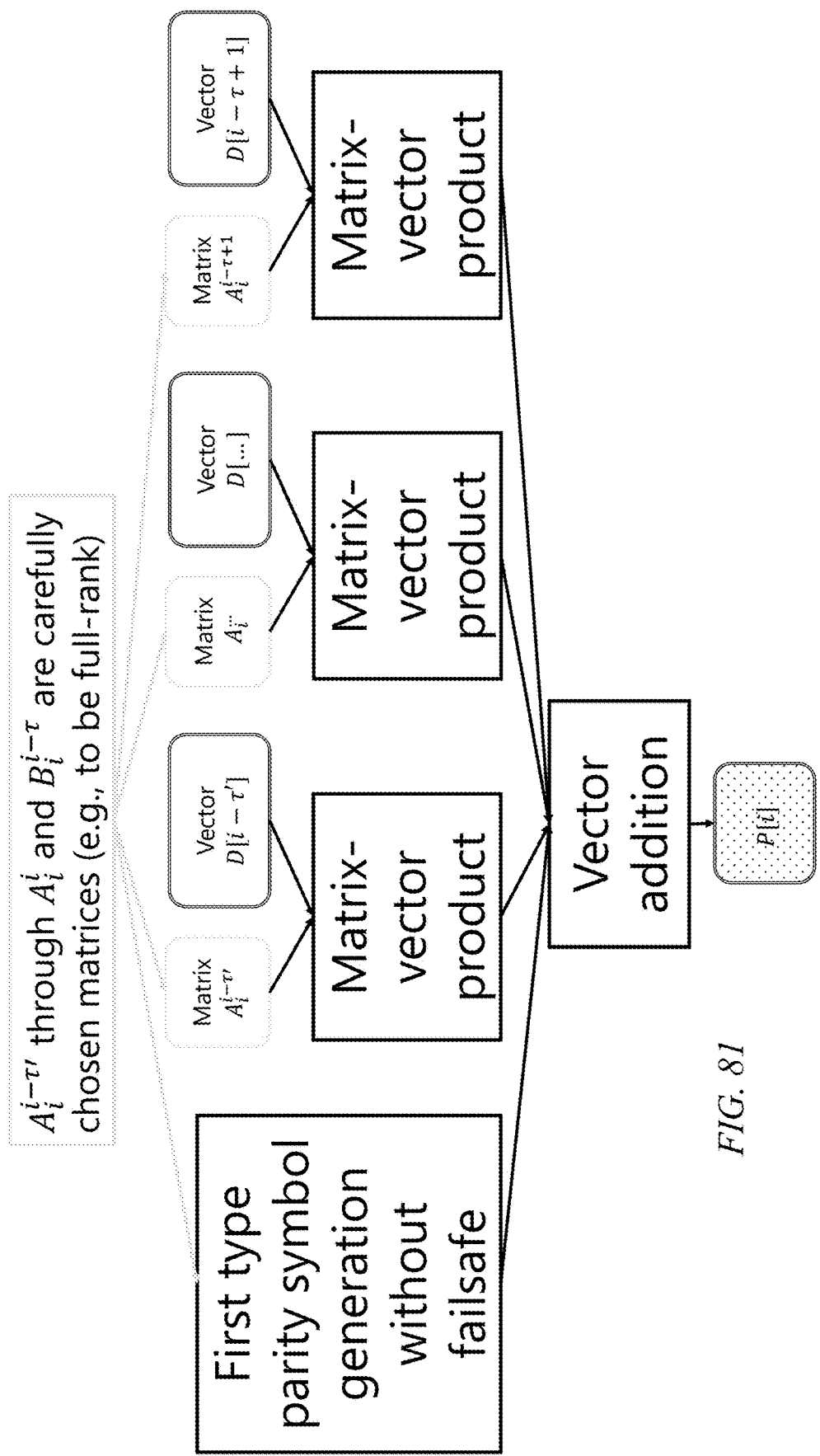
FIG. 81 shows first type parity symbol generation for the ith data frame in accordance with FIG. 80, in accordance with certain embodiments.

FIG. 81 shows first type parity symbol generation for the ith data frame in accordance with FIG. 80, in accordance with certain embodiments. Here, the parity symbols for time slot i can now also be functions of some or all of both components of data frames (i−τ−1) through (i−τ') in addition to being functions of the same data from without the failsafe. Here, linear combinations of the symbols of data frames more than data frames earlier are added to parity symbols of the current data frame. This enables loss recovery even in cases where losses are worse than the anticipated values (e.g., a burst of length $b_i$ starting in data frame i where more than $l_i$ fraction of the packets are lost for each data frame j in the burst might be recovered, albeit after over more than τ time slots). For example, if P[i] is the parity symbols as defined under CSIPBRAL, the parity symbols to be sent may be P[i]+P⁺[i] and G[i]+G⁺[i] where each of P⁺[i] and G⁺[i] comprises random linear combinations of the symbols of data frames (i−τ') through (i−τ−1) for some τ' larger than τ; formally, $$P^+[i] = \sum_{j=i-\tau'}^{i-\tau-1} A_i^j D[j]$$

and $$G^+[i] = \sum_{j=i-\tau'}^{i-\tau-1} C_i^j D[j],$$

where each $A_i^j$ and $C_i^j$ are matrices with entries drawn uniformly at random from the field.

Even if CSIPBRAL might not be able to recover certain lost packets, the failsafe mechanism on top of CSIPBRAL may lead to loss recovery (albeit with a latency of more than τ). Recovering data frames after their deadline is still useful due to inter-frame dependencies, as later data frames are playable once all prior data frames have been recovered. A complementary failsafe can be used either in combination or instead of the aforementioned failsafe as follows: feedback can be sent from the receiver to the sender to generate a keyframe (i.e., an uncompressed frame that does not depend on prior uncompressed frames), e.g., by triggering the new keyframe when data frame i has not been recovered by some threshold number of time slots later (e.g., by time slot (i+τ'+1)). The keyframe may also be requested sooner if frame i is deemed unlikely to be recovered, e.g., if the fraction of packets lost during time slot i greatly exceeds $l_i$.

Figure 82:
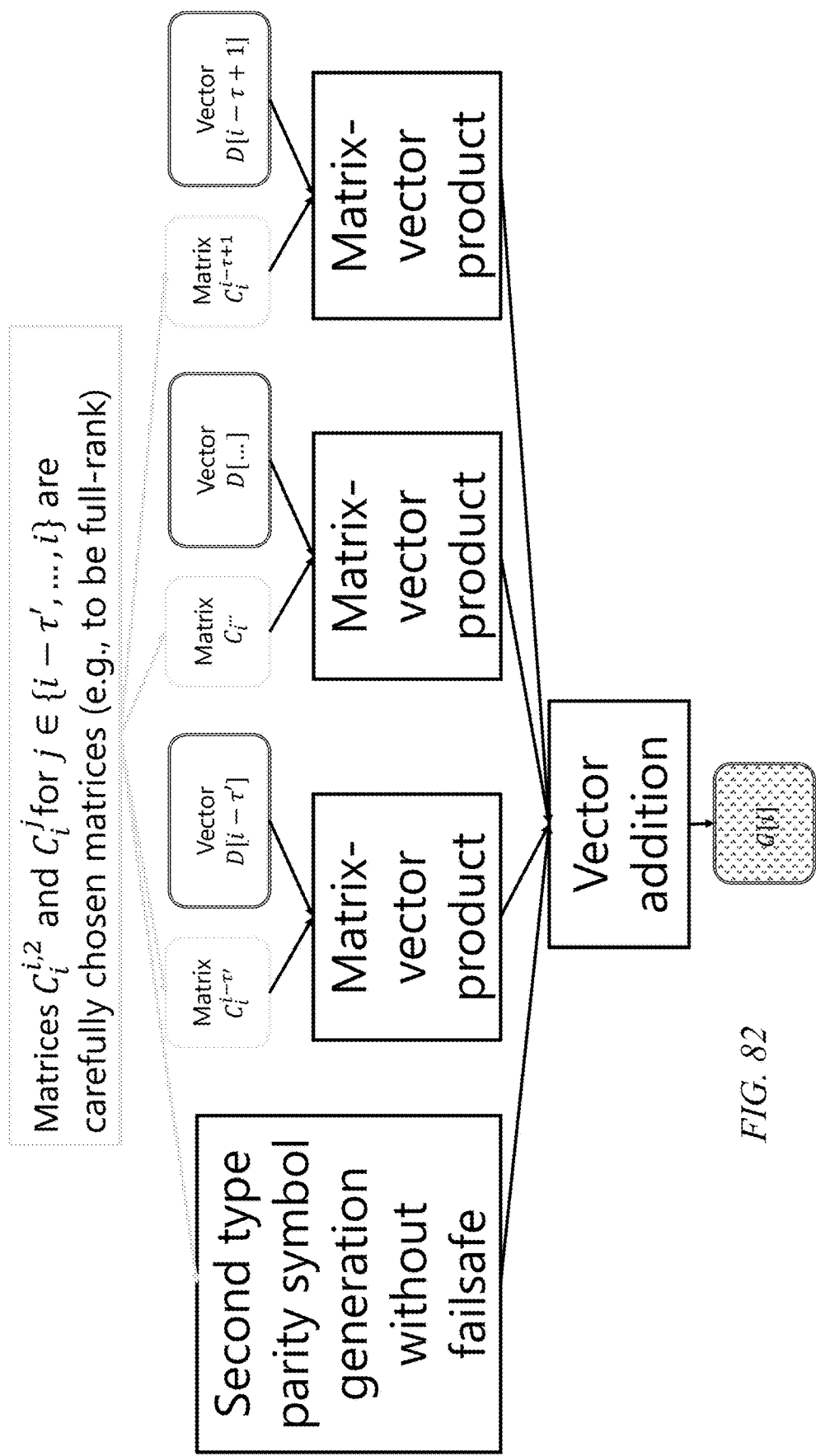
FIG. 82 shows second type parity symbol generation for the ith data frame in accordance with FIG. 80, in accordance with certain embodiments.

FIG. 82 shows second type parity symbol generation for the ith data frame in accordance with FIG. 80, in accordance with certain embodiments. Here, the parity symbols for time slot i can now also be functions of some or all of both components of data frames (i−τ−1) through (i−τ') in addition to being functions of the same data from without the failsafe.

Figure 83:
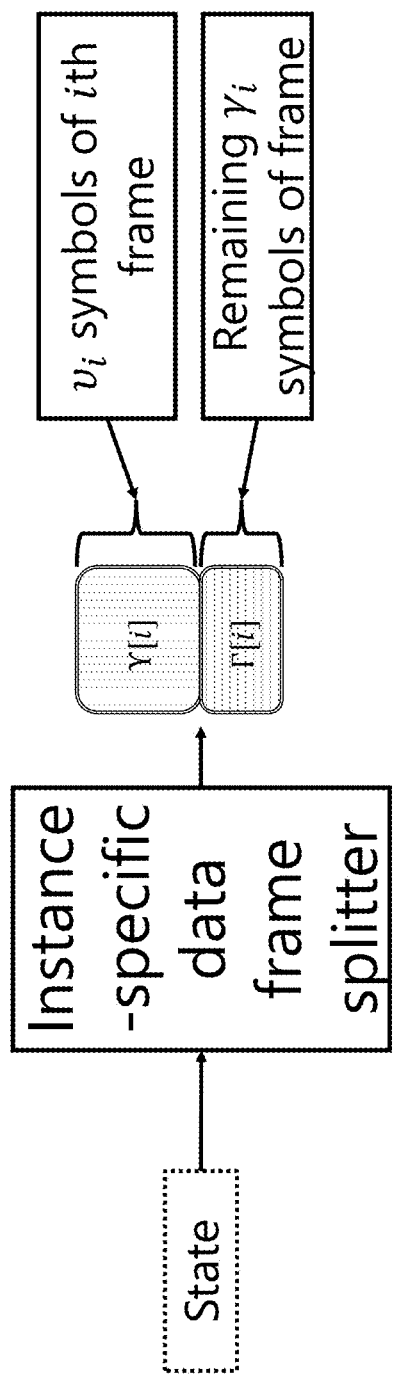
FIG. 83 illustrates data frame splitting for CSIPBRAL using an analogous process to CSIPB.

FIG. 83 illustrates data frame splitting for CSIPBRAL using an analogous process to CSIPB. Here, the data frame splitter enables for each data frame to allocate as many as $d_i$ or as few as 0 symbols to each of the two components. This is done using a methodology that can leverage information about the call (i.e., its inputs) as well as properties of the application, user preference, etc. Hence, this may be referred to as "instance specific" frame splitting. For example, it may be a machine learning model trained to optimize key metrics of the QoE (e.g., rate, freeze, fraction of rendered decompressed frames, latency of rendered decompressed frames, PSNR, SSIM, LPIPS, etc.); such a model may make use of properties of prior calls in the decision (e.g., if a very large data frame is likely to be followed by a smaller data frame, the model may exploit such a property). Another possible data frame splitter is a heuristic.

The ith data frame, D[i], is partitioned into two components: γ[i] and Γ[i]. In the event of a partial burst involving time slot i, t is the intention that (a) Γ[i:i+τ] will be recovered by timeslot (i+τ) (it suffices for Γ[i:i+τ−1] to be recovered by time slot (i+τ−1) and Γ[i+τ] to be recovered during time slot (i+τ), and (b) γ[i] will be recovered within τ additional data frames. In some cases, the size of Γ[i] ranges from 0 to some maximum value, $\gamma_i'$ (sometimes called $\gamma_i^{max}$), set to be as large as possible subject to the following constraint. Consider any partial burst starting in time slot j of length $b_j$ that encompasses data frame i. Then the first component of data frames j through i can be recovered by time slot (j+τ−1) assuming that all symbols of data frames after data frame i have all of their symbols allocated to the second component (i.e., if $\gamma_z=0$ for $z \in \{i+1, \ldots, j+b_j-1\}$). Then a procedure is used to select an integral value between 0 and $\gamma_i$ reflecting the number of symbols allocated to $\Gamma[i]$. For example, this procedure may be a learning-based approach.

The splitting of the data frame may depend on metadata of frame such as its compression; for example, if certain symbols of D[i] are supplementary (i.e., the data frame is useful without them but even better with them), the size of the split and the decision of which symbols to allocate to the second component may be chosen so that the second component (i.e., $\gamma[i]$) contains the supplementary information. The reason for this is that it is the intention that for certain partial bursts the symbols of the first component (i.e., $\Gamma[i]$) are recovered strictly before the symbols of the second component, so such a decision may improve the QoE. In some instances, no such metadata will be available (i.e., it may not be tracked under the state in certain embodiments), so this type of information about the compression may not come into play.

Figure 84:
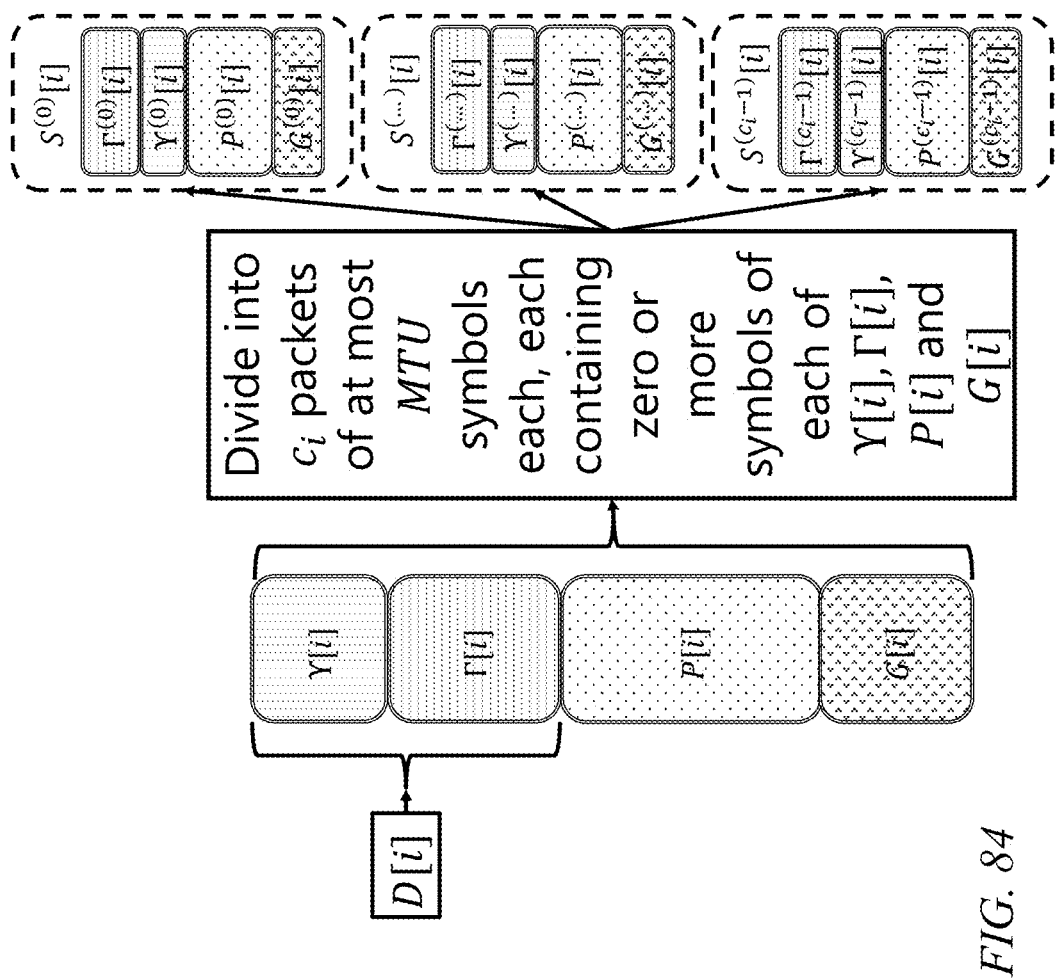
FIG. 84 shows the concept of packetization in accordance with CSIPBRAL.

FIG. 84 shows the concept of packetization in accordance with CSIPBRAL.

Here, packetization involves distributing the symbols of $\gamma[i]$, $\Gamma[i]$, P[i], and G[i] over some number, $c_i$, of packets such that (a) each packet has size at most MTU symbols, and (b) losses under a partial burst channel are recoverable such that each data frame is recovered within $\tau$ time slots. It suffices to receive approximately $(1-l_i)$ fraction of each of $\gamma[i]$, $\Gamma[i]$, P[i], and G[i]. Each packet may contain symbols from one, two, three, or four of: $\gamma[i]$, $\Gamma[i]$, P[i], and G[i].

Figure 85:
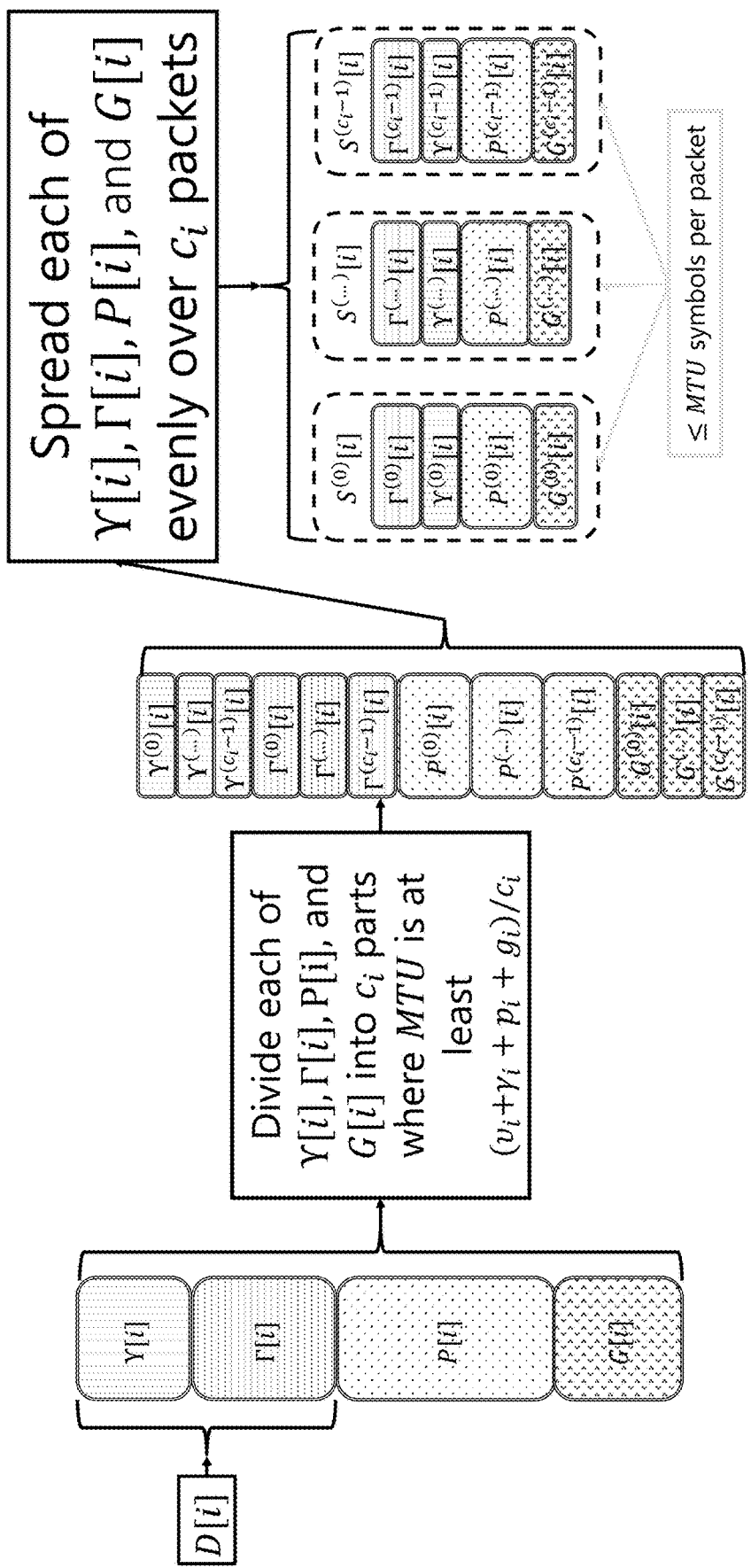
FIG. 85 shows one way for packetizing the ith data frame in accordance with CSIPBRAL (referred to herein as Packetization #2).

FIG. 85 shows one way for packetizing the ith data frame in accordance with CSIPBRAL (referred to herein as Packetization #2). Here, as few packets, $c_i$, are transmitted as possible so that when the data and parity symbols of a time slot are spread evenly over these packets, the following conditions hold: (a) Each packet's size does not exceed the maximum transmittable unit (for example, 1500 bytes), (b) the number of packets times $l_i$ is an integer (or, it is slightly less than an integer where the difference is deemed sufficiently small relative to the number of packets). Optionally, there may be another condition that the number of packets times $l_i^{(G)}$ is an integer (or slightly less than an integer where the difference is deemed sufficiently small relative to the number of packets). Then $\gamma[i]$ and $\Gamma[i]$ are zero-padded and the sizes of P[i] and G[i] are increased, each by as little as possible to ensure the sizes of $\gamma[i]$, $\Gamma[i]$, P[i] and G[i] are divisible by $c_i$. Each of $\gamma[i]$, $\Gamma[i]$, P[i] and G[i] are evenly distributed over the $c_i$ packets. Again, this solution deviates from Tambur where all parity symbols are sent in separate packets from data symbols and number of packets is not chosen based on loss-recovery characteristics.

Figure 86:
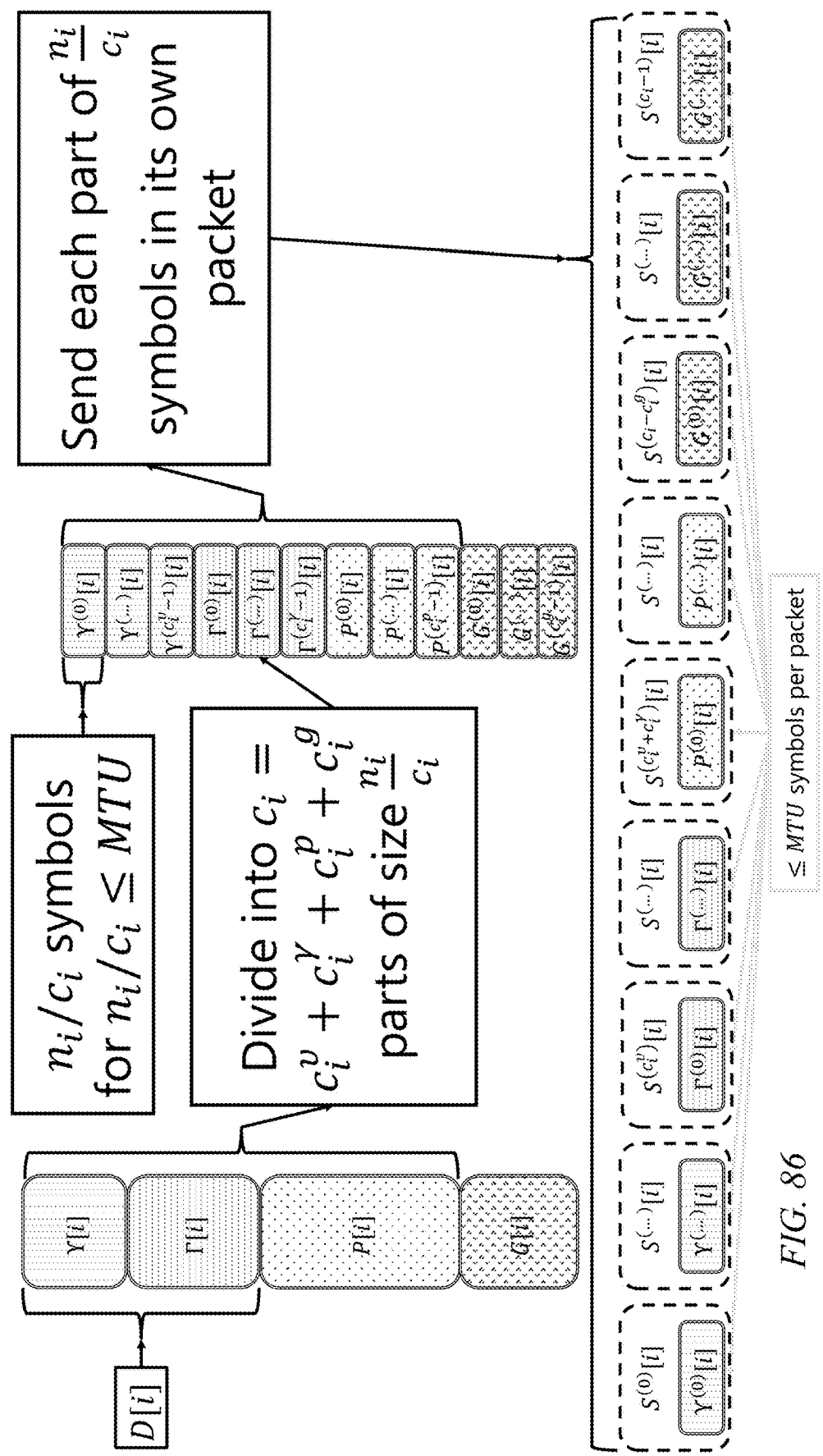
FIG. 86 shows a second way for packetizing the ith data frame in accordance with CSIPBRAL.

FIG. 86 shows a second way for packetizing the ith data frame in accordance with CSIPBRAL. Here, $\Gamma[i]$ is divided into $c_i^{\gamma}$ packets of size $$\frac{n_i}{c_i}$$

where $$\frac{n_i}{c_i} \leq MTU,$$

$\gamma[i]$ is divided into $c_i^{\upsilon}$ packets of size $$\frac{n_i}{c_i}$$

where $$\frac{n_i}{c_i} \leq MTU,$$

P[i] is divided into $c_i^P$ packets of size $$\frac{n_i}{c_i}$$

where $$\frac{n_i}{c_i} \leq MTU,$$

and G[i] is divided into $c_i^g$ packets of size $$\frac{n_i}{c_i}$$

where $$\frac{n_i}{c_i} \leq MTU;$$

then $c_i=(c_i^{\upsilon}+c_i^{\gamma}+c_i^P+c_i^g)$ packets are sent with each part in its own packet Note that the width is reduced in some cases for reasons of space. Also note that this solution may involve zero padding and or pushing the boundary between $\gamma[i]$ and $\Gamma[i]$ so as to fill each packet with $$\frac{n_i}{c_i}$$

symbols while minimizing zero padding.

Figure 87:
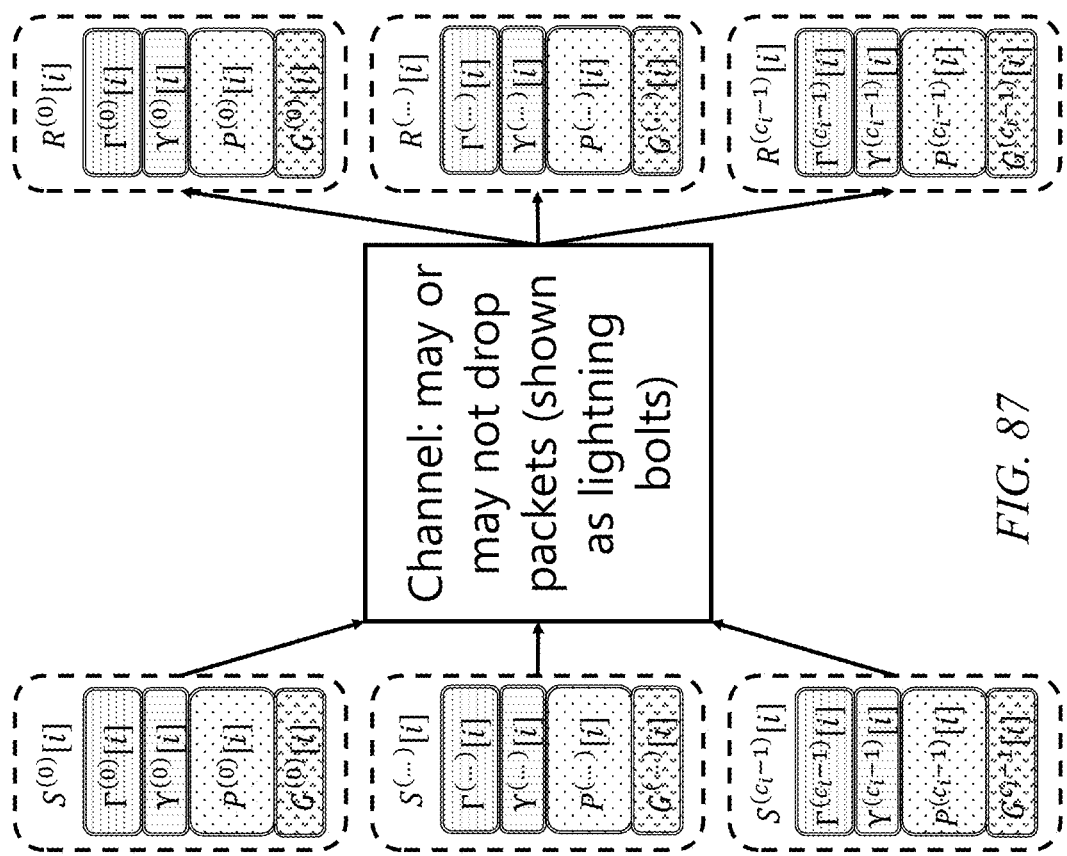
FIG. 87 illustrates how transmission switching is reflected from sent packets to received packets (e.g., based on packet loss/reception).

FIG. 87 illustrates how transmission switching is reflected from sent packets to received packets (e.g., based on packet loss/reception).

Figure 88:
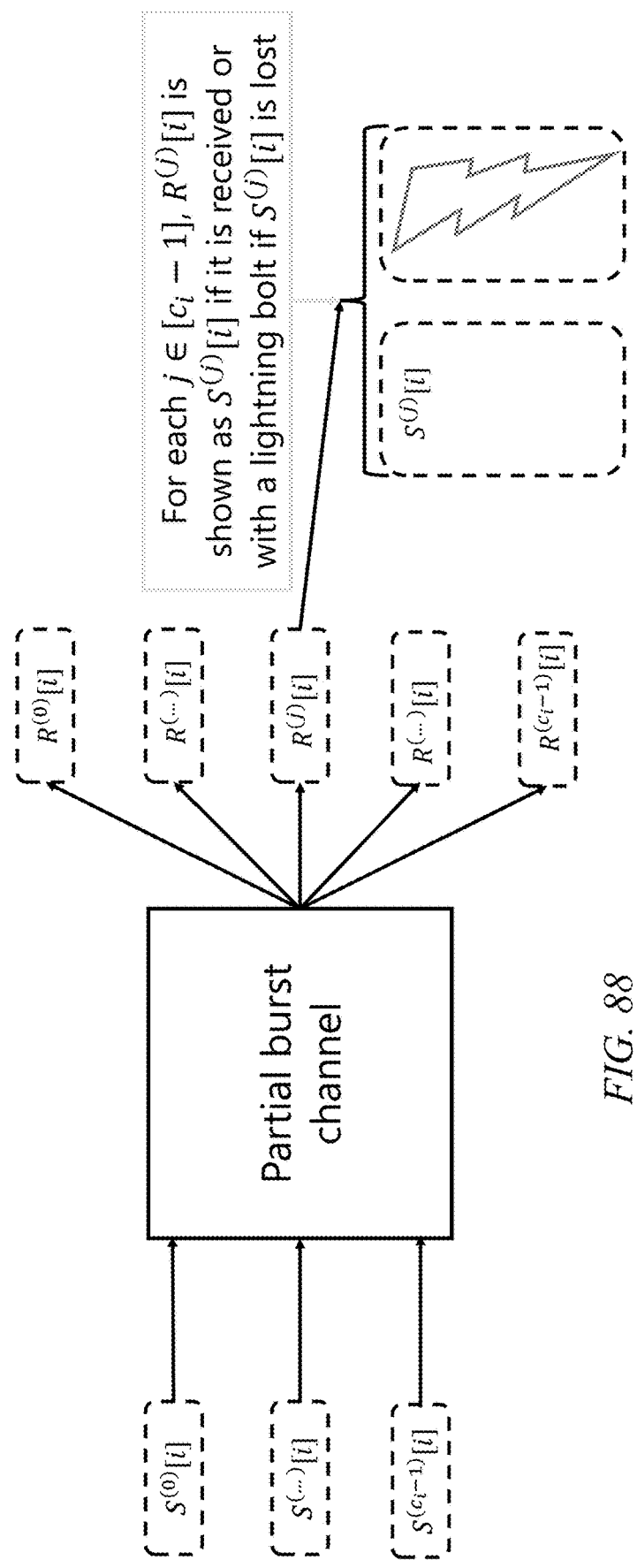
FIG. 88 provides a simplified illustration of how transmission switching is reflected from sent packets to received packets (essentially same as CSIPB) (e.g., based on packet loss/reception).

FIG. 88 provides a simplified illustration of how transmission switching is reflected from sent packets to received packets (essentially same as CSIPB) (e.g., based on packet loss/reception).

Figure 89:
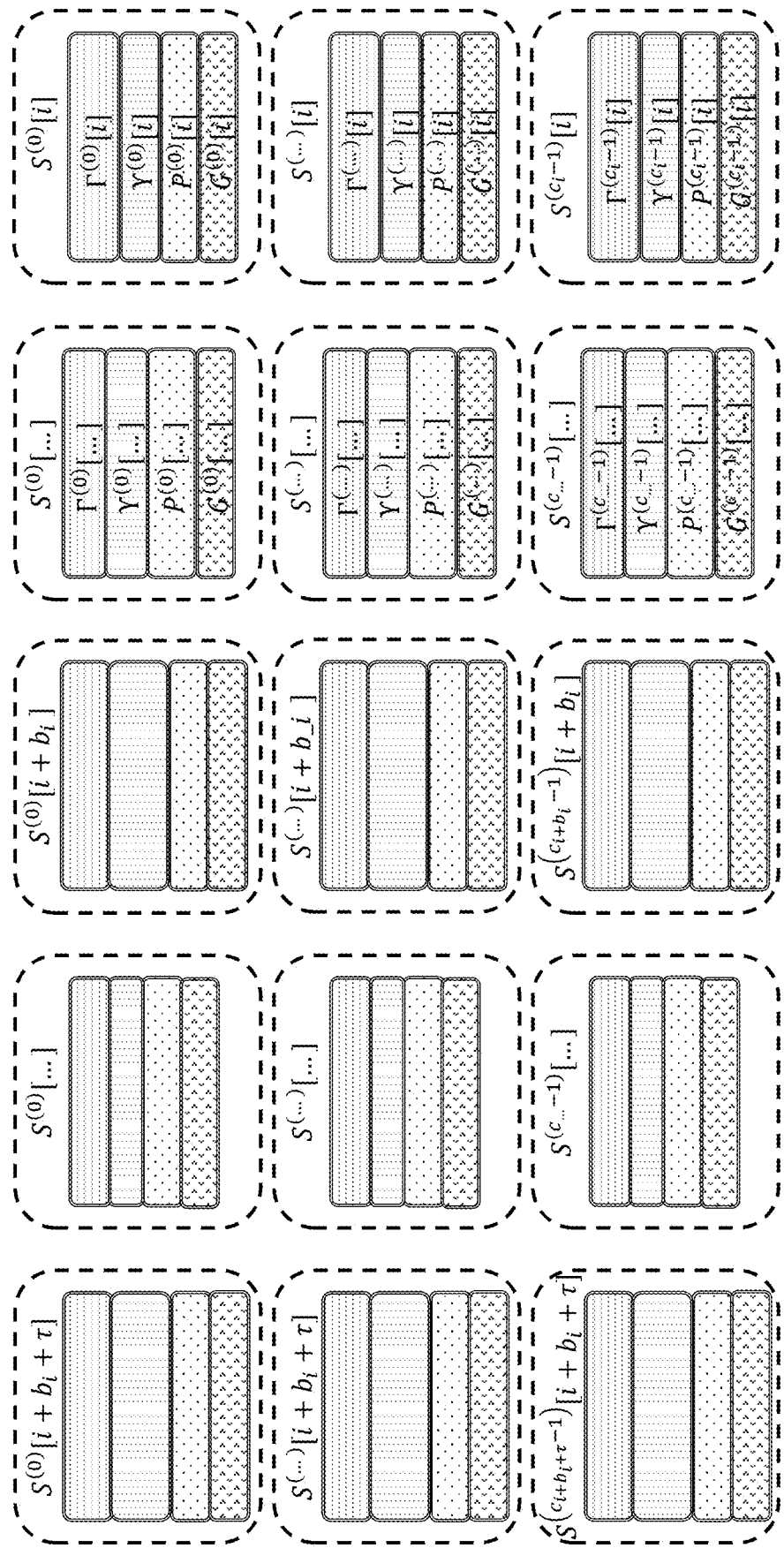
FIG. 89 shows an example of what is sent for time slots i through $(i+b_i+\tau)$.

FIG. 89 shows an example of what is sent for time slots i through $(i+b_i+\tau)$. Here, for each $j \in \{i+b_i, \ldots, i+b_i+\tau\}$ and each $z \in [c_j-1]$, (a) the box with horizontal lines inside of $S^{(z)}[j]$ is $\Gamma^{(z)}[j]$, (b) the box with vertical lines inside of $S^{(z)}[j]$ is $\gamma^{(z)}[j]$, (c) the box with black dots inside of $S^{(z)}[j]$ is $P^{(z)}[j]$, and (d) the box with black divots inside of $S^{(z)}[j]$ is G (z) [j]. An analogous convention can be defined by substituting R (z) [j] for $S^{(z)}[j]$. The conventions are assumed to hold elsewhere unless otherwise specified.

The intended loss recovery of a partial burst loss using CSIPBRAL is now described with reference to FIGS. 90-96.

Note that lightning bolts sometimes will change to no longer overlap a vector (e.g., $\Gamma^{(z)}[i]$) once it has been recovered.

Figure 90:
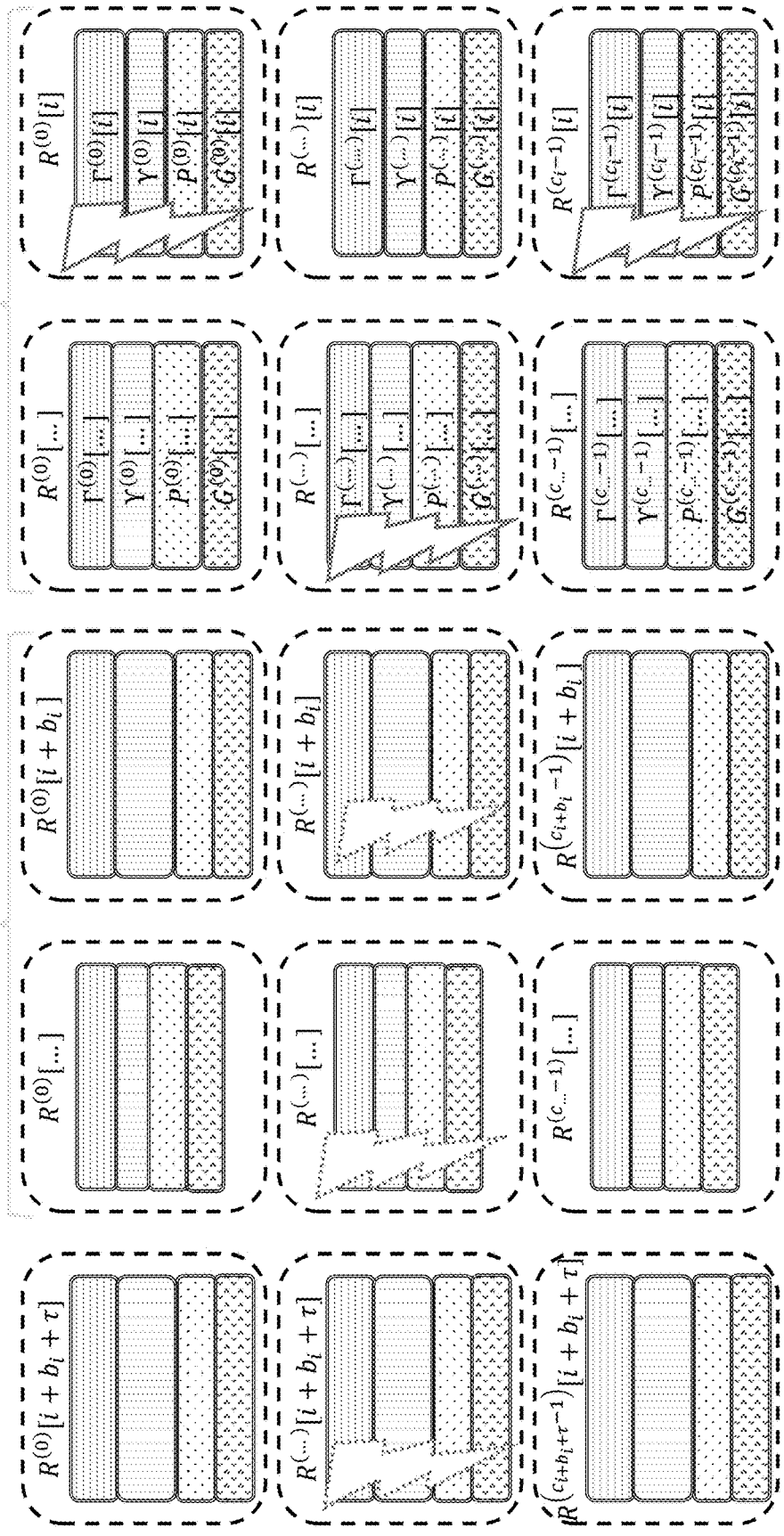
FIG. 90 shows an example of what may be received for time slots i through $(i+b_i+\tau)$ for non-negative integers i, $b_i$, and τ.

FIG. 90 shows an example of what may be received for time slots i through $(i+b_i+\tau)$ for non-negative integers i, $b_i$, and $\tau$. Here, for each $j \in \{i+b_i, \ldots, i+b_i+\tau\}$ and each $z \in [c_j-1]$, (a) the box with horizontal hashes inside of $R^{(z)}[j]$ is $\Gamma^{(z)}[j]$, (b) the box with vertical lines inside of $R^{(z)}[j]$ is $\gamma^{(z)}[j]$, (c) the box with black dots inside of $R^{(z)}[j]$ is $P^{(z)}[j]$, and (d) the box with black divots inside of R (z) [j] is G (z) [j]. In order to distinguish (a) time slots j of a partial burst wherein up to $[1_j c_j]$ packets are lost from (b) time slots j' of a partial guard space wherein up to $[1_{j'}^{(G)} c_{j'}]$ packets are lost, the convention is used of showing a lightning bolt with (a) a thick outline, and (b) an outline with dashes of squares to reflect the two respective type of losses.

Figure 91:
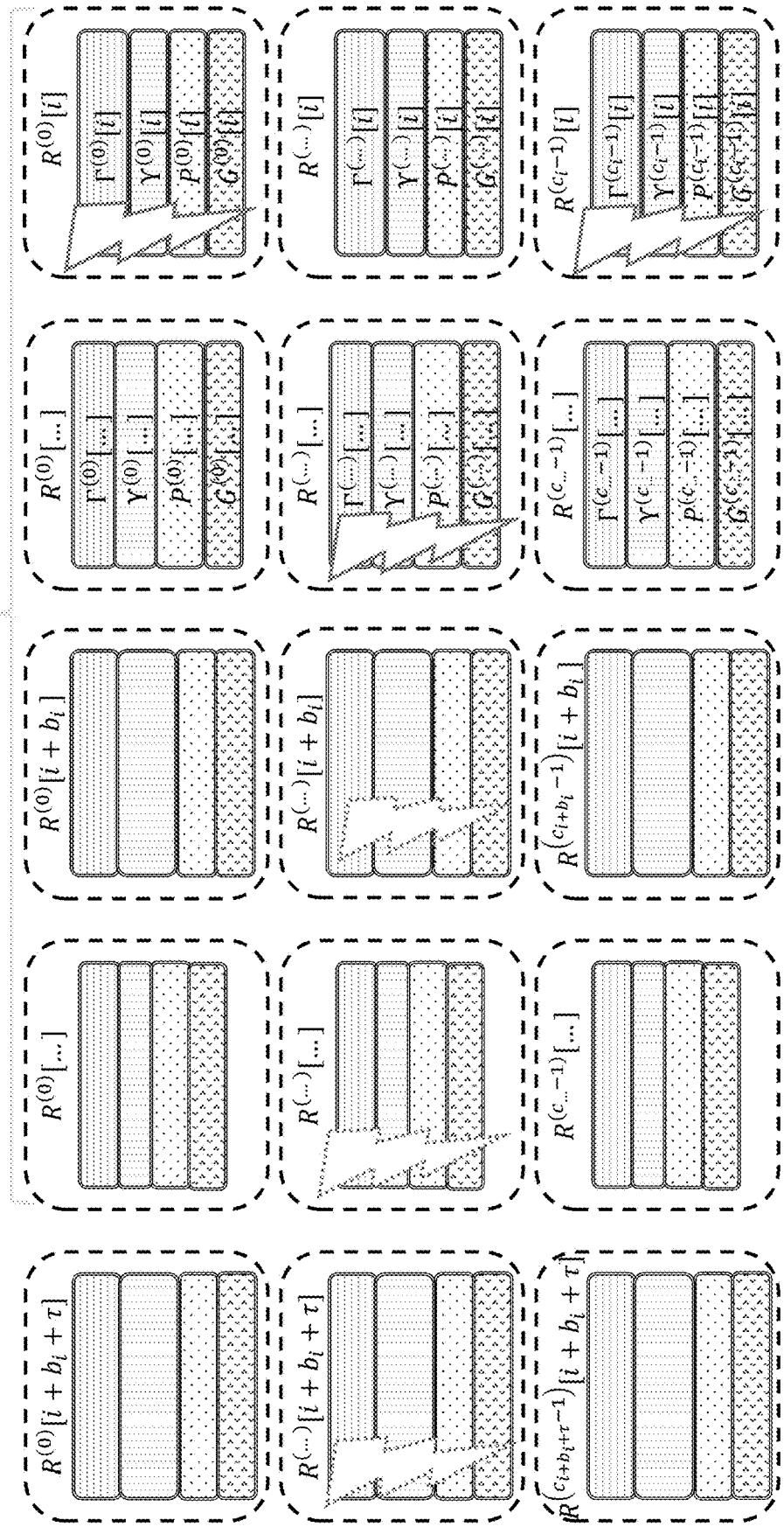
FIG. 91 illustrates recovery of lost symbols of $\Gamma[i], \ldots, \Gamma[i+\tau-1]$ and $\gamma[i+b_i], \ldots, \gamma[i+\tau-1]$ by time slot $(i+\tau-1)$ in accordance with certain embodiments of CSIPBRAL.

FIG. 91 illustrates recovery of lost symbols of $\Gamma[i], \ldots \Gamma[i+\tau-1]$ and $\gamma[i+b_i], \ldots \gamma[i+\tau-1]$ by time slot $(i+\tau-1)$ with the received symbols of $P[i:i+\tau-1]$, $G[i+b_i:i+\tau-1]$, $\Gamma[i:i+\tau-1]$, and $\gamma[i+b_i:i+\tau-1]$ as well as with (the already recovered) symbols of $D[i-\tau:i-1]$. It is assumed that the symbols of $D[i-\tau:i-1]$ are already decoded by time slot $(i+\tau-1)$. Note that such recovery is not necessarily a requirement but is feasible with certain embodiments. For ease of presentation, we show an embodiment where $\Gamma[i:i+\tau-1]$ and $\gamma[i+b_i:i+\tau-1]$ are recovered during time slot $(i+\tau-1)$; in other embodiments, $\Gamma[i:i+\tau-1]$ may not be recovered until time slot $(i+\tau)$ and $\gamma[j]$ for $j \in \{i+b_i, \ldots, i+\tau-1\}$ may not be recovered until time slot $(j+\tau)$.

Figure 92:
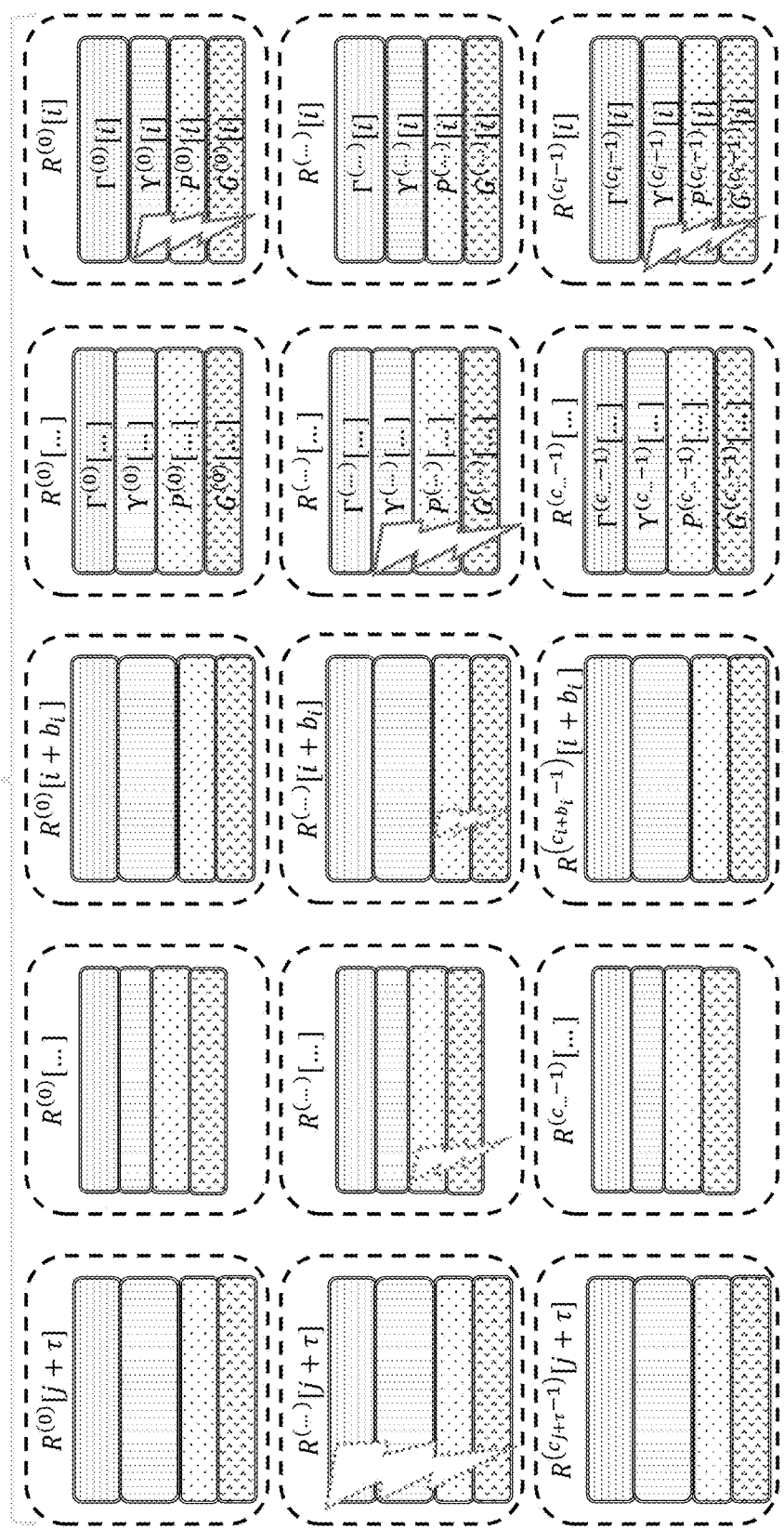
FIG. 92 illustrates recovery of lost symbols $\gamma[j], \gamma[j+\tau]$ and $\Gamma[j+\tau]$ during time slot $(j+\tau)$ in accordance with CSIPBRAL.

FIG. 92 illustrates for $j \in \{i, \ldots, i+b_i-1\}$ recovery of the lost symbols of $\gamma[j]$, $\gamma[j+\tau]$, and $\Gamma[j+\tau]$ during time slot $(j+\tau)$ with (a) $\Gamma[j:j+\tau-1]$ and $\gamma[i+b_i:j+\tau-1]$, and (b) the received symbols of $\gamma[j]$, $\Gamma[j+\tau]$, $\gamma[j+\tau]$, $G[j+\tau]$, $P[j+\tau]$, and $G[j]$. It is assumed that the symbols of (a) are already decoded by time slot $(i+\tau-1) \le (j+\tau)$. It is also assumed that $D[j-\tau:j-1]$ have been decoded before time slot $(j+\tau)$. We note that in certain other embodiments (e.g., where $G[j]$ is defined to use the optional grey arrows in FIGS. 77 and 80), $\gamma[i+b_i:i+b_i-1+\tau]$ may not be recoverable until time slot $(i+b_i-1+\tau)$.

Figure 93:
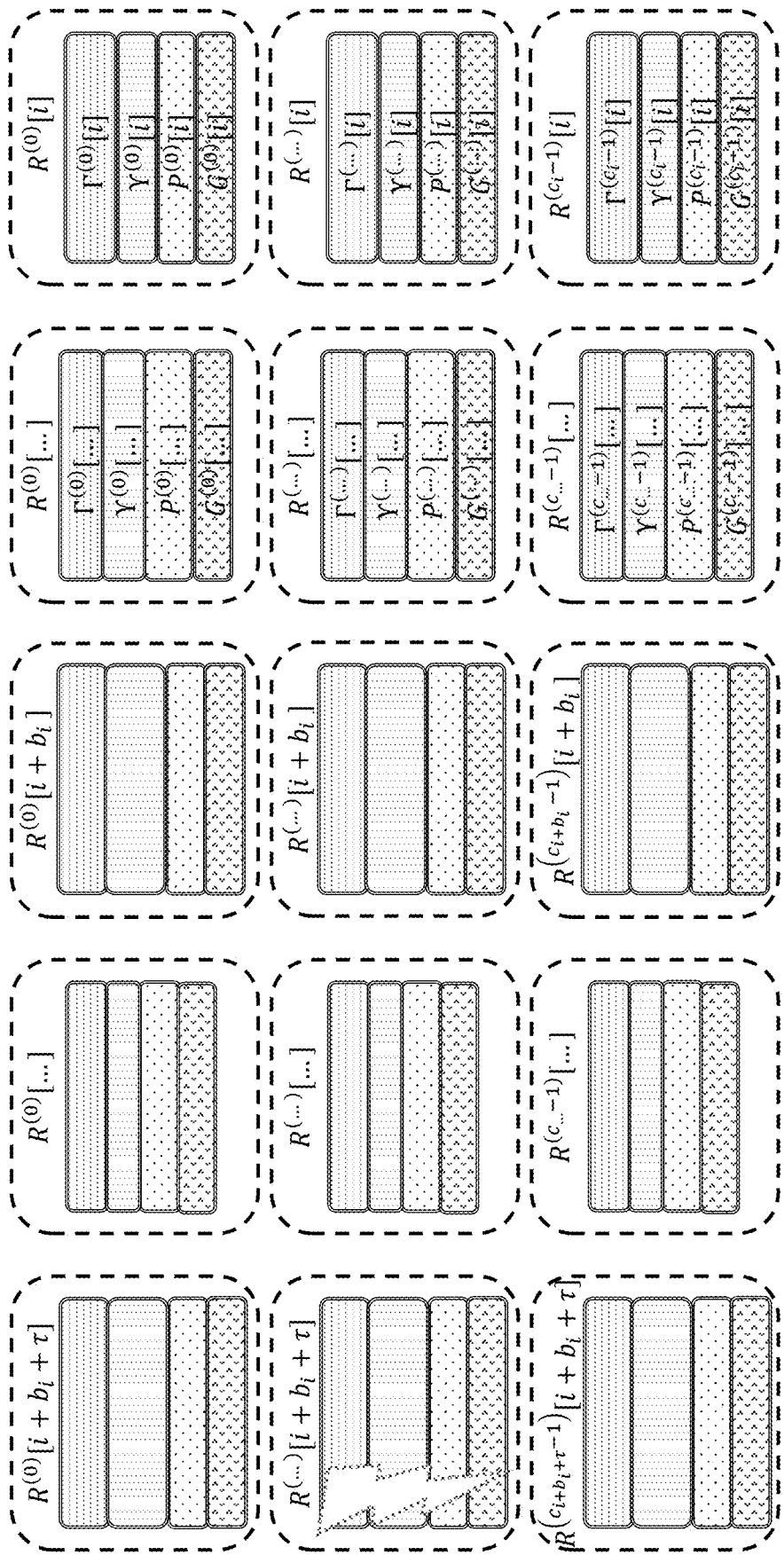
FIG. 93 shows one possible state of the system following the recovery of FIG. 92; lost parity symbols prior to time slot $(i+b_i+\tau)$ are shown as available because they can be computed using the recovered and received data, and certain packets of time slot $(i+b_i+\tau)$ are shown as lost (as part of the partial guard space, although a partial burst could have started during time slot $(i+b_i+\tau)$).

FIG. 93 shows a representation of one possible state of the system following the recovery of FIG. 92 (wherein up to $1_{i+b_i+\tau}^{(G)}$ fraction of the packets sent during time slot $(i+b_i+\tau)$ are lost). In embodiments where $G[i]$ is only used to recover $\gamma[i]$ (i.e., grey arrows not used), it can be assumed that $\gamma[j+\tau]$ is recovered with $\gamma[j]$ during time slot $(j+\tau)$. It also can be assumed during time slot $(i+b_i+\tau-1)$ that $\gamma[i+b_i:i+\tau-1]$ is recovered.

Figure 94:
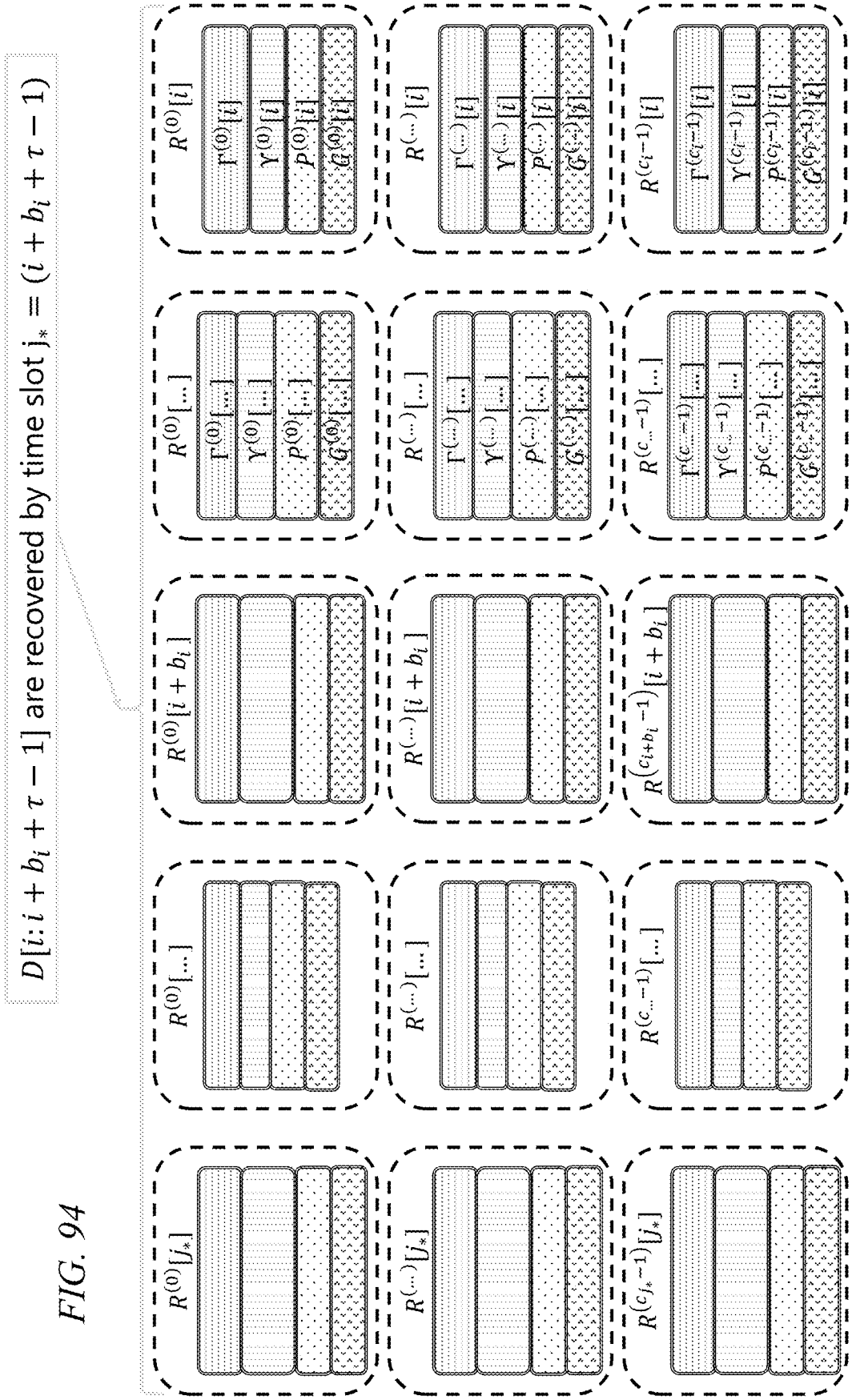
FIG. 94 shows $D[i:i+b_i+\tau-1]$ recovered by time slot $(i+b_i+\tau-1)$.

In FIG. 94, $D[i:i+b_i+\tau-1]$ are recovered by time slot $(i+b_i+\tau-1)$. This means it is also possible to compute $P[i:i+b_i+\tau-1]$ and $G[i:i+b_i+\tau-1]$ (so they are shown as recovered, even though one typically would not in practice compute the lost parity symbols).

Figure 95:
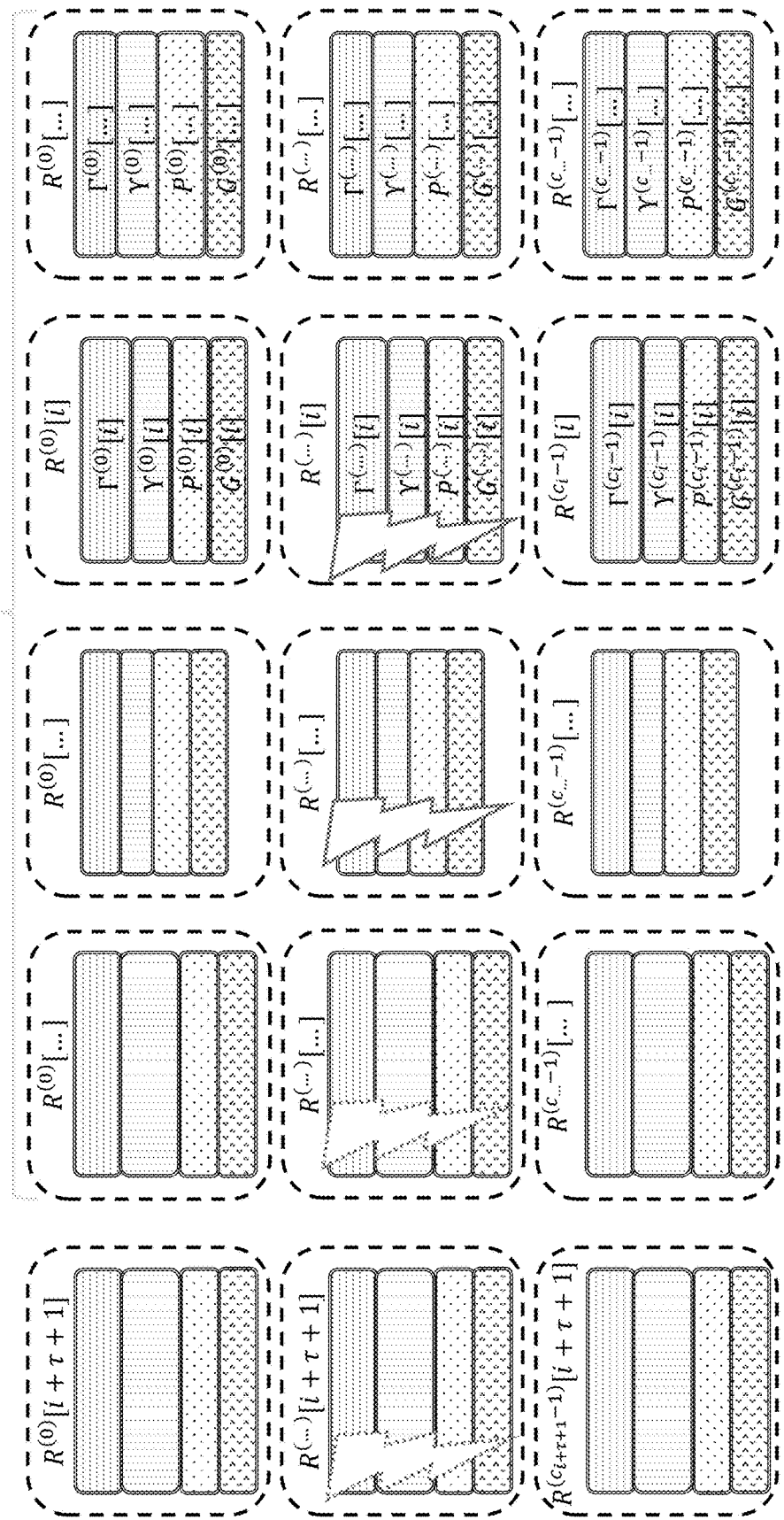
FIG. 95 illustrates recovery of all lost symbols of D[i] during time slot $(i+\tau)$ by solving a system of linear equations over $D[i-\tau:i+\tau]$ using the recovered symbols of $D[i-\tau:i-1]$ as well as the received symbols of (a) $P[i:i+\tau]$, (b) $D[i:i+\tau]$, and (c) $G[i:i+\tau]$.

FIG. 95 illustrates recovery of all lost symbols of $D[i]$ during time slot $(i+\tau)$ by solving a system of linear equations over $D[i-\tau:i+\tau]$ using the recovered symbols of $D[i-\tau:i-1]$ (available by time slot $(i+\tau-1)$ as well as the received symbols of (a) $P[i:i+\tau]$, (b) $D[i:i+\tau]$, and (c) $G[i:i+\tau]$. It is assumed that the symbols of $D[i-\tau:i-1]$ are assumed to already be decoded by time slot $(i+\tau)$. The figure includes symbols of $\gamma[i+1:i+\tau]$ and $G[i+1:i+\tau]$, which can be used in solving the system of linear equations but is not necessary in certain embodiments. Generally speaking, such loss recovery can be viewed as follows. Recover all lost symbols of $D[i]$ during time slot $(i+\tau)$ by solving a system of linear equations over (a) the received symbols of $P[i:i+\tau]$, (b) the received symbols of $D[i]$, (c) the received symbols of $G[i]$, (d) the received symbols of $\Gamma[i+1:i+\tau]$, and (e) $D[i-\tau:i-1]$. One way to do so is to use Gaussian Elimination to solve the system of linear equations.

Figure 96:
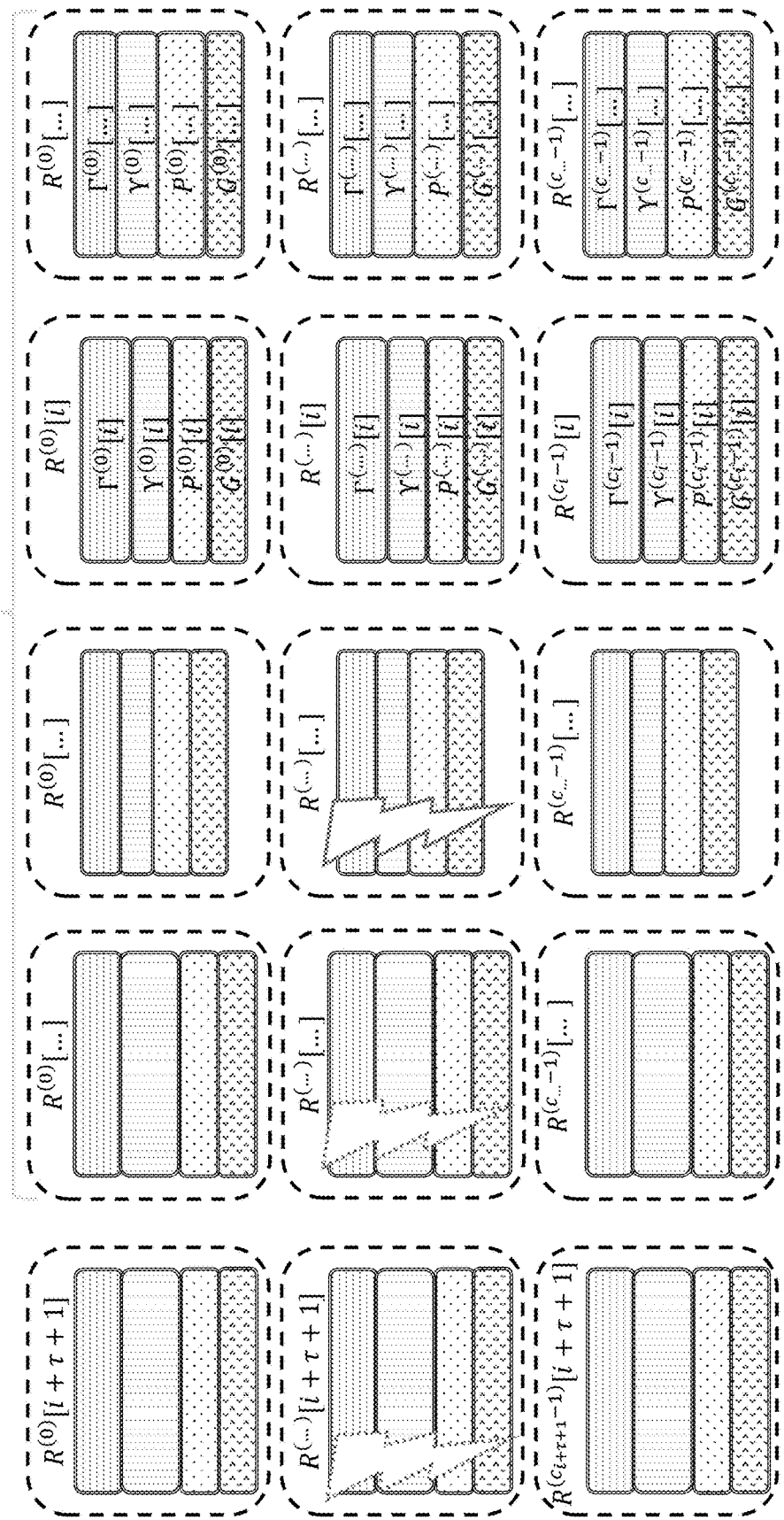
FIG. 96 shows lightning bolts reflecting that symbols of $R[i+1:i+\tau-1]$ may be lost; however, it is possible that some of these symbols have been recovered (e.g., the symbols of $\Gamma[i+1:i+\tau-1]$ and $\gamma[i+b_i:i+\tau-1]$ may already decoded by time slot $(i+\tau-1)$ in certain embodiments).

FIG. 96 shows lightning bolts reflecting that symbols of $R[i+1:i+\tau-1]$ may be lost (the convention is used of showing a lightning bolt with (a) a thick outline and (b) an outline with dashes of squares to reflect the loss in a partial burst vs. a partial guard space, respectively); however, it is possible that some of these symbols have been recovered (e.g., the symbols of $\Gamma[i+1:i+\tau-1]$ and $\gamma[i+b_i:i+\tau-1]$ may already decoded by time slot $(i+\tau-1)$ in certain embodiments).

Figure 97:
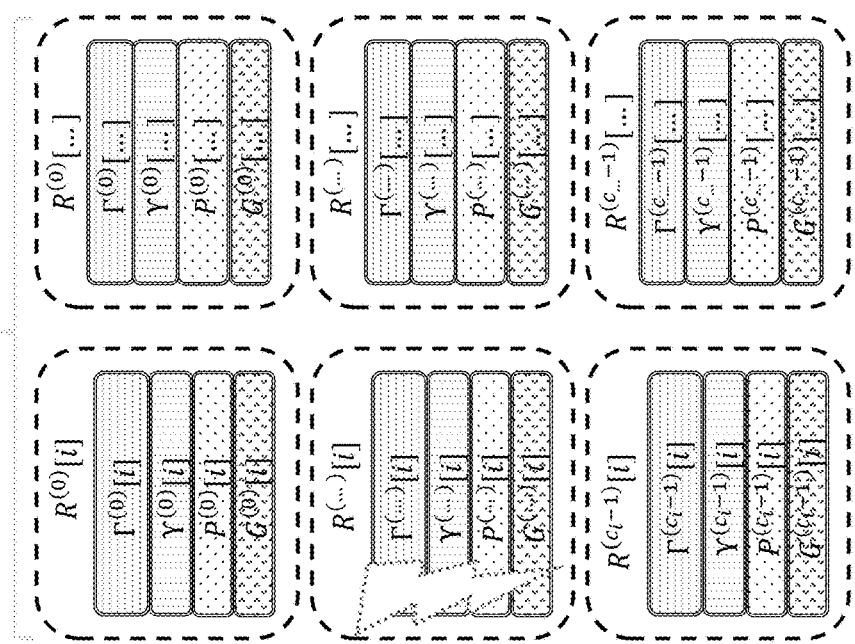
FIGS. 97-98 illustrate intended loss recovery if all prior data frames have been decoded (e.g., only guardspace loss or an earlier partial burst has been decoded along with all prior data frames).
Figure 98:
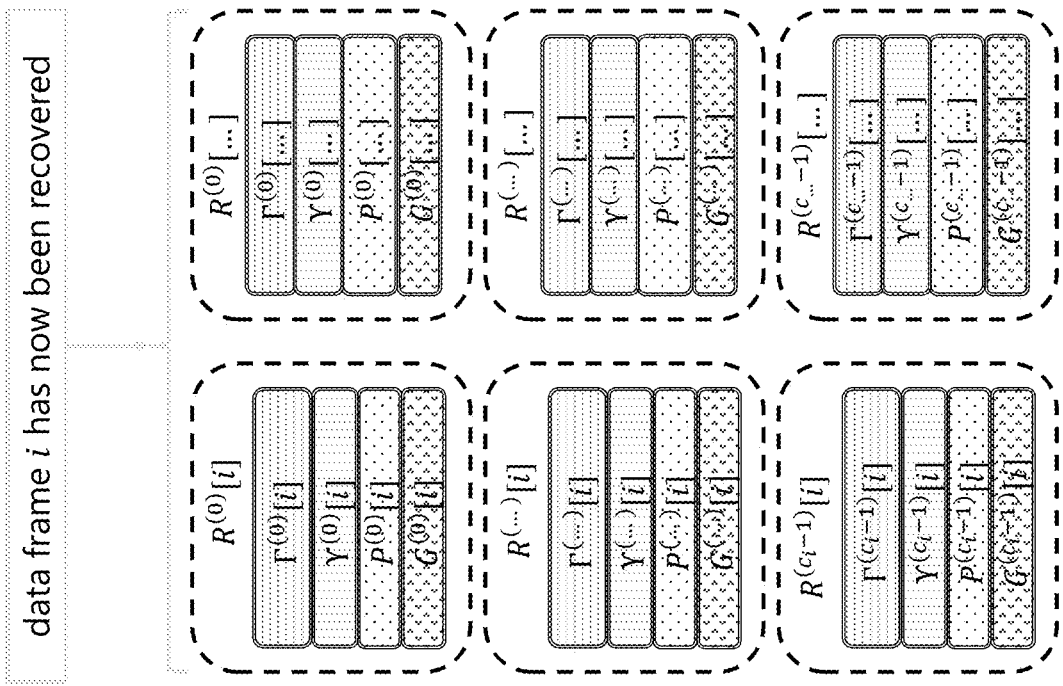

FIGS. 97-98 illustrate intended loss recovery if all prior data frames have been decoded (e.g., only guardspace loss or an earlier partial burst has been decoded along with all prior data frames). FIG. 97 illustrates recovery of all lost symbols of $D[i]$ during time slot i by solving a system of linear equations over $D[i-\tau:i-1]$ as well as the received symbols of (a) $P[i]$, (b) $D[i]$, and (c) $G[i]$. FIG. 98 illustrates the system after data frame i has been recovered. In FIGS. 97-98, it is assumed that failsafe is not used. If failsafe is used, it would be assumed that $D[i-\tau':i-1]$ are available.

Figure 99:
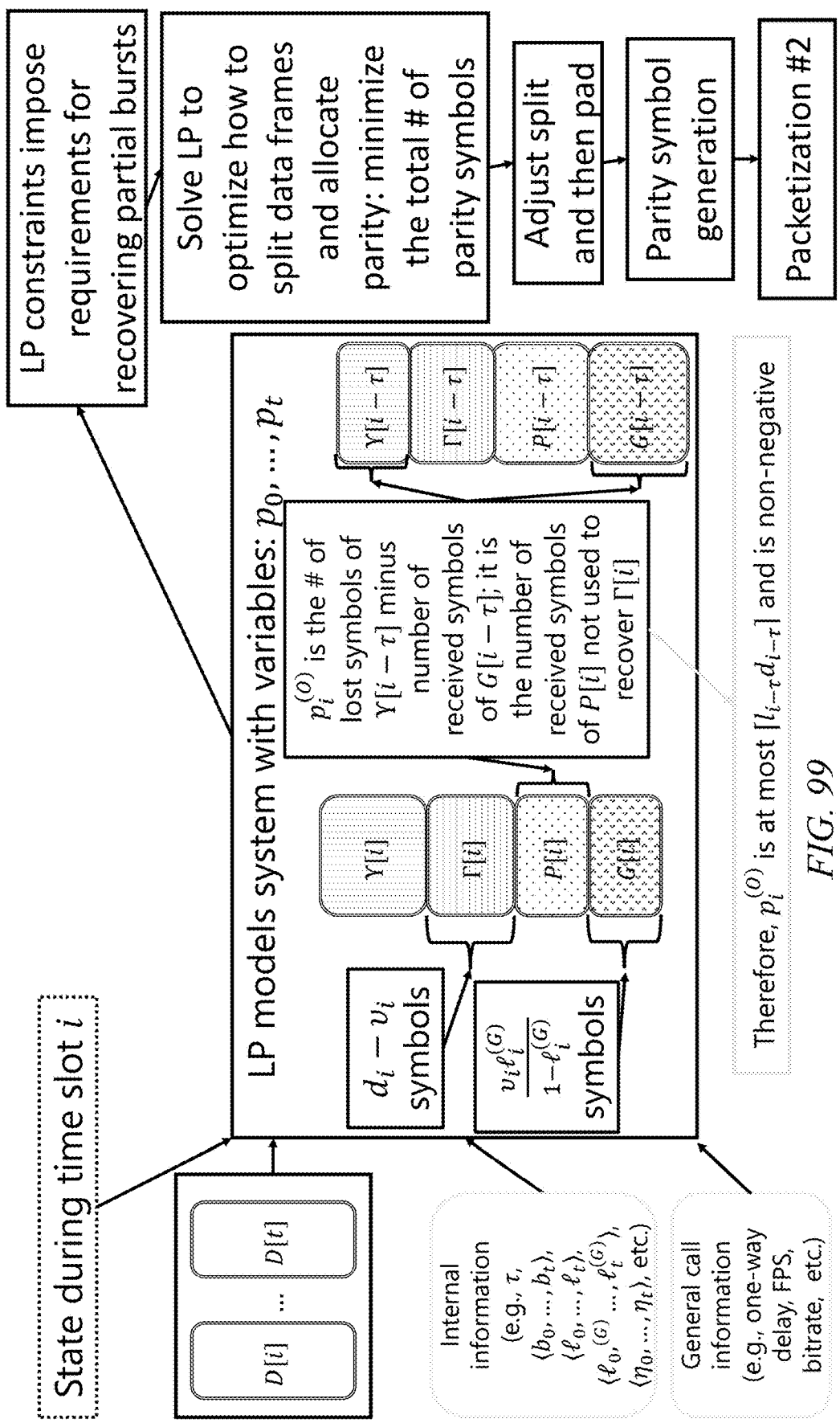
FIG. 99 schematically shows an offline optimization to find splits and parity allocation via a linear program, in accordance with one embodiment.

In an offline setting, where sizes of future frames are available, an offline optimization can be used to find splits and parity allocation, e.g., via a linear program. FIG. 99 schematically shows an offline optimization to find splits and parity allocation via a linear program, in accordance with one embodiment.

Figure 100:
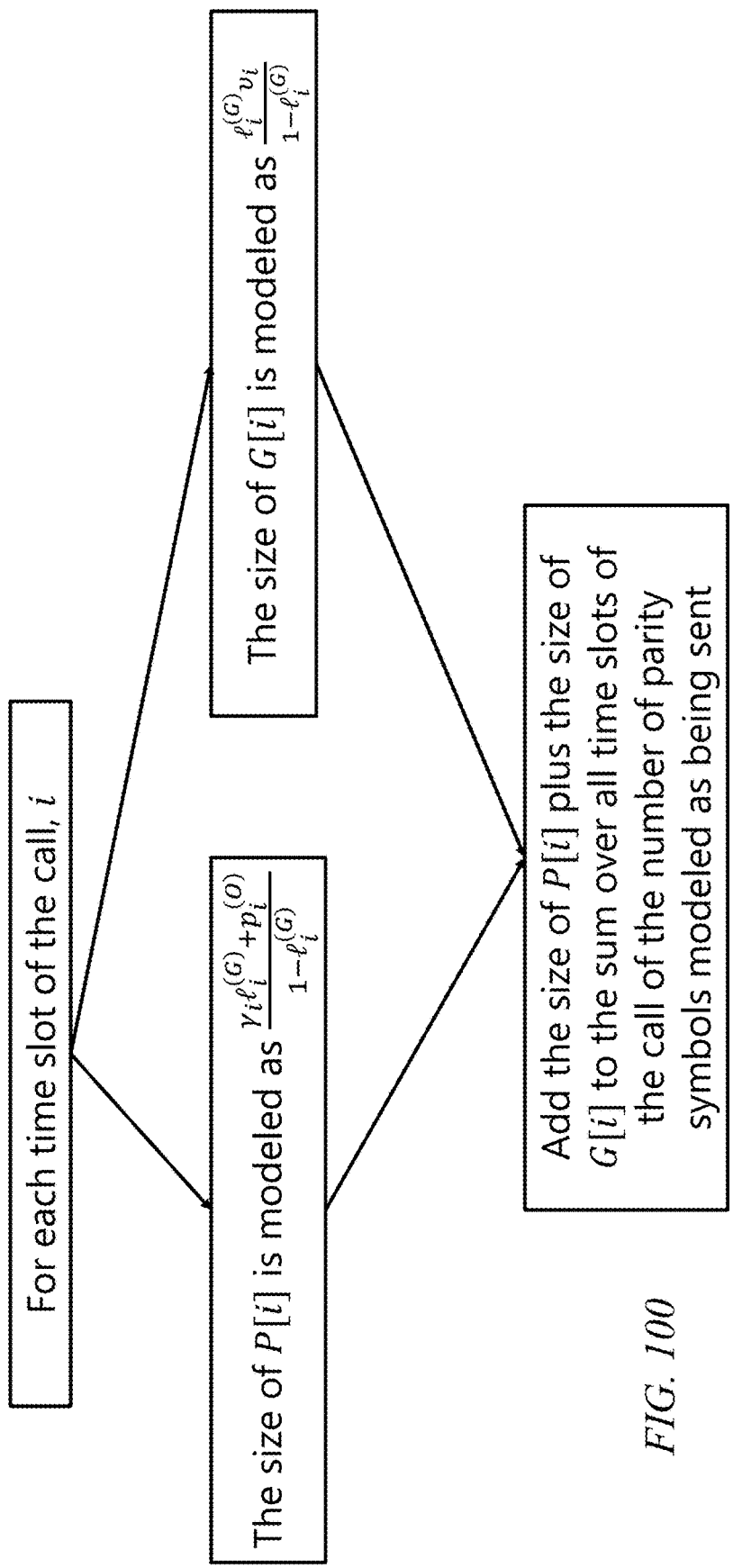
FIG. 100 shows the system computing the total number of parity symbols.

In FIG. 100, the system computes the total number of parity symbols. Here, $p_i^{(o)}$ is modeled as the number of received parity symbols of $P[i]$ that are useful to recover earlier data frames, i.e., $(1-l_i^{(G)})p_i$; this is the size of the parity of time slot i that would have occurred if $1_j^{(G)}=0$ for all j (i.e., this is the pre-allocated parity). Here, this is modeled as adjusting the amount of parity sent during time slot i only during time slot i and doing so by (a) increasing the number of parity symbols by factor of $$\frac{1}{1-l_i^{(G)}},$$

(b) adding $$\frac{d_i l_i^{(G)}}{1-l_i^{(G)}} = \frac{\gamma_i l_i^{(G)}}{1-l_i^{(G)}} + \frac{v_i l_i^{(G)}}{1-l_i^{(G)}}$$

extra parity symbols. This ensures if a partial burst occurs and includes time slot $(i-\tau)$ that after the partial guard space losses occur, there remain enough received parity symbols to have (a) $p_i^{(o)}$ to recover the remaining missing symbols of $\gamma[i-\tau]$ (i.e., the second component from $\tau$ frames before), $$\frac{\gamma_i l_i^{(G)}}{1-l_i^{(G)}} \qquad (b)$$

parity symbols to recover the missing symbols of $\Gamma[i]$ (i.e., the first component of the current frame), and $$\frac{v_i l_i^{(G)}}{1-l_i^{(G)}} \qquad (c)$$

parity symbols to recover the missing symbols of γ[i] (i.e., the second component of the current frame).

Figure 101:
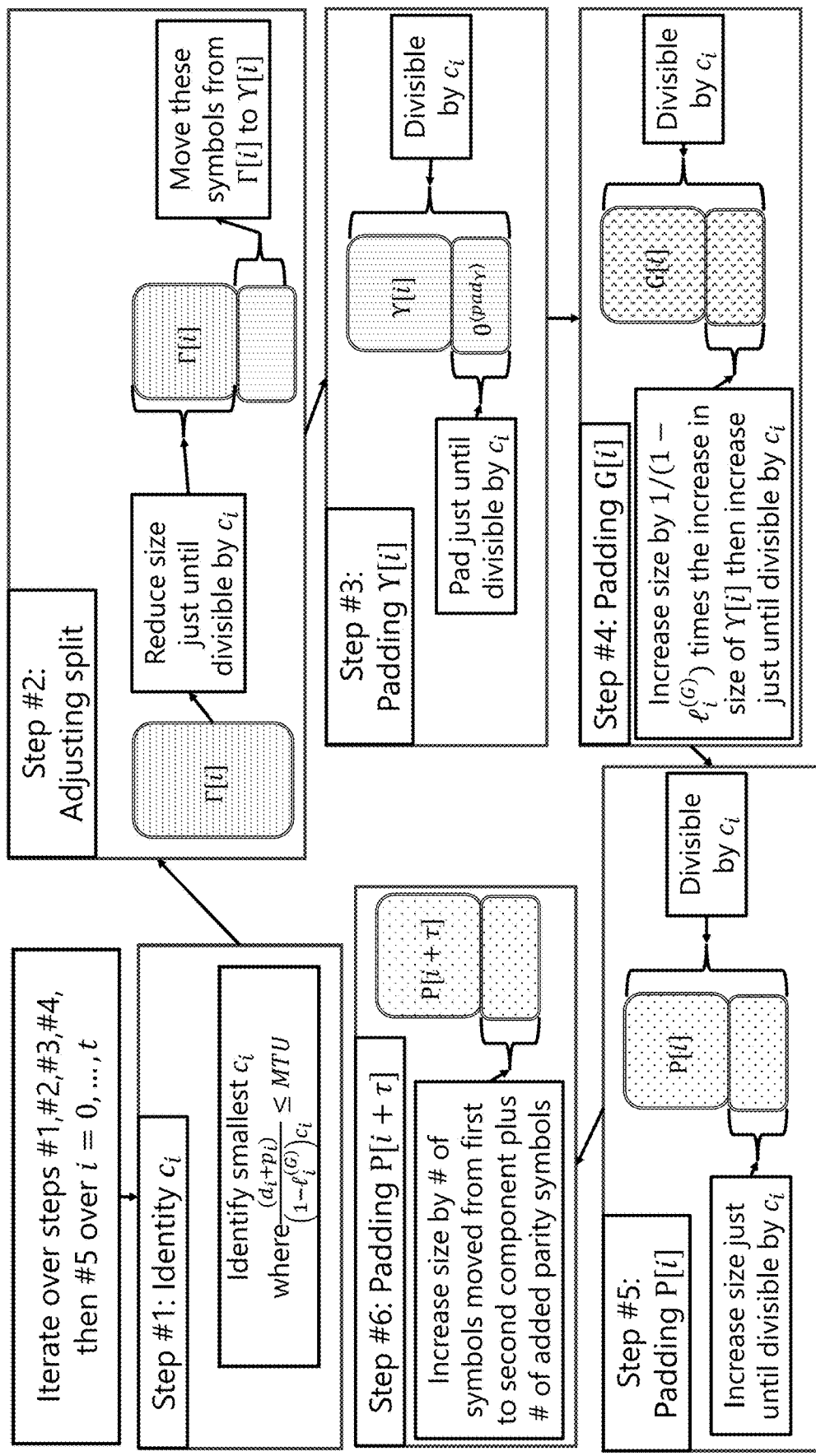
FIG. 101 shows one way to adjust the split and add padding.

FIG. 101 shows one way to adjust the split and add padding to convert the variables from a solution to the linear program into quantities that can be used for communication. Here, the system ensures (a) the packetization is well defined while (b) maintaining the intended recovery properties for partial bursts (i.e., for a partial burst starting in time slot i with high probability (a) Γ[i:i+$b_i$−1] are recovered by time slot (i+τ−1) and (b) each γ[j] is recovered by time slot (j+τ) for j∈{, . . . , i+$b_j$−1}, and (c) after recovering D[i:i+$b_i$−1], D[i+$b_i$:i+$b_i$−1+τ] are recoverable.

Figure 102:
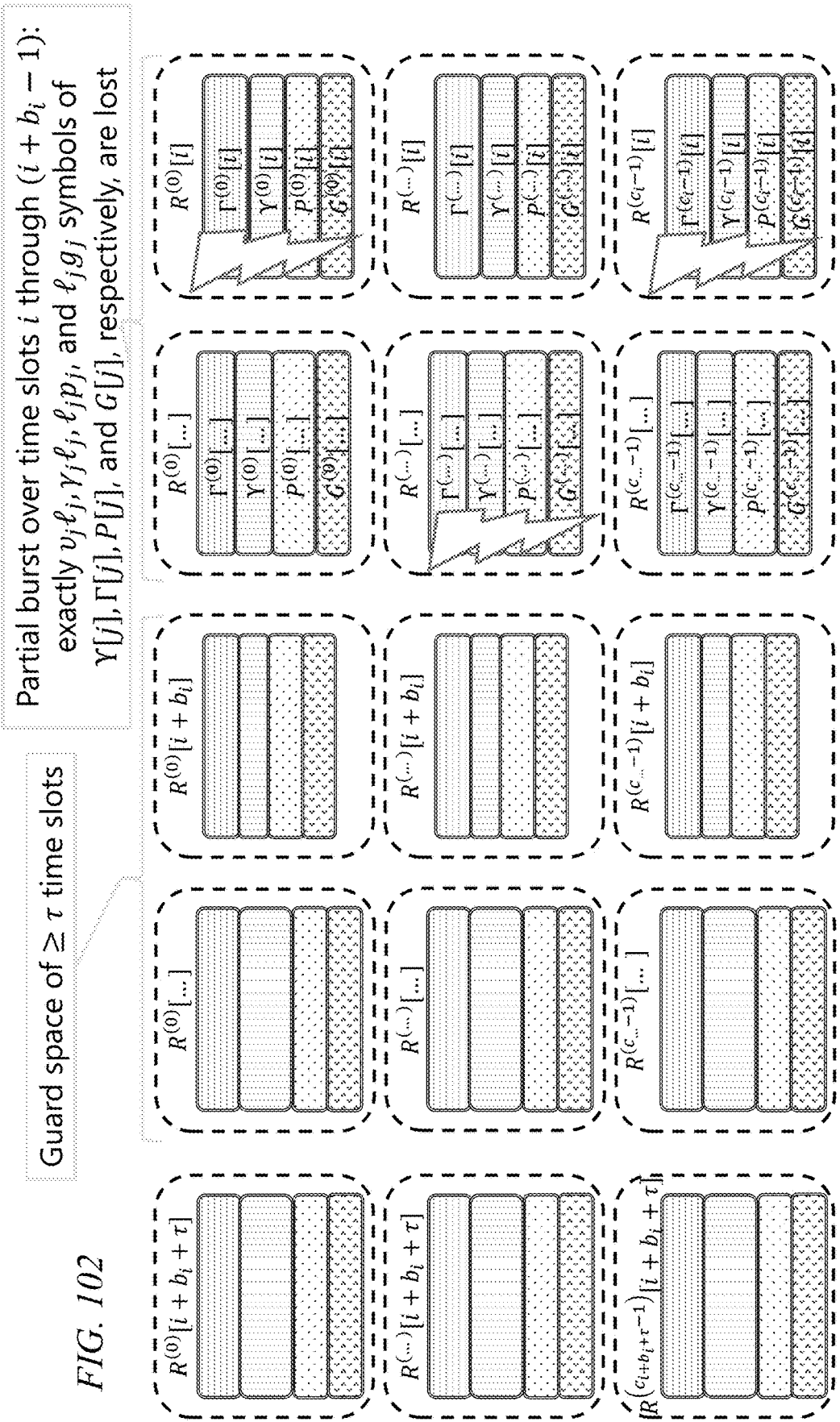
FIG. 102 illustrates modeling a partial burst starting in time slot i for constraints on loss recovery and modeling as a guard space (not a partial guard space) after the burst by assuming $1_j^{(G)}=0$ for $j \in \{+b_i, \ldots, i+b_i+\tau-1\}$ for this modeling.

FIG. 102 illustrates modeling a partial burst starting in time slot i for constraints on loss recovery and modeling as a guard space (not a partial guard space) after the burst by assuming $l_j^{(G)}$=0 for j∈{+$b_i$, . . . , i+$b_i$+τ−1} for this modeling. If it turns out that $l_j^{(G)}$>0 for such a j, loss recovery only gets harder; but the system also models even more parity symbols as being sent; specifically, after the system accounts for the losses in the guard space and parity symbols that are used to recover D[i+$b_i$:i+$b_i$+τ−1] (where these parity symbols are necessary and sufficient to recover those data symbols), the number of remaining parity symbols for each such frame, j, is $p_j$; this is shown in FIG. 100, where G[j] is allocated to be large enough to ensure the received symbols of G[j] can be used to recover lost symbols of γ[j] and extra parity symbols are allocated to P[i] to ensure some of the received symbols of P[j] can be used to recover the lost symbols of Γ[j] and then the remaining $p_j$ symbols are available to recover γ[j−τ]. A relaxation is used to assume that the fraction of symbols lost for Γ[j], γ[j], P[j], and G[j] is $l_i$, but any rounding issue can be handled by the process outlined in FIG. 101. FIG. 100 also shows the number of parity symbols modeled as being sent during each time slot.

Figure 103:
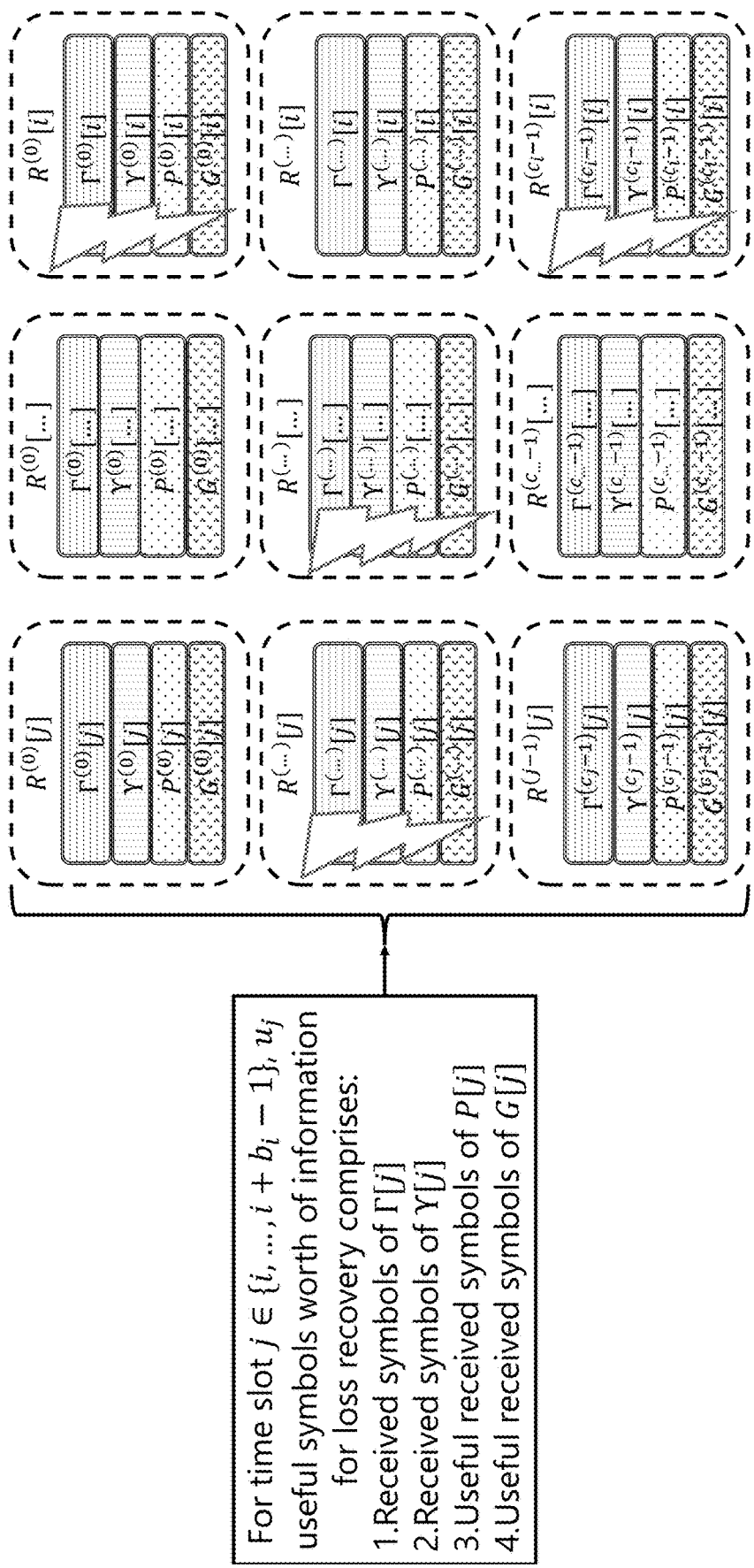
FIG. 103 shows useful symbols for loss recovery in time slot $j \in \{i, \ldots, i+b_i-1\}$, in accordance with one embodiment.

FIG. 103 shows useful symbols for loss recovery in time slot j∈{i, . . . , i+$b_i$−1}, in accordance with one embodiment.

Figure 104:
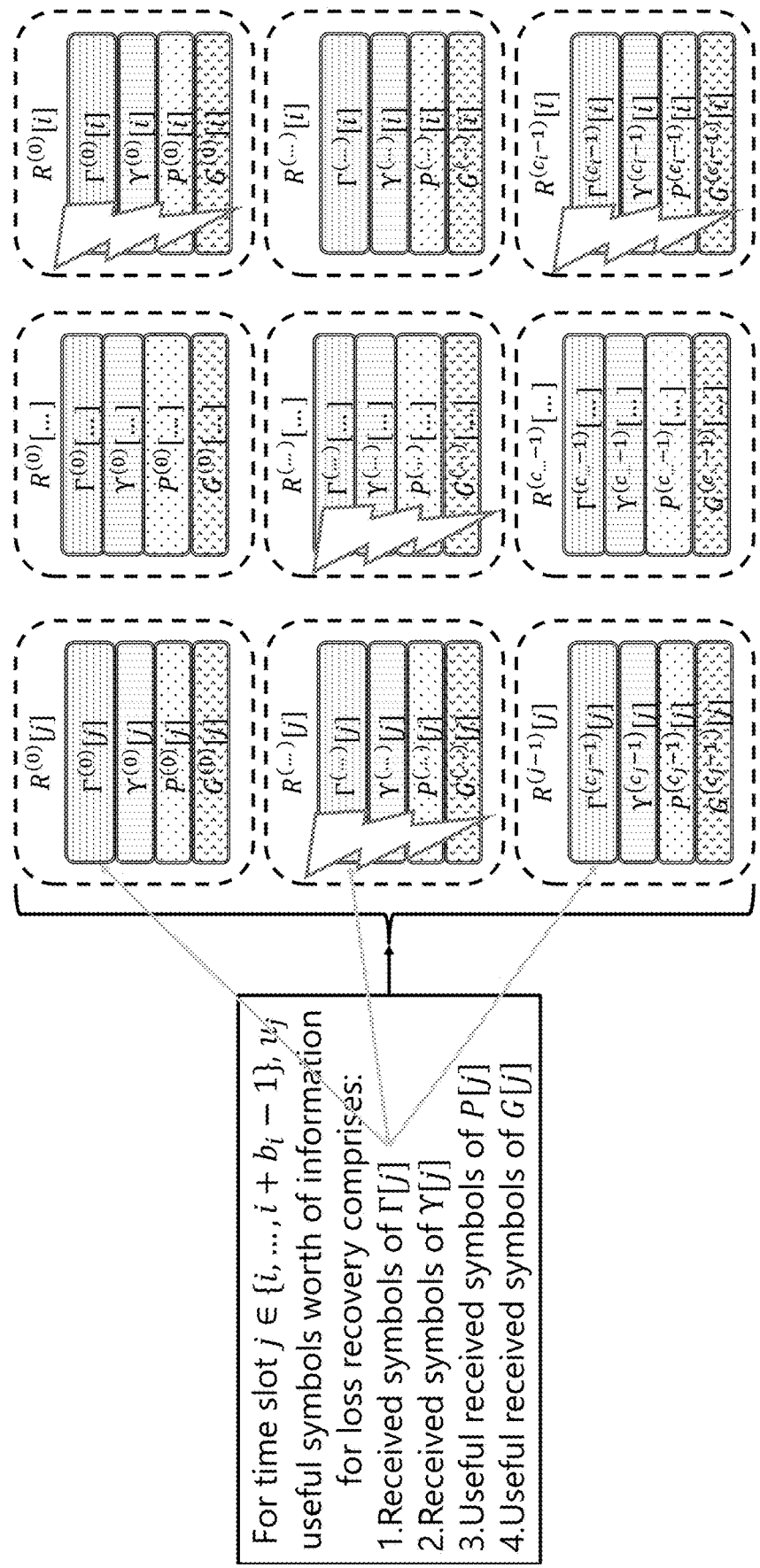
FIG. 104 highlights received symbols $\Gamma[j]$.
Figure 105:
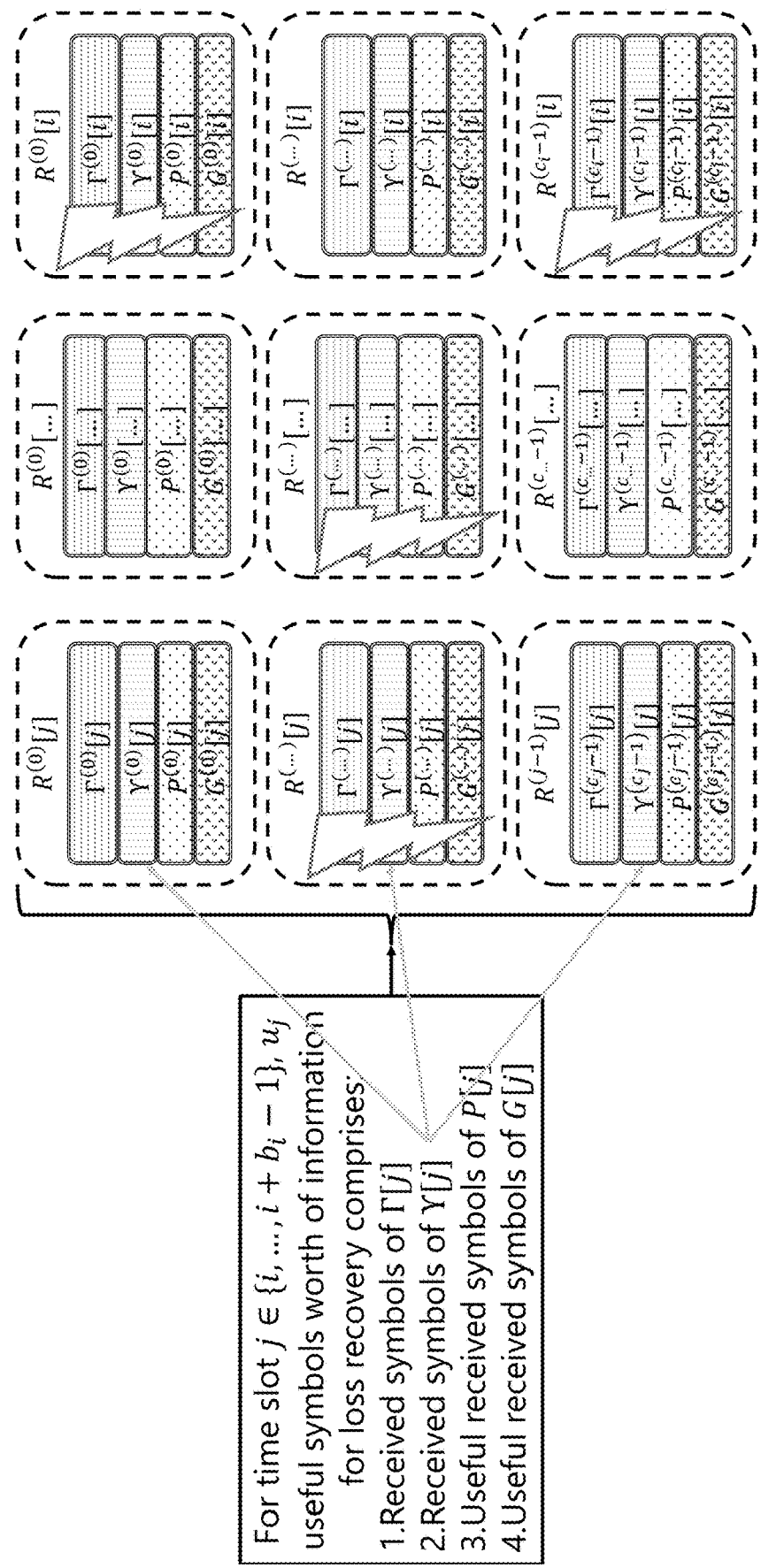
FIG. 105 highlights received symbols $\gamma[j]$.
Figure 106:
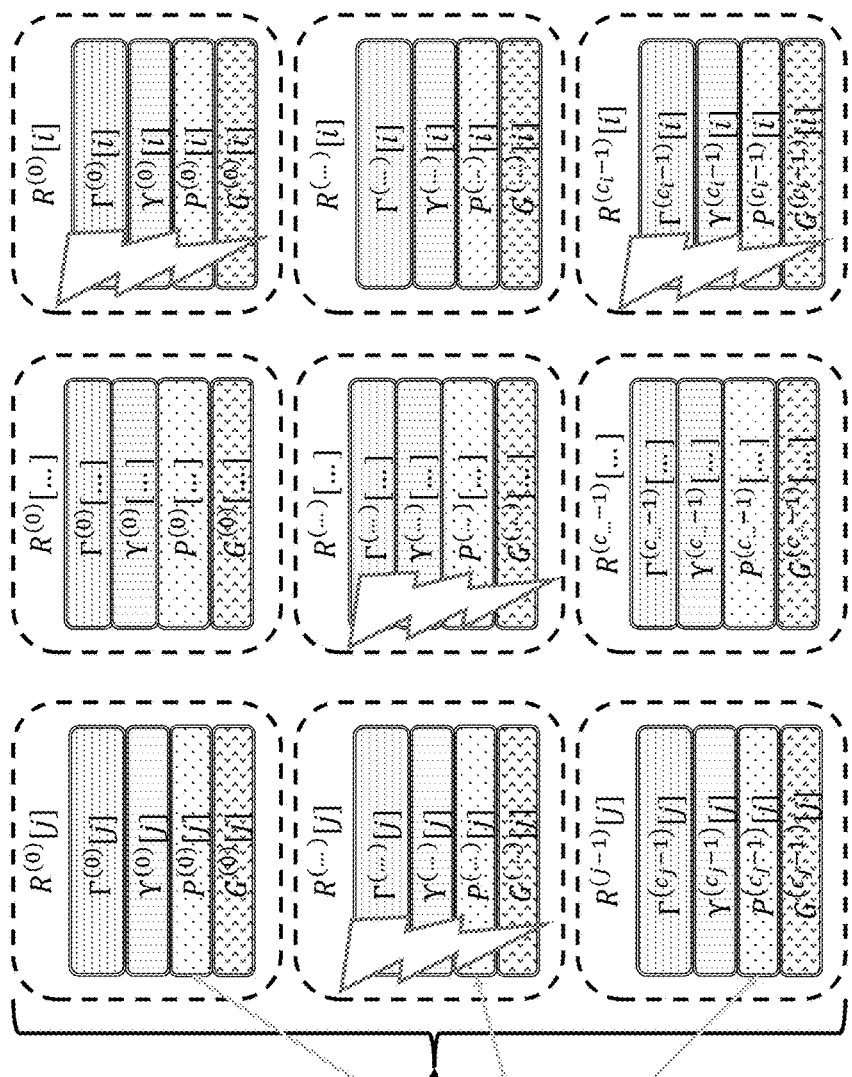
FIG. 106 highlights received symbols $P[j]$.
Figure 107:
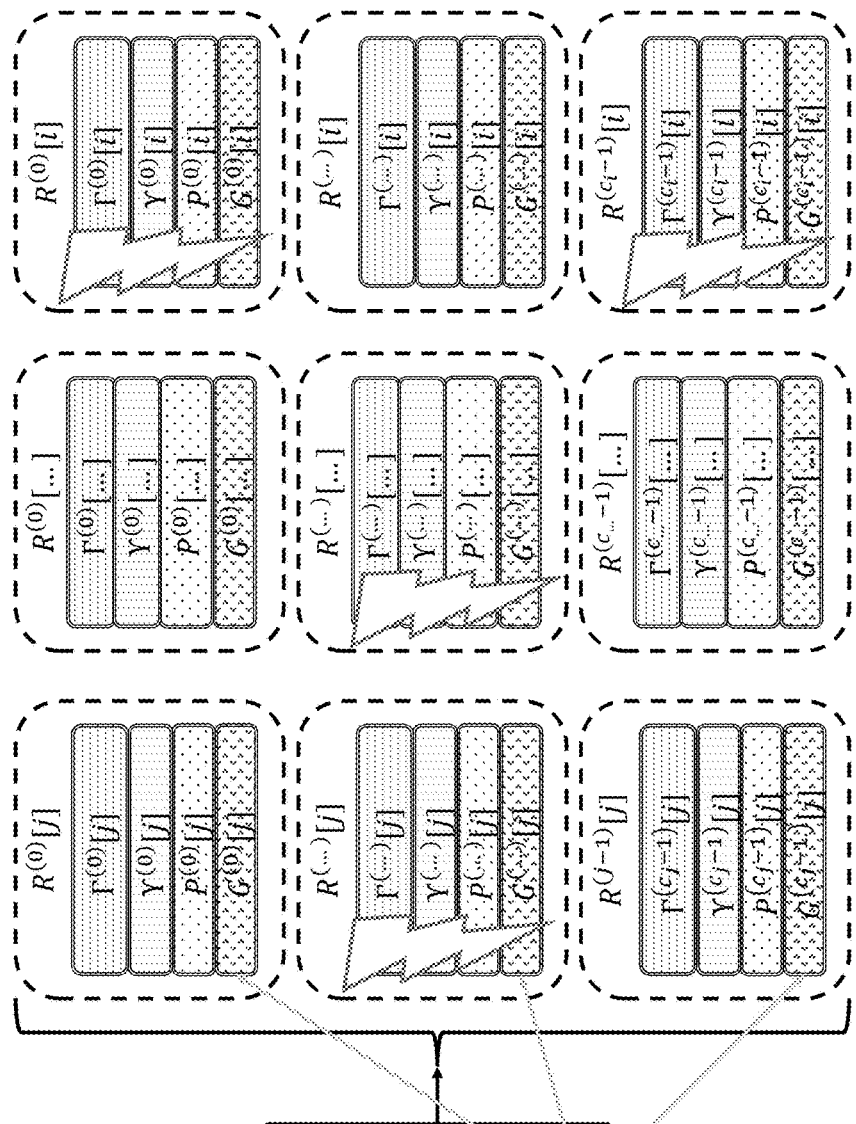
FIG. 107 highlights received symbols $G[j]$.

FIG. 104 highlights received symbols Γ[j].
FIG. 105 highlights received symbols γ[j].
FIG. 106 highlights received symbols P[j].
FIG. 107 highlights received symbols G[j].

Figure 108:
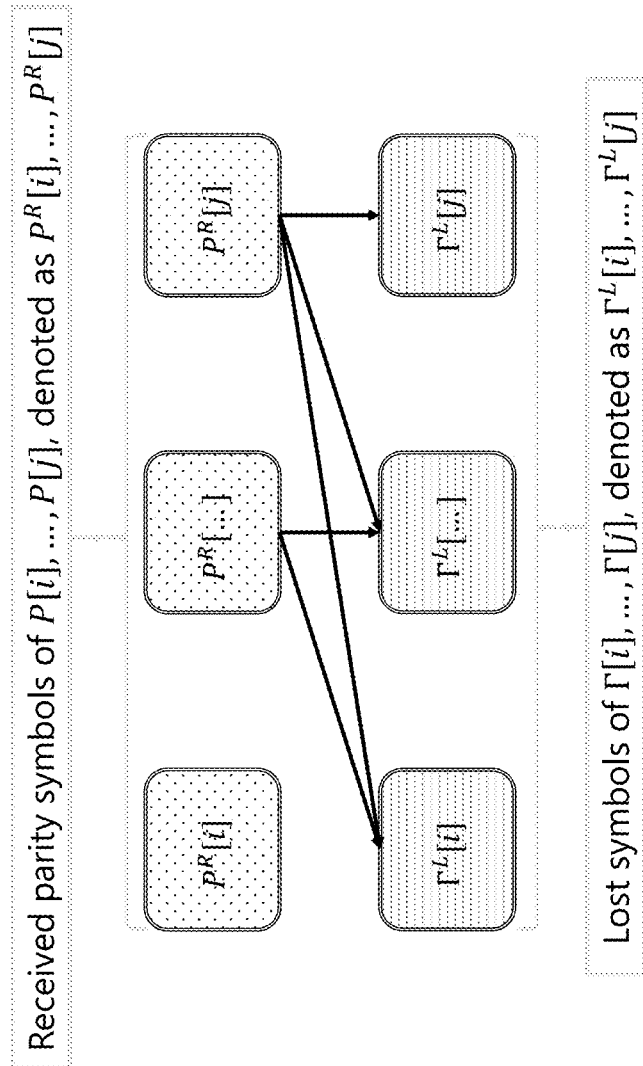
FIG. 108 shows useful parity symbols for loss recovery, in accordance with this example.

FIG. 108 shows useful parity symbols for loss recovery, in accordance with this example.

Figure 109:
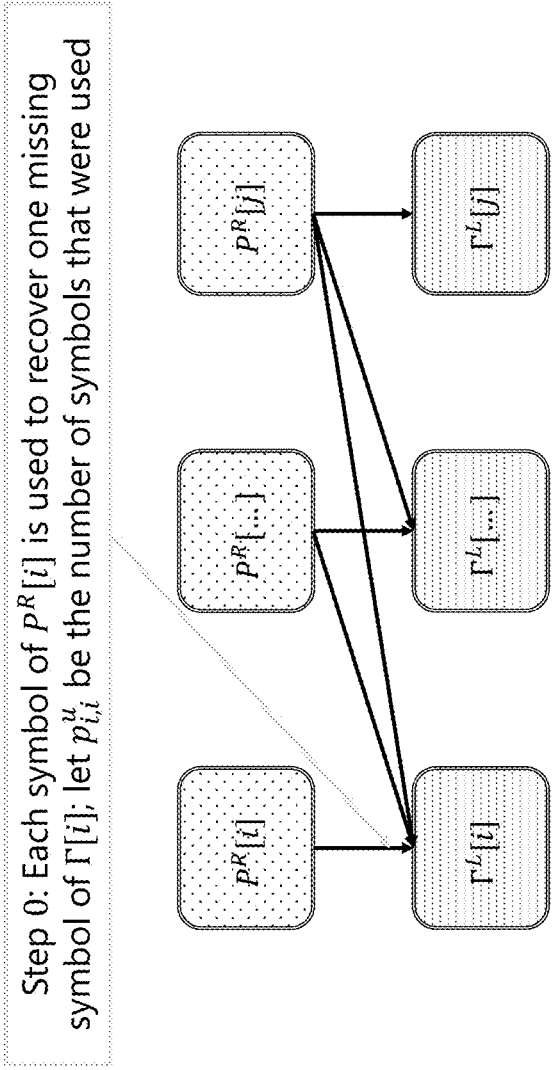
FIG. 109 shows an initial step for first type loss recovery in accordance with this example.

FIG. 109 shows an initial step for first type loss recovery in accordance with this example.

Figure 110:
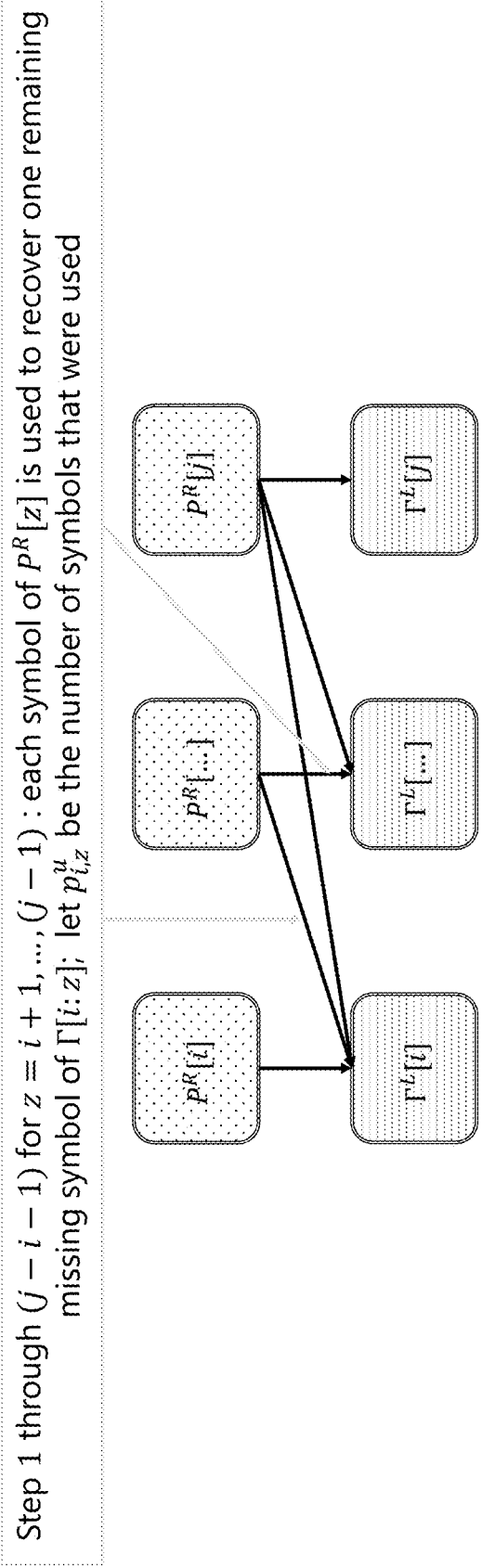
FIG. 110 shows intermediate steps for first type loss recovery in accordance with this example.

FIG. 110 shows intermediate steps for first type loss recovery in accordance with this example.

Figure 111:
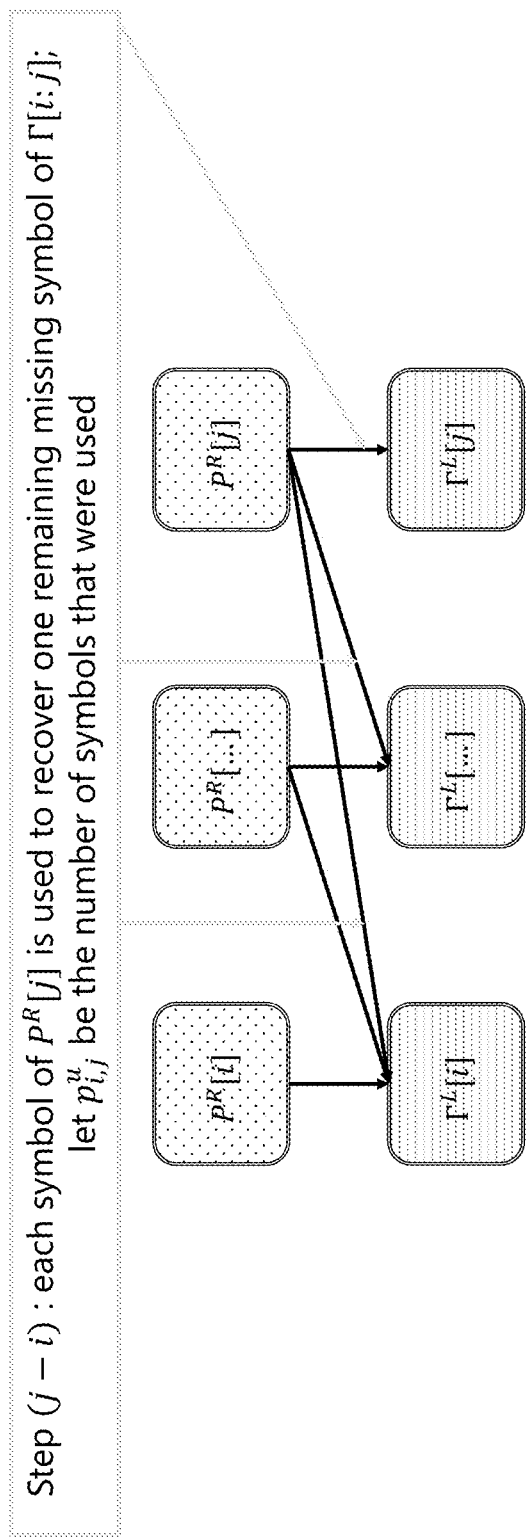
FIG. 111 shows the final step for first type loss recovery in accordance with this example.

FIG. 111 shows the final step for first type loss recovery in accordance with this example.

Figure 112:
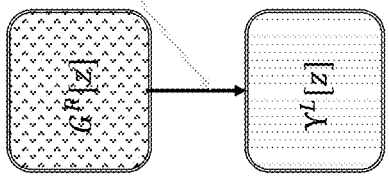
FIG. 112 shows second type loss recovery in accordance with this example.

FIG. 112 shows second type loss recovery in accordance with this example.

Figure 113:
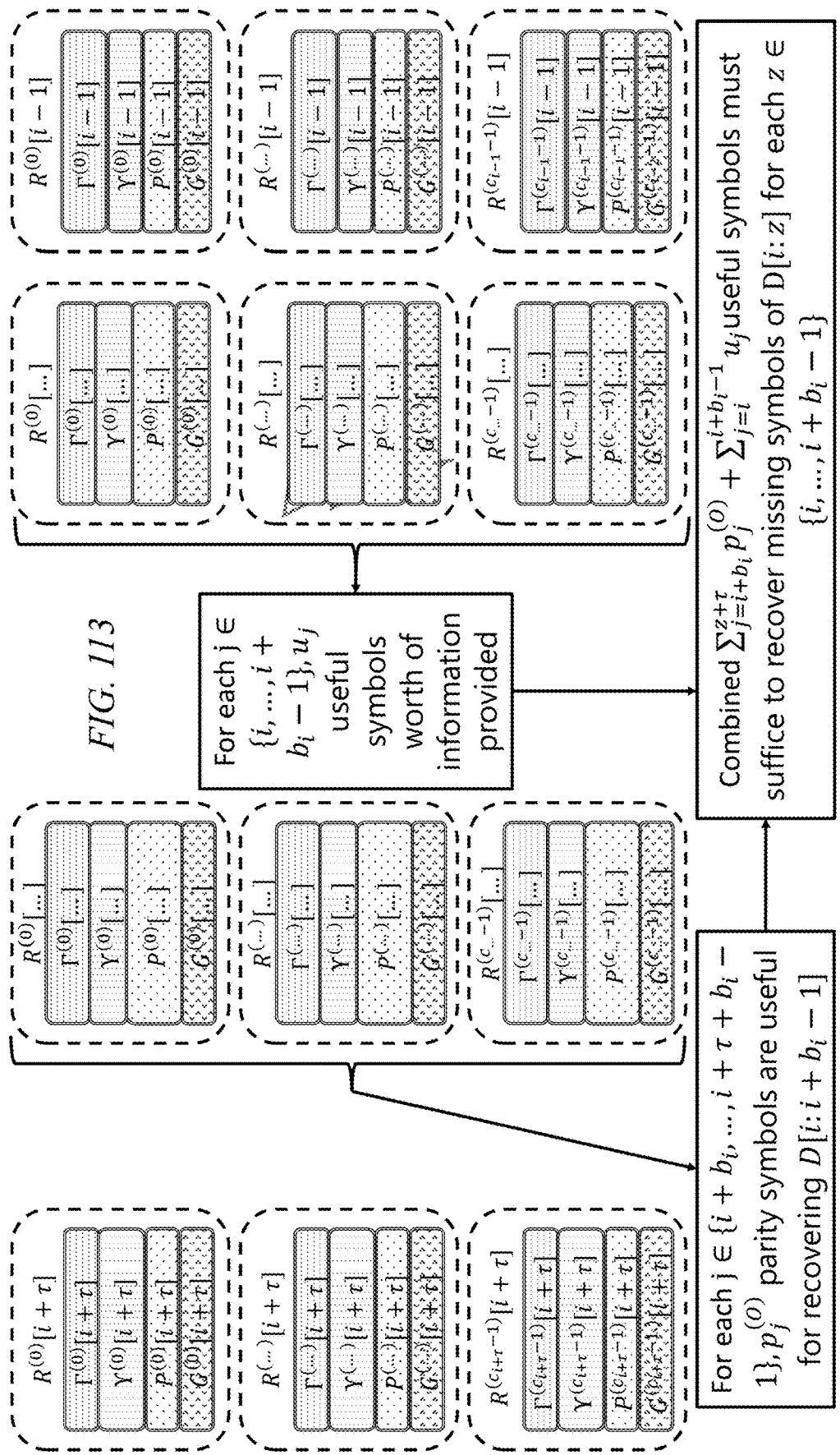
FIG. 113 shows how a sufficient number of useful symbols can be used to recover missing symbols of D[i:z] by times lot (z+τ) for each time slot z of the partial burst.

FIG. 113 shows how a sufficient number of useful symbols can be used to recover missing symbols of D[i:z] by times lot (z+τ) for each time slot z of the partial burst.

Here, optimization is accomplished by minimizing $$\sum_{i=0}^{c} \frac{p_i^{(o)}}{1-l_i^{(G)}} + \frac{d_i}{1-l_i^{(G)}}$$

where t is the length of the call subject to (a) the above loss recovery constraint, (b) bounding the size of each $p_i^{(o)}$ to be at least 0 and for i>τ to be at most [$d_{i-\tau}l_{i-\tau}$], and (c) (optionally) add the constraint that the first τ−1 time slots involve sending 0 parity symbols using a linear program. Then, padding is performed to ensure divisibility by $c_i$ of sizes of γ[i], Γ[i], P[i], and G[i] as discussed herein and then the sizes of γ[i], Γ[i], P[i], and G[i] are matched (i.e., handling splitting and allocating parity symbols) and the parity symbol generation/loss recovery is performed. To deal with resets, for each time slot i where there is a reset among time slots (i+1), . . . , (i+τ), $d_i$ is modeled as being of size 0 in the linear program and is split so that γ[i]=D[i] and $p_{i+\tau}$=0.

Figure 114:
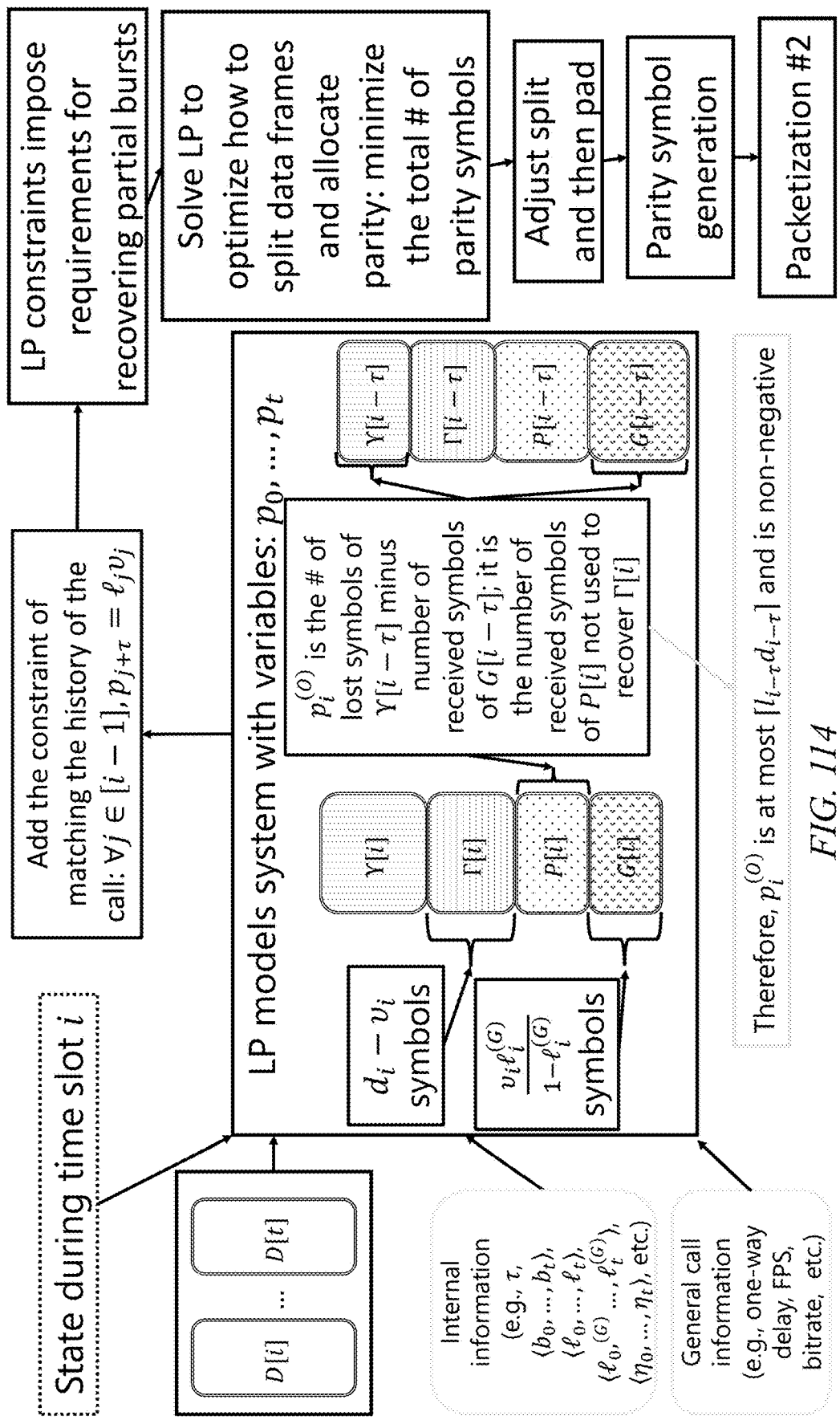
FIG. 114 shows that the optimization can be modified to apply during time slot i (i.e., after packets have been sent for previous time slots) by adding constraints to reflect the actions from earlier in the call (e.g., how much parity was allocated) and then using the offline linear program solver to determine the splits for the remainder of the call, where, without loss of generality, the system assumes $l_i^{(G)} \le l_i$ for all i (since otherwise $l_i$ is just set to equal $l_i^{(G)}$).

FIG. 114 shows that the optimization can be modified to apply during time slot i (i.e., after packets have been sent for previous time slots) by adding constraints to reflect the actions from earlier in the call (e.g., how much parity was allocated for the first and second type of parity symbols and the sizes of the two components) and then using the offline linear program solver to determine the splits for the remainder of the call, where, without loss of generality, the system assumes $l_i^{(G)}$≤$l_i$ for all i (since otherwise $l_i$ is just set to equal $l_i^{(G)}$. For convenience, this optimization may be referred to herein as the "offline solver"). One way to split data frames is to use a heuristic.

Figure 115:
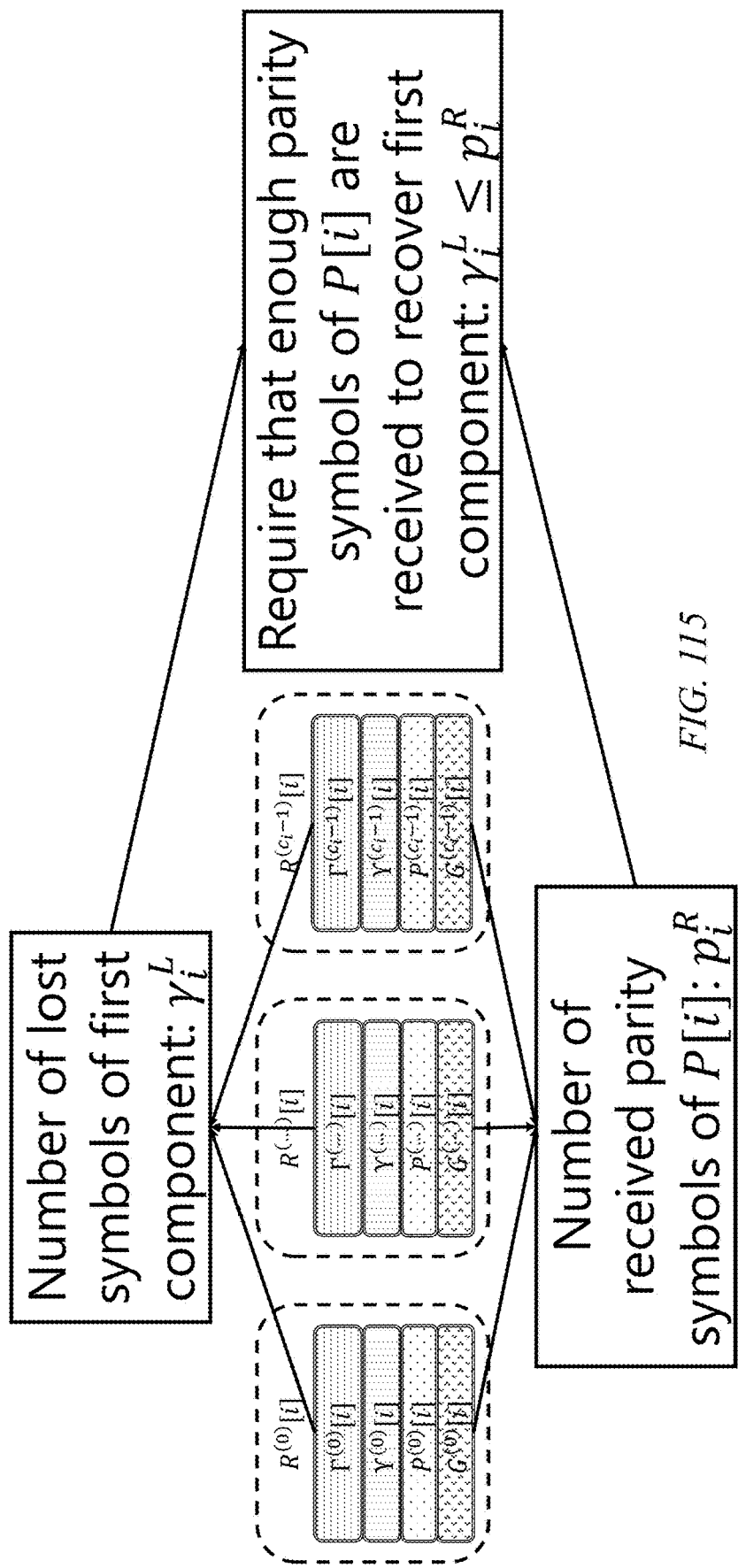
FIG. 115 is a schematic diagram representing a heuristic for splitting video frames to recover type "I" immediately for any partial burst, in accordance with one embodiment.

FIG. 115 is a schematic diagram representing a heuristic for splitting video frames to recover type "Γ" immediately for any partial burst, in accordance with one embodiment. This heuristic determines the size of the first component should be as large as possible subject to ensuring that it is recoverable using the received parity of the same time slot with high probability.

Figure 116:
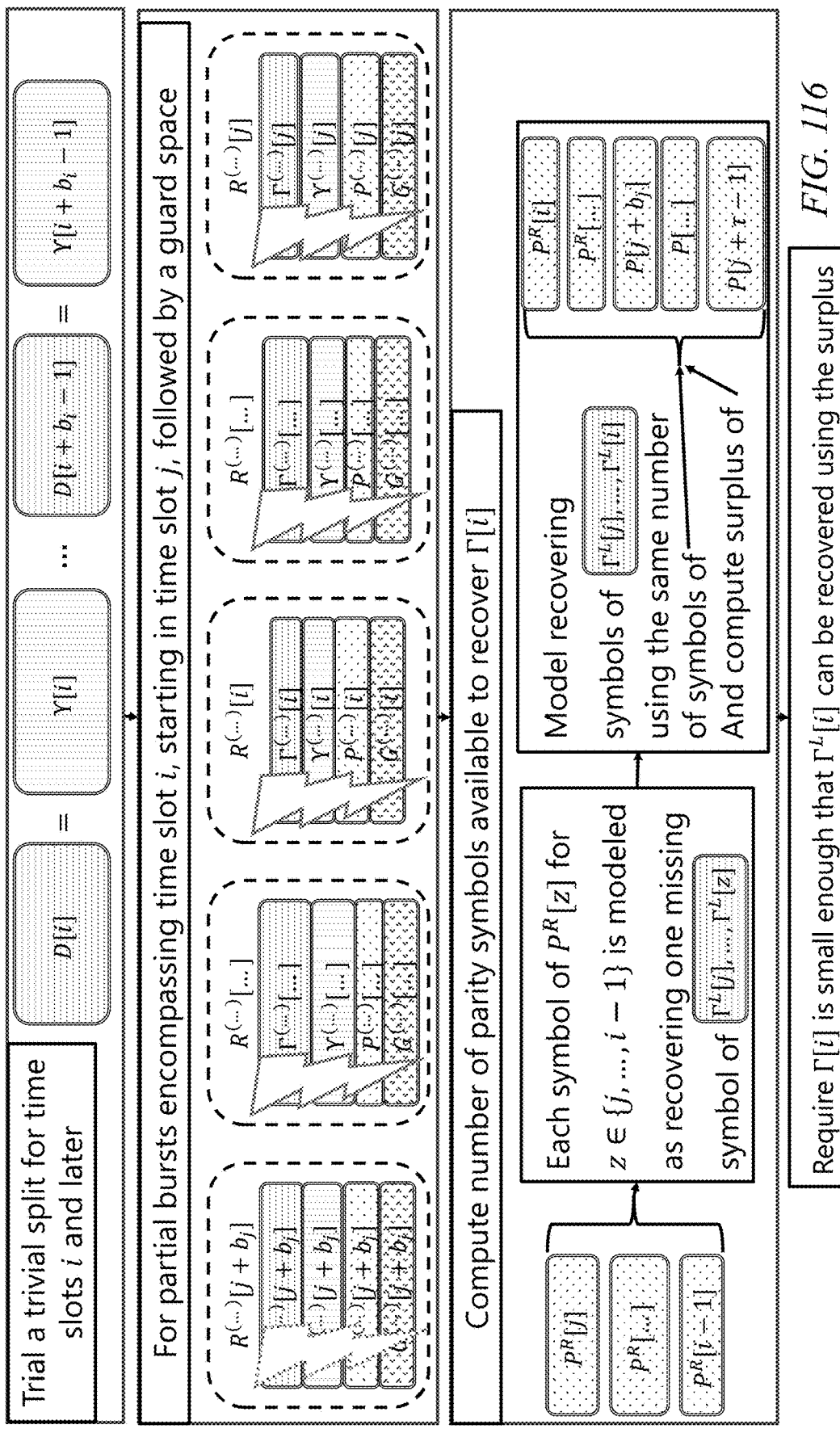
FIG. 116 is a schematic diagram representing a process for splitting video frames to minimize parity associated with each data frame i (referred to herein as "max heuristic PG," where PG is for partial guardspace).

FIG. 116 is a schematic diagram representing a process for splitting video frames to minimize parity associated with each data frame i (referred to herein as "max heuristic PG," where PG is for partial guardspace). This heuristic determines the size of the first component should be as large as possible subject to the following constraint. Suppose the first component is empty for the next τ time slots (i.e., all data symbols are allocated to Y). For any partial burst that includes the current time slot, then all symbols of the first component that are lost in the partial burst are recovered by τ−1 time slots after the start of the partial burst with high probability. The maximum value that the first component can be for time slot i under this heuristic is sometimes called $\gamma_i^{max}$. Here, a guard space, not a partial guard space, is assumed; the reason is that a partial guard space would lead to only using the pre-allocated parity symbols of P[z] in time slots z=i+1, . . . , j+τ−1 and would assume that they are all received; in the event that $l_z^{(G)}$>0, then the number of parity symbols of P[z] would be increased until the number that are received that are useful for recovering Γ[i] match the number that are pre allocated under certain embodiments.

Another way to split data frames is to treat splitting as a reinforcement learning problem. As is generally known, reinforcement learning is a type of machine learning technique in which the system learns through training to make decisions using trial-and-error based on feedback from a reward function.

Figure 117:
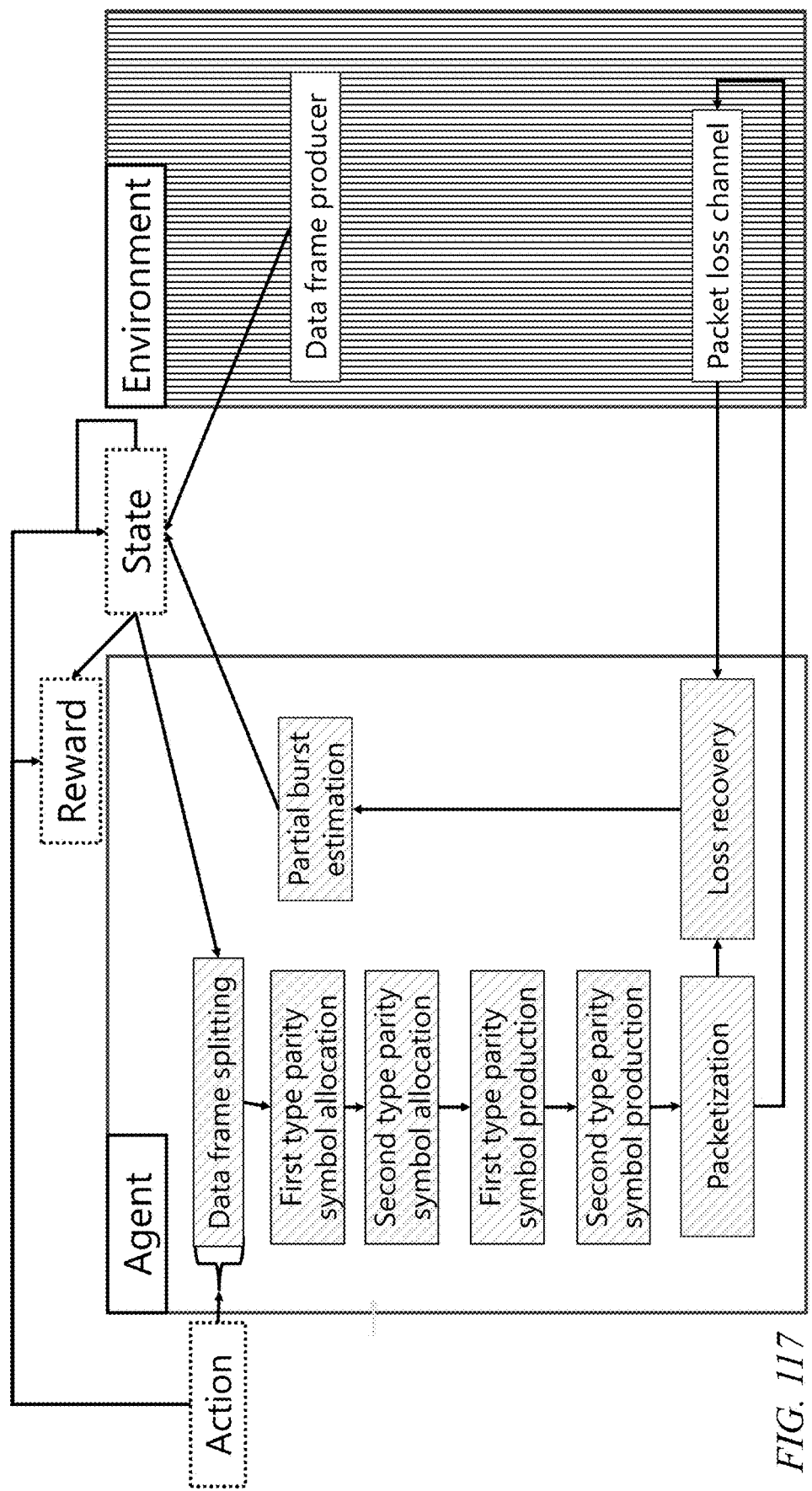
FIG. 117 illustrates a general methodology for splitting frames using reinforcement learning, in accordance with certain embodiments.

FIG. 117 illustrates a general methodology for splitting frames using reinforcement learning, in accordance with certain embodiments. The concept here is the same as in CSIPB.

The general methodology of FIG. 117 can be extended to encompass frame splitting and/or parity symbol allocation using reinforcement learning.

Figure 118:
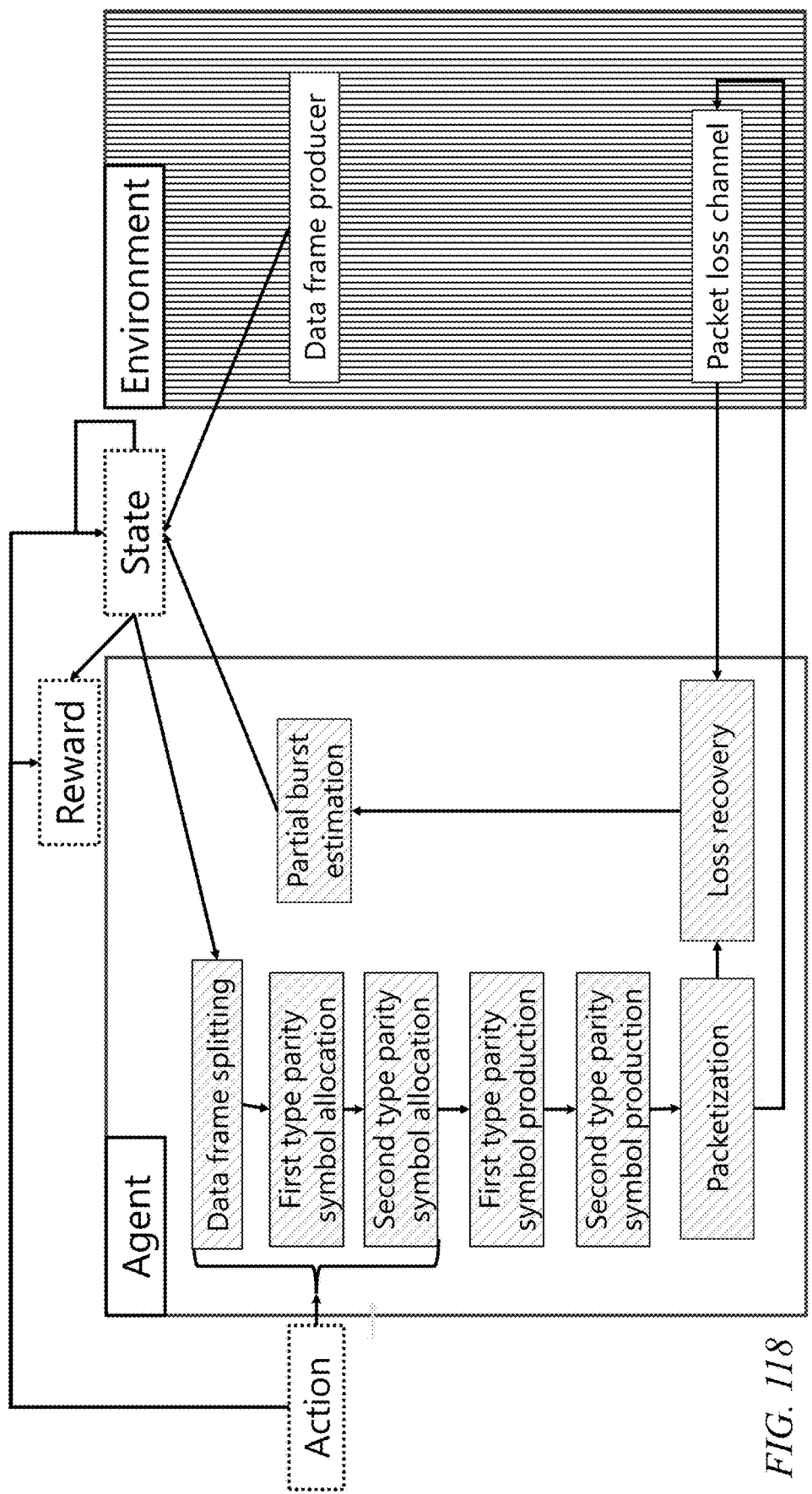
FIG. 118 illustrates a general methodology for splitting frames and allocating parity symbols for CSIPBRAL using reinforcement learning, in accordance with certain embodiments.

FIG. 118 illustrates a general methodology for splitting frames and allocating parity symbols for CSIPBRAL using reinforcement learning, in accordance with certain embodiments. The concept here is the same as in CSIPB except for the addition of second type parity symbol allocation and production.

Figure 119:
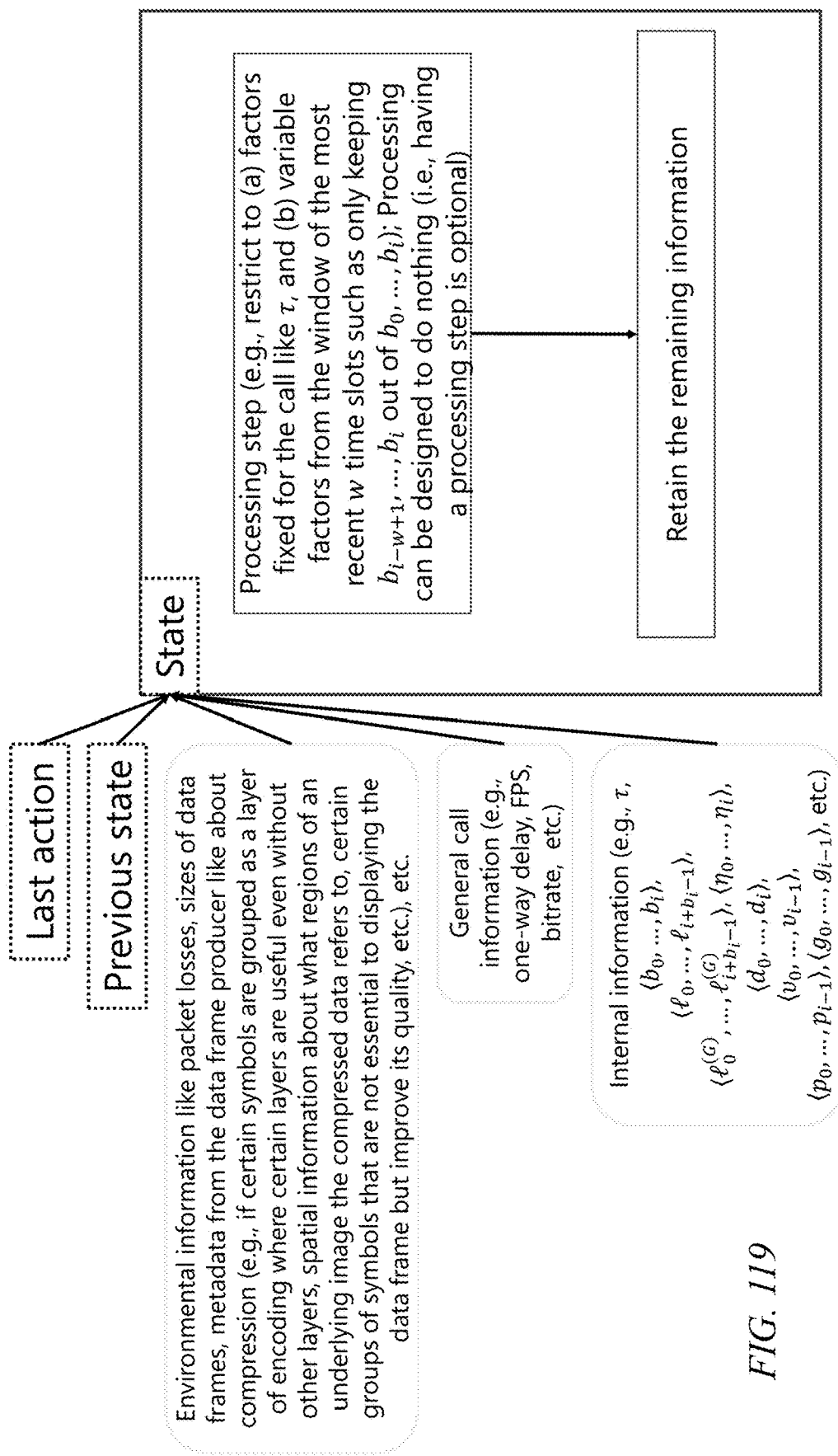
FIG. 119 schematically illustrates the concept of "state" for reinforcement learning, in accordance with certain embodiments.

FIG. 119 schematically illustrates the concept of "state" for reinforcement learning, in accordance with certain embodiments. The concept here is the same as in CSIPB except for the additional internal information.

Figure 120:
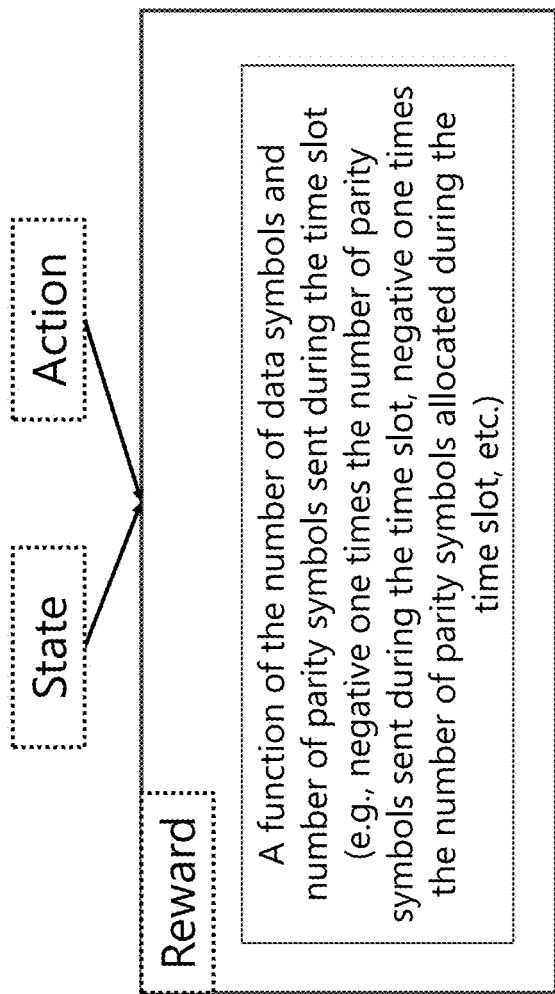
FIG. 120 shows one example of a reward function for training frame splitting and/or parity allocation, in accordance with certain embodiments.

FIG. 120 shows one example of a reward function for training frame splitting and/or parity allocation, in accordance with certain embodiments.

Figure 121:
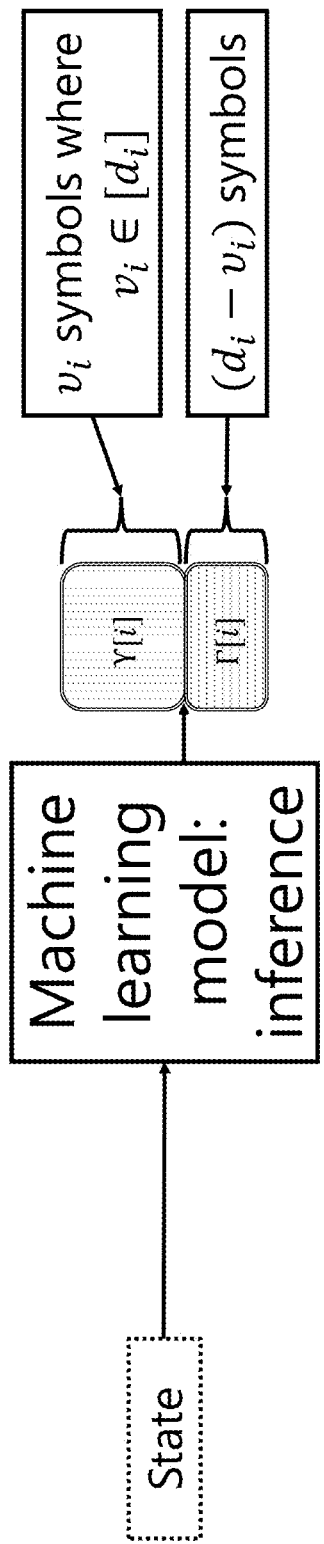
FIG. 121 depicts a machine learning model that can be applied at inference time, e.g., at the time of deciding how to split frames and/or allocate parity symbols.

As depicted in FIG. 121, a machine learning model can be applied at inference time, e.g., at the time of deciding how to split frames and/or allocate parity symbols.

Figure 122:
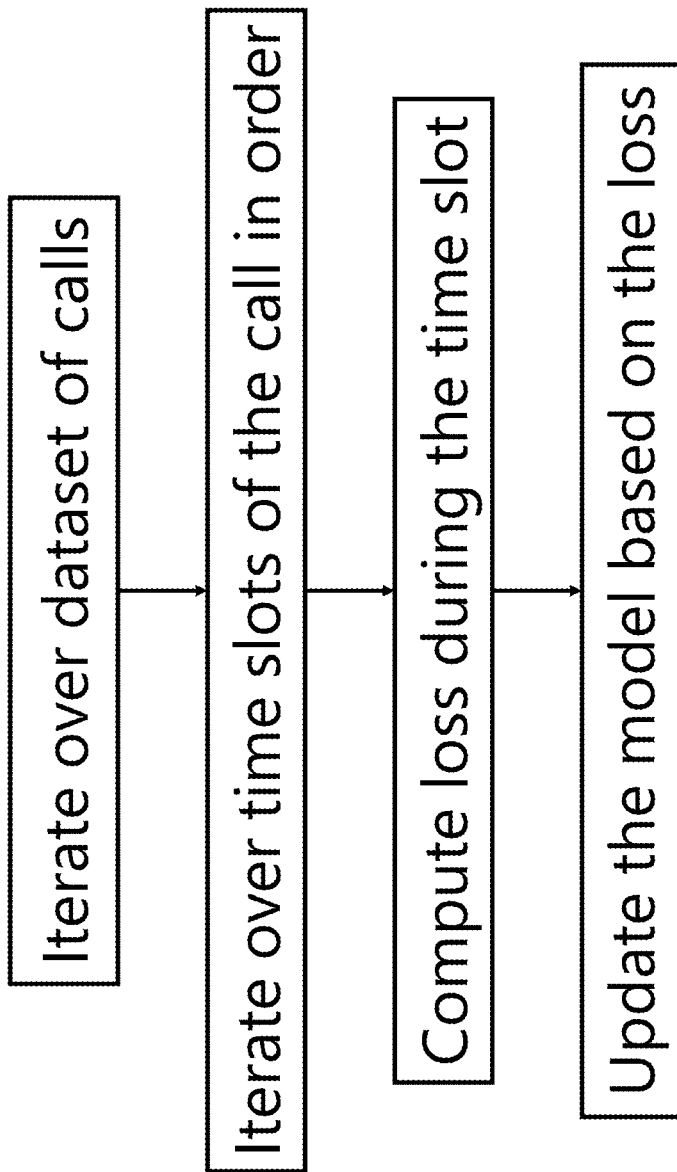
FIG. 122 depicts one way a machine learning model would be trained offline using actual and/or simulated data (e.g., data representing a number of calls) and could involve iterating over the dataset, computing the loss during each time slot, and updating the model using the loss.

FIG. 122 depicts one way a machine learning model would be trained offline using actual and/or simulated data (e.g., data representing a number of calls) and could involve iterating over the dataset, computing the loss during each time slot, and updating the model using the loss. Embodiments can allow for human feedback such as to fine-tune the model. The concept here is the same as in CSIPB.

Figure 123:
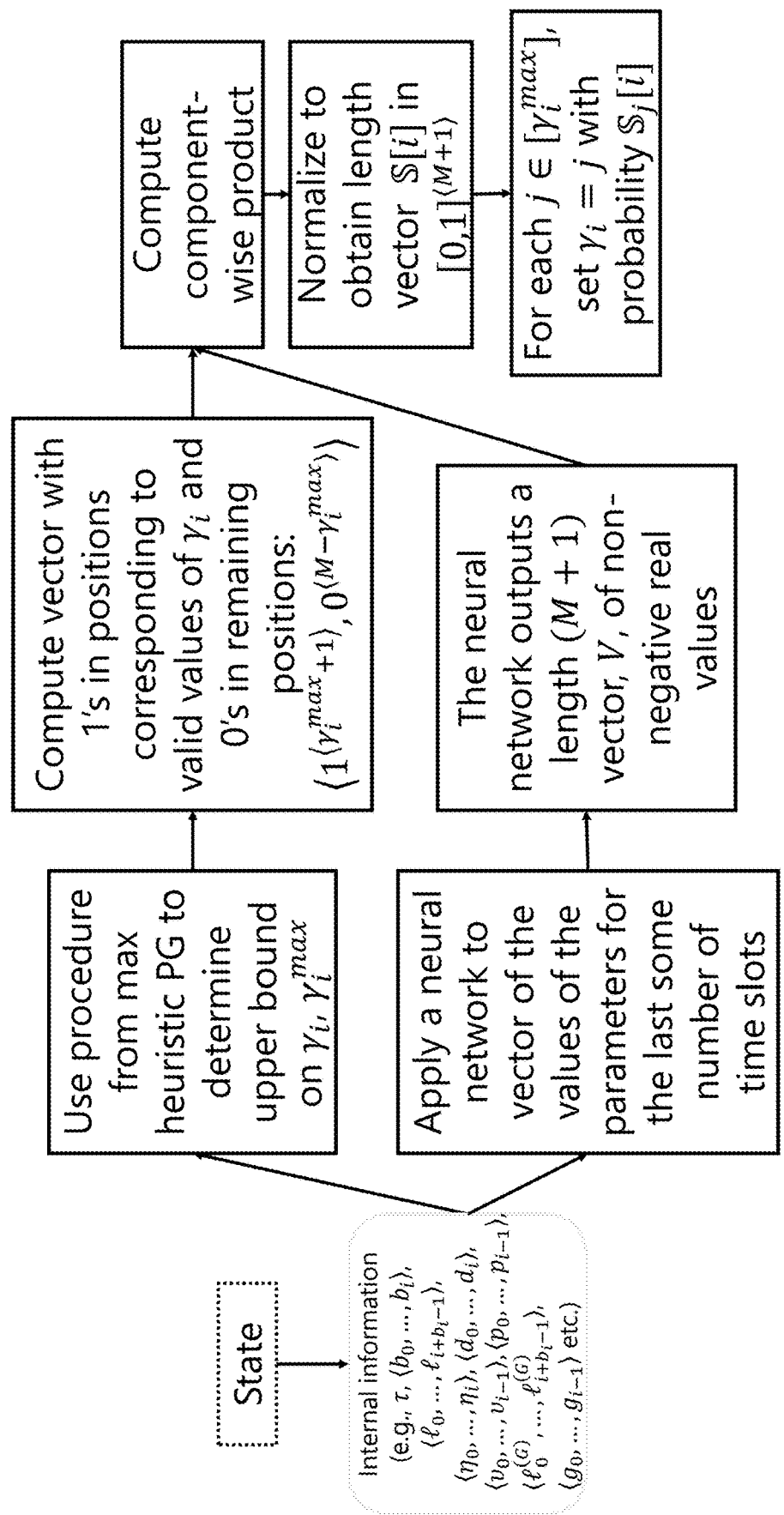
FIG. 123 shows one example of neural network (NN) model for training frame splitting, in accordance with certain embodiments.

FIG. 123 shows one example of neural network (NN) model for training frame splitting, in accordance with certain embodiments. The concept here is the same as in CSIPB except for the additional internal information and the use of the CSIPBRAL offline solver and "max heuristic PG" heuristic.

Figure 124:
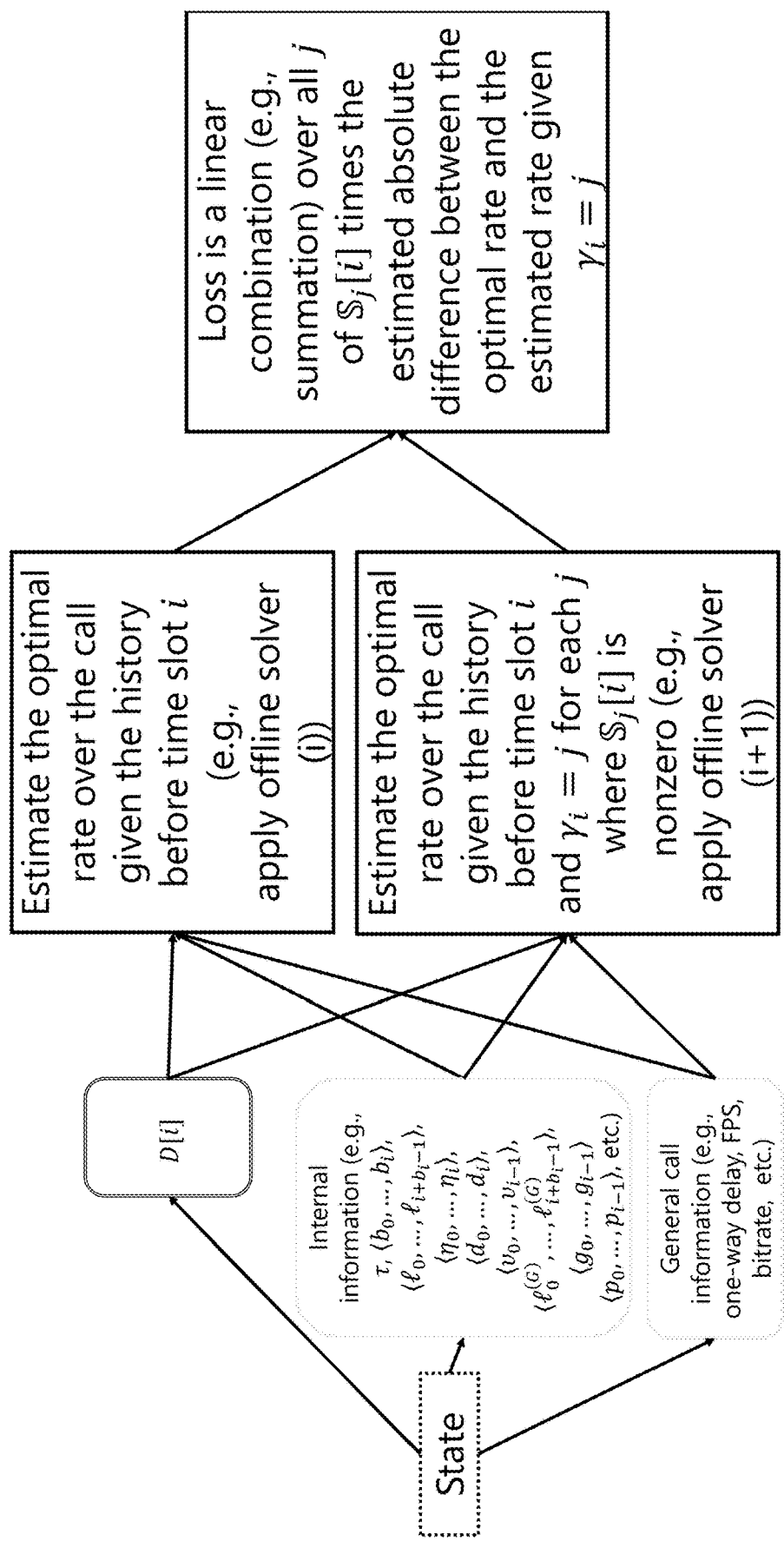
FIG. 124 shows one possible loss function (referred to herein as "loss function 2"), in accordance with certain embodiments.

FIG. 124 shows one possible loss function (referred to herein as "loss function 2"), in accordance with certain embodiments. The concept here is the same as in CSIPB, except for the added internal information and the use of the "offline solver (i)" solver (i.e., the offline solver computed during time slot i).

Figure 125:
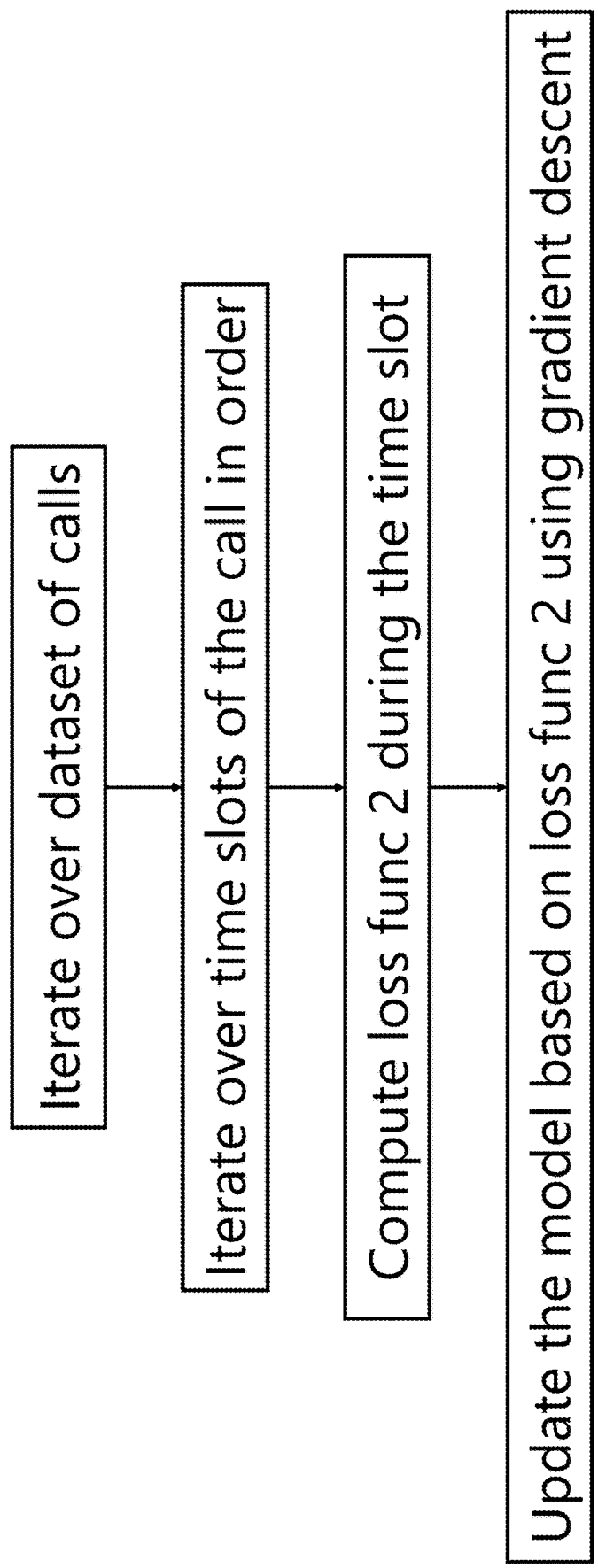
FIG. 125 shows one possible way to train the NN during jth call and ith time slot, in accordance with certain embodiments.

FIG. 125 shows one possible way to train the NN during jth call and ith time slot, in accordance with certain embodiments. The concept here is the same as in CSIPB, except for the use of the "loss function 2" loss function. Additionally or alternatively, the partial burst parameters can be modeled using reinforcement learning.

Figure 129:
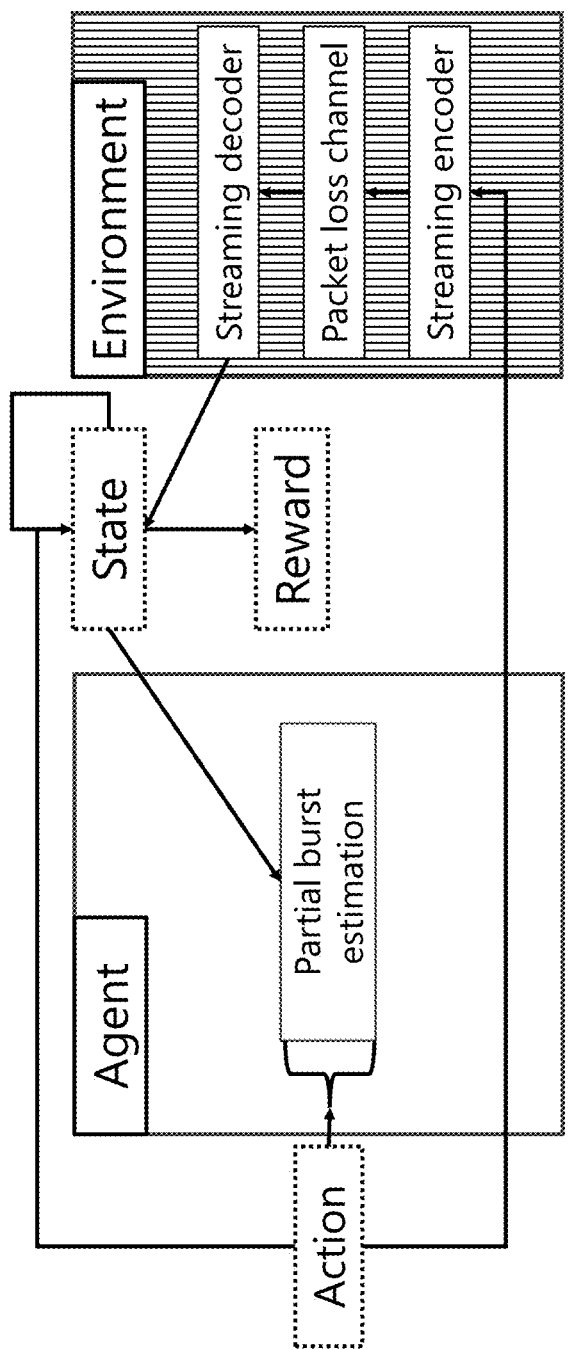
FIG. 129 provides an overview of how one can model estimating the partial burst parameters using a model conducive to reinforcement learning, in accordance with certain embodiments.

FIG. 129 provides an overview of how one can model estimating the partial burst parameters using a model conducive to reinforcement learning, in accordance with certain embodiments. Here, calling the parameters $l_i$, $b_i$, $l_i^{(G)}$ "burst parameters" or similar notation is meant to explain one way the embodiment of the communication schemes could be. Another (more general) viewpoint is that these parameters can be considered knobs to tune the communication scheme, e.g., they may be based on explicit characteristics of packet loss, or they may just be used to tweak the communication scheme until it behaves as desired (e.g., scores high on certain metrics of QoE). Thus, these parameters impact the code construction itself, which varies from data frame to data frame; these parameters do not merely change the bandwidth overhead (although that is one thing they will impact).

Figure 130:
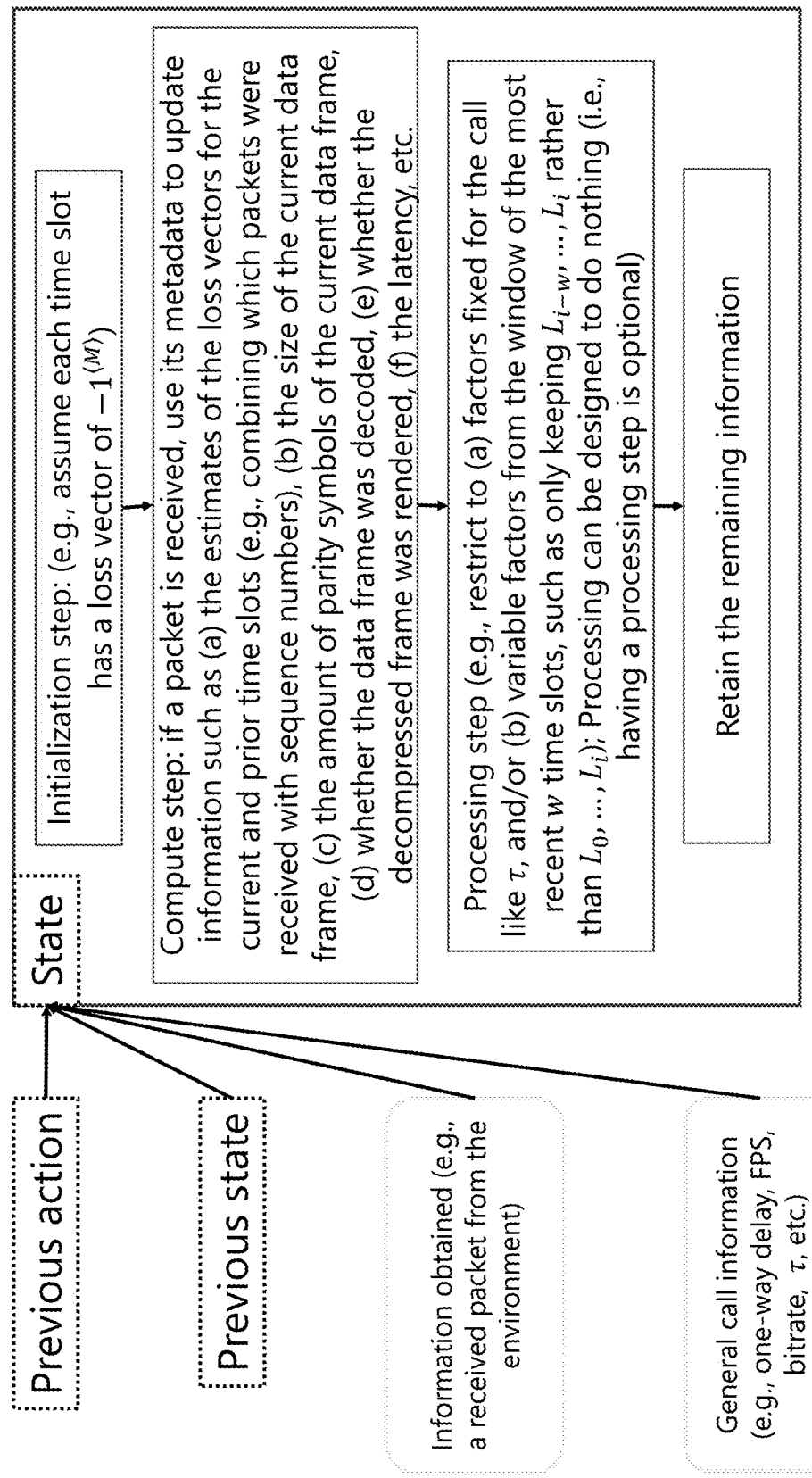
FIG. 130 illustrates the concept of "state" for the modeling of FIG. 129, in accordance with certain embodiments.

FIG. 130 illustrates the concept of "state" for the modeling of FIG. 129, in accordance with certain embodiments. Here, the state is meant to capture the situation; by assumption, the state can track any piece of information pertaining to the system, although some may not be tracked in certain embodiments (as can be accomplished via the processing step). To aid in the compute costs of reinforcement learning (e.g., to avoid the curse of dimensionality), some information may be dropped. Also, one may reduce the granularity of information such as by bucketing the number of parity symbols sent per time slot (e.g., list the number of symbols sent per time slot as integral multiples of a number, like 100, and applying rounding).

Figure 131:
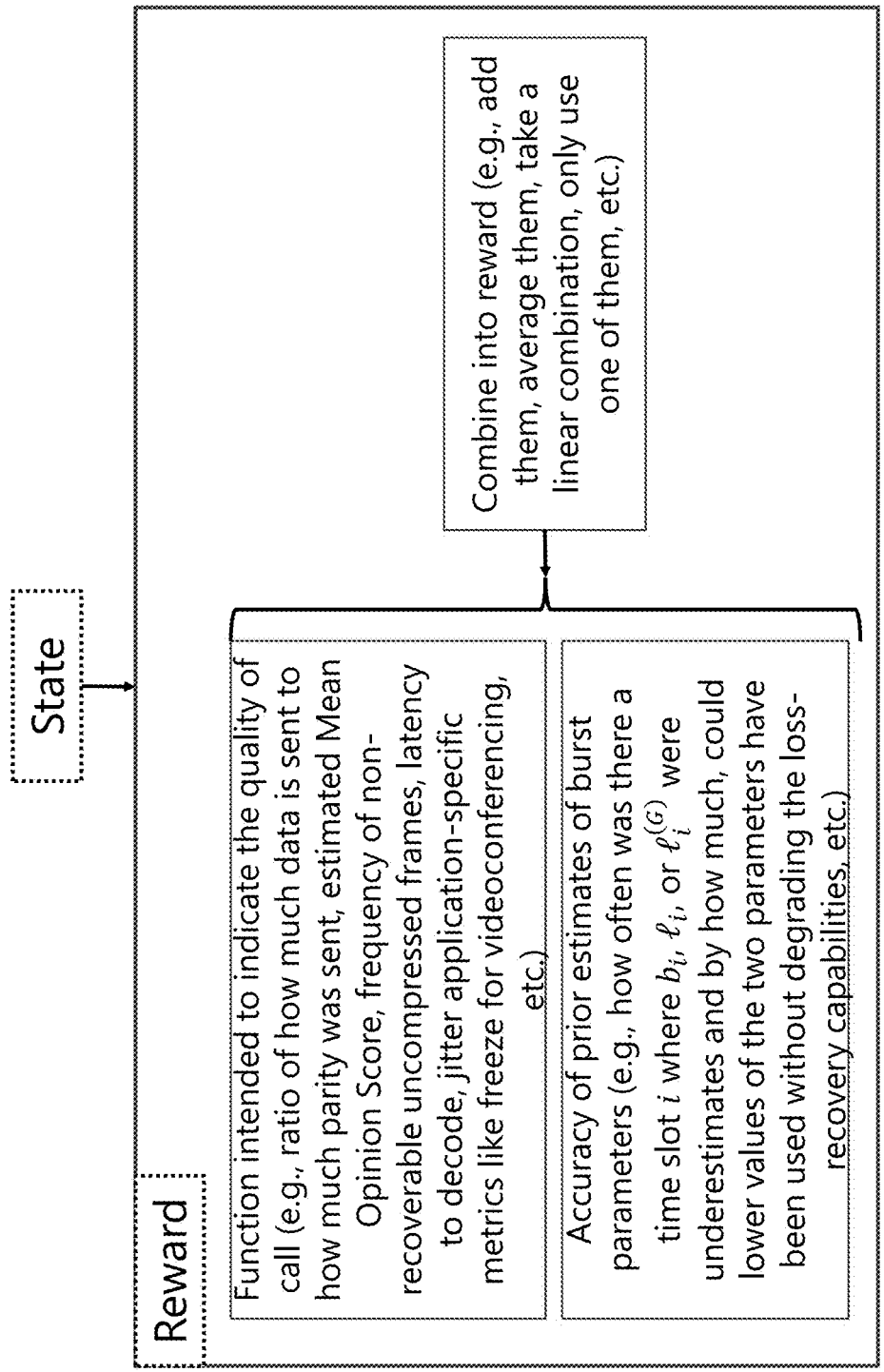
FIG. 131 shows one example of a possible reward function for the modeling of FIG. 130, in accordance with certain embodiments.

FIG. 131 shows one example of a possible reward function for the modeling of FIG. 130, in accordance with certain embodiments. One approach is to only give a reward when a packet is received (otherwise give 0 reward). Then one might consider two main intrinsic sources of reward (a) the quality of the call, and (b) the quality of the estimates. For each of these values, a function can be applied to score the performance (e.g., output a value between 0 and 1 where 1 is the optimal and 0 is the worst possible. Certain embodiments use a reward function that combines these three factors in a predetermined manner. For example, create a function (e.g., a metric) to measure the value/costs of an action for each metric. Then, create a second function to combine these three factors into a reward. One way is to add them. Another way is to ignore one and just use the other; for example, it may be much easier computationally just to use (b) to aim to select parameters that are intended to be upper bounds on how lossy the packet losses will be with reasonably high probability. Instead, another example is that one may ignore the "accuracy" of prior estimates and/or view these parameters not as estimates of future packet loss but as knobs for how to run the Streaming Encoder/Decoder; in this case, one can tune these parameters simply to optimize only for metrics of the quality of the call (e.g., frequency of video freeze, PSNR, SSIM, or LPIPS if the desired application is videoconferencing).

Figure 132:
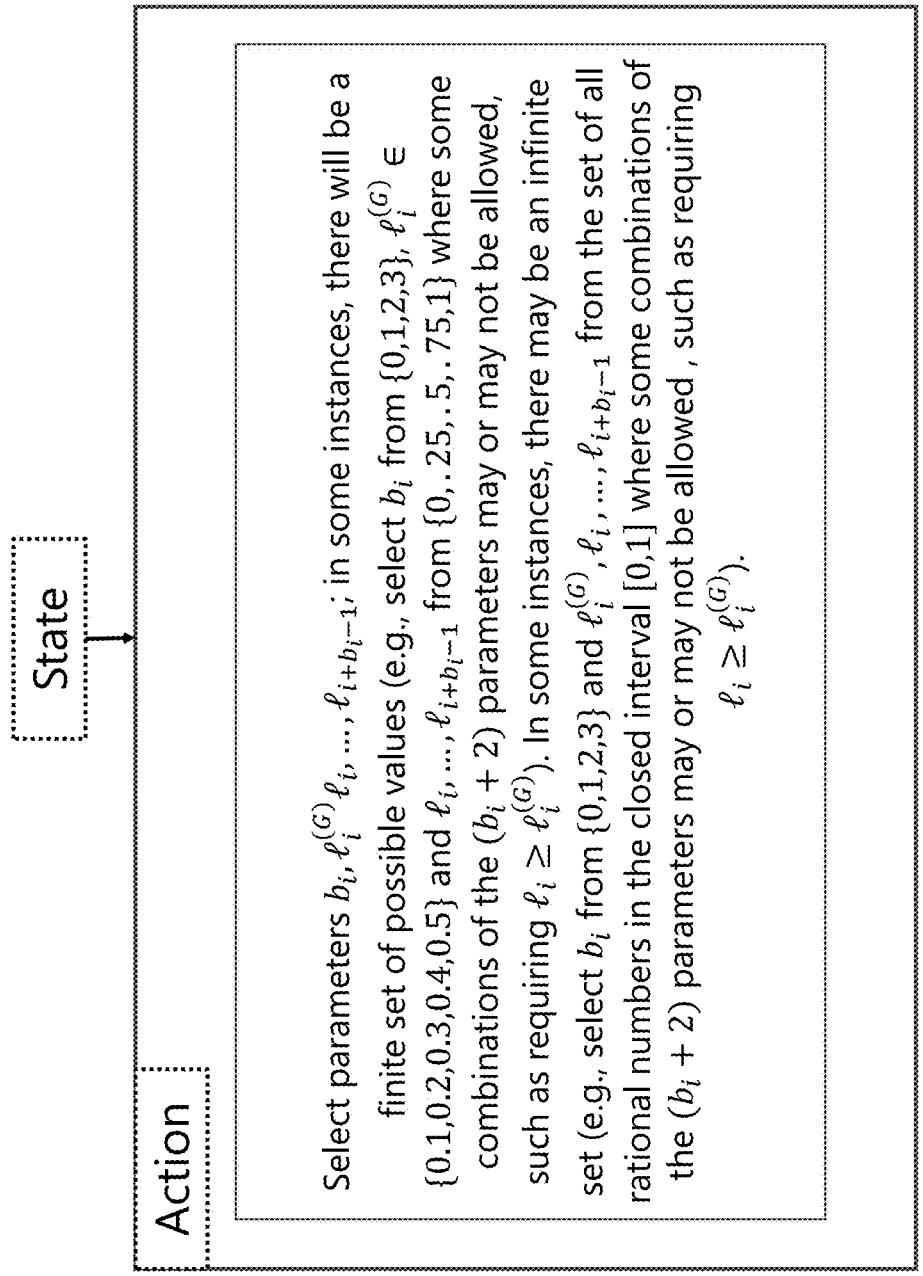
FIG. 132 shows one example for the action block of FIG. 129, in accordance with certain embodiments.

FIG. 132 shows one example for the action block of FIG. 129, in accordance with certain embodiments. The action may be taken as often as once a time slot. It may instead be less frequent; one example is to be periodic (e.g., every some fixed number of time slots), in which case feedback may or may not be returned to the streaming encoder that time slot (i+1) should maintain the estimate of $b_i$ (e.g., $b_{i+1}=b_i$) and of $l_i^{(G)}$ (e.g., $l_{i+1}^{(G)}=l_i^{(G)}$) and likewise not change the estimated parameter for the fraction of packets lost (e.g., $l_{i+b_{i+1}}=l_{i+b_{i+1}-1}$).

Figure 133:
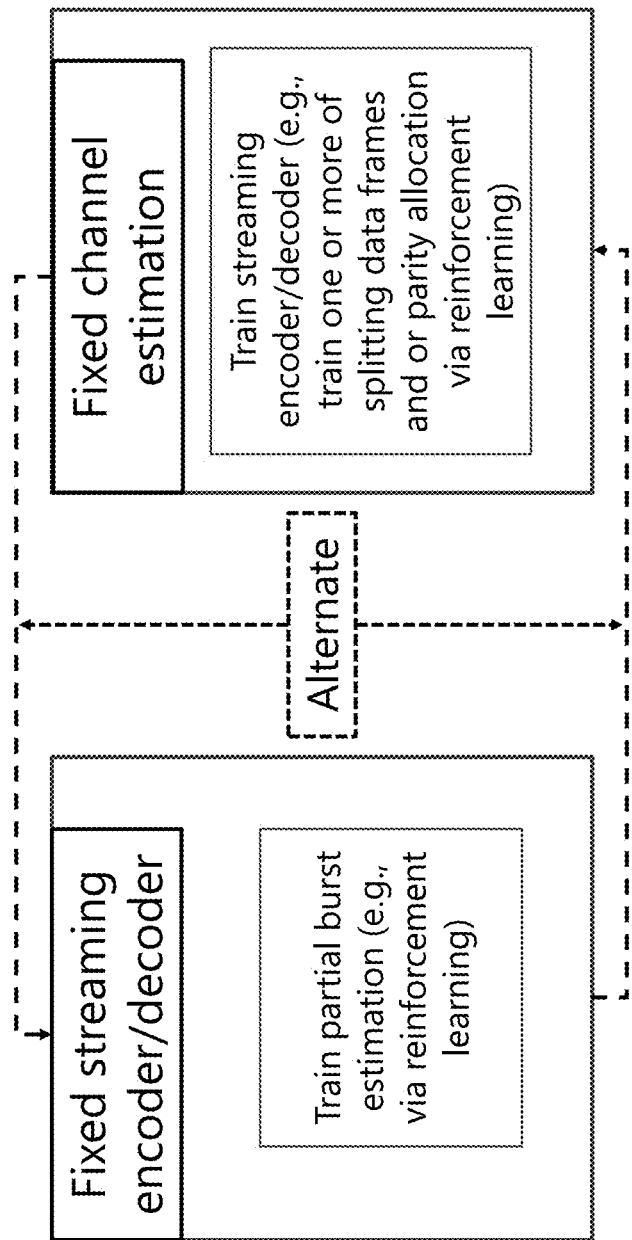
FIG. 133 shows an example of alternating training of (a) estimating the partial burst, and (b) the streaming code (e.g., splitting and/or parity allocation), in accordance with certain embodiments.

FIG. 133 shows an example of alternating training of (a) estimating the partial burst, and (b) the streaming code (e.g., splitting and/or parity allocation), in accordance with certain embodiments. Here, one methodology is introduced to synergize the actions for estimating the partial burst parameters and the streaming code (e.g., splitting). communication (e.g., splitting, spreading, splitting, and spreading, etc.). Alternate between (a) fixing partial burst estimation and optimizing the policy for communication (e.g., how to split data frames), and (b) fixing streaming encoder/decoder and optimizing the policy for estimating partial burst parameters. The optimization can be done using techniques from reinforcement learning. This can continue until the user is satisfied with performance.

Figure 134:
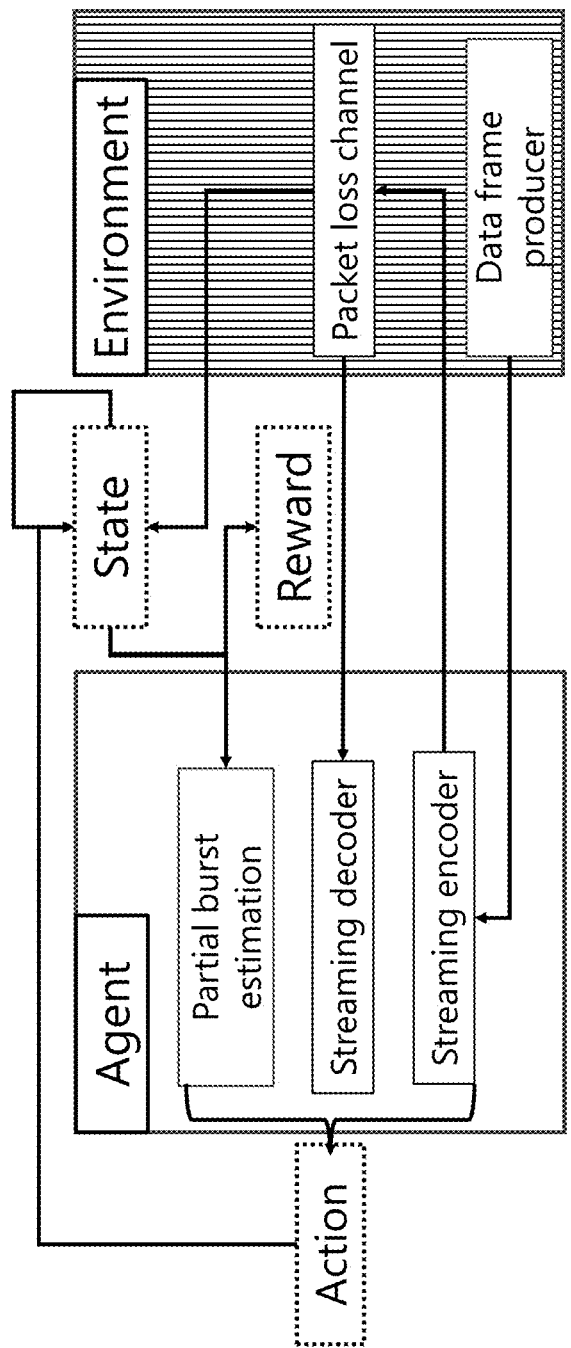
FIG. 134 shows an example of jointly training (a) estimating the partial burst, and (b) the streaming code (e.g., splitting and/or parity allocation), in accordance with certain embodiments.

FIG. 134 shows an example of jointly training (a) estimating the partial burst, and (b) the streaming code (e.g., splitting and/or parity allocation), in accordance with certain embodiments. Here, the system jointly trains both (a) partial burst estimation and (b) the streaming encoder/decoder (e.g., splitting data frames and/or parity allocation by using the state to track all information tracked by the (a) state from the partial burst estimation and (b) the state from the streaming encoder, combining their two rewards (e.g., adding them), and letting actions be the combination of actions of the partial burst estimation and the streaming encoder/decoder. Reward might still only occur every time a packet is received. Or it may be once per time slot now that complete information about what packets were lost is now available.

Figure 126:
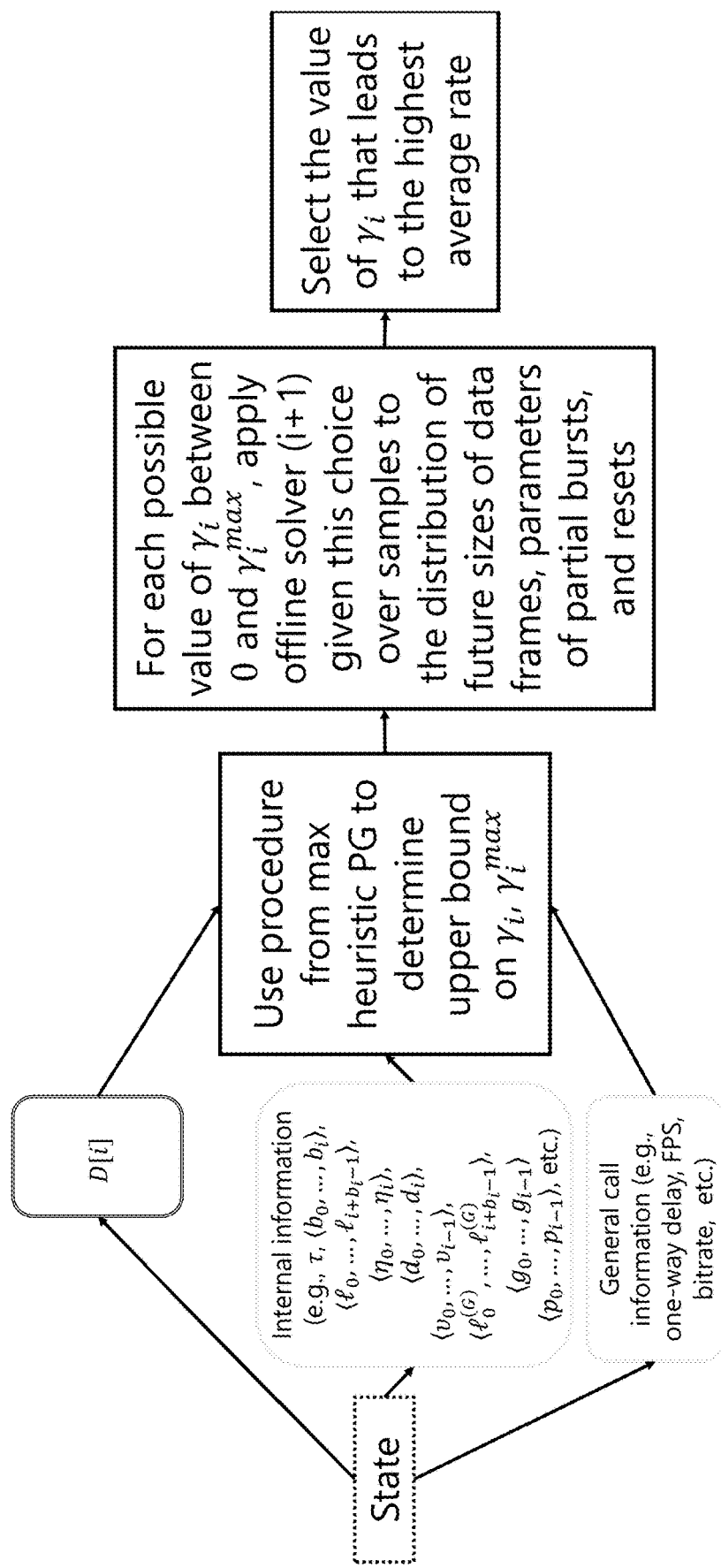
FIG. 126 shows an example of another way to split frames is using stochastic optimization to split frames on-the-fly.

Another way to split frames is using stochastic optimization to split frames on-the-fly, for example, as depicted schematically in FIG. 126. The concept here is the same as in CSIPB, except for the additional internal information and the use of the CSIPBRAL offline solver and "max heuristic PG" heuristic.

Another way to split frames is using stochastic optimization to split frames on-the-fly, for example, as depicted schematically in FIG. 126. The concept here is the same as in CSIPB, except for the additional internal information and the use of the CSIPBRAL offline solver and "max heuristic PG" heuristic. In detail, one methodology to split data frames is to (a) first determine the range of suitable values of the size of the first component using the procedure from the max heuristic PG, (b) estimate the expected optimal offline rate given each possible choice of how to split the data frame by determining the empirical offline optimal rate over samples to the distribution of future information (e.g., sizes of future frames, parameters of partial bursts and partial guard spaces, etc.), and (c) choosing the value that has the highest empirical rate.

Figure 127:
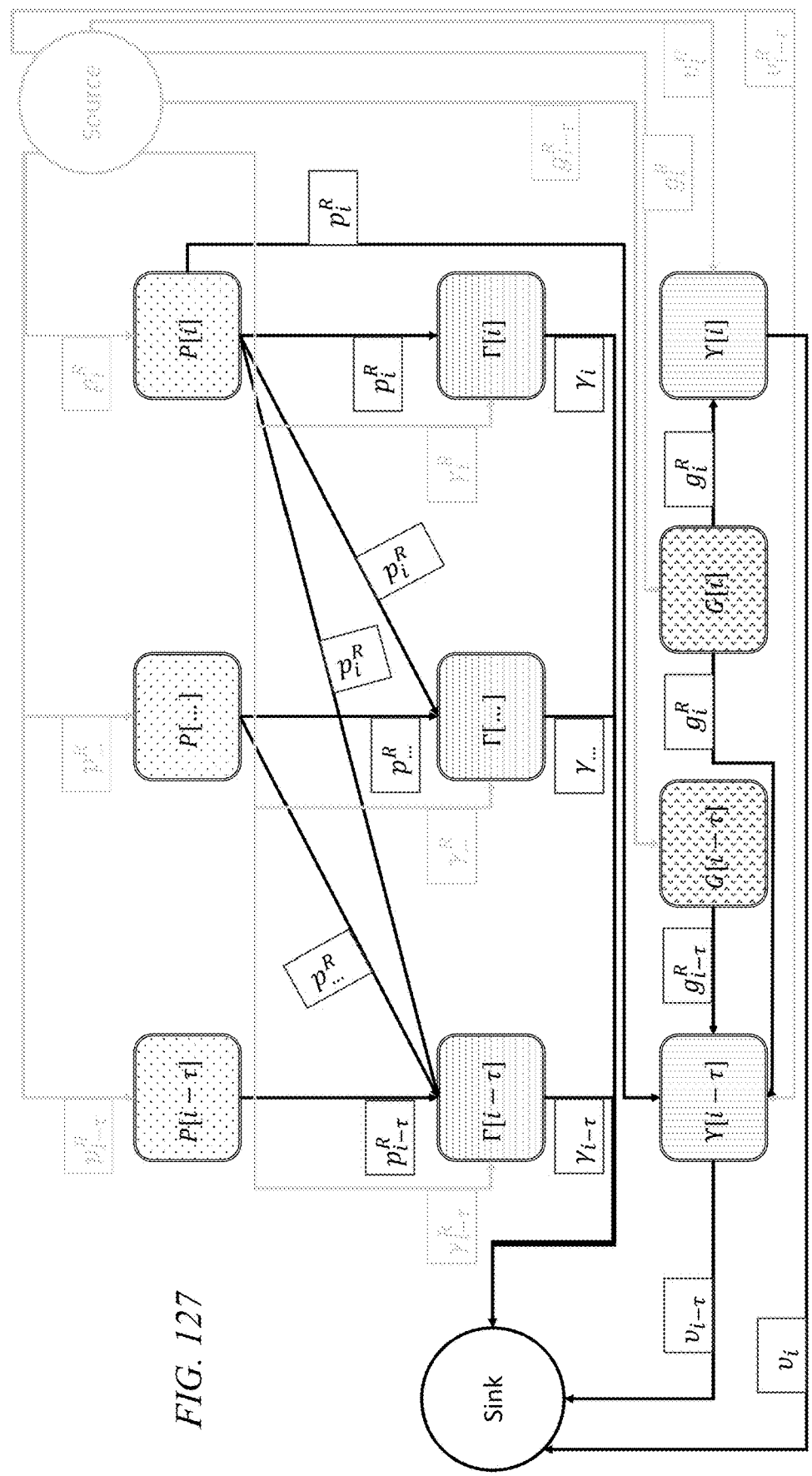
FIG. 127 is a schematic diagram for a method to determine whether the lost data of the ith data frame can be recovered assuming the prior τ data frames have been recovered, in accordance with one embodiment.

Certain embodiments can include a method to quickly determine if a data frame cannot be decoded, which can be used to avoid the expensive decoding operation (e.g., using Gaussian Elimination to solve a system of linear equations) unless the data frame is able to be decoded. FIG. 127 is a schematic diagram for a method to determine whether the lost data of the ith data frame can be recovered assuming the prior $\tau$ data frames have been recovered, in accordance with one embodiment. Here, decoding is represented using a flow graph. A maxflow can be computed (e.g., by using the Ford-Fulkerson algorithm) to determine whether decoding is possible. Essentially, the flow may reflect whether enough relevant parity symbols are received to decode each of $\Gamma[i]$ and $\gamma[i]$; based on the code's structure, this also necessitates recovering $\Gamma[i+1]$ through $\Gamma[i+\tau]$ and $\gamma[i+\tau]$. For example, there may be four vertices (labeled as $\gamma[i]$, $\Gamma[i]$, $P[i]$, and $G[i]$) for each data frame to reflect the four quantities $\gamma[i]$, $\Gamma[i]$, $P[i]$, and $G[i]$, respectively. A Source is connected to all vertices reflecting first type parity symbols for data frames i through $i+\tau$, the vertices reflecting second type parity symbols for data frames i and $i+\tau$, all vertices reflecting the first component of data frames i through $(i+\tau)$, and the first component of data frame i. Edge capacities are shown in the graph; for edges between Source and vertices representing a first or second component of a data frame, the capacity is the number of received symbols of that component of that data frame. For edges between the Source and vertices representing the first type parity symbols of a frame, the edge capacity is the number of received first type parity symbols of that data frame. For edges between the Source and vertices representing the second type parity symbols of a frame, the edge capacity is the number of received second type parity symbols of that data frame. Vertices representing parity are connected to the vertices reflecting data that was used to create the parity (i.e., if there was an edge between corresponding components of the factor graph). All vertices representing the first or second component of a data frame are connected to the Sink; the capacity of the edge from one such vertex to the Sink is the size of the corresponding component. A maxflow is computed (e.g., by using the Ford-Fulkerson algorithm). Decoding of data frame $(i-\tau)$ is deemed possible if and only if the flow to Sink is at least the sum of (a) the sizes of the first component of data frames $i-\tau$ through i plus (b) the sum of the size of the second components of data frames $(i-\tau)$ and data frame i.

Figure 128:
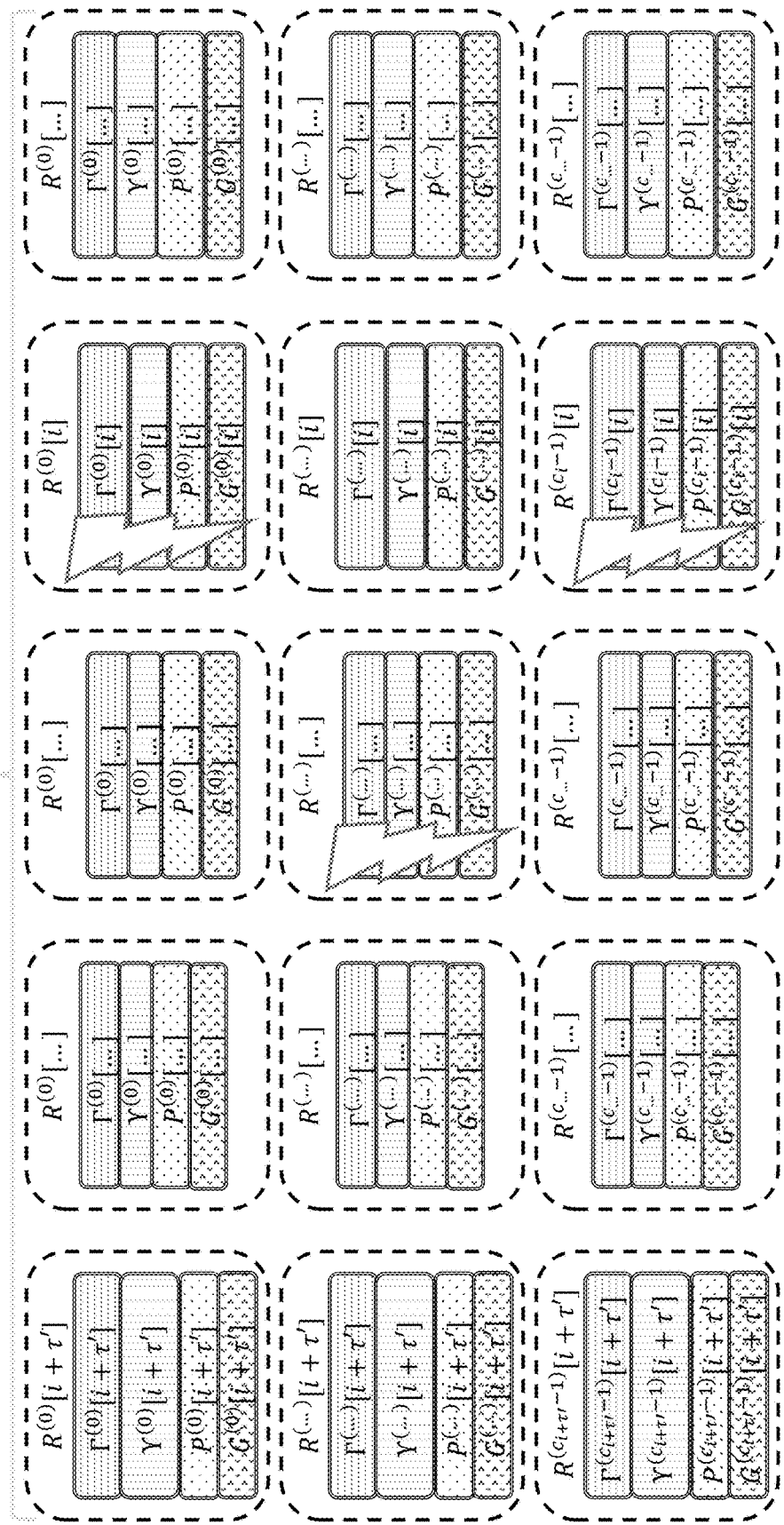
FIG. 128 shows an example of intended loss recover from the perspective of a frame when using a failsafe for CSIPBRAL, in accordance with certain embodiments.

FIG. 128 shows an example of intended loss recover from the perspective of a frame when using a failsafe for CSIPBRAL, in accordance with certain embodiments. Here, the goal is to recover all lost symbols of D[i] during time slot $(i+\tau')$ by solving a system of linear equations over $D[i-\tau':i+\tau']$ using $D[i-\tau':i-1]$ and the received symbols of (a) $P[i:i+\tau']$, (b) $G[i:i+\tau']$, and (c) $D[i:i+\tau']$. One way to do so is to use Gaussian Elimination to solve the system of linear equations. The symbols of $D[i-\tau':i-1]$ are assumed to already be decoded by time slot $(i+\tau')$. A complementary failsafe of sending feedback from the receiver to the sender to generate a keyframe (i.e., an uncompressed frame that does not depend on prior uncompressed frames) can be applied on top of the new failsafe by triggering the new keyframe when frame i has not been recovered (e.g., by some number of time slots, such as by time slot $(i+\tau'+1)$)–this extra failsafe is similarly applied as in CSIPB.

It should be noted that embodiments can be applied to batch encoding and decoding with striping, similar to CSIPB. For example, the same streaming encoder may be applied to all parts; for example, the streaming encoder may be the variant of CSIPBRAL with packetization #2, the heuristic for splitting data frames to minimize parity associated with each data frame, and a heuristic parity allocation (e.g., allocate roughly just enough parity symbols for $p_{i+\tau}$ to recover the missing symbols of $\gamma[i]$ when also using the received parity symbols of $G[i]$ in the first type parity symbol allocation). Alternatively, a different streaming encoder/decoder could be used for each stripe (e.g., different randomly generated encoding matrices) such that both encoding and decoding can be done in parallel (i.e., at the sender and receiver, respectively); in this case, the "side information" generally would not be needed or used. Striping can be added to CSIPBRAL analogously to how striping is added to CSIPB (where striping is applied to G[i] under CSIPBRAL analogously to how striping was applied to P[i] under CSIPB).

It also should be noted that CSIPBRAL can be extended to include frame splitting into more than two components and/or to more than two types of parity symbols.

FIGS. 151-163 provide an example of frame splitting, parity generation, and packetization under CSIPBRAL, in accordance with certain embodiments. Merely for the sake of demonstration, it is assumed for this example that we intend loss recovery of one possible partial burst starting slot i=4 of length $b_i=2$ time slots followed by a partial guard space of $\tau=3$ time slots. In this example, for all $w \in \{0,1,2,3,4,5,6,7,8,9,10,11\}$, $b_w=2$, $l_i=\frac{2}{3}$, $l_w^{(g)}=\frac{1}{3}$, and for $i \in \{4,5,6,7,8\}$, the size of the ith frame is 24z for some positive integer z.

Figure 151:
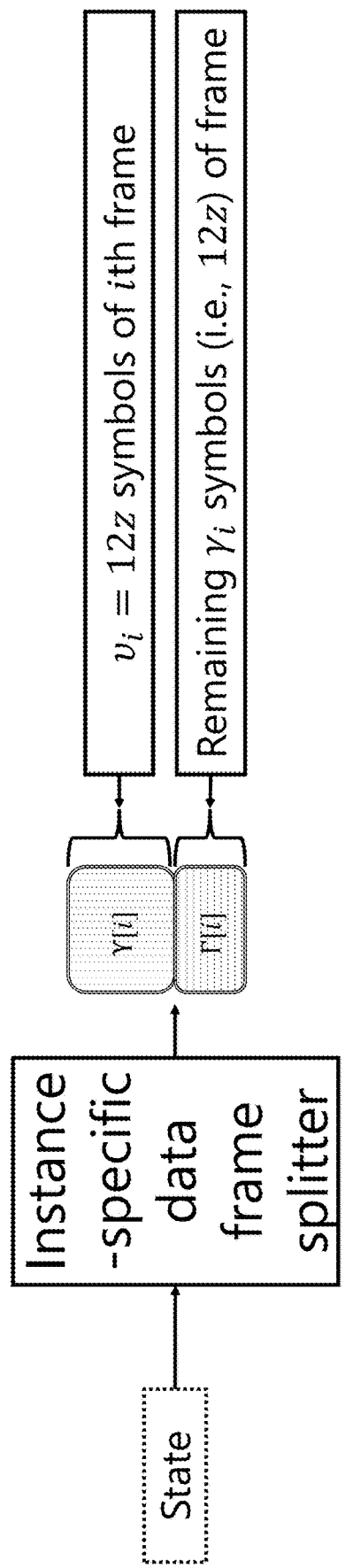

FIG. 151 shows an example frame splitting scheme for $i \in \{4,5,6,7,8\}$ in which, for the sake of simplicity, it has been determined that 12z symbols are allocated to $\gamma[i]$ and the remaining 12z symbols are allocated to $\Gamma[i]$. Of course, the frames could be split differently including variably based on any criteria discussed herein (e.g., feedback from receiver, predictive analytics, etc.).

Figure 152:
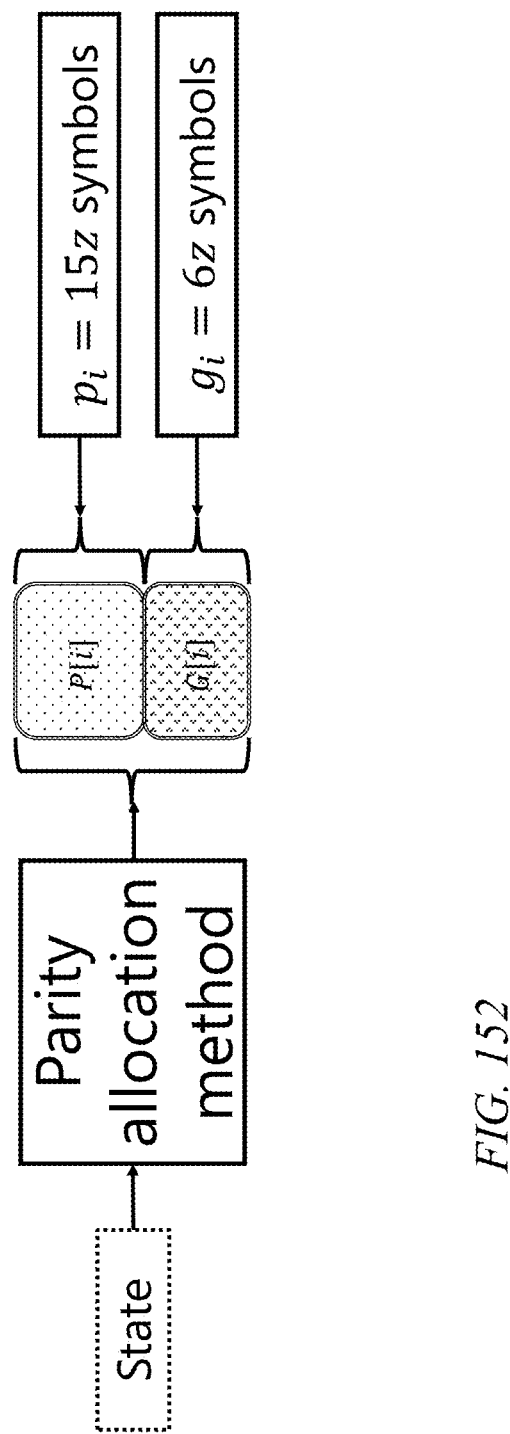

FIG. 152 shows an example of parity allocation for $i \in \{4,5,6,7,8\}$ in which it has been determined that 15z symbols are allocated to P[i] and 6z symbols are allocated to G[i]. Of course, parity could be generated differently including variably based on any of the criteria discussed herein.

Figure 153:
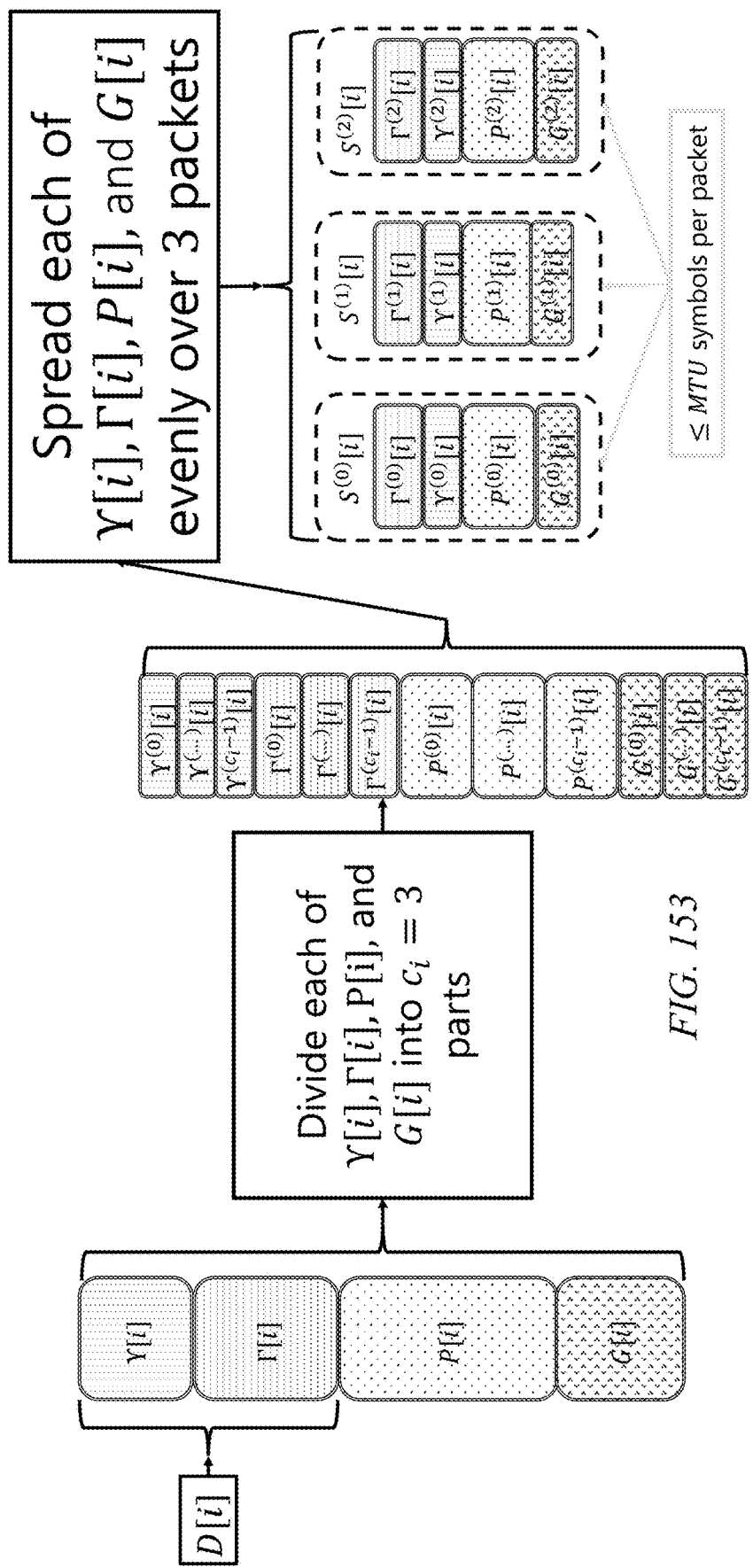

FIG. 153 shows an example of packetization for $i \in \{4,5,6,7,8\}$. In this example, it is assumed that 15z≤MTU. Three packets are sent (i.e., $S^{(0)}[i]$, $S^{(1)}[i]$, and $S^{(2)}[i]$), where each packet contains one-third of the symbols of each of $\gamma[i]$, $\Gamma[i]$, P[i], and G[i]. This totals 15z symbols, which is assumed to be no more than MTU (to simplify the example). Under this packetization, the following conditions hold: (a) each packet's size does not exceed the maximum transmittable unit, (b) the number of packets times $l_i$ is an integer (i.e., $\frac{2}{3}*3=2$), and (c) the number of packets times $l_i^{(G)}$ is an integer (i.e., $\frac{1}{3}*3=1$).

Figure 154:
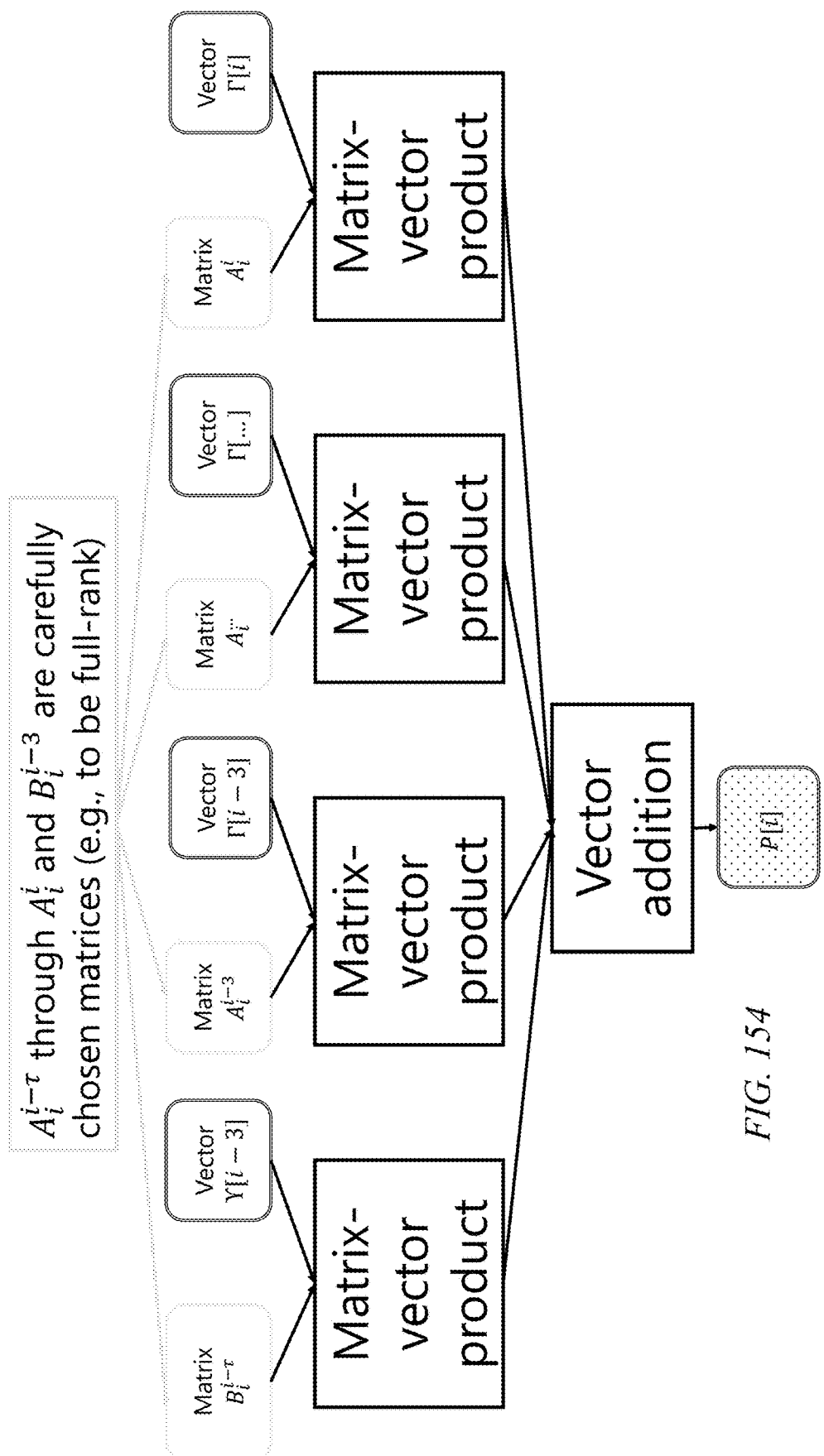

FIG. 154 shows an example of first type parity symbol generation for the ith time slot for i∈{4,5,6,7} with no failsafe.

Figure 155:
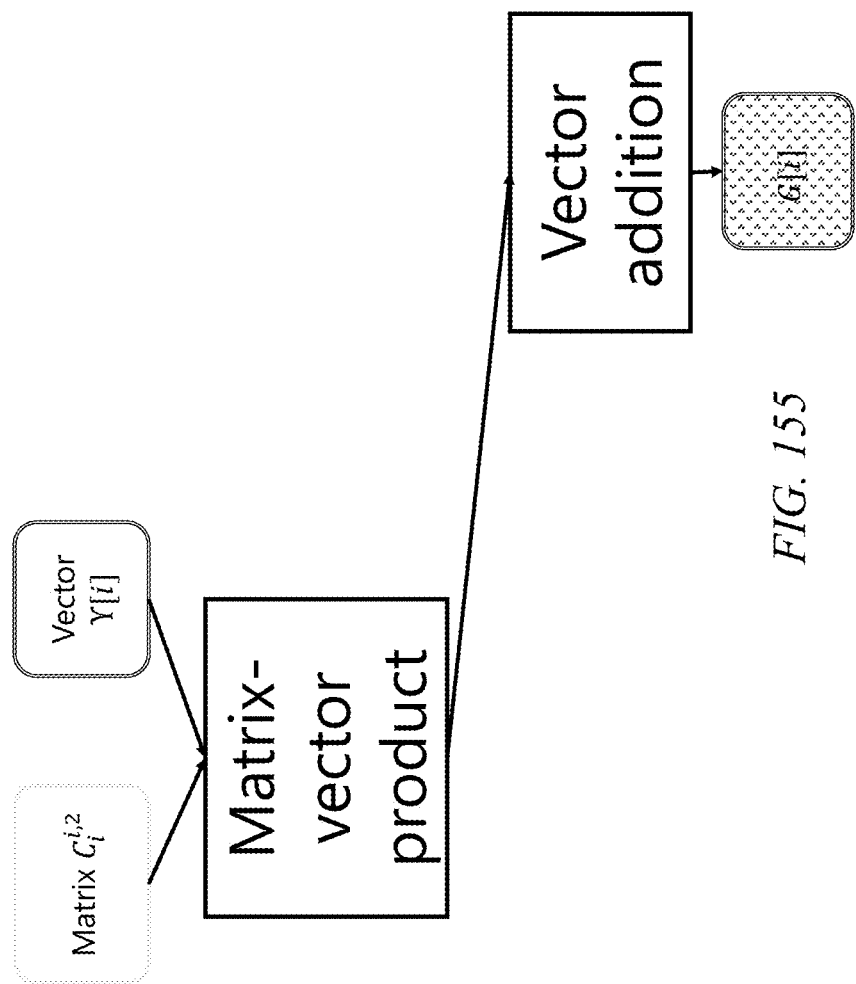

FIG. 155 shows an example of second type parity symbol generation for the ith time slot for i∈{4,5,6,7} with no failsafe. In this example, all $C_i^j$ for j∈{i−τ, . . . , i} are the all-zero matrices and are not shown (i.e., the calculation is reflective of what is shown in FIG. 79 except with $C_i^j$ as the all-zero matrix for each j in {i−τ, . . . , i}).

Figure 156:
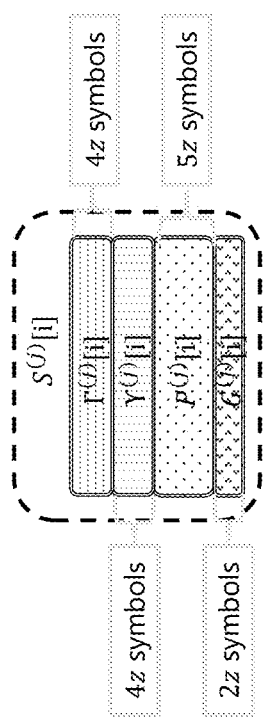

FIG. 156 shows an example of the sizes of the parts of the jth transmitted packet for frame i for i∈{4,5,6,7,8} and for j∈{0,1,2}. In this example, Γ[i] contains 4z symbols, γ[i] contains 4z symbols, P[i] contains 5z symbols, and G[i] contains 2z symbols. Note that all frames are the same size in this example for simplicity of presentation. The sizes of the transmitted packets are each 15z where z is assumed to be a positive integer so that 15z is no more than one MTU. Stripes are not used in this example for simplicity, but stripes may be used (e.g., for any divisor of z).

Figure 157:
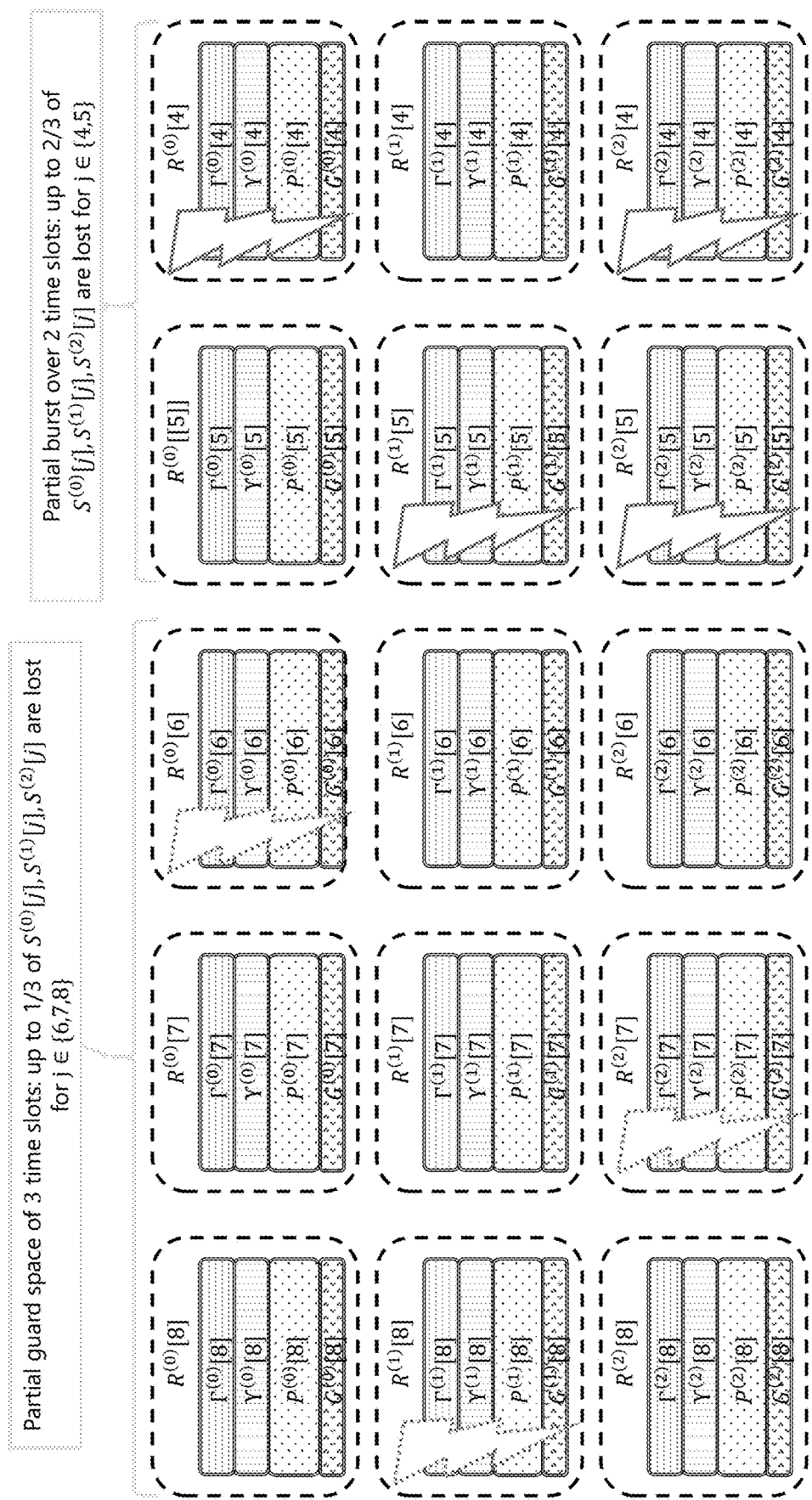

FIG. 157 shows an example partial burst loss for the above example in which there has been a partial burst over two time slots (i.e., time slots 4 and 5) where up to $l_i$ packets are lost per time slot followed by a partial guard space of three time slots (i.e., time slots 6 through 8) where up to $l_w^{(G)}$ packets are lost per time slot. The convention is used of showing a lightning bolt with (a) a thick outline, and (b) an outline with dashes of squares to reflect the two respective types of losses (in partial burst vs in partial guardspace).

Figure 158:
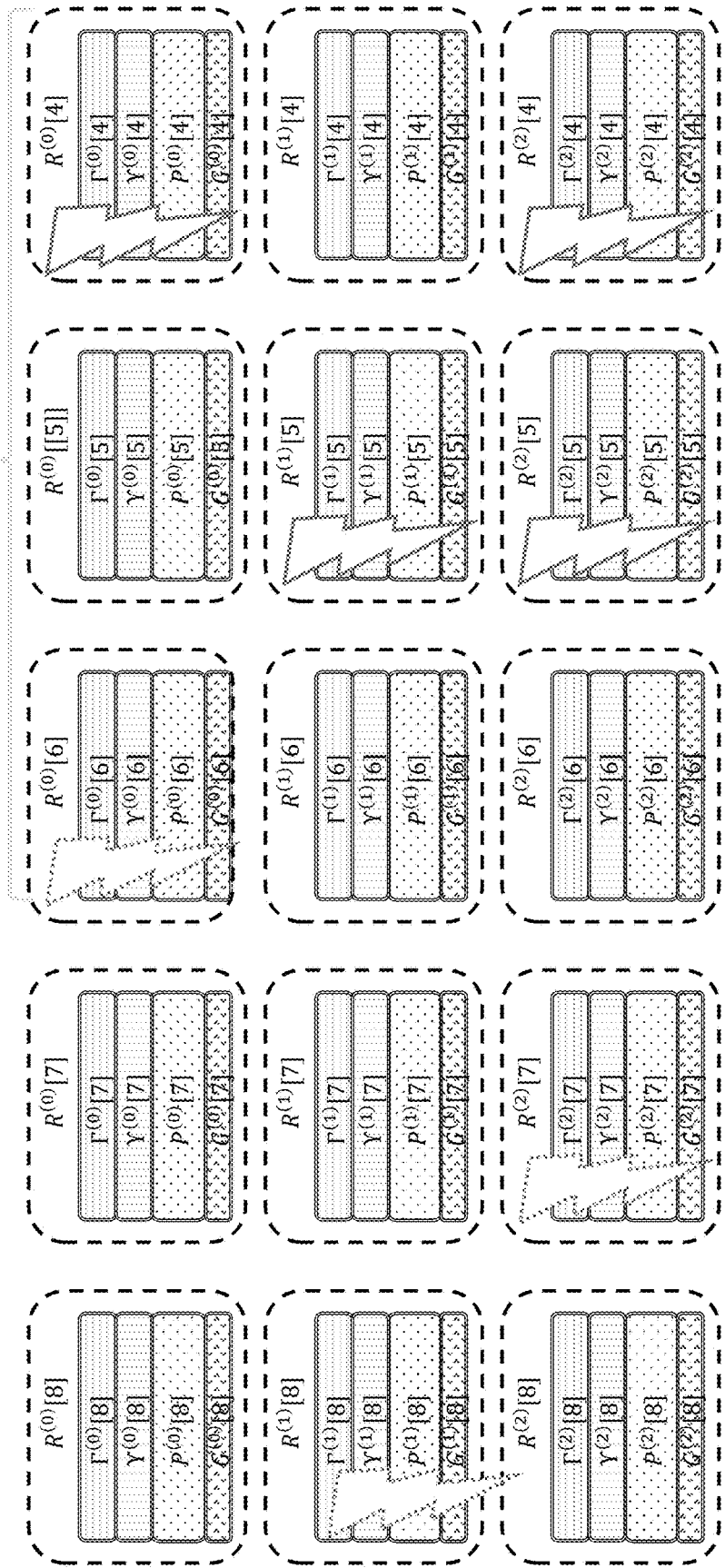
Figure 159:
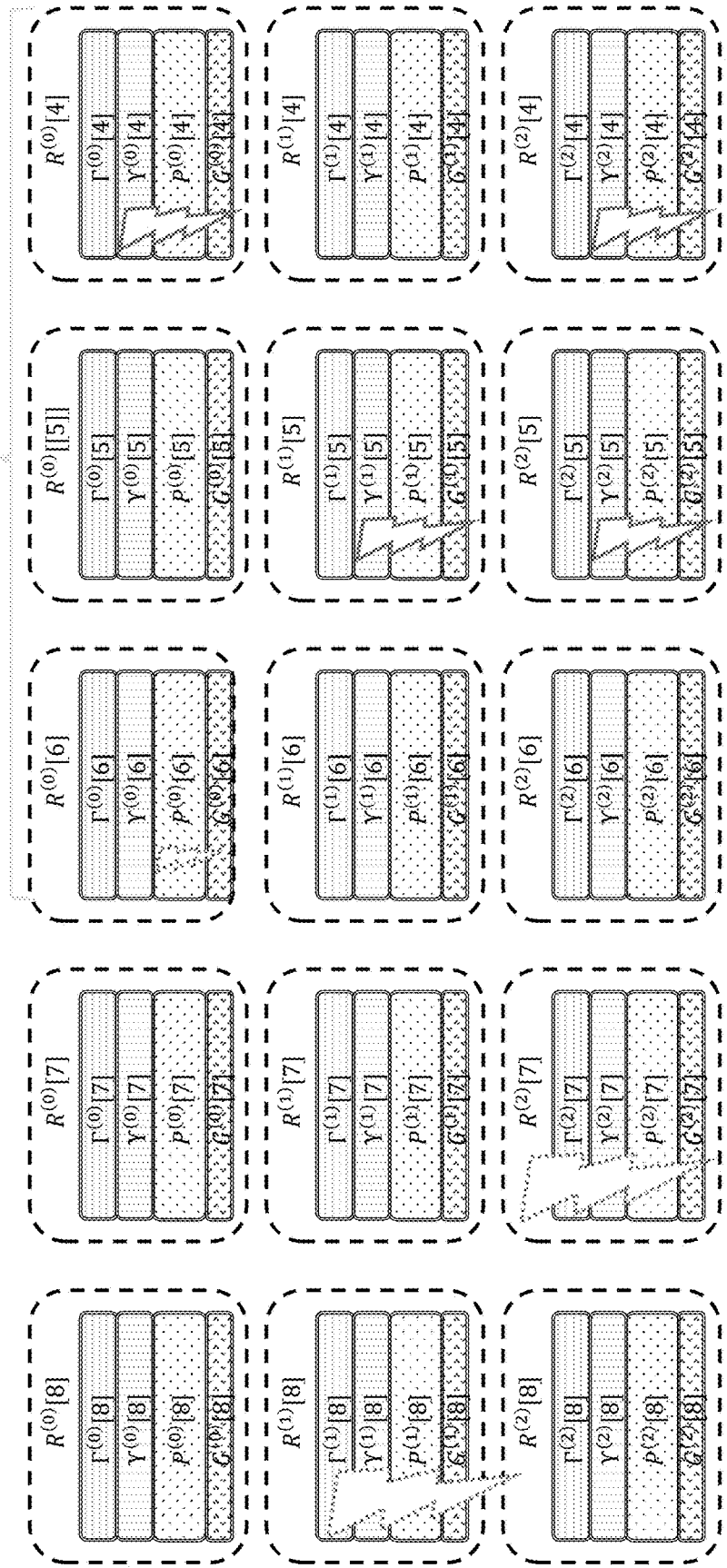
Figure 160:
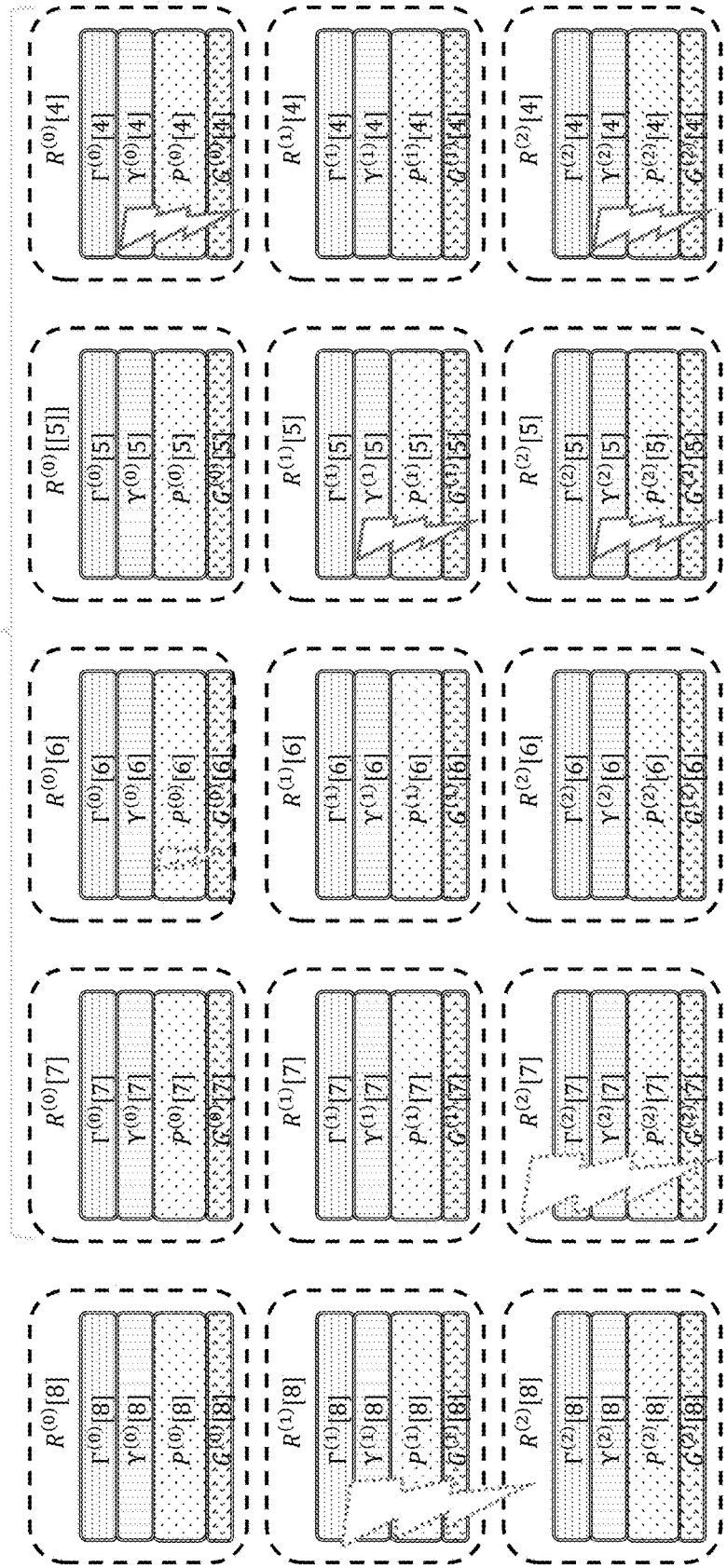
Figure 161:
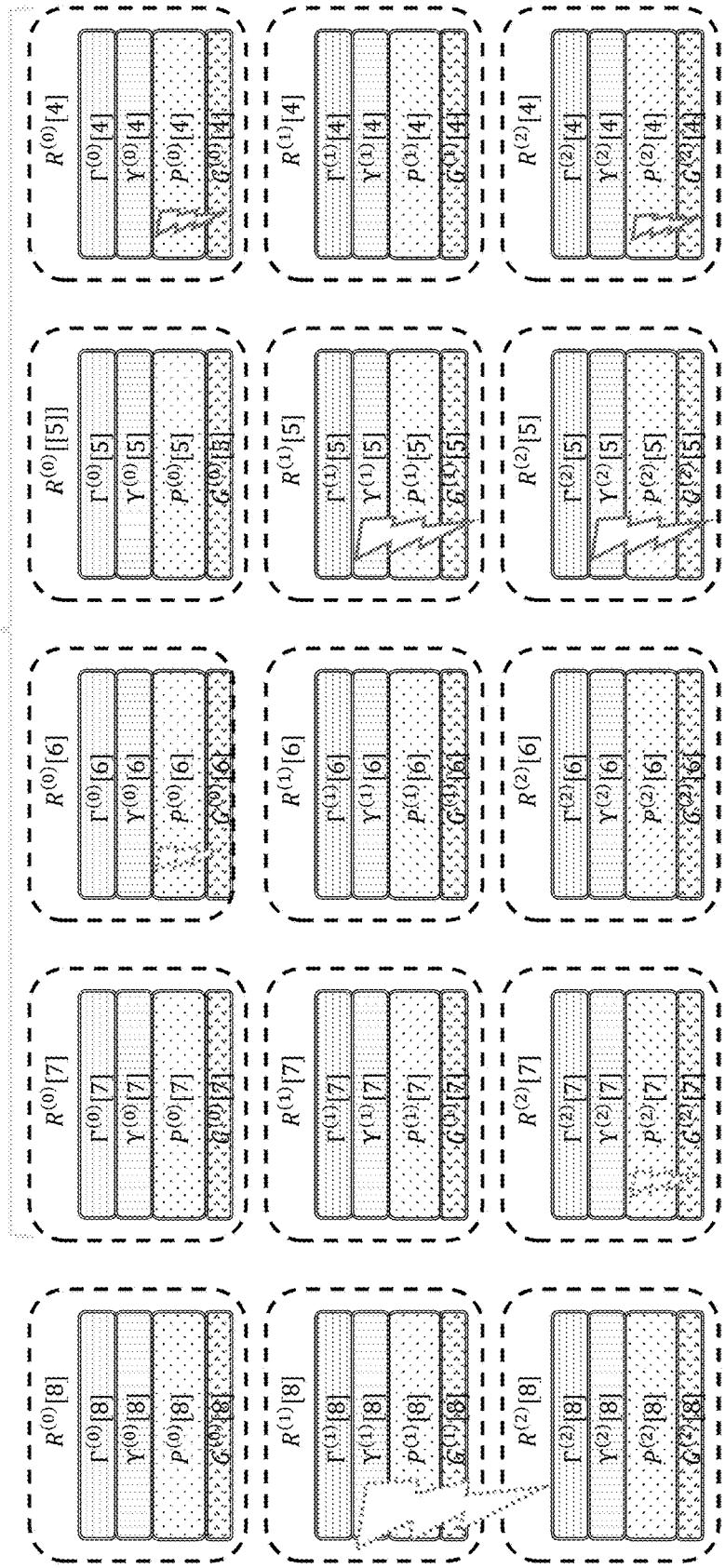
Figure 162:
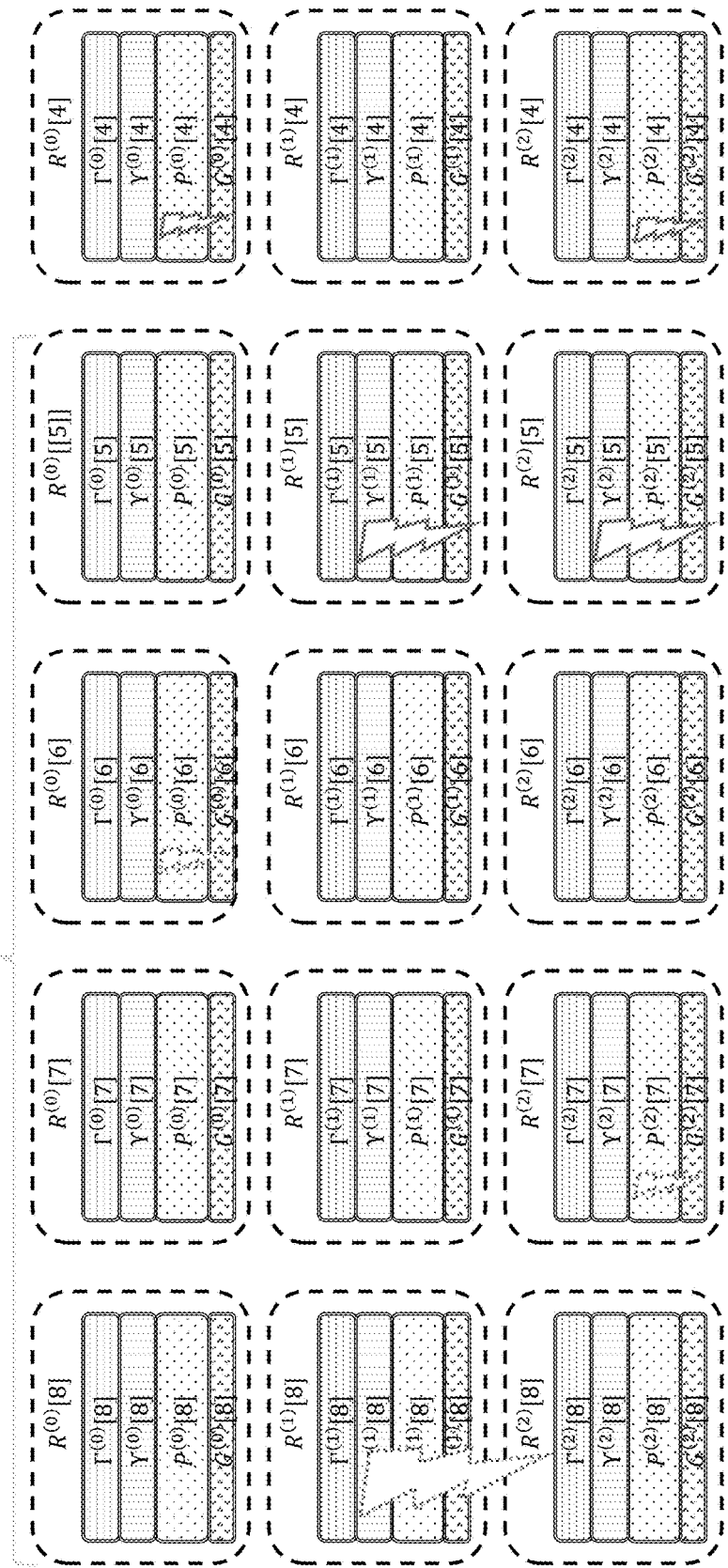
Figure 163:
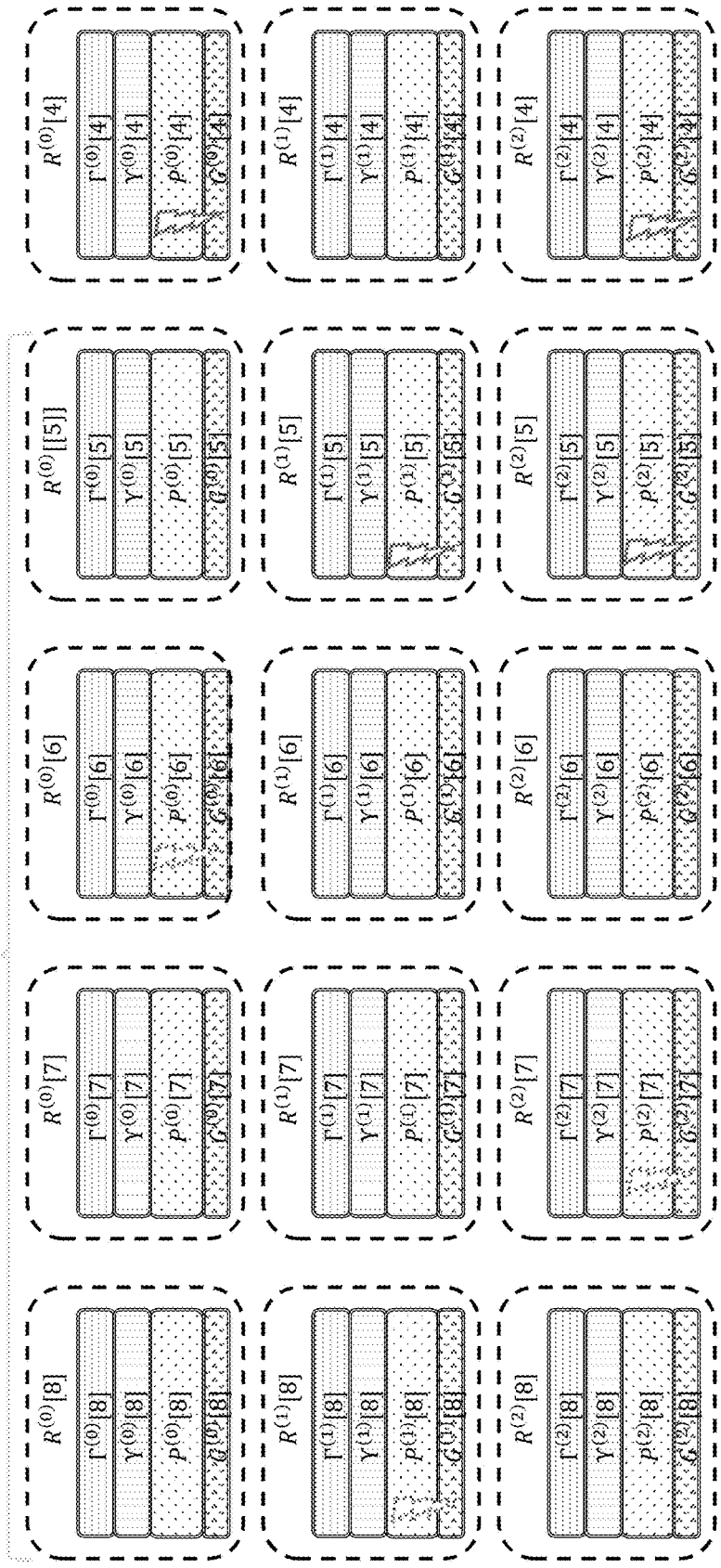

FIG. 158 shows an example of recovery of 24z missing symbols of the first components of frames 4, 5, and 6 (i.e., Γ[4:6]) and second component of frame 6 (i.e., γ[6]) during time slot 6 using 24z received parity symbols (i.e., from P[4:6] and G[6]). After recovery during time slot 6, the remaining missing symbols (sent by time slot 6) are (a) lost parity symbols of P[4:6] and G[4:6], and (b) lost data symbols of γ[4:5], as depicted in FIG. 159. As depicted in FIG. 160, there are 12z missing symbols of the second components of frames 4 and 7 (i.e., 8z from γ[4] and 4z from γ[7]) and 4z missing symbols of the first component of frame 7 (i.e., Γ[7]) which are recovered during time slot 7 using 16z received parity symbols of P[7], G[7], and G[4] (which provide 10z, 4z, and 2z symbols, respectively). After recovery during time slot 7, the remaining missing symbols (through time slot 7) are (a) lost parity symbols of P[4:7] and G[4:7] and (b) lost data symbols of γ[5], as depicted in FIG. 161. Additionally, there are 12z missing symbols of the second components of frames 5 and 8 (i.e., 8z from γ[5] and 4z from γ[8]) and 4z missing symbols of the first component of frame 8 (i.e., Γ[8]) which are recovered during time slot 8 using 16z received parity symbols of P[8], G[8], and G[5] (which provide 10z, 4z, and 2z symbols, respectively), as depicted in FIG. 162. As depicted in FIG. 163, by the end of time slot 8, all data has been recovered for D[4:8]. Note that some of the parity symbols may be recoverable from the recovered data but are still marked as missing for simplicity in this example.

Heuristic with No Second Component

Figure 135:
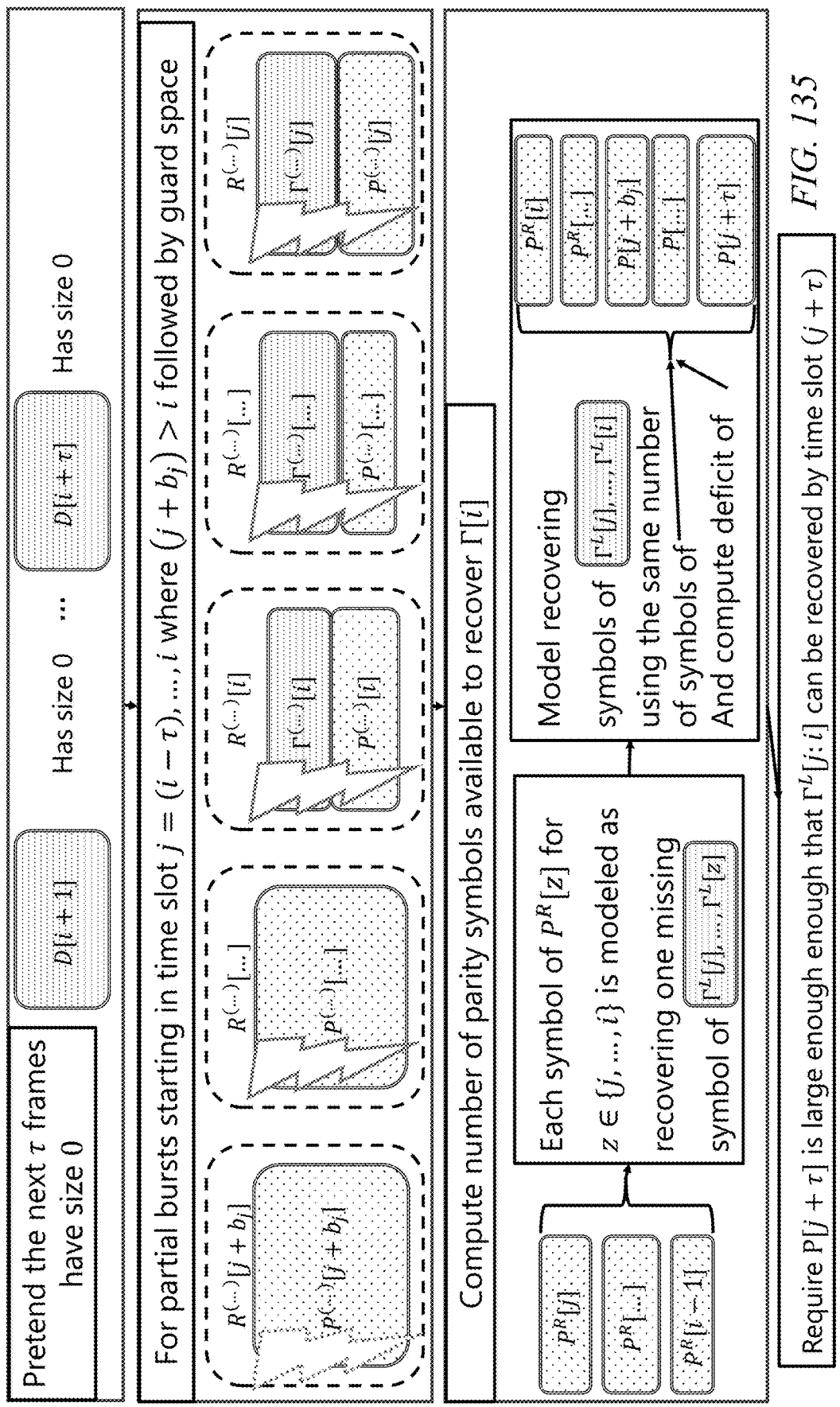
FIG. 135 illustrates another heuristic for encoding data frames to minimize parity associated with each data frame i by allocating all symbols to the first component (i.e., Γ[i]=D[i] for each time slot i).

FIG. 135 illustrates another heuristic for encoding data frames to minimize parity associated with each data frame i by allocating all symbols to the first component (i.e., Γ[i]=D[i] for each time slot i). This heuristic can be applied to both CSIPB and CSIPBRAL, i.e., to both scenarios of (a) guard spaces, and (b) partial guard spaces.

This heuristic may be combined with the following heuristic for allocating parity symbols with guardspaces: temporarily set $p_{i+\tau}=0$ and assume that $k_{i+1}, \ldots, k_{i+\tau}$ are all zero. For each time slot i, for each time slot j between (i−τ) and i (inclusive), increase the number of parity symbols to be sent at the deadline ($p_{j+\tau}$) by as little as possible so that the following holds. For any partial burst starting in time slot j, the number of received data symbols during the partial burst, plus the number of useful parity symbols received during the partial bursts, plus the number of parity symbols received after the partial burst by time slot (j+τ) is at least the number of data symbols from frames j through i (i.e., $$\left(\text{i.e., } \sum_{z=j}^{i} k_z\right).$$

One way to determine how to encode data frames is to use a heuristic that determines the size of the first component contains all symbols of a frame. Then the heuristic for pre-allocating parity symbols can be as follows. Here, the system essentially pretends that the next τ frames are of size 0 (i.e., $k_{i+1}=0=\ldots=k_{i+\tau}$) and that $p_i+\tau=0$. Next, for each time slot j=i−τ, . . . , i where a partial burst starting in time slot j can encompass time slot i, consider a burst starting in time slot j should be as large as possible subject to the following constraint. Suppose the next τ frames have size 0. For any partial burst that includes the current time slot, then all symbols of the first component that are lost in the partial burst are recovered by τ time slots after the start of the partial burst with high probability.

Note that in the scenario of a partial guard space, a guard space (not a partial guard space) is assumed; the reason is that a partial guard space would lead to only using the pre-allocated parity symbols of P[z] in time slots z=i+1, . . . , j+τ−1 and that they are all received; in the event that $l_z^{(G)}>0$ then the number of parity symbols of P[z] would be increased until the number that are received and available to recover D[i] (i.e., not used to recover lost symbols of D[z]) match the number that are pre-allocated under certain embodiments.

Multimodal CSIPBRAL

As discussed above, CSIPBRAL has been designed to address the issue of loss recovery when there are losses during τ time slots under a partial burst, for example, by adding a new extra type of parity symbol, G[i], and by implementing a two-stage parity allocation process. However, similar to the ability to use $l_i$, $b_i$ as "tuning knobs" in CSIPB, parameters such as $l_i$, $b_i$, $l_i^{(G)}$ can be used as "tuning knobs" in CSIPBRAL rather than as merely parameters of burst. Among other things, such tuning would allow implementations of CSIPBRAL to effectively support or switch between a CSIPBRAL mode in which the second (or third, fourth, fifth, etc.) type of parity is used and a CSIPB mode in which only the first type of party is used (e.g., by setting $l_i^{(G)}=0 \forall i$ and $g_i=0$ for all i, the partial guard space of CSIPBRAL effectively becomes a guard space as in CSIPB with the encoder operating substantially as a CSIPB encoder). Such multimodal operation can be controlled, for example, based on feedback from the receiver indicating whether or not protection for partial guard space losses is needed.

More generally, embodiments can support any of the various frame splitting mechanisms (e.g., heuristics) and/or any of the various parity allocation mechanisms to address virtually any performance goal, e.g., actual losses, predicted losses, bandwidth constraints, or other performance goals.

FEC-Aware Compression and Compression-Aware FEC

Consider a call comprising a sequence of t uncompressed frames, U[0:t]. Suppose during time slot i=0, . . . , t that the uncompressed frame is compressed into data frame D[i], and then some protocol is used to communicate D[i] reliably (with sufficiently high probability) over a lossy channel. Suppose that the protocol for reliably communicating D[i] typically involves sending a number of symbols that depends on the size of D[i], the sizes of one or more prior data frames, and the number of symbols sent during one or more previous time slots. For example, D[i] might be communicated directly, plus some additional parity symbols might be send to ensure loss-recovery of the symbols of D[i] in a timely manner with high probability This scenario is common in a large class of coding schemes, including but not limited to CSIPB and CSIPBRAL. Under existing methods, one would typically compress the uncompressed frames independently of the protocol used to communicate reliably. For example, this could be done for an application like videoconferencing using CSIPB combined with a video codec.

Certain embodiments coordinate the two components of (a) compression, and (b) reliable communication, particularly by designing the compression to fit into the reliable communication scheme. The intuition is as follows. Consider CSIPB and during time slot i allocating parity symbols to be sent τ time slots later so that just enough are received to recover symbols of the second component of data frame i that may be lost in a partial burst. If one increases the size of some data frames, the second component of those data frames will be increased by some amount, causing the number of parity symbols allocated during time slot i to increase. But increasing the size of other data frames may lead to increasing only the size of the first component (i.e., maintaining the size of the second component); this can mean that no extra parity symbols are allocated (e.g., if the future frames are small and also can allocate all data to the first component without sending additional parity symbols). Increasing the sizes of some data frames and decreasing others may lead to (a) the same amount of data being sent while (b) less parity symbols are sent. Either these savings in bandwidth could be realized, or the extra bandwidth could be reallocated to increase the sizes of other data frames, leading to more data being sent with the same bandwidth usage overall. Alternatively, given that the process leads to lower bandwidth utilization overall, one could then send additional parity symbols (e.g., by setting the channel parameters more conservatively) to attain higher reliability without increasing the overall bandwidth utilization.

Therefore, certain embodiments enable optimizing compression to synergize with FEC for real-time communication. One example of how this can be done includes optimizing for the amount of transmitted data after FEC is applied rather than optimizing for size of data frames, e.g., by selecting the size of a data frame based on properties of the FEC scheme. To do so, one could leverage results from existing work on compression (e.g., "Learned Video Compression"), which has designed "spatial rate control" where one can specify for a data frame what the bitrate should be for compressing different spatial regions of the data frame.

Another example of how this can be done includes optimizing for a sequence of data frames that lead to a high QoE after packet loss followed by FEC decoding. Another example of how this can be done includes informing the FEC scheme about how to tune its parameters (knobs) to best synergize with compression (e.g., under CSIPB and/or CSIPBRAL, indicating to the encoder which parts of the data frame are needed sooner and should be allocated or the first component to have the potential to be recovered sooner, versus which parts are acceptable to recover later and might comprise the second component.

Another example of how this can be done includes spreading information over one or more additional time slots. For example, the spreading of information content could involve creating a compression to provide a less refined version of the data now and during one or more later time slots sending along extra information to refine the prior information. One way to do this is to send a compression that is decompressed to a blurry image now and later send extra information that can fill in the blurry parts to make them crisp. This is known, as sometimes compression can lead to multiple layers where some layers are more important than others and/or some layers are not needed to decode an estimate of the uncompressed frame (these layers merely refine the estimate). Another way is to defer compressing some information now and instead compress it later (making the data frame smaller and a later data frame bigger); for example, for a video, during compression, leave a spatial portion of the image (e.g., the upper rightmost part) to be blurry for the ith data frame but then during compression of the (i+1)th uncompressed frame ensure that the compression provides information about this previously-blurry spatial portion (e.g., refining that portion so that its image is clear); then for later uncompressed frames (e.g., uncompressed frame (i+2)) the added information about that spatial location for uncompressed frame (i+1) will be used in compression. Another technique is to build upon existing work (e.g., "Learned Video Compression"), which has designed "spatial rate control," by allocating the data for one or more stable and/or less important region(s) to be sent later. This spreading can be applied under any FEC scheme and packet loss channel, including CSIPB with partial bursts then guard spaces and/or CSIPBRAL with partial bursts then partial guard spaces wherein only some packets per time slot may be lost.

Prior work of the inventor has shown how to spread some number of symbols of each data frame over the transmission of its time slot and one or more additional time slots (in particular, up to $\tau_L$ time slots, where the model assumes that one can wait up to $\tau_L$ extra time slots to recover any data of a data frame even when there are no losses); this involved selecting the symbols to be spread without regard to the structure of the compression, which is why all such symbols may need to be recovered before obtaining any information about the current data frame. This approach of spreading has only been applied to a setting where all or no data of a data frame is received based on packet losses. Also, this prior work did a different (less general) form of spreading where it spread arbitrary symbols (or the first or final bunch of symbols) rather than spreading information. The approach applies on top of existing compression/decompression methods to tune them to make them synergize well with FEC.

The following is a supplemental glossary for the following data compression discussion:

| Term | Definition |
| --- | --- |
| Target size | The objective for the size of the data frame (e.g., D[i]) |
| Primary target size | The objective for how many symbols should be sent for the current uncompressed frame in the data frame |
| Secondary target size | The objective for how many symbols should be created to be sent over one or more later time slots to provide additional information about the current uncompressed frame |
| D'[i] | The combination (e.g., concatenation) of two components of a compression of the current uncompressed frame (and potentially previous uncompressed frames): the primary target size symbols that are to be sent during the current time slot and the secondary target size symbols that are to be sent later |

Figure 136:
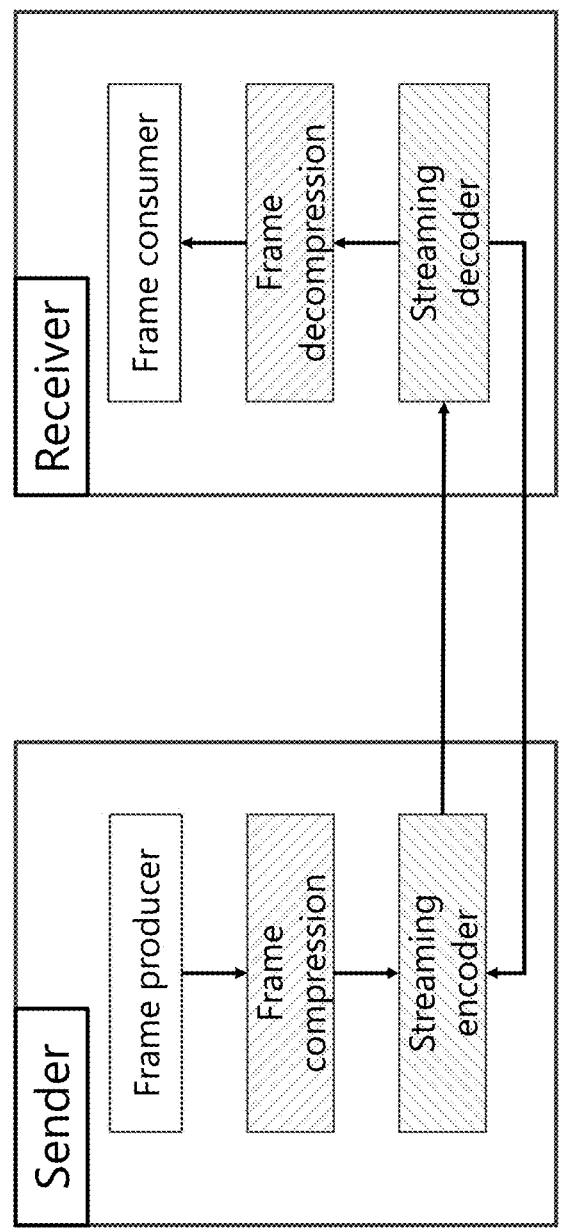
FIG. 136 is a schematic diagram of a data compression system, in accordance with certain embodiments.

FIG. 136 is a schematic diagram of a data compression system, in accordance with certain embodiments. Under existing works, the following is standard. First, uncompressed frames are created by an application (e.g., shown as frame producer), then they are compressed independently of the communication scheme. The communication scheme (i.e., streaming encoder/decoder) is applied. Afterwards, at the receiver, decompression is applied to the (recovered) data frames. Hence, compression is usually viewed by the streaming code communication scheme as a black box. Often lossy compression is used, resulting in a decompressed frame that only approximates the original uncompressed frame.

Figure 137:
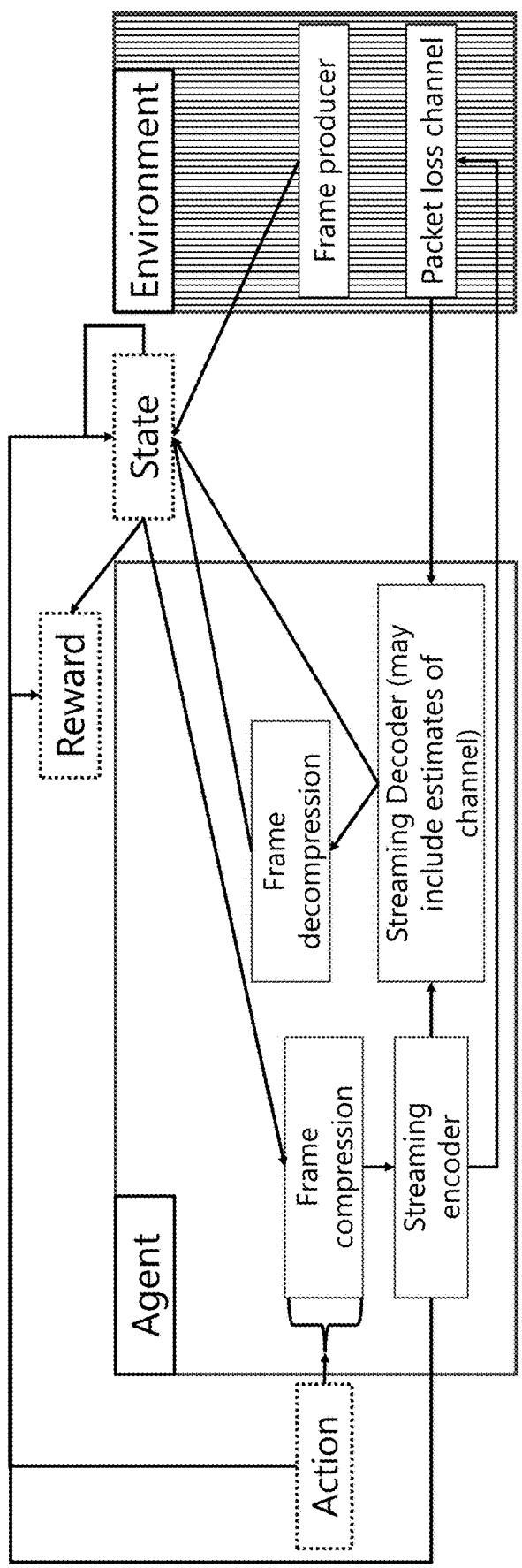

FIG. 137 illustrates treatment of compression as a reinforcement learning problem, in accordance with certain embodiments. Here, a new methodology is introduced to combine frame compression—especially lossy frame compression—with the communication scheme (e.g., erasure code). The key intuition is that (a) the marginal value of an extra symbol in a data frame (i.e., a data frame) can vary from frame to frame and/or within each frame, and (b) the marginal cost in terms of the number of extra parity symbol (s) sent as a result of increasing the size of a data frame (i.e., size of a data frame) also can vary from frame to frame and/or within each frame. Our approach enables synergizing compression with the communication scheme (e.g., parity symbol allocation), leading to more useful information being communicated per bandwidth consumed (i.e., the number of symbols sent).

To do so, compression is modeled here within a framework reminiscent of reinforcement learning. An uncompressed frame is created and then compressed by an agent as its action; the compression may cause the data frame to depend on earlier data frame or not (e.g., make the new data frame from compressing a new keyframe). Then a communication scheme (e.g., CSIPB) is applied to communicate the (now compressed) data frame from one or more sender(s) to one or more receiver(s). A reward is obtained based on the action and state of the system. For example, the reward may combine (a) application-level benefits of having extra symbols within the data frame with (b) costs such as bandwidth usage (including data and parity symbols sent under the communication scheme) and consequences arising from this usage (e.g., sending too much data may incur loss by overflowing the buffer(s) of network router(s)). In certain embodiments, the application-level benefits may be measured using metrics of QoE like freeze rate, latency, PSNR, SSIM, or LPIPS (where freeze rate may be reduced by allocating some of the bandwidth savings to sending extra redundancy via setting more conservative estimates of channel parameters). The environment reflects (a) how an application produces uncompressed frames (e.g., the underlying world that is being captured by the video), and (b) how packets may be lost. The state reflects the situation and may include information like previous uncompressed and data frames, how many packets have been sent, what sizes were the packets that have been sent, etc. Then one can use methods from reinforcement learning to solve for a suitable policy for how the uncompressed frame should be compressed (e.g., what size to target for the compression).

Figure 138:
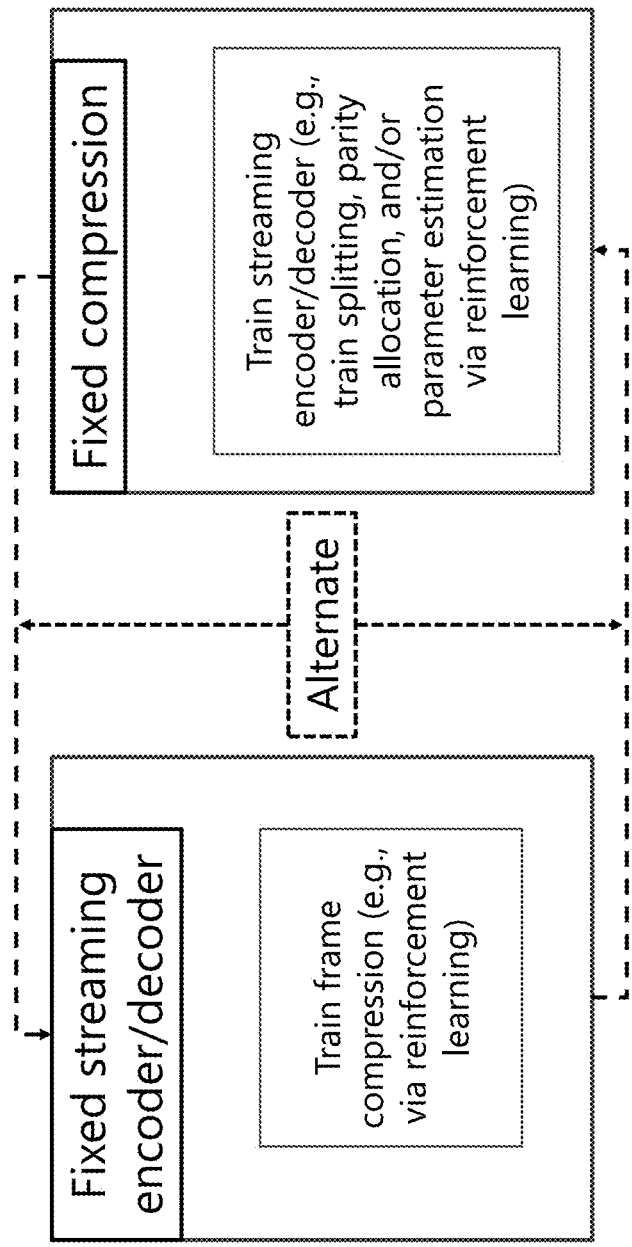

FIG. 138 shows the concept of alternating training of compression and streaming code (e.g., splitting, parity allocation, etc.), in accordance with certain embodiments. Here, a second methodology is introduced to synergize the actions for compressing frames and communication (e.g., splitting, parity allocation, etc.). Alternate between (a) fixing compression and optimizing the policy for communication (e.g., how to split data frames, how to allocate parity symbols, etc.), and (b) fixing communication and optimizing the policy for compression. The optimization can be done using techniques from reinforcement learning. This can continue until the user is satisfied with performance.

Figure 139:
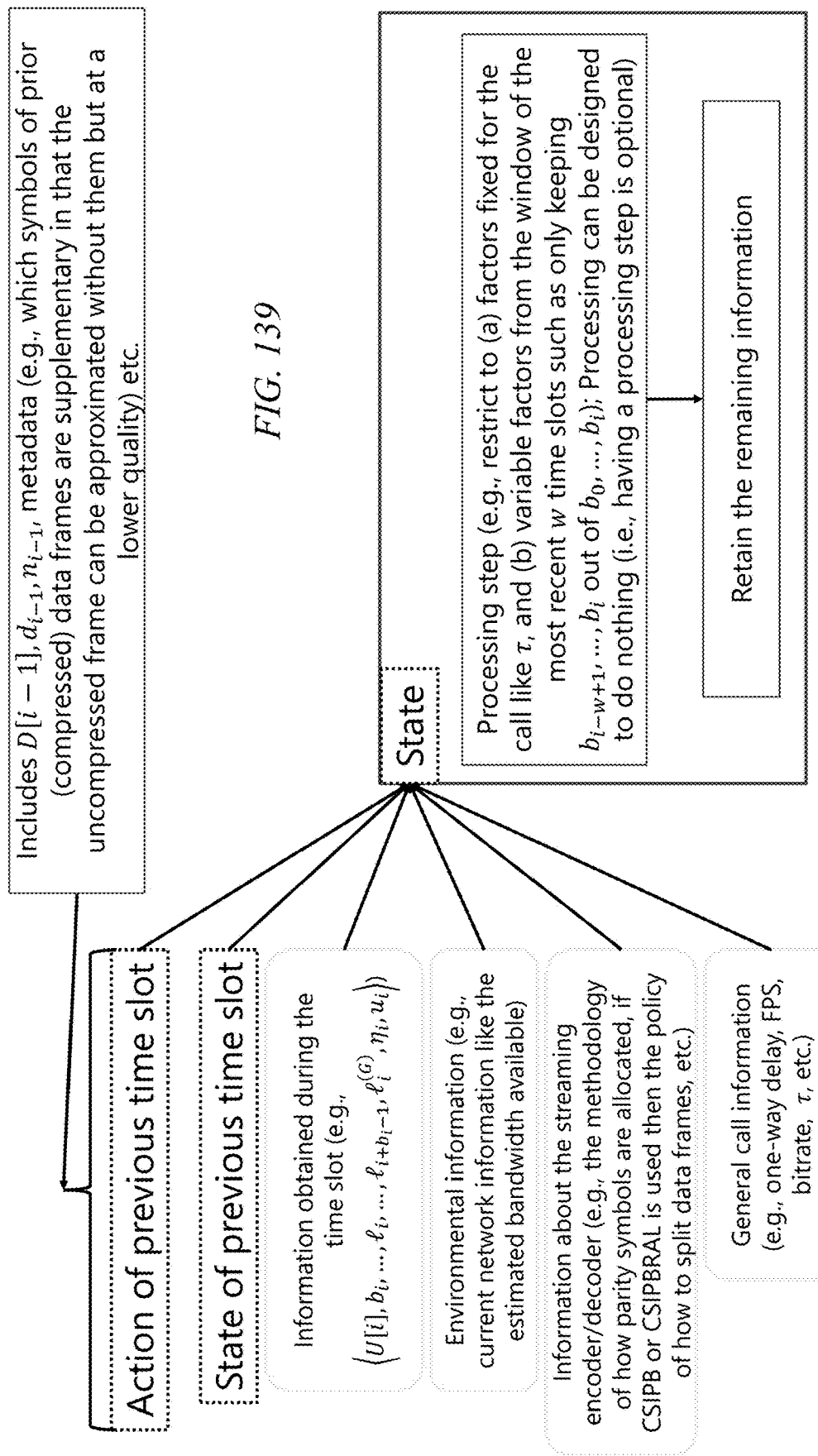

FIG. 139 illustrates updating the state during the ith time slot, in accordance with certain embodiments. Here, the state is meant to capture the situation; by assumption, the state can track any piece of information pertaining to the system, although some may not be tracked in certain embodiments (as can be accomplished via the processing step). To aid in the compute costs of reinforcement learning (e.g., to avoid the curse of dimensionality), some information may be dropped. Also, one may reduce the number of possible states by reducing the granularity of information (e.g., list the number of symbols of each component and/or parity symbols sent per time slot as integral multiples of a number, like 100, and applying rounding). The Action of previous time slot (i−1) includes D[i−1] and $d_i$−1.

Figure 140:
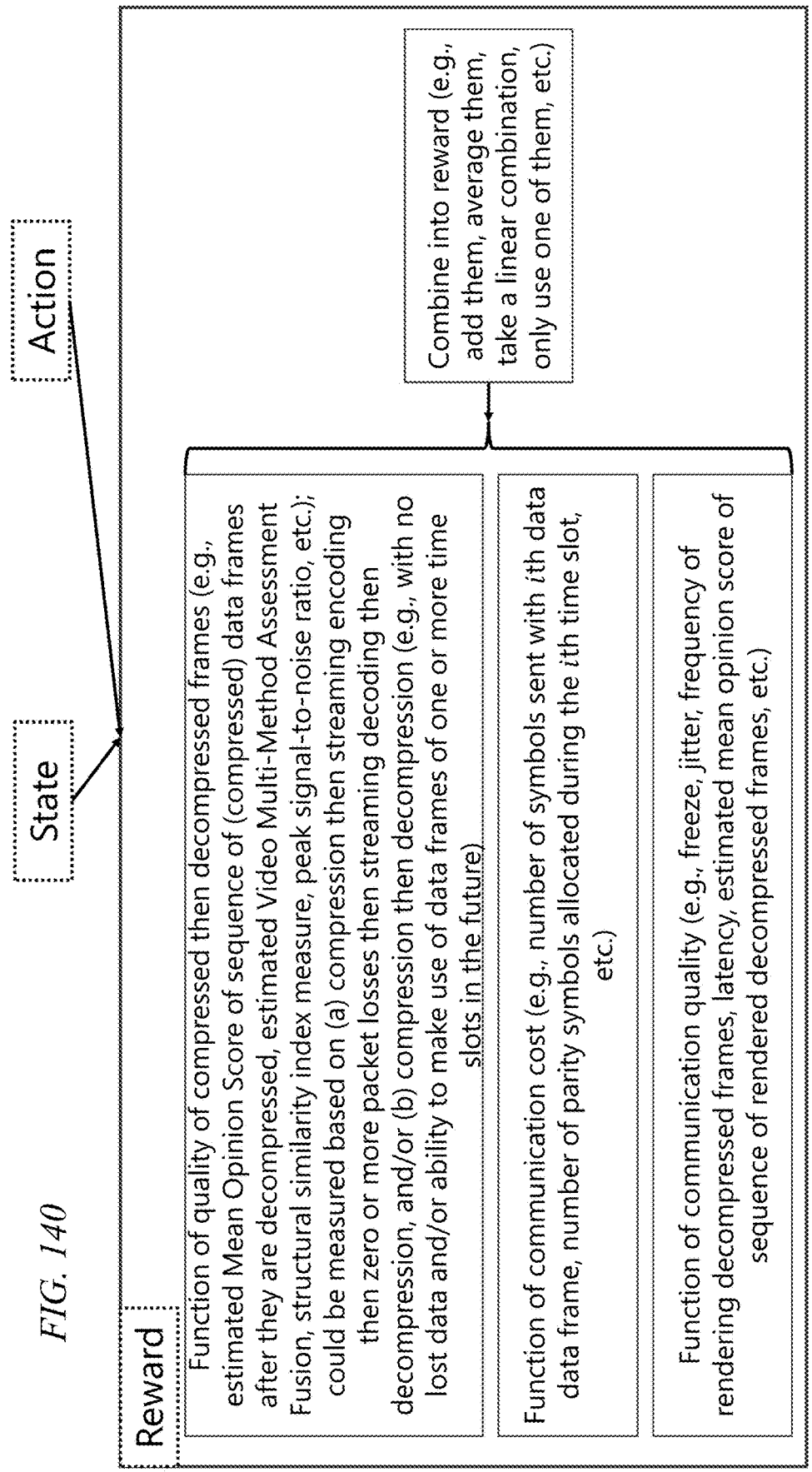

FIG. 140 shows an example of a possible type of reward function, in accordance with certain embodiments. Here, there are three main intrinsic sources of reward (a) the quality of the compression then decompression (with and/or without the added component of decompressing occurring after streaming encoding, packet losses, then streaming decoding), (b) the communication cost, and (c) the quality of the received data (which can include measures of the QoE like latency of recovered frames). Here, a reward function is used that somehow combines these three factors. For example, a function (e.g., a metric) can be created to measure the value/costs of an action for each metrics. Then, a second function can be created to combine these three factors into a reward.

Figure 141:
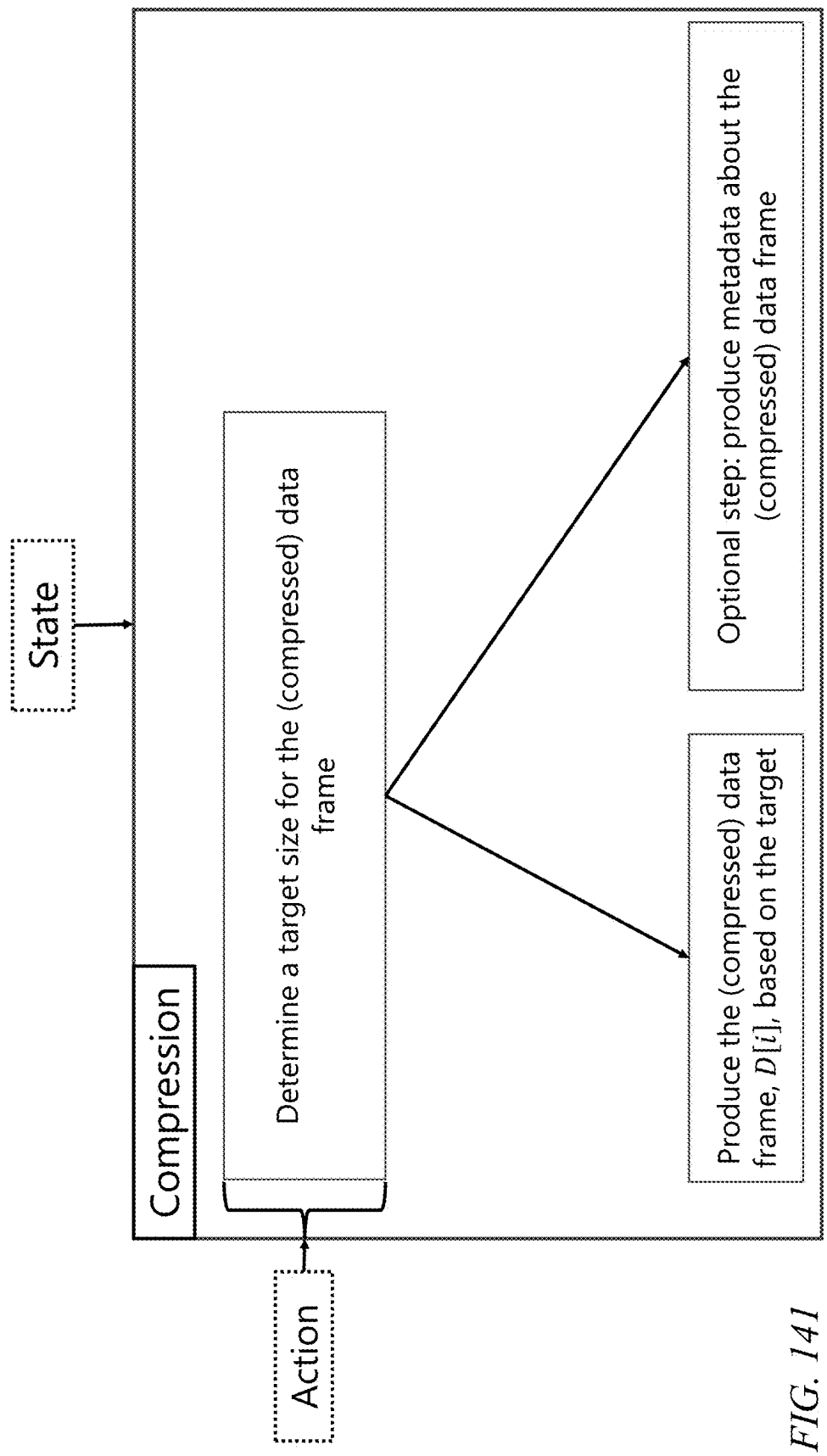

FIG. 141 shows one possible compression scheme, in accordance with certain embodiments. Compression may follow in two main stages: first, identifying a target size for how large the (compressed) data frame should be. Second, compressing the data frame to obtain D[i] based on the target size. One possibility is to estimate the reward for each possible target size and to take the best option. Determining the target may involve examining the state and anticipated reward. For example, considering the bandwidth estimate of the network, how many symbols were sent over the last several time slots, parity allocated for future data frames, point of diminishing returns for how many symbols it takes to accurately compress the uncompressed frame, etc.

There is an optional stage of determining metadata about the compression. For example, if certain symbols reflect a layer of encoding that is supplementary to the rest of the symbols but not needed, identifying them may be useful for the streaming encoder/decoder. One methodology this may be useful for the streaming encoder/decoder occurs under CSIPB or CSIPBRAL wherein the supplementary symbols may be placed in the second component rather than the first to lead the non-supplementary symbols to take up the first component; in certain scenarios, this will lead to the non-supplementary symbols being recovered sooner (e.g., when the first component is recovered sooner). This metadata could be included in D[i] itself and/or in some sort of header so that it can be used (a) in the streaming encoder/decoder (e.g., if CSIPB or CSIPBRAL it may be used to ensure the symbols of earlier data frames are placed in the first component), and/or (b) in the decompression step. To avoid this step (if electing to not do the optional step), one can simply make the metadata empty.

Figure 142:
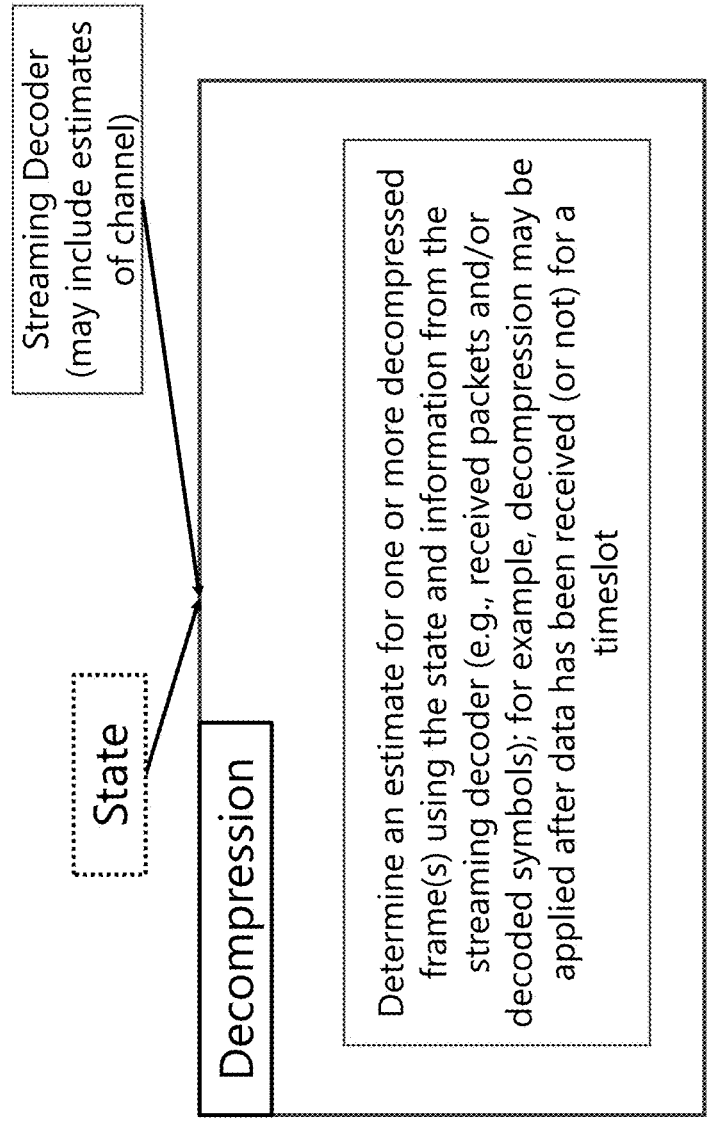

FIG. 142 shows one possible decompression, in accordance with certain embodiments.

Figure 143:
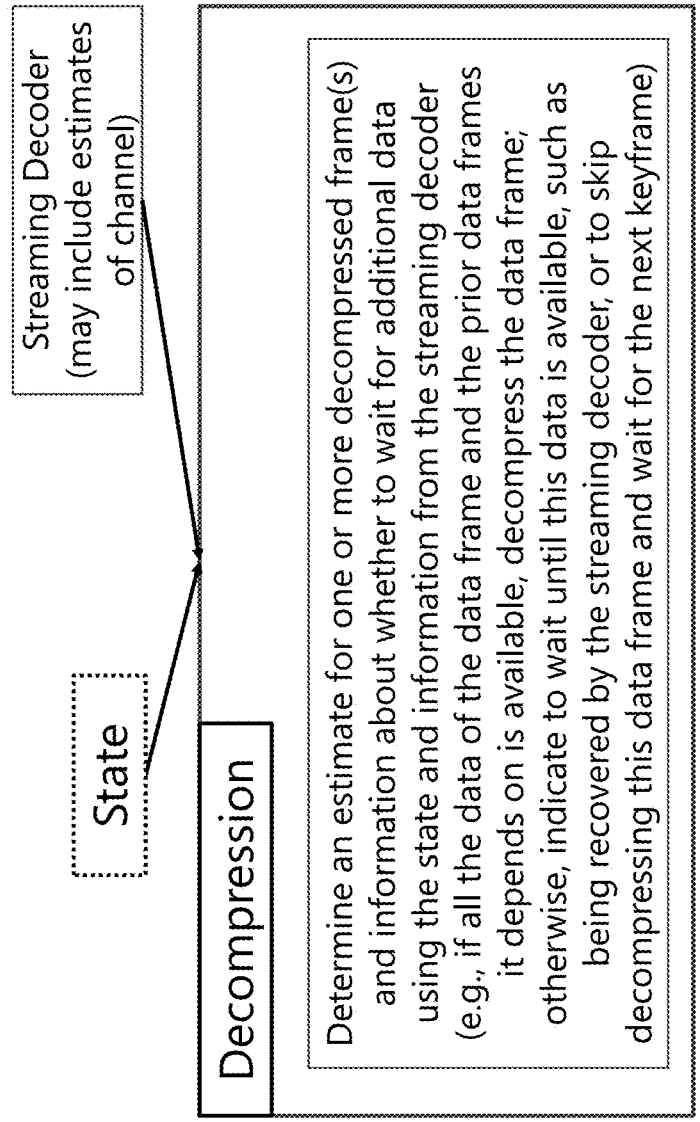

FIG. 143 shows another possible decompression allowing for flagging to wait to decompress until more data is available (e.g., decoded), in accordance with certain embodiments.

Figure 144:
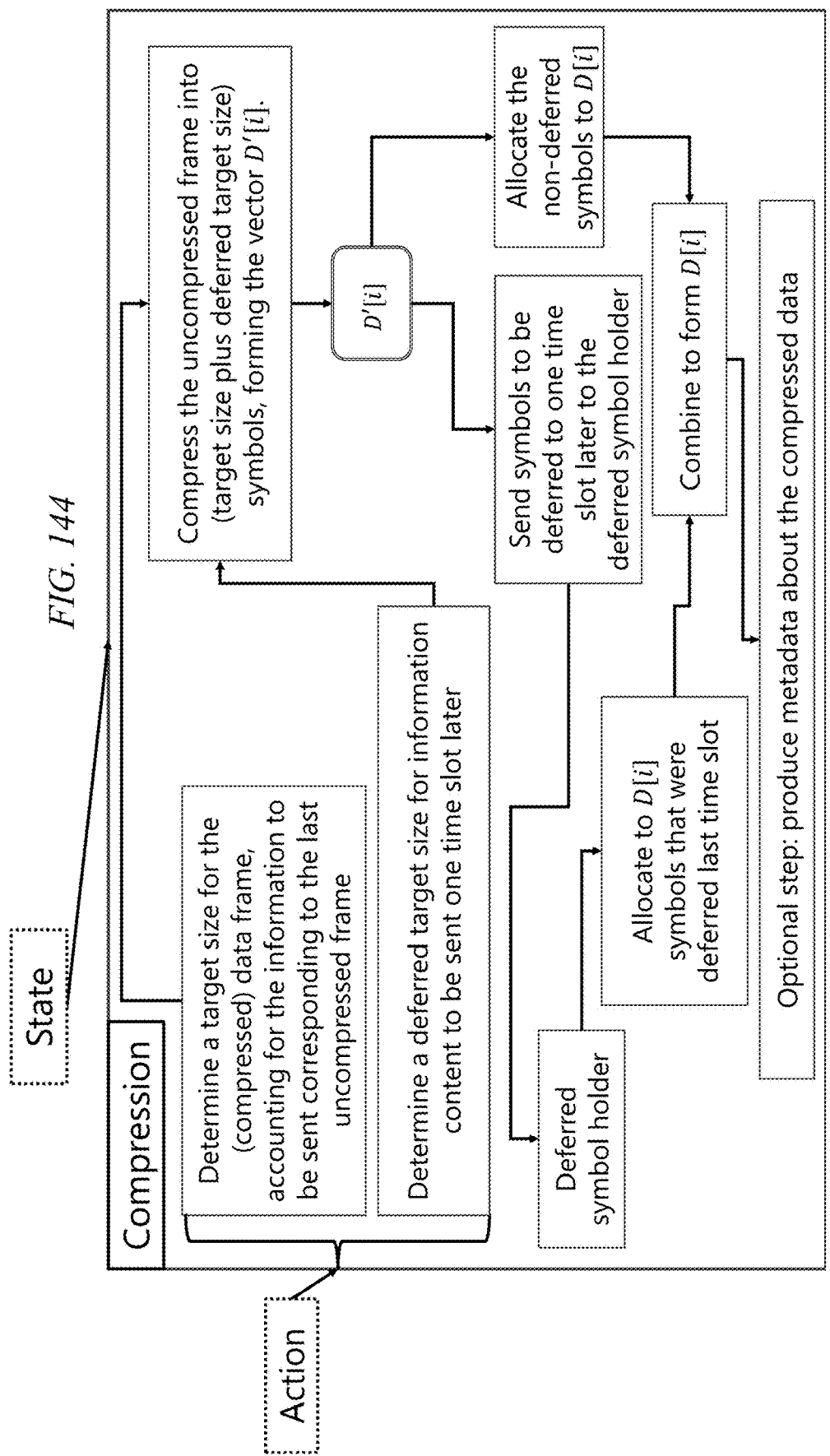

FIG. 144 illustrates spreading information content as a simplified approach, in accordance with certain embodiments. The idea here is to compress a frame into (a) a part to be sent now of some size and (b) a part to be sent later to help refine the decompression of the frame given the other part. Then the second part is spread to the next time slot and the current part is sent during the same time slot. This spreads information content, not just symbols, as the first part is useful on its own. One example from video is to send a pixilated version of the image as the first part and then the second part is used to refine the image (i.e., reduce the pixilation); in the literature, this may be referred to as compression with multiple layers where one more (less important) layer(s) are allocated to the second part and the rest is/are allocated to the first part.

Here, the example for spreading information content over one additional time slot is shown, but the general approach may defer this information over multiple time slots; When using CSIPB or CSIPBRAL, one may select the deferred target size so that those symbols can fit into the first component and use the metadata to indicate to place the deferred symbols into the first component; one benefit of doing so for certain embodiments is that information content is available by the playback deadline of the current uncompressed frame.

There is an optional step of producing metadata; for example, it may provide information about the divide between new and old information content in D[i]; This metadata could be included in D[i] itself and/or in some sort of header so that it can be used (a) in the streaming encoder/decoder (e.g., if CSIPB or CSIPBRAL it may be used to ensure the symbols of earlier data frames are placed in the first component) and/or (b) in the decompression step.

Figure 145:
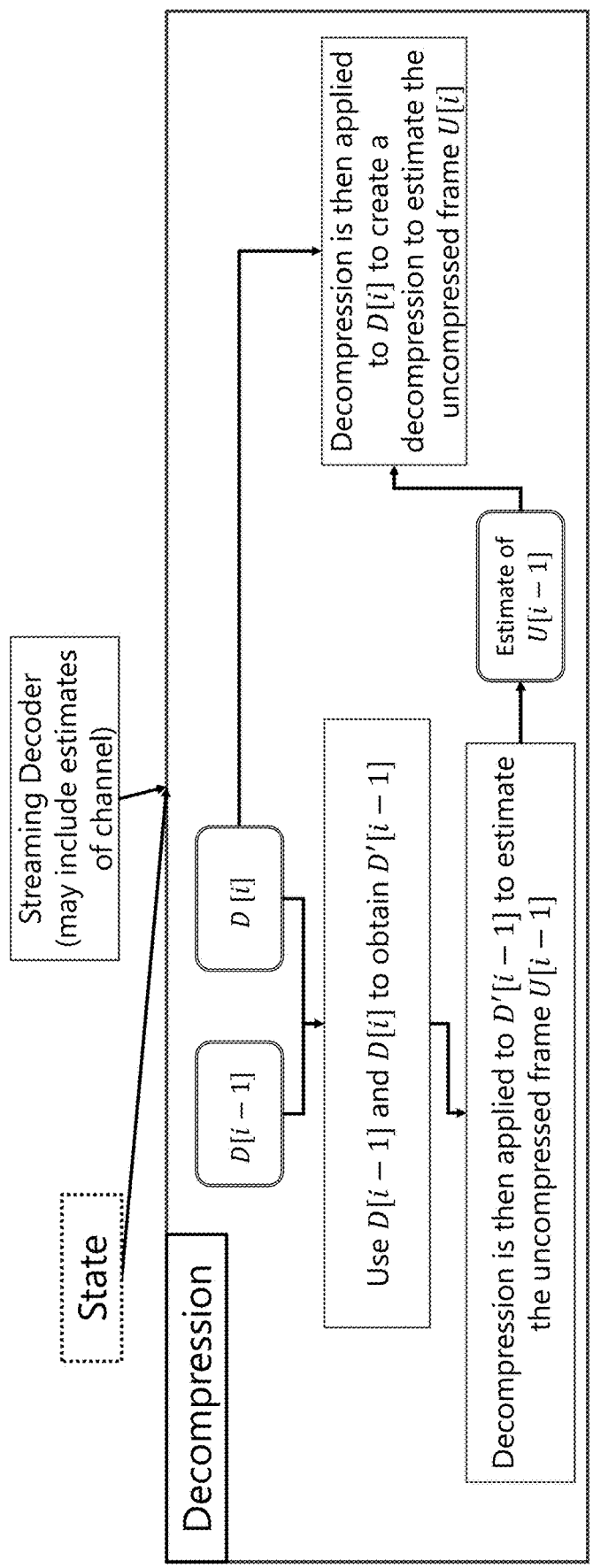

FIG. 145 illustrates decompression after spreading information content. Decompression first improves the decompression of the previous data frame and then uses it to have a better estimate when decompressing the current data frame. This is the decompression step during time slot i; due to loss recovery, this may be applied just before one or more decompressed frames prior to i are rendered. Here, the example for decompressing information content that was spread over one additional time slot is shown, but the general approach may be used for decompression when the information is deferred over multiple time slots.

Figure 146:
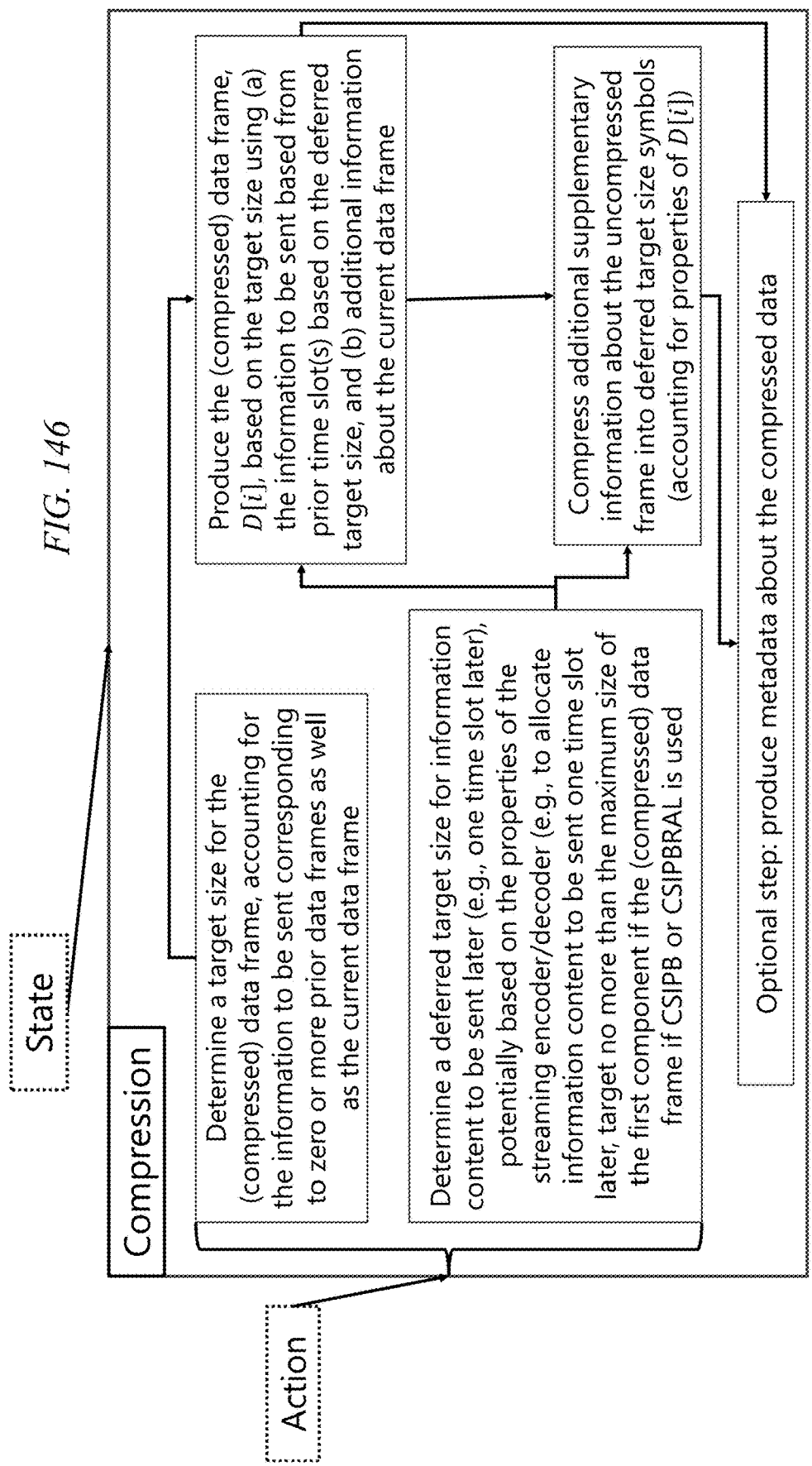

FIG. 146 shows one possible compression to spread information content: create information and then spread some of it until later by deferring sending it. Compression may involve (a) compressing information about the current uncompressed frame into symbols to be sent during the same time slot, and (b) compressing information about the current uncompressed frame to be sent at one or more later time slot(s) (e.g., during the next time slot). This may occur in two stages: (1) identifying a target size number of symbols to form the current data frame D[i] and identifying a deferred target size number of symbols to use to compress information about the current uncompressed frame (to be sent later), (2) creating D[i] by combining a subset of the symbols created earlier (including the empty subset or the subset containing all symbols of the set) with extra symbols where the number of symbols is dictated by the target size; these symbols are combined into D[i]. Then creating additional symbols reflecting the compression of the current uncompressed frame that are meant to be sent later (e.g., during the next time slot).

There is an optional step of producing metadata; for example, to provide information about the divide between new and old information content in D[i]. This metadata could be included in D[i] itself and/or in some sort of header so that it can be used (a) in the streaming encoder/decoder (e.g., if CSIPB or CSIPBRAL it may be used to ensure the symbols of earlier data frames are placed in the first component) and/or (b) in the decompression step.

Determining the target size and deferred target size may involve examining the state and anticipated reward, e.g., considering the size and information contained in symbols corresponding to earlier data frame(s), the bandwidth estimate of the network, how many symbols were sent over the last several time slots, parity allocated for future data frames, point of diminishing returns for how many symbols it takes to accurately compress the uncompressed frame, etc.

This is an example of spreading information content, not just symbols; the symbols that are not sent until a later time slot are chosen based on the compression (i.e., to ensure they are supplementary and do not prevent decompressing the data frame). In contrast, another approach is to spread arbitrary symbols during the streaming encoder stage; while this would enable higher-rate FEC schemes than would be possible without any spreading, it would potentially force decompression to wait until these symbols are received.

Figure 147:
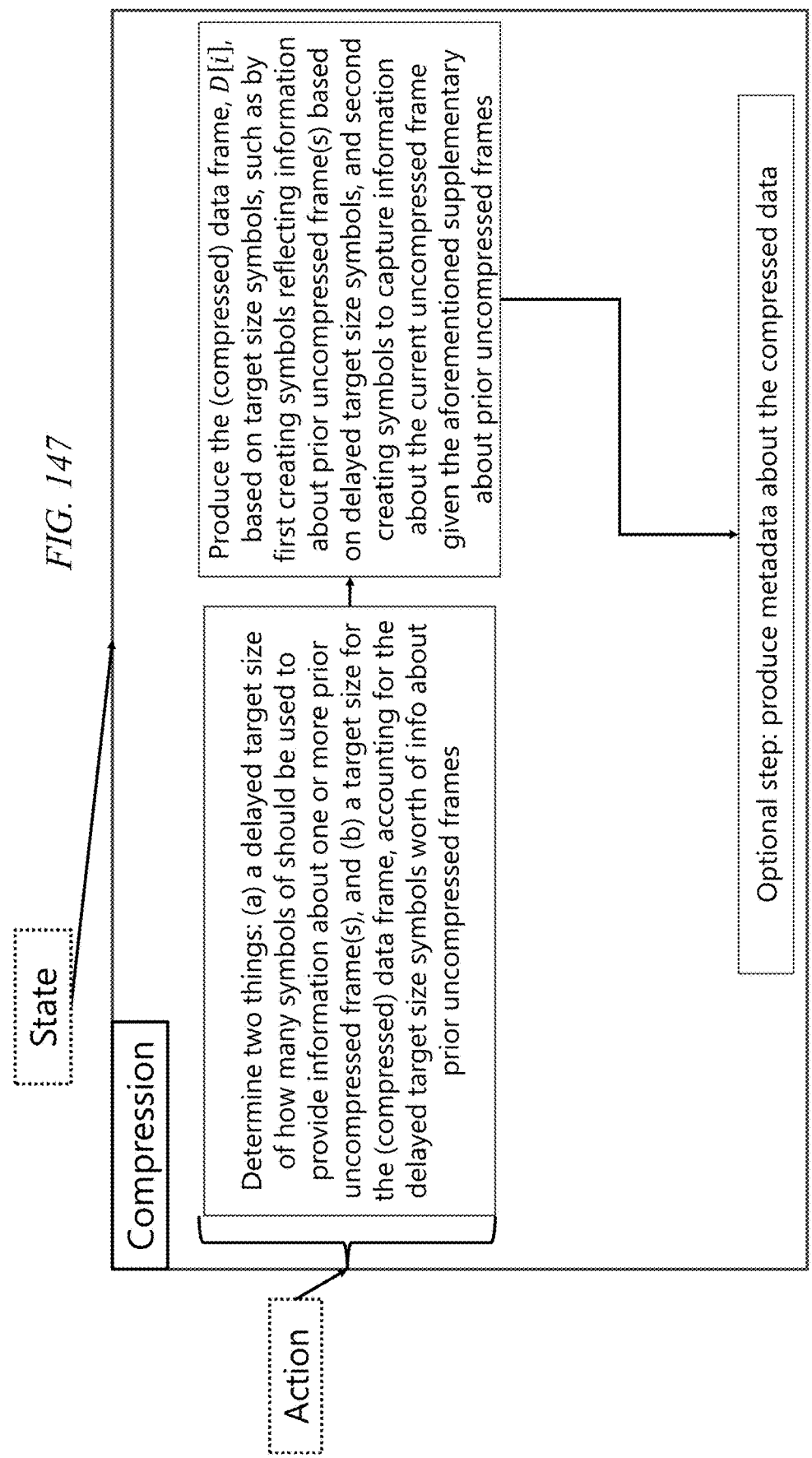

FIG. 147 illustrates a second possible compression to spread information content to smooth out when it is generated (e.g., generate less information now and generate more later). In this example, compression involves:

Identifying how many symbols to use to capture information about one or more prior uncompressed frames, and identifying how many symbols to produce in total (i.e., providing how many extra symbols to be used).

Then compression can produce the data frame that involves supplementing information about one or more earlier uncompressed frames and providing additional information about the current uncompressed frame subject to the delayed target size and target size; The purpose could be for decompressing the previous data frame(s) during the current time slot to (a) display it/them with some delay waiting for the received packets of the current time slot, and/or (b) so that the decompression of prior data frame(s) are updated and used when decompressing the new data frame.

Metadata may be produced to be used by the streaming encoder/decoder and or decompression.

This example enables spreading information content by smoothing out the sequence of sizes of (compressed) data frames; for example, if a lot of information is received about the current frame, the compression can be kept from being too large by compressing some now and filling in the gaps later. This is not just spreading symbols of data frames; for example, consider a live video call. Compression may involve separately compressing spatial regions of the uncompressed frame; one or more of these regions may either (a) not be compressed or (b) be compressed in a very lossy way using a low bitrate during the current time slot; then during a later time slot (e.g., the next time slot) additional information could be used to flesh out these spatial region(s). If there are losses and FEC involves multiple time slots to recover lost packets, the extra information can be used to display a higher-quality decompressed frame. Otherwise, this extra information can be used to improve the compression/decompression of future time slots.

Decompression may or may not happen after packets are decoded and may or may not happen across multiple time slots. For example, compression may send some information about the current uncompressed frame in the next one (or multiple) data frames. If this information is available (e.g., there was a burst, so data frame i is not decoded until time slot (i+τ) by which point there may be data from data frames i+1, . . . , i+τ available for decoding frame i).

One idea is to spread some of the information across multiple data frames. If decompression is called during time slot i, perhaps it uses some methodology (e.g., techniques like error concealment and/or infers information about parts of the uncompressed frame like pixels) to create some sort of decompressed frame to display. Then, that additional information may be available during the next time slot and used to obtain a better decompressed frame during time slot (i+1). Or the decompression module may suggest waiting until the next time slot to leverage data from that time slot in the decompressed frame (e.g., delay displaying any decompressed frame).

Figure 148:
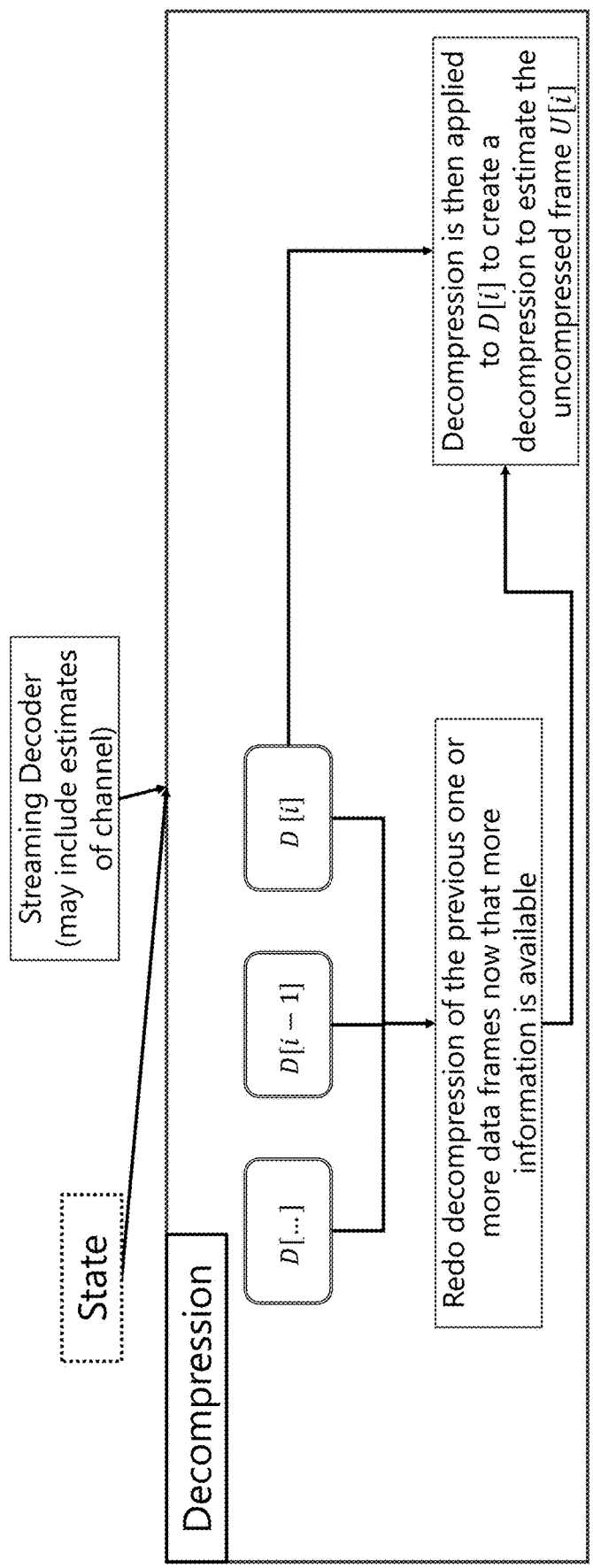

FIG. 148 illustrates decompression after spreading information content. Decompression first improves the decompression of the previous data frames and then uses them to have a better estimate when decompressing the current data frame. This is the decompression step during time slot i. Due to loss recovery, this sometimes may be applied just before one or more decompressed frames prior to i are rendered. In this example, all frames prior to i have been recovered. For many FEC schemes, often it is the intention to have this property. However, in other examples, due to packet loss and properties of the FEC scheme, only some (or none) of the symbols of one or more data frames may be available, but decompression (along with error concealment) will be used.

FIG. 149 illustrates one possible decompression allowing for decompressing then flagging to consider waiting for more data to render the frame (once can use the extra data to decompress to a better estimate of the uncompressed frame) detailed example of one way the process could work. Here, due to packet loss and properties of the FEC scheme, only some (or none) of the symbols of one or more data frames may be available. This is one way decompression may still be applied/combined with some sort of rendering logic (which may include error concealment).

FIG. 150 illustrates treating compression and communication action (e.g., splitting, parity allocation, etc.) as a reinforcement learning problem. Previously, it was shown how to improve how compression will work in conjunction with a fixed communication scheme (e.g., CSIPB, CSIPBRAL, etc.). Now, a new methodology is introduced to codesign compression with the communication scheme. To do so, the model can be adjusted so that the action combines (a) how to compress the uncompressed frame with (b) decisions made by the streaming encoder (e.g., how to split data frames, how to allocate parity symbols, how to packetize symbols, etc.). Then a policy for both compression and streaming encoding can be obtained using techniques from reinforcement learning. The state is now the combination of (a) the information of state from compression-only, and (b) the information of state from communication-only. The action is the combination of (a) the action from compression-only with (b) the action from communication-only. The reward is a combination (e.g., a linear combination, like the summation) of the rewards of (a) the compression-related action using the compression-only reward, and (b) the communication-related action using the communication-only reward. Hence, the agent is a combination of the (a) compression-only agent, and (b) the communication-only agent. This approach can be taken instead of using alternating training of compression and communication.

FIGS. 164-170 provide an example of FEC-aware compression, in accordance with certain embodiments. Generally speaking, for a given time slot, the system determines a target size for the compressed data frame, accounting for information to be sent corresponding to the last uncompressed frame. The system also determines a deferred target size for information to be sent one time slot later, e.g., deferring a number of symbols relating to video content that is determined to be less important to user perception of video quality (e.g., if those symbols are not available when the frame is played but are available in time to be used for any inter-frame encoding of the next frame, then the video quality will not be significantly degraded). The system compresses the uncompressed frame into (target size plus deferred target size) symbols to form a vector where the (deferred target size) symbols are to be deferred to the next frame. The compressed data to be transmitted then comprises the remaining (target size) non-deferred symbols from the vector and any deferred symbols from the prior frame. The system optionally may produce metadata about the compressed data, e.g., to be sent along with the compressed data or separately from the compressed data.

Figure 171:
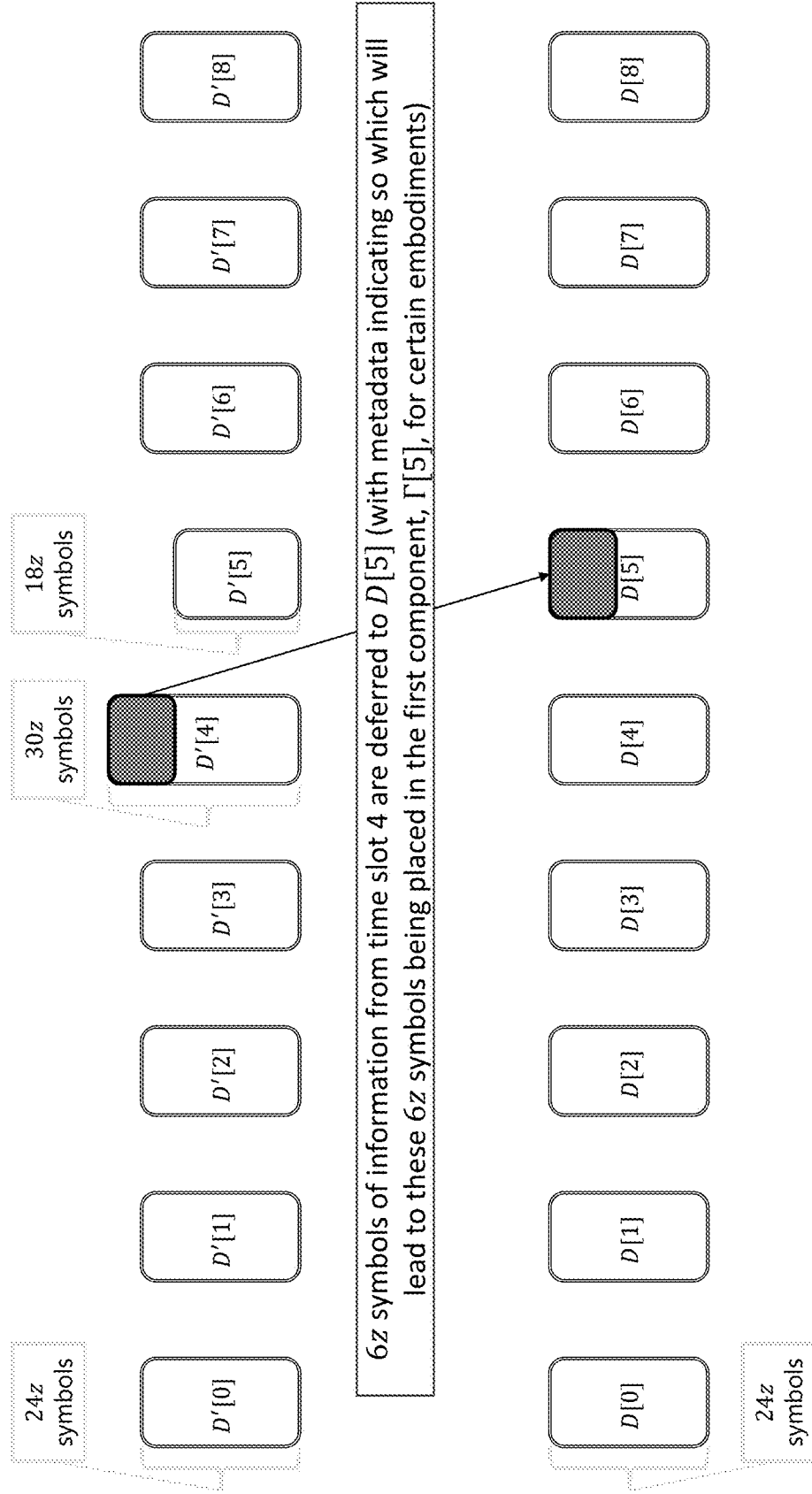

For purposes of the following example, all frames are presumed to be size 24z except for frame 4 which is size 30z and frame 5 which is size 18z (see the top row of boxes D' [0], . . . , D' [8] in FIG. 171). Information from frame 4 is spread over one time slot so it appears to FEC as though all frames are size 24z (see the bottom row of boxes D[0], . . . , D[8] in FIG. 171) but the scheme knows that the 6z symbols are from frame 4 and therefore places them in the first component of frame 5 (intending for loss recovery for partial bursts at a lower latency). This is shown in FIG. 171 in the dark box of 6z symbols moved from the top of D' [4] to the top of D[5]. A simplified real-world example that inspires this may be that for frame 4, there happens to be extra information in part of the frame that is less important. The example might relate to a video call where each frame (other than frames 4 and 5) has about 24z symbols of information, but during frame 4, there is a slight movement in the background (e.g., upper right corner) that is less important to the video call but takes up an extra 6z symbols of information and then, during frame 5, there happens to be less change in the video, so the compression can be more efficient and only use 18z symbols to convey all information.

Figure 164:
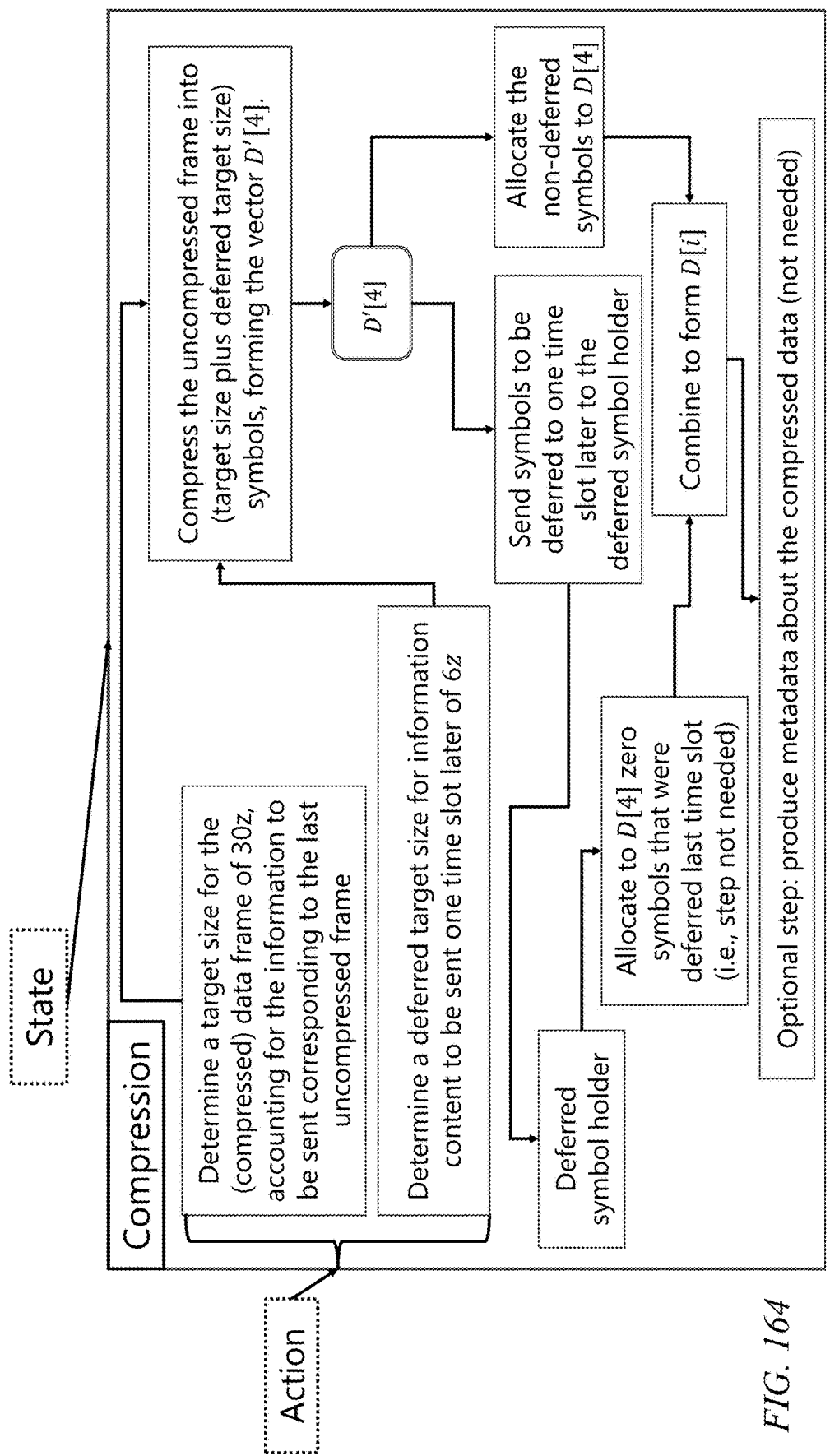

FIG. 164 depicts compression for a frame number 4 in which the target size is determined to be 30z and the deferred target size (i.e., the number of symbols to be deferred for frame 5) is determined to be 6z, with zero symbols deferred from prior frame 3.

Figure 165:
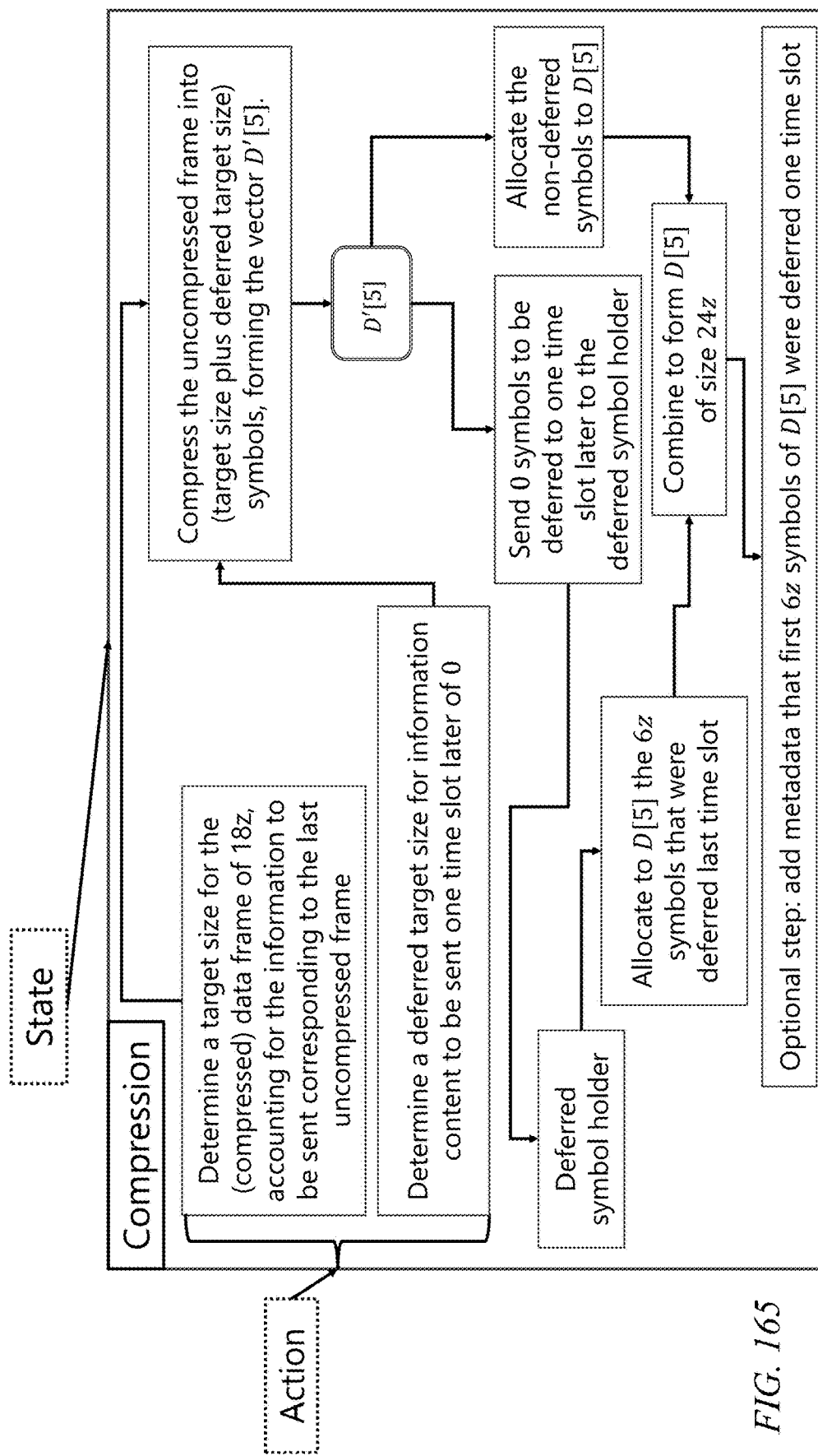

FIG. 165 depicts encoding of frame 5 following the encoding of frame 4 per FIG. 164. Here, the target size for frame 5 is determined to be 18z and the deferred target size for frame 5 is determined to be zero. After compressing frame 5, the system forms compressed data to transmit, including the non-deferred symbols (which, in this case, is all of the compressed symbols from frame 5 since the deferred target size is zero) and the 6z symbols deferred from frame 4. In certain embodiments, the coding scheme will place the 6z symbols corresponding to the uncompressed frame from time slot 4 in the first component (i.e., Γ[5]) so that it is intended to be recovered for partial bursts by time slot $(5+\tau-1)=(5+3-1)=7=(4+\tau)$. In this example, there happens to be less change in the underlying video, so, given the extra info on frame 4 that was deferred, only 18z symbols are needed to produce the good quality video.

Figure 166:
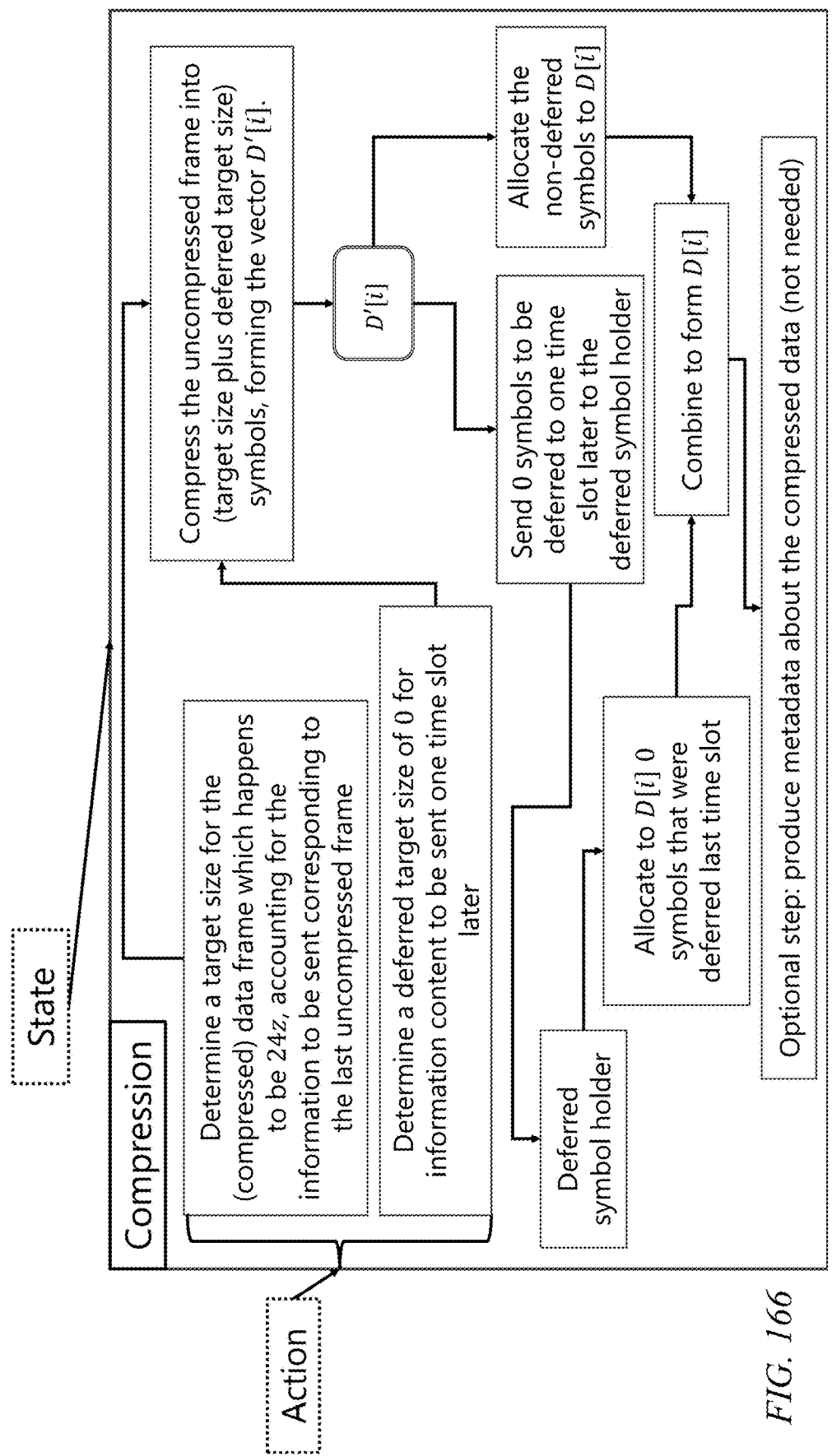

FIG. 166 depicts the generalized encoding scheme for time slots i=0, 1, 2, 3, 6, 7, 8 in which, for the sake of simplicity, the target size is determined to be 24z symbols (which, in this example, is based on how many symbols are needed to convey the information about the underlying video), and there are no deferred symbols from prior time slots. In this example, D[−1] is assumed to be the empty vector.

Figure 167:
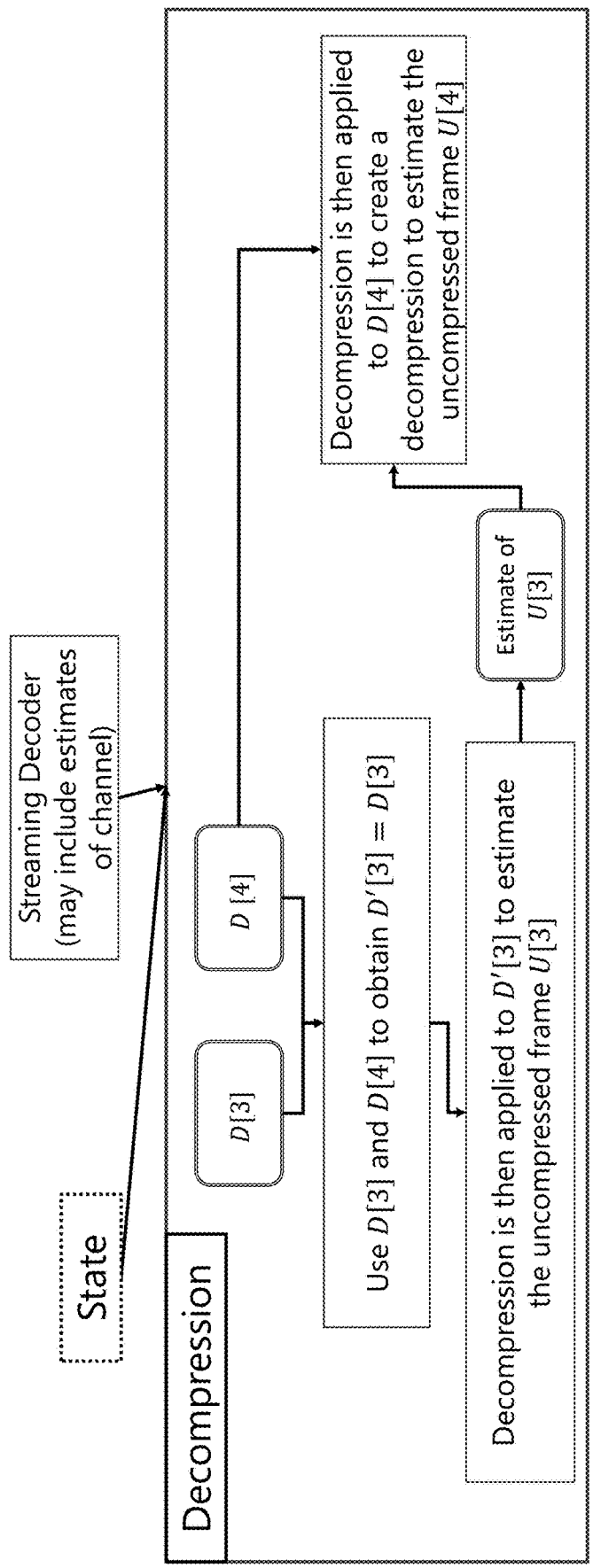

FIG. 167 depicts decompression after spreading information content for frames 3 and 4 and earlier (during time slot 7 when frame 4 has been recovered from the partial burst starting in time slot 4). Here, it is assumed that there were no losses before time slot 4 and that D[3] (which in the example equals D'[3]) was already recovered during time slot 3. Then, U[4] is estimated using only the 24z symbols that were not deferred (i.e., not using the extra 6z deferred symbols).

Figure 168:
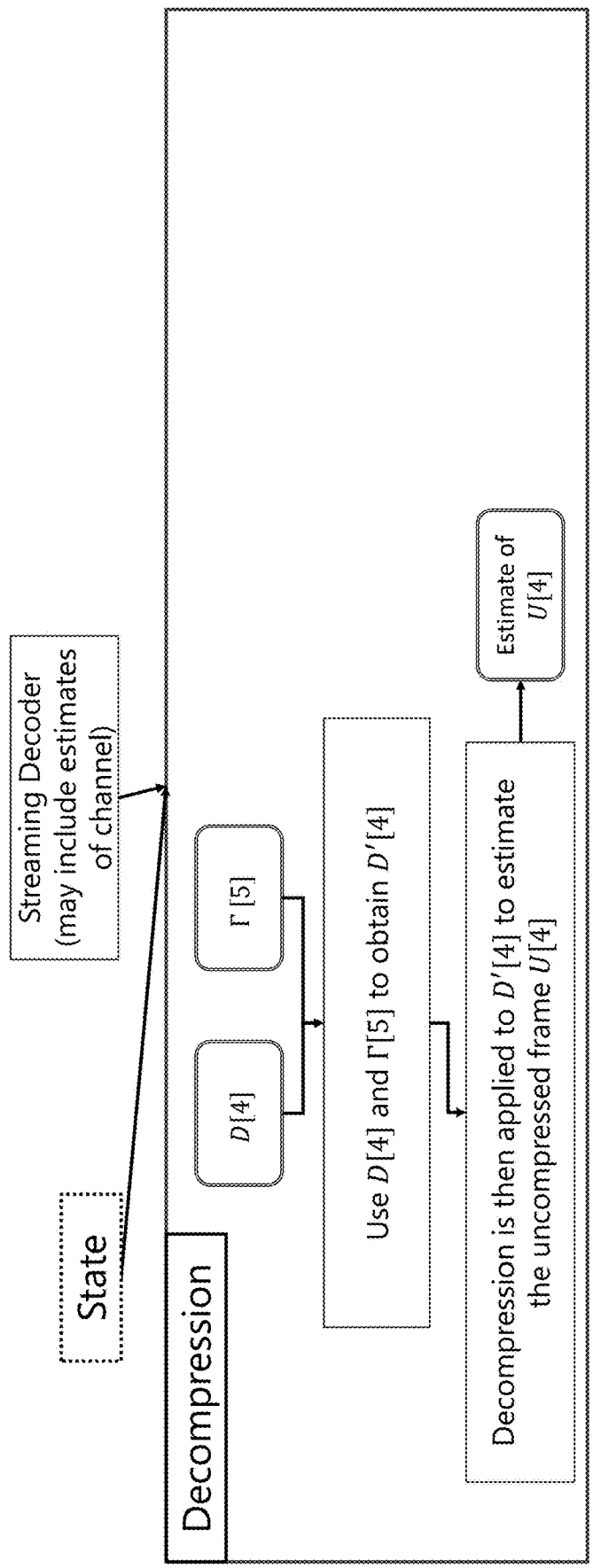

FIG. 168 depicts decompression after spreading information content for frames 4 and 5 (during time slot 7 when under certain embodiments the first component of frame 5 has been recovered from the partial burst starting in time slot 4). Here, during time slot 7, the previous frame is fully recovered now that loss recovery has occurred and all the deferred symbols from the fourth frame are available.

Figure 169:
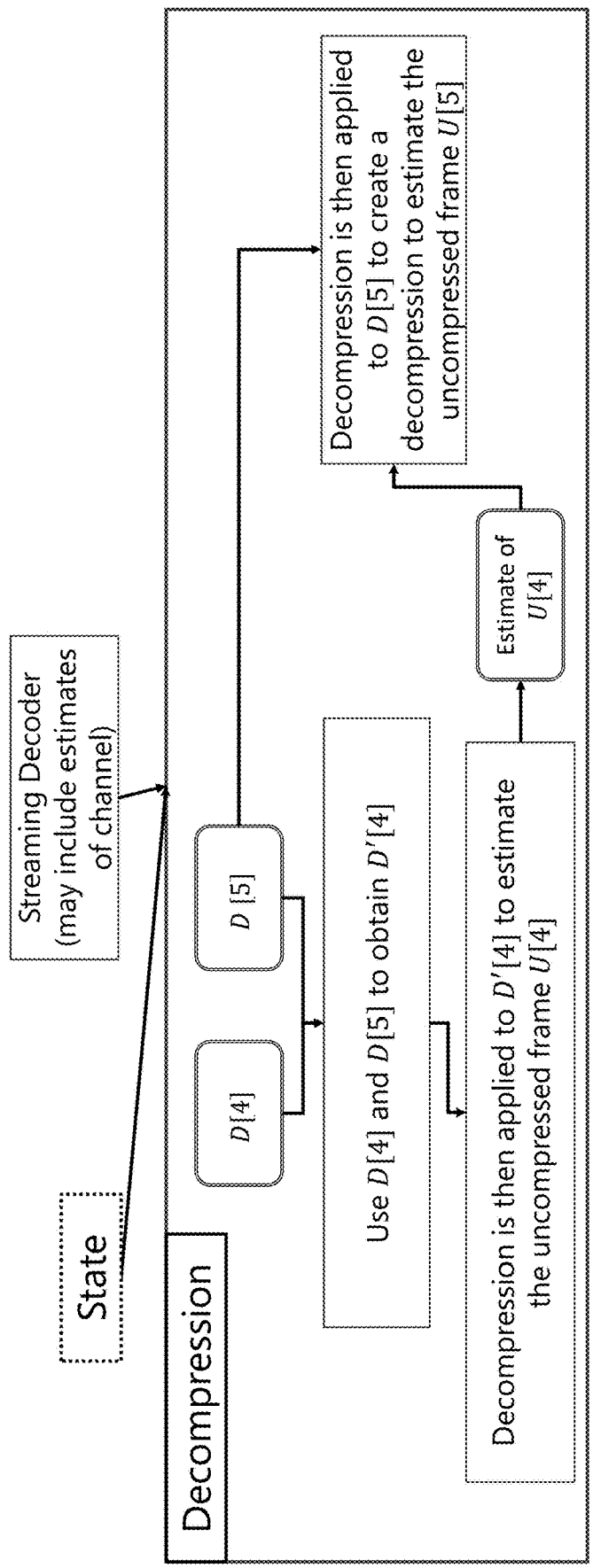

FIG. 169 depicts decompression after spreading information content for frames 4 and 5 (during time slot 5 if there are no losses before time slot 6). Here, during time slot 5, the previous frame is fully recovered.

Figure 170:
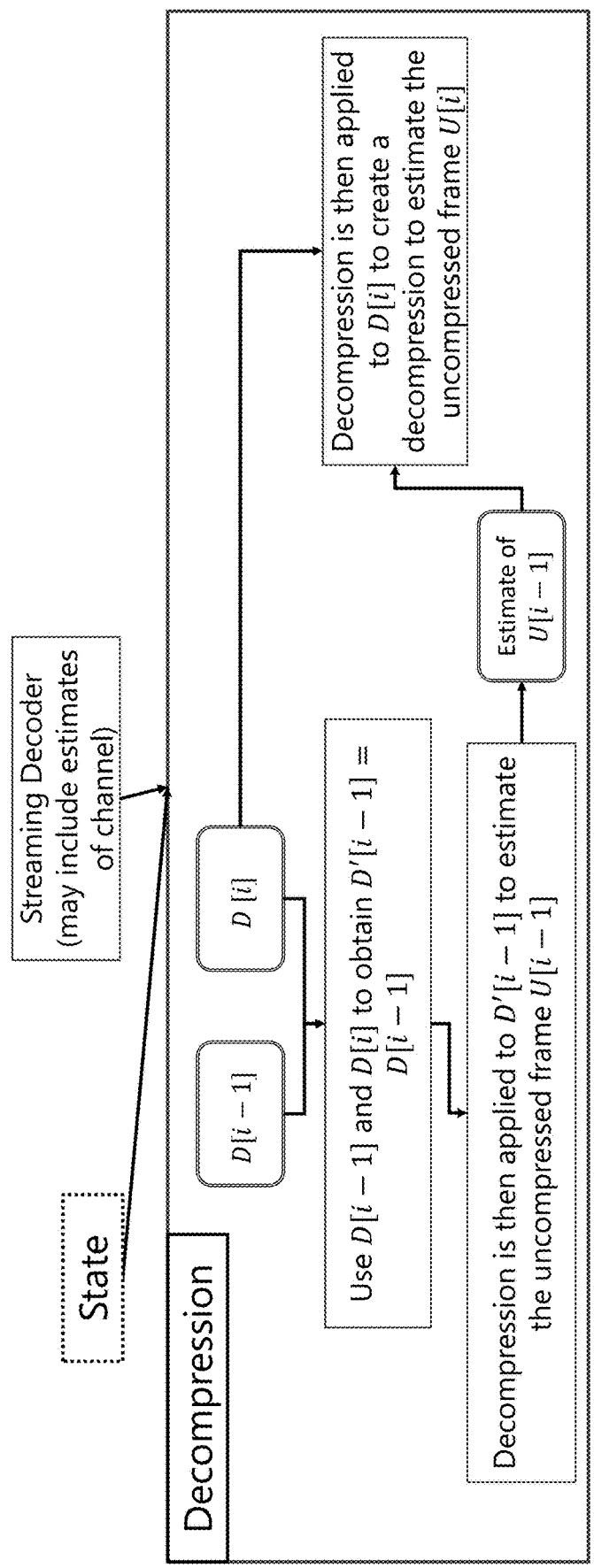

FIG. 170 depicts the generalized decoding scheme after spreading information content for frames 0,1,2,3,6,7,8. Here, there was no spreading of information content for these frames, so D[i] equals D'[i].

Generalities

All inventions disclosed in this patent application are intended to apply to any effectively equivalent model and/or methodology. Any generalization, extension, or modification that can be reduced to the inventions disclosed would be considered as being covered. Some examples are presented below.

Variable frame rate generality (Generality 1). Consider a scenario where the frames are not created with a constant frame rate. This scenario can still be captured under the loss-recovery models described herein (e.g., CSIPB and CSIPBRAL), for example, as follows. Use a faster frame rate so the time between frames is some small value, π (which is used here as a variable and is not related to the ratio of the circumference of a circle to its diameter), where during each time slot, one of two things occurs: (a) no frame is generated, as can be represented with a pseudo-frame of size "0" symbols D[i]=" "; or (b) a frame, D[i], is generated. Metadata can indicate if a pseudo-frame or frame was generated. Then τ can be set based on the duration π to ensure a tolerable latency. Setting $b_i$ appropriately can reflect a partial burst covering the same duration (e.g., in ms) as in the original model, but $b_i$ can also be set with more granularity. Similarly, setting $l_i$ (and $l_i^{(G)}$) where the value during any time slot corresponding to a pseudo-frame equals the value of the prior time slot would capture the same effect as in the previous model; but $l_i$ (and $l_i^{(G)}$ can also be set with more granularity. Applying loss-recovery innovations (e.g., CSIBRAL or CSIPB) to the new model (i.e., with π ms between time slots and some time slots having pseudo-frames) captures applying the invention to the scenario of a non-constant frame rate.

For example, suppose that a frame is generated every ~33.3 ms. In between these frames (i.e., every ~16.67 ms) a supplementary frame may or may not be generated (e.g., as an optional supplementary frame). Then one can model the system as having a frame generated every 16.67 ms where sometimes a frame of size 0 is created. In some embodiments, metadata for the supplementary frame may indicate for it to be allocated entirely to the first component with the intention that it is recovered within (τ−1) time slots; sometimes this stipulation may be combined with setting τ so that all frames are recovered during time slots corresponding to the frames generated every ~33.3 ms, and parity symbols are only sent during such time slots. In other embodiments, the intention will be for each frame to be recovered within τ time slots (so such metadata would not be used). The example highlights the broadness of the class of models/approaches captured under the inventions.

For data compression, consider the description under "generality 1." FEC-Aware compression can be made more powerful by applying a similar model (e.g., reducing the time between frames with the understanding that some time slots may correspond to pseudo-frames). Under such a model, compression has more granularity. For example, spreading information of a frame over multiple time slots (which would otherwise be "pseudo-frames") can impose "pacing," where pacing involves spreading the transmission of symbols corresponding to a frame (data and/or parity) over the duration between the frame's creation and the creation of the next frame. This can be done through the compression methodology allocating symbols of one frame over multiple time slots of small granularity where said allocation is contained within a time slots corresponding to pseudo-frames (i.e., before the next frame is created). Such an approach may or may not be combined with the FEC scheme setting τ to be small enough to leave room for the spreading of symbols of a frame over multiple time slots (i.e., the delay of (a) spreading over XX time slots, plus (b) loss recovery taking τ time slots is within a desired threshold).

Another power granted to the compression method is to create frames at different frequencies depending on the underlying content. For example, if something changes in the video, such as moving the camera, it could be reflected sooner (e.g., via a supplementary frame). Another example is to send different granularities of the frame over multiple time slots (during time slots that would otherwise be called pseudo-frames, which occur before the next frame).

The compression methodology may choose to never use the "pseudo-frames" by always setting the information content to be empty during those time slots without loss of generality. As such, the additional optionality enabled by the extended model with the ability for "pseudo-frames" is not limiting.

Variability of $\tau$ generality (Generality 2). As discussed above, the parameter $\tau$ could vary during a call. The loss-recovery models described herein (e.g., CSIPB and CSIPBRAL) can capture modeling $\tau$ as frequently changing. For example, consider embodiments where the first component is designed to be recovered within ($\tau-1$) time slots when losses are within the tolerance of being deemed partial bursts. Suppose $\tau$ is modeled as changing at most once per time slot; this captures larger changes for $\tau$ by changing $\tau$ by one over multiple time slots (e.g., in a short period of time). For example, under CSIPBRAL and CSIPB, it is possible to maintain the same code design and recover within the new deadline by allocating all symbols of the new frame (where $\tau$ changes) to (a) the first component if $\tau$ is reduced by one, and (b) to the second component if $\tau$ is increased by one. If a partial burst starts with the frame, loss recovery would hold within the new $\tau$. If the partial burst started in an earlier frame and encompasses the new frame, all first components of all frames in the partial burst (including the new frame) will be recovered within $\tau-1$ (for the new $\tau$) time slots from the new time slot. Also, the second component will still be recovered within $\tau$ time slots of the new time slot (for the new $\tau$). FEC-aware compression and/or compression-aware FEC can be optimized for such a model (where $\tau$ can change by one per time slot); for example, the optimization may be via jointly training FEC-aware compression and compression-aware FEC, or the optimization may be via alternating fixing one (of FEC-aware compression and compression-aware FEC) and training the other, such as using machine learning, such as reinforcement learning.

The reasons for changes in $\tau$ can include, for example, a change in one-way delay, frame rate, etc. For example, if the frame rate changes from fixed (e.g., 30 fps) to variable (e.g., as discussed in "Generality 1"), then the new model may be captured by changing t. Under a variable frame rate, $\tau$ may slightly change from frame to frame (e.g., reducing or increasing by one depending on whether the time slot corresponds to one where there is always a frame or whether there is only sometimes a supplementary frame). In other settings with a variable frame rate, $\tau$ may be fixed.

Miscellaneous

In certain embodiments, metadata of various kinds may be transmitted from the sender to the receiver (e.g., metadata on how the sender is splitting frames, metadata on allocating parity symbols, a seed value for a pseudorandom number generator used for random linear combinations, metadata regarding usage of failsafe, etc.). It should be noted that such metadata could be conveyed in any appropriate manner, e.g., in message headers of messages carrying encoded data, embedded encoded or unencoded within the channel frames, in a separate stream (which may or may not also employ some form of erasure coding to recover from losses), etc. If sent in a separate stream, the separate stream could be encoded using techniques described herein to better ensure receipt of the information.

It should be noted that embodiments are not limited to any particular order of data symbols and parity symbols within channel frames.

While the above disclosure has concentrated on the methods of the present invention in the context of the overall system, it should be noted that the present invention can also take the form of a sender device, method, computer program product, and integrated circuit that performs some or all of the sender functions discussed above (e.g., splitting video frames into two components based on loss estimation parameters, generating parity data, forming channel frames, and transmitting the channel frames to the receiver in accordance with the described methodologies), and the present invention also can take the form of a receiver device, method, computer program product, and integrated circuit that performs some or all of the receiver functions discussed above (e.g., recovering video frames from received channel frames and providing loss estimation feedback to the sender in accordance with the described methodologies). More generally, Applicant reserves the right to claim any inventive aspect whether part of a sender device, a receiver device, or a larger system and in whatever form is appropriate, e.g., a system, device, method, computer program product, integrated circuit, etc.

FIG. 172 is a schematic block diagram showing components of a sender device and/or receiver device 1300 in accordance with certain embodiments. In one aspect, device 1300 may include processor 1302 for carrying out processing functions associated with one or more of components and functions described herein. Processor 1302 can include a single or multiple set of processors or multi-core processors. Moreover, processor 1302 can be implemented as an integrated processing system and/or a distributed processing system.

Device 1300 may further include memory 1304, such as for storing local versions of operating systems (or components thereof) and/or applications being executed by processor 1302, such as a streaming application/service 1312, etc., related instructions, parameters, etc. Memory 1304 can include a type of memory usable by a computer, such as random access memory (RAM), read only memory (ROM), tapes, magnetic discs, optical discs, volatile memory, non-volatile memory, and any combination thereof.

Further, device 1300 may include a communications component 1306 that provides for establishing and maintaining communications with one or more other devices, parties, entities, etc. utilizing hardware, software, and services as described herein. Communications component 1306 may carry communications between components on device 1300, as well as between device 1300 and external devices, such as devices located across a communications network and/or devices serially or locally connected to device 1300. For example, communications component 1306 may include one or more buses, and may further include transmit chain components and receive chain components associated with a wireless or wired transmitter and receiver, respectively, operable for interfacing with external devices.

Additionally, device 1300 may include a data store 1308, which can be any suitable combination of hardware and/or software, that provides for mass storage of information, databases, and programs employed in connection with aspects described herein. For example, data store 1308 may be or may include a data repository for operating systems (or components thereof), applications, related parameters, etc. not currently being executed by processor 1302. In addition, data store 1308 may be a data repository for streaming application/service 1312 and/or one or more other components of the device 1300.

Device 1300 may optionally include a user interface component 1310 operable to receive inputs from a user of device 1300 and further operable to generate outputs for presentation to the user. User interface component 1310 may include one or more input devices, including but not limited to a keyboard, a number pad, a mouse, a touch-sensitive display, a navigation key, a function key, a camera, a microphone, a voice recognition component, a gesture recognition component, a depth sensor, a gaze tracking sensor, a switch/button, any other mechanism capable of receiving an input from a user, or any combination thereof. Further, user interface component 1310 may include one or more output devices, including but not limited to a display, a speaker, a wired or wireless audio interface, a haptic feedback mechanism, a printer, any other mechanism capable of presenting an output to a user, or any combination thereof. For example, user interface 1310 may allow for receiving video, audio, and other information for transmission as part of a videoconference or other application via streaming application/service 1312 and/or may render streaming content from streaming application/service 1312 for consumption by a user (e.g., on a display of the device 1300, an audio output of the device 1300, and/or the like).

Device 1300 may additionally include the streaming application/service 1312, which, for a sender device 110, may include or implement some or all of the video encoder 111, the frame splitter 112, the parity symbol generator 113, the packetizer 114, and/or the loss parameter generator 115, and for a receiver device 120, may include or implement some or all of the video decoder 121, the loss estimator 122, and/or the loss recovery processor 123.

It should be noted that embodiments include "full duplex" embodiments, e.g., where a first video stream is being sent from a first party to a second party (in which case the first party is the sender and the second party is the receiver for the first video stream) and where a second video stream is being sent from the second party to the first party (in which case the second party is the sender and the first party is the receiver for the second video stream). Without limitation, this can be particularly useful for two-way videoconferencing. Embodiments likewise can extend to multiparty communication (e.g., videoconferencing with any number of people, such as by applying the methodology for each pair of people), for example, as depicted schematically in FIG. 59 in which a connection between a sender and a receiver indicates that they are communicating.

By way of example, an element, or any portion of an element, or any combination of elements may be implemented with a "processing system" that includes one or more processors. Without limitation, some examples of processors include microprocessors, microcontrollers, digital signal processors (DSPs), graphics processing units (GPUs), tensor processing units (TPUs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Such a processing system can be implemented in any of a wide variety of devices and systems, including, without limitation, such things as computing devices and systems, data communication devices and systems, video streaming systems (e.g., live video streaming), video conferencing systems, extended reality systems (e.g., virtual reality, augmented reality, mixed reality, etc.), portable computing devices (e.g., smartphones, tablet computers, etc.), wearable computing devices (e.g., smart watches, VR goggles, VR headsets, smart gloves, etc.), smart vehicles (e.g., drones, self-driving vehicles, etc.), in-vehicle entertainment systems (e.g., airplanes, trains, etc.), communication satellites, video security systems, etc.

As used herein, the term software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. The above hardware description is provided to enable any person skilled in the art to practice the various aspects described herein.

It should be noted that headings are used above for convenience and are not to be construed as limiting the present invention in any way.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In alternative embodiments, the disclosed apparatus and methods (e.g., as in any flow charts or logic flows described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory device, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., components of the sender 110 and/or receiver 120) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

"Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements.

This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

To the extent of any inconsistency or conflict in the definition or use of terms between any of the incorporated publications, documents or things and the present application, those of the present application shall prevail.

Described embodiments are considered as illustrative only of the principles of the present invention. Further, since numerous modifications and changes will readily occur to those skilled in the art based on the teachings herein, it is not desired to limit the invention to the exact construction and operation shown and described herein. Accordingly, all suitable modifications and equivalents may be resorted to and should be assumed to fall within the scope of the invention as may be further defined in this and any subsequent regular patent application's claims to the invention.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A frame splitting encoder system comprising:
   a frame splitter configured to split each of a number of data frames i into a plurality of components including at least a first component $\Gamma[i]$ and a second component $\gamma[i]$;
   a parity symbol generator configured to allocate parity symbols for the components to ensure that (a) if the fraction of packets lost during time slot i is at most and the data of all prior frames is available, then the parity symbols sent during a time slot suffice to recover the lost data during that time slot, and (b) if time slot i is part of a partial burst starting in time slot j (i.e., for each time slot $z \in \{j, \ldots, j+b_j-1\}$, $1_z$ or fewer fraction of the packets sent during the time slot are lost where $i \in \{j, \ldots, j+b_j-1\}$) followed by a partial guard space (i.e., for each time slot $z \in \{j+b_j, \ldots, j+b_j-1+\tau\}$, $1_z^{(G)}$ or fewer fraction of the packets sent during the time slot are lost) and all the data of frames before the start of the partial burst is available, then the data for frame i is recovered within $\tau$ time slots; and
   a packetizer configured to packetize the components and the parity symbols.

2. The system of claim 1, wherein parity symbols are allocated such that all lost data for the first component of the frames is to be recovered by $(\tau-1)$ time slots after the start of the partial burst and the second component of each frame of the partial burst is recovered $\tau$ time slots later.

3. The system of claim 2, wherein the second component of the frames in a partial guard space after the partial burst are recovered by $(\tau-1)$ time slots after the start of the partial burst excluding future frames $\tau$ or more time slots after the start of the partial burst.

4. The system of claim 1, wherein parity symbols are allocated such that there are two or more types of parity symbols where one type of parity symbol for a frame is independent of the symbols of the second component of the same frame.

5. The system of claim 4, wherein the parity symbols allocated for a data frame i include at least a first set of parity symbols P[i] and a second set of parity symbols G[i] based on the plurality of components, wherein the second set of parity symbols is configured to ensure that (a) some parity symbols of a data frame can be used to recover the first component of the same data frame, (b) some parity symbols of a data frame can be used to recover the second component of the same data frame, and (c) some parity symbols of a data frame cannot be used to recover the second component of the data frame.

6. The system of claim 5, wherein the number of parity symbols allocated to P[i] and G[i] is based on the parameter $1_i^{(G)}$.

7. The system of claim 6, wherein the parameter $1_i^{(G)}$ is set to approximate an upper bound on the fraction of packets that may be lost during time slot i if there is no partial burst encompassing time slot i for which loss recovery is needed.

8. The system of claim 6, wherein $1_i^{(G)}$ is set so that the fraction of losses during time slot i is no more than $1_i^{(G)}$ with some probability.

9. The system of claim 5, wherein allocating the parity symbols comprises a two-stage parity allocation of (a) pre-allocating $p_{i+\tau}$ during time slot i for robustness to partial bursts then (b) increasing the size of $p_i$ during time slot i for robustness to loss in the partial guard space; the size of G[i] can then be set during time slot i.

10. The system of claim 5, wherein the frame splitting encoder system is multimodal.

11. The system of claim 5, wherein the number of parity symbols to be sent with the data of data frame i is set with the intention of (a) loss recovery during time slot i if there is no partial burst (and losses defined as partial guard space) and (b) loss recovery during time slot i of the second component of frame $(i-\tau)$ (i.e., $\gamma[i-\tau]$) which reflects if the partial burst encompasses frame $(i-\tau)$.

12. The system of claim 11, wherein:
   if the partial burst includes time slot i, then some of the parity symbols are used to recover a subset of $\Gamma[i]$ and/or some of the parity symbols are used to recover $\Gamma[i-\tau+1:i-1]$; and
   if the partial burst starts after time slot $(i-\tau)$ and ends before time slot i, then the parity symbols are used to recover lost symbols of $\Gamma[i-\tau+1:i-1]$ depending on the time slot in which the burst starts.

13. The system of claim 11, wherein the number of parity symbols $p_i+g_i$ is set so that when $1_i^{(G)}$ fraction of the parity symbols are lost and a partial burst encompasses time slot $(i-\tau)$, the number of received parity symbols $p_i^R+g_i^R$ is approximately equal to (a) the number of missing symbols $\Gamma[i]$ plus (b) the number of missing symbols of $\gamma[i-\tau]$ less the number of received symbols of $G[i-\tau]$, where this subtraction is bounded below by 0.

14. The system of claim 13, wherein $g_i$ is set so that the at least $g_i^R=(1-1_i^{(G)})g_i$ received symbols of G[i] suffice to recover the lost symbols of $\gamma[i]$, leaving $p_i^R$ symbols of P[i] to recover the lost symbols of $\Gamma[i]$ and $\gamma[i-\tau]$.

15. The system of claim 13, wherein $p_i$ is set approximately as follows:

$$p_i(1-l_i^{(G)})=\gamma_i l_i^{(G)}+\max(0, l_{i-\tau}v_{i-\tau}-(1-l_{i-\tau})g_{i-\tau}),$$

leading to:

$$p_i = \left\lceil \frac{\gamma_i l_i^{(G)} + \max(0, l_{i-\tau}v_{i-\tau} - (1 - l_{i-\tau})g_{i-\tau})}{(1 - l_i^{(G)})} \right\rceil,$$

and the ceiling is taken to ensure $p_i$ is an integer, optionally wherein $p_i$ is multiplied by $(1+\varepsilon)$ for an $\varepsilon$ of small absolute value.

16. The system of claim 11, wherein the number of parity symbols is set so that when $l_i^{(G)}$ fraction of the parity symbols are lost, the number of received parity symbols of P[i] (i.e., $p_i^R$) is approximately equal to (a) the number of missing symbols Γ[i] plus (b) the number of missing symbols of γ[i−τ] less the number of received symbols of G[i−τ], where this subtraction is bounded below by 0.

17. The system of claim 5, wherein the parity symbols are set with the intention that the number of symbols of P[i] is sufficient to recover Γ[i] during time slot i (e.g., $$p_i = \left\lceil \frac{l_i \gamma_i}{1 - l_i^{(G)}} \right\rceil$$

in the event that losses do not exceed a predetermined amount, optionally wherein the predetermined amount is defined as only losses as partial guard spaces.

18. The system of claim 5, wherein the parity symbols are set with the intention that the number of symbols of G[i] is sufficient to recover γ[i] during time slot i (e.g., $$g_i = \left\lceil \frac{l_i v_i}{1 - l_i^{(G)}} \right\rceil$$

in the event that losses do not exceed a predetermined amount, optionally wherein the predetermined amount is defined as only losses as partial guard spaces.

19. The system of claim 5, wherein some of the parity symbols of a data frame can be used to recover either the first or second component of the same data frame whereas other parity symbols can only be used to recover the first component of the data frame but not the second component, optionally wherein said some of the parity symbols comprise parity symbols of G[i] and wherein said other parity symbols comprise parity symbols of P[i].

20. The system of claim 5, wherein some of the parity symbols of a data frame can be used to recover the first component but not the second component of the data frame and other parity symbols can be used to recover the second component but not the first component, optionally wherein said some of the parity symbols comprise parity symbols of P[i] and wherein said other parity symbols comprise parity symbols of G[i].

21. The system of claim 5, wherein the number of parity symbols to be sent with the data of data frame i is set with the intention of (a) loss recovery during time slot i if there is no partial burst and losses defined as partial guard space and (b) if there is a partial burst starting in frame j encompassing frame i, (i) loss recovery by time slot (j+T) of the first component of frames j through (j+$b_j$−1) (i.e., Γ[j:j+$b_j$−1]), and (ii) loss recovery by time slot (i+τ) of the second component of frame i (i.e., γ[i]).

22. The system of claim 21, wherein loss recovery of the first component of frames j through (j+$b_j$−1) (i.e., Γ[j:j+$b_j$−1]) occurs by time slot (j+τ−1).

23. The system of claim 21, wherein the second component of the frames of the guard space will also be recovered in step (i), optionally wherein γ[j+$b_j$:j+τ−1] and Γ[j:j+τ−1] are recovered by time slot (j+τ−1).

24. The system of claim 1, wherein parity symbols are allocated such that the amount of parity symbols is minimized subject to predetermined performance targets for loss recovery.

25. The system of claim 1, wherein the frame splitter splits the data frames into variable size components.

26. The system of claim 1, wherein the frame splitter splits the data frames into fixed size components.

27. The system of claim 1, wherein at least one of (a) splitting of the data frames into the two or more components or (b) allocating parity symbols for the two or more components or (c) packetizing the components and the parity symbols is based on feedback from a receiver.

28. The system of claim 1, wherein at least one of (a) splitting of the data frames into the two or more components or (b) allocating parity symbols for the two or more components or (c) packetizing the components and the parity symbols is based on predictive analytics.

29. The system of claim 1, wherein at least one of (a) splitting of the data frames into the two or more components or (b) allocating parity symbols for the two or more components or (c) packetizing the components and the parity symbols is based on machine learning.

30. The system of claim 1, wherein at least one of (a) splitting of the data frames into the two or more components or (b) allocating parity symbols for the two or more components or (c) packetizing the components and the parity symbols is based on reinforcement learning.

31. The system of claim 1, wherein the frame splitter is configured to select between splitting a given data frame into a single component or into two or more components, optionally wherein the frame splitter is configured to select how to split frames based on at least one of a frame-by-frame basis, a per-call basis, feedback from a receiver, predictive analytics, or machine learning.

32. The system of claim 1, wherein at least one of the frame splitting or the parity symbol allocation is based on a heuristic.

33. The system of claim 1, wherein parity symbol allocation includes at least one failsafe.

34. The system of claim 1, wherein in the frame splitting encoder system is a compression-aware frame splitting encoder system that uses compression information from a frame compressor to determine FEC parameters for transmitting compressed frames.

35. The system of claim 34, wherein the compression information comprises metadata indicating whether certain symbols are supplementary such that the data frame is useful without them but even better with them, optionally wherein such supplementary symbols are placed in γ[i] so that the non-supplementary symbols fit into Γ[i] to be recovered sooner.

36. The system of claim 34, wherein the FEC parameters include at least one of frame splitting parameters, parity symbol allocation parameters, and/or packetization parameters.

37. The system of claim 34, wherein the compression-aware FEC frame splitting encoder system is trained using machine learning to determine the FEC parameters for transmitting compressed frames, optionally wherein the machine learning is reinforcement learning.

38. The system of claim 34, further comprising the frame compressor.

39. The system of claim 38, wherein at least one mechanism within the compression-aware frame splitting encoder system and at least one mechanism within the frame compressor are trained jointly.

40. The system of claim 39, wherein all considered mechanisms of the compression-aware frame splitting encoder system and the frame compressor are trained jointly.

41. The system of claim 39, wherein the compression-aware frame splitting encoder system and the frame compressor are trained by alternating (a) fixing some of the mechanisms, and (b) training the non-fixed mechanisms.

42. The system of claim 1, wherein packetizing the components and the parity symbols comprises dividing each component and each type of parity symbols into pieces and distributing the pieces across multiple packets, optionally wherein the pieces are equal size pieces and/or wherein packetization involves striping.

43. The system of claim 1, further comprising an FEC-aware frame compressor that utilizes information from the frame splitting encoder system about FEC methodology and/or parameters to control compression of data into one or more compressed frames for the frame splitter.

44. The system of claim 43, wherein the FEC-aware frame compressor performs selective compression based on anticipated parity allocation.

45. The system of claim 43, wherein the information from the frame splitting encoder system includes at least one of frame splitting and/or parity symbol allocation information and/or indicators of frame splitting and/or parity symbol allocation information for future frames such as parameters of partial bursts and/or guardspaces.

46. The system of claim 43, wherein the frame compressor selectively spreads information for a time slot over one or more additional time slots.

47. The system of claim 46, wherein selectively spreading information comprises producing a lower resolution compression for an initial decompression and producing a higher resolution compression for a subsequent decompression.

48. The system of claim 46, wherein selectively spreading information comprises creating a first compression to provide a less refined version of the data for the time slot and sending extra information during one or more later time slots to refine the prior information.

49. The system of claim 43, wherein the FEC-aware frame compressor is trained using machine learning, optionally wherein the machine learning is reinforcement learning.

50. The system of claim 43, wherein both the frame splitting encoder system and the FEC-aware frame compressor are trained together using machine learning, optionally wherein the machine learning is reinforcement learning.

51. The system of claim 43, wherein the FEC-aware frame compressor utilizes information about FEC methodology and/or parameters to control the target size of the compressed frame for the FEC encoder.

52. The system of claim 51, wherein the FEC-aware frame compressor is trained using machine learning, optionally wherein the machine learning is reinforcement learning where the reward is the number of symbols that are transmitted.

53. The system of claim 51, wherein both the frame splitting encoder system and the FEC-aware frame compressor are trained together using machine learning, optionally wherein the machine learning is reinforcement learning.

54. The system of claim 51, wherein the frame compressor tunes the target size based on the relationship between the size of the compressed frame and the number of parity symbols sent, optionally, wherein, the number of parity symbols sent is monotonically non-decreasing with the size of the compressed frame, so the marginal cost (in bandwidth usage) of increasing the target size may differ based on the state of the system and target size.

55. The system of claim 51, wherein the frame compressor tunes the amount of data sent per frame without spreading information content, optionally by choosing to compress to a smaller number of symbols (providing less information/a lower resolution frame) for a frame i and then for the next frame i+1 compressing to more symbols (providing more information about the next frame/higher resolution).

56. The system of claim 51, wherein the frame compressor tunes the amount of data sent per frame and also spreads information content, optionally by choosing to compress to a smaller number of symbols (providing less information/a lower resolution frame) for a frame i and then for the next frame i+1 (a) compressing to more symbols (providing more information about the next frame/higher resolution) while also (b) sending information to help lead to a better resolution of frame i.

57. The system of claim 51, wherein the frame compressor selectively spreads information for a time slot over one or more additional time slots, optionally by creating a first compression to provide a less refined version of the data for the time slot and sending extra information during one or more later time slots to refine the prior information.

58. The system of claim 51, wherein the FEC parameters include at least one of frame splitting parameters, parity symbol allocation parameters, and/or packetization parameters.

59. The system of claim 51, wherein the frame compressor creates one or more parts as part of compression (and may or may not include metadata about the parts) and distributes the parts over one or more compressed frames, optionally wherein the frame compressor makes two parts, allocates the first part to the current compressed frame and the second part to the subsequent compressed frame, and then uses metadata to indicate that the FEC scheme should place the second part in the first component to lead to loss recovery at a tolerable latency.

60. The system of claim 51, wherein the frame compressor adjusts the sizes of compressed frames by reducing or increasing the video quality for compressed frames to better control the amount of data needed in compressed frames such that the displayed frames may reduce the granularity of certain frames if necessary to keep the video consistent with the understanding that having a higher quality frame available than is displayed is still useful (e.g., for better inter-frame compression of future frames).

61. The system of claim 1 embodied as a sender device that implements the frame splitter, the parity symbol generator, and the packetizer.

62. The system of claim 1 embodied as a computer program product comprising a tangible, non-transitory computer readable medium having embodied therein program code which, when executed by at least one processor, implements the frame splitter, the parity symbol generator, and the packetizer.

63. The system of claim 1 embodied as an integrated circuit having circuitry configured to implement the frame splitter, the parity symbol generator, and the packetizer.

64. A receiver device that decodes lost data and/or parity symbols in accordance with the encoding of claim 1.

65. A frame splitting encoder method comprising:
splitting each of a number of data frames i into a plurality of components including at least a first component Γ[i] and a second component γ[i];
allocating parity symbols for the components to ensure that (a) if the fraction of packets lost during time slot i is at most $l_i^{(G)}$ and the data of all prior frames is available, then the parity symbols sent during a time slot suffice to recover the lost data during that time slot, and (b) if time slot i is part of a partial burst starting in time slot j (i.e., for each time slot $z \in \{j, \ldots, j+b_j-1\}$, $l_z$ or fewer fraction of the packets sent during the time slot are lost where $i \in \{j, \ldots, j+b_j-1\}$) followed by a partial guard space (i.e., for each time slot $z \in \{j+b_j, \ldots, j+b_j-1+\tau\}$, $l_z^{(G)}$ or fewer fraction of the packets sent during the time slot are lost) and all the data of frames before the start of the partial burst is available, then the data for frame i is recovered within τ time slots; and
packetizing the components and the parity symbols.

66. The method of claim 65, wherein parity symbols are allocated such that all lost data for the first component of the frames is to be recovered by (τ−1) time slots after the start of the partial burst and the second component of each frame of the partial burst is recovered τ time slots later.

67. The method of claim 66, wherein the second component of the frames in a partial guard space after the partial burst are recovered by (τ−1) time slots after the start of the partial burst excluding future frames τ or more time slots after the start of the partial burst.

68. The method of claim 65, wherein parity symbols are allocated such that there are two or more types of parity symbols where one type of parity symbol for a frame is independent of the symbols of the second component of the same frame.

69. The method of claim 68, wherein the parity symbols allocated for a data frame i include at least a first set of parity symbols P[i] and a second set of parity symbols G[i] based on the plurality of components, wherein the second set of parity symbols is configured to ensure that (a) some parity symbols of a data frame can be used to recover the first component of the same data frame, (b) some parity symbols of a data frame can be used to recover the second component of the same data frame, and (c) some parity symbols of a data frame cannot be used to recover the second component of the data frame.

70. The method of claim 69, wherein the number of parity symbols allocated to P[i] and G[i] is based on the parameter $l_i^{(G)}$.

71. The method of claim 70, wherein the parameter $l_i^{(G)}$ is set to approximate an upper bound on the fraction of packets that may be lost during time slot i if there is no partial burst encompassing time slot i for which loss recovery is needed.

72. The method of claim 70, wherein $l_i^{(G)}$ is set so that the fraction of losses during time slot i is no more than $l_i^{(G)}$ with some probability.

73. The method of claim 69, wherein allocating the parity symbols comprises a two-stage parity allocation of (a) pre-allocating $p_{i+\tau}$ during time slot i for robustness to partial bursts then (b) increasing the size of $p_i$ during time slot i for robustness to loss in the partial guard space; the size of G[i] can then be set during time slot i.

74. The method of claim 69, wherein the frame splitting encoder method is multimodal.

75. The method of claim 69, wherein the number of parity symbols to be sent with the data of data frame i is set with the intention of (a) loss recovery during time slot i if there is no partial burst (and losses defined as partial guard space) and (b) loss recovery during time slot i of the second component of frame (i−τ) (i.e., γ[i−τ]) which reflects if the partial burst encompasses frame (i−τ).

76. The method of claim 75, wherein:
if the partial burst includes time slot i, then some of the parity symbols are used to recover a subset of Γ[i] and/or some of the parity symbols are used to recover Γ[i−τ+1:i−1]; and
if the partial burst starts after time slot (i−τ) and ends before time slot i, then the parity symbols are used to recover lost symbols of Γ[i−τ+1:i−1] depending on the time slot in which the burst starts.

77. The method of claim 75, wherein the number of parity symbols $p_i+g_i$ is set so that when $l_i^{(G)}$ fraction of the parity symbols are lost and a partial burst encompasses time slot (i−τ), the number of received parity symbols $p_i^R+g_i^R$ is approximately equal to (a) the number of missing symbols Γ[i] plus (b) the number of missing symbols of γ[i−τ] less the number of received symbols of G[i−τ], where this subtraction is bounded below by 0.

78. The method of claim 77, wherein $g_i$ is set so that the at least $g_i^R=(1-l_i^{(G)})g_i$ received symbols of G[i] suffice to recover the lost symbols of γ[i], leaving pf symbols of P[i] to recover the lost symbols of Γ[i] and γ[i−τ].

79. The method of claim 77, wherein $p_i$ is set approximately as follows:

$$p_i(1-l_i^{(G)}) = \gamma_i l_i^{(G)} + \max(0, l_{i-\tau} v_{i-\tau} - (1-l_{i-\tau})g_{i-\tau}),$$

leading to:

$$p_i = \left\lceil \frac{\gamma_i l_i^{(G)} + \max(0, l_{i-\tau} v_{i-\tau} - (1-l_{i-\tau})g_{i-\tau})}{(1-l_i^{(G)})} \right\rceil,$$

and the ceiling is taken to ensure $p_i$ is an integer, optionally wherein $p_i$ is multiplied by (1+ε) for an ε of small absolute value.

80. The method of claim 75, wherein the number of parity symbols is set so that when $l_i^{(G)}$ fraction of the parity symbols are lost, the number of received parity symbols of P[i] (i.e., $p_i^R$) is approximately equal to (a) the number of missing symbols Γ[i] plus (b) the number of missing symbols of γ[i−τ] less the number of received symbols of G[i−τ], where this subtraction is bounded below by 0.

81. The method of claim 69, wherein the parity symbols are set with the intention that the number of symbols of P[i] is sufficient to recover Γ[i] during time slot i (e.g., $$\left(\text{e.g., } p_i = \left\lceil \frac{l_i \gamma_i}{1-l_i^{(G)}} \right\rceil \right)$$

in the event that losses do not exceed a predetermined amount, optionally wherein the predetermined amount is defined as only losses as partial guard spaces.

82. The method of claim 69, wherein the parity symbols are set with the intention that the number of symbols of G[i] is sufficient to recover γ[i] during time slot i (e.g., $$\left(\text{e.g., } g_i = \left\lceil \frac{l_i v_i}{1-l_i^{(G)}} \right\rceil \right)$$

in the event that losses do not exceed a predetermined amount, optionally wherein the predetermined amount is defined as only losses as partial guard spaces.

83. The method of claim 69, wherein some of the parity symbols of a data frame can be used to recover either the first or second component of the same data frame whereas other parity symbols can only be used to recover the first component of the data frame but not the second component, optionally wherein said some of the parity symbols comprise parity symbols of G[i] and wherein said other parity symbols comprise parity symbols of P[i].

84. The method of claim 69, wherein some of the parity symbols of a data frame can be used to recover the first component but not the second component of the data frame and other parity symbols can be used to recover the second component but not the first component, optionally wherein said some of the parity symbols comprise parity symbols of P[i] and wherein said other parity symbols comprise parity symbols of G[i].

85. The method of claim 69, wherein the number of parity symbols to be sent with the data of data frame i is set with the intention of (a) loss recovery during time slot i if there is no partial burst and losses defined as partial guard space and (b) if there is a partial burst starting in frame j encompassing frame i, (i) loss recovery by time slot (j+τ) of the first component of frames j through (j+$b_j$−1) (i.e., Γ[j:j+$b_j$−1]), and (ii) loss recovery by time slot (i+τ) of the second component of frame i (i.e., γ[i]).

86. The method of claim 85, wherein loss recovery of the first component of frames j through (j+$b_j$−1) (i.e., Γ[j:j+$b_j$−1]) occurs by time slot (j+τ−1).

87. The method of claim 85, wherein the second component of the frames of the guard space will also be recovered in step (i), optionally wherein γ[j+$b_j$:j+τ−1] and Γ[j:j+τ−1] are recovered by time slot (j+τ−1).

88. The method of claim 65, wherein parity symbols are allocated such that the amount of parity symbols is minimized subject to predetermined performance targets for loss recovery.

89. The method of claim 65, wherein the data frames are split into variable size components.

90. The method of claim 65, wherein the data frames are split into fixed size components.

91. The method of claim 65, wherein at least one of (a) splitting of the data frames into the two or more components or (b) allocating parity symbols for the two or more components or (c) packetizing the components and the parity symbols is based on feedback from a receiver.

92. The method of claim 65, wherein at least one of (a) splitting of the data frames into the two or more components or (b) allocating parity symbols for the two or more components or (c) packetizing the components and the parity symbols is based on predictive analytics.

93. The method of claim 65, wherein at least one of (a) splitting of the data frames into the two or more components or (b) allocating parity symbols for the two or more components or (c) packetizing the components and the parity symbols is based on machine learning.

94. The method of claim 65, wherein at least one of (a) splitting of the data frames into the two or more components or (b) allocating parity symbols for the two or more components or (c) packetizing the components and the parity symbols is based on reinforcement learning.

95. The method of claim 65, wherein splitting each of a number of data frames i into a plurality of components comprises selecting between splitting a given data frame into a single component or into two or more components.

96. The method of claim 65, wherein at least one of the frame splitting or the parity symbol allocation is based on a heuristic.

97. The method of claim 65, wherein parity symbol allocation includes at least one failsafe.

98. The method of claim 65, wherein the frame splitting encoder method is a compression-aware frame splitting encoder method that uses compression information from a frame compressor to determine FEC parameters for transmitting compressed frames.

99. The method of claim 98, wherein the compression information comprises metadata indicating whether certain symbols are supplementary such that the data frame is useful without them but even better with them, optionally wherein such supplementary symbols are placed in γ[i] so that the non-supplementary symbols fit into Γ[i] to be recovered sooner.

100. The method of claim 98, wherein the FEC parameters include at least one of frame splitting parameters, parity symbol allocation parameters, and/or packetization parameters.

101. The method of claim 98, wherein the compression-aware frame splitting encoder method is trained using machine learning to determine the FEC parameters for transmitting compressed frames, optionally wherein the machine learning is reinforcement learning.

102. The method of claim 98, further comprising the frame compressor producing the compression information.

103. The method of claim 102, wherein at least one mechanism within the compression-aware frame splitting encoder method and at least one mechanism within the frame compressor are trained jointly.

104. The method of claim 103, wherein all considered mechanisms of the compression-aware PEC frame splitting encoder method and the frame compressor are trained jointly.

105. The method of claim 103, wherein the compression-aware frame splitting encoder method and the frame compressor are trained by alternating (a) fixing some of the mechanisms, and (b) training the non-fixed mechanisms.

106. The method of claim 65, wherein packetizing the components and the parity symbols comprises dividing each component and each type of parity symbols into pieces and distributing the pieces across multiple packets, optionally wherein the pieces are equal size pieces and/or wherein packetization involves striping.

107. The method of claim 65, further comprising utilizing information from the frame splitting encoder method about FEC methodology and/or parameters to control compression of data into one or more compressed frames for the frame splitter.

108. The method of claim 107, wherein controlling compression performs selective compression based on anticipated parity allocation.

109. The method of claim 107, wherein the information from the frame splitting encoder method includes at least one of frame splitting and/or parity symbol allocation information and/or indicators of frame splitting and/or parity symbol allocation information for future frames such as parameters of partial bursts and/or guardspaces.

110. The method of claim 107, wherein controlling compression selectively spreads information for a time slot over one or more additional time slots.

111. The method of claim 110, wherein selectively spreading information comprises producing a lower resolution compression for an initial decompression and producing a higher resolution compression for a subsequent decompression.

112. The method of claim 110, wherein selectively spreading information comprises creating a first compression to provide a less refined version of the data for the time slot and sending extra information during one or more later time slots to refine the prior information.

113. The method of claim 107, wherein the FEC-aware frame compressor is trained using machine learning, optionally wherein the machine learning is reinforcement learning.

114. The method of claim 107, wherein both the frame splitting encoder method and the FEC-aware frame compressor are trained together using machine learning, optionally wherein the machine learning is reinforcement learning.

115. The method of claim 107, wherein the FEC-aware frame compressor utilizes information about FEC methodology and/or parameters to control the target size of the compressed frame for the FEC encoder.

116. The method of claim 115, wherein the FEC-aware frame compressor is trained using machine learning, optionally wherein the machine learning is reinforcement learning where the reward is the number of symbols that are transmitted.

117. The method of claim 115, wherein both the frame splitting encoder method and the FEC-aware frame compressor are trained together using machine learning, optionally wherein the machine learning is reinforcement learning.

118. The method of claim 115, wherein the frame compressor tunes the target size based on the relationship between the size of the compressed frame and the number of parity symbols sent, optionally, wherein the number of parity symbols sent is monotonically non-decreasing with the size of the compressed frame, so the marginal cost (in bandwidth usage) of increasing the target size may differ based on the state of the system and target size.

119. The method of claim 115, wherein the frame compressor tunes the amount of data sent per frame without spreading information content, optionally by choosing to compress to a smaller number of symbols (providing less information/a lower resolution frame) for a frame i and then for the next frame i+1 compressing to more symbols (providing more information about the next frame/higher resolution).

120. The method of claim 115, wherein the frame compressor tunes the amount of data sent per frame and also spreads information content, optionally by choosing to compress to a smaller number of symbols (providing less information/a lower resolution frame) for a frame i and then for the next frame i+1 (a) compressing to more symbols (providing more information about the next frame/higher resolution) while also (b) sending information to help lead to a better resolution of frame i.

121. The method of claim 115, wherein the frame compressor selectively spreads information for a time slot over one or more additional time slots, optionally by creating a first compression to provide a less refined version of the data for the time slot and sending extra information during one or more later time slots to refine the prior information.

122. The method of claim 115, wherein the FEC parameters include at least one of frame splitting parameters, parity symbol allocation parameters, and/or packetization parameters.

123. The method of claim 115, wherein the frame compressor creates one or more parts as part of compression (and may or may not include metadata about the parts) and distributes the parts over one or more compressed frames, optionally wherein the frame compressor makes two parts, allocates the first part to the current compressed frame and the second part to the subsequent compressed frame, and then uses metadata to indicate that the FEC scheme should place the second part in the first component to lead to loss recovery at a tolerable latency.

124. The method of claim 115, wherein the frame compressor is configured to adjust the sizes of compressed frames by reducing or increasing the video quality for compressed frames to control the amount of data needed in compressed frames such that the frame compressor may reduce the granularity of certain displayed frames if necessary to keep the video consistent, optionally wherein a higher quality frame than is displayed is available to the frame compressor for inter-frame compression.

* * * * *